United States Patent
Stoneman

(10) Patent No.: US 8,983,889 B1
(45) Date of Patent: *Mar. 17, 2015

(54) AUTONOMOUS HUMANOID COGNITIVE SYSTEMS

(76) Inventor: Martin L. Stoneman, Phoenix, AZ (US)

(*) Notice: Subject to any disclaimer, the term of this patent is extended or adjusted under 35 U.S.C. 154(b) by 781 days.

This patent is subject to a terminal disclaimer.

(21) Appl. No.: 13/022,839

(22) Filed: Feb. 8, 2011

Related U.S. Application Data

(63) Continuation-in-part of application No. 11/423,382, filed on Jun. 9, 2006, now Pat. No. 7,885,912, which is a continuation-in-part of application No. 10/716,640, filed on Nov. 18, 2003, now abandoned, which is a continuation-in-part of application No. 09/302,010, filed on Apr. 27, 1999, now Pat. No. 6,651,044, which is a continuation-in-part of application No. 08/621,426, filed on Mar. 25, 1996, now abandoned.

(51) Int. Cl.
*G06N 5/02* (2006.01)
(52) U.S. Cl.
USPC .......................................................... 706/46
(58) Field of Classification Search
USPC .......................................................... 706/46
See application file for complete search history.

(56) References Cited

U.S. PATENT DOCUMENTS

| | | | |
|---|---|---|---|
| 4,638,445 A | 1/1987 | Mattaboni | |
| 5,325,441 A | 6/1994 | Hoecker | |
| 5,367,454 A | 11/1994 | Kawamoto et al. | |
| 5,371,673 A | 12/1994 | Fan | |
| 5,412,756 A | 5/1995 | Bauman et al. | |
| 5,416,899 A | 5/1995 | Poggio et al. | |
| 5,566,295 A | 10/1996 | Cypher et al. | |
| 5,677,997 A | 10/1997 | Talatik | |
| 5,873,094 A | 2/1999 | Talatik | |
| 6,088,689 A | 7/2000 | Kohn et al. | |

OTHER PUBLICATIONS

Reilly et al.; "Natural Negotiation for Believable Agents". Carnegie Mellon University, School of Computer Science, Jun. 1995 CMU-CS-95-164.

*Primary Examiner* — Kakali Chaki
*Assistant Examiner* — Mai T Tran
(74) *Attorney, Agent, or Firm* — Raymond J. E. Hall; Lodestar Patents, PLLC

(57) ABSTRACT

Disclosed are computer systems with intelligent or autonomous decision systems which include means for determining relevancy, i.e., the threats to and opportunities of the autonomous decision system. Also disclosed are such autonomous decision systems using an efficient ontology to interact sociably with humans, including the use of natural languages and bonding. The desired "whether concrete is included in abstract" computation system is enhanced by the ontology system using categorizing of natural objects using as primitives a set of self tendencies suitable, when hierarchically assigned to objects, to do incremental simulation of "future" situations (including such objects) from a presented situation. Using such primitives and computation system, planning, learning, languaging, etc., are efficiently accomplished.

21 Claims, 62 Drawing Sheets

FIG. 1B-1

General Listing and Description of Primary ADS Data Types

```
In    - Input device n of the ADS
Xn    - sensory "reading" of input device In (may be
        proprioceptive)
XRFn  - a specified range/purview of In
RF    - a rule that is "true" if Xn is included in XRFn
BF    - a set of RF's identifying a "doing"
RFs   - RF about the self ADS
RFsB  - an RFs identifying a doing of the ADS
RFsM  - an RFs identifying a "metabolic" status of the ADS
RFsE  - an RFs identifying an "emotion" of "feeling" of the ADS
BFs   - a set of RFs's identifying the doings or metabolism or
        feelings of the self ADS
RFM   - a unique marker referring to an RF
BFM   - a unique marker referring to a BF
PFM   - an arbitrary unique marker to be used to refer to a PF
Rx    - a "concrete" set of "sensed" RFM's referring to a sensed
        "concrete" object
Ri    - an "abstract" set of RFM's
Px    - a "concrete" set of allocated PFM's plus "concrete" RFM-
        set
Pi    - a set of PFM's and RFM's referring to an "abstract
        object", often a single PFM
Ris   - the "self" object
r     - a specified spacio-temporal relationship, including the
        null relation
SE    - a single-relation abstract situation, i.e., an r between
        among abstract objects, including a self object; thus
        SE = r(Ris,Pi1,Pi2,..)
Si    - a Boolean set of SE's defining an abstract situation
dsd   - an "incremental" action decision for a self-object
Lx    - a location of a (usually-concrete) object, i.e., an Rx/Px
Vx    - a vector of a (usually-concrete) object, i.e., an Rx/Px
Ex    - an "event", for example described as a data row:
        Rx/Px...Lx...Vx...BF
Sx    - a concrete situation described as a set of Ex's
PF    - a "hierachied" rule that if (from the viewpoint of the
        tested object) the tested concrete situation (Sx) is included
        in the abstract situation (Si) of the rule, then DO the
        incremental action decision of the rule (dsd), each set of
        hierachied PF's associated with an object being adequate for
        incremental simulation
SxC   - the "now" Sx of an ADS, including access to the PF's
        referred to by the PFM's of the Px's of the Ex's
SxTn  - (SxT1=SxC) from n=2, the nth incremental computation (in
        simulation) of the predicted situation of an ADS
Sip   - an abstract situation (Si) of the self ADS which
        identifies a (hierachied) problem p
```

FIG. 1B-2

Sigp — an abstract situation (Si) of the self ADS which identifies a (hierarchied) subgoal g attached to the problem p
dD — a hierarchied default real-time action decision attached to an abstract situation of the self ADS
dTd — a hierarchied trial (to try to get to a later subgoal without incurring a worse problem) incremental action decision attached to an abstract situation of the self ADS
dc — a "coordinated" real-time action decision for the ADS equal to (based on) a "successful" dTd (trial incremental decision)
G — a plan (a hierarchied set of subgoals g), each subgoal g having associated hierarchied dD's and dTd's
Gpn — the nth subgoal of a plan to solve the problem p
Pil — one of the "look-for" Pi's (abstract objects) of the next Sigp (of the next subgoal g), i.e., the next Gpn
RFl — one of the "look-for" RF's generated by finding (from a list of known concrete objects with their associated RF's) concrete objects including a current Pil and heuristically-selecting RF's to look for

FIG. 2

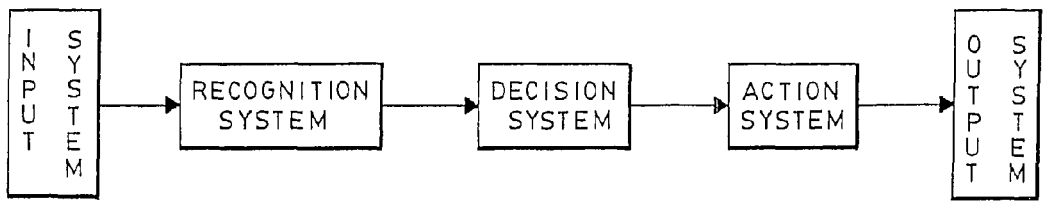

FIG. 3

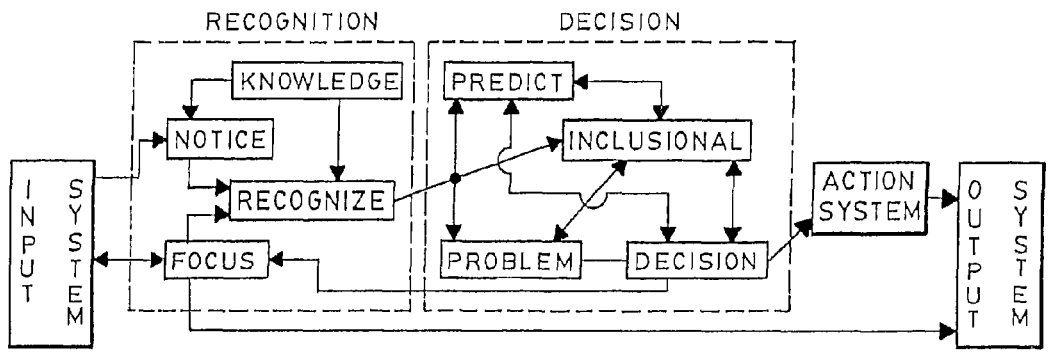

DATA FLOW IN AUTONOMOUS DECISION SYSTEM

PLAN 1 STRING

PLAN 2 STRING

PLAN 3 STRING

○ "N" MEANS A "NODE"

○ UPPER-MOST NODE IS THE ABSENCE OF THE RELEVANT PROBLEM

FIG. 6

EXAMPLE COMPUTATION FLOW FOR TESTING WHETHER A GIVEN
CONCRETE SITUATION (Sx) IS INCLUDED IN A GIVEN ABSTRACT
SITUATION (Si), ONE SUB-EVALUATION (SE) AT A TIME:

----------

Definition Reminders:

$$Sx = \begin{pmatrix} (Px1 = [PFM_1, PFM_2, \ldots PFM_n; RFM_1, RFM_2 \ldots RFM_n] \ldots Lx_1 \ldots Vx_1 \ldots BFM's_1) \\ (Px2 = [PFM_1, PFM_2, \ldots PFM_n; RFM_1, RFM_2 \ldots RFM_n] \ldots Lx_2 \ldots Vx_2 \ldots BFM's_2) \\ ( \ .\qquad\qquad\qquad\qquad\qquad\qquad\qquad\qquad\qquad .\quad .\quad .\quad ) \\ ( \ .\qquad\qquad\qquad\qquad\qquad\qquad\qquad\qquad\qquad .\quad .\quad .\quad ) \\ (Pxn = [PFM_1, PFM_2, \ldots PFM_n; RFM_1, RFM_2 \ldots RFM_n] \ldots Lx_n \ldots Vx_n \ldots BFM's_n) \end{pmatrix}$$

SE= r(Pi1, Pi2, ...Pin)     where any abstract thing (Pi) may
                             specify one or more doings (BFM's) and
                             where each Pi is a set of PFM's and a
                             set of RFM's

----------

Computation Flow:

```
IS Px1 INCLUDED IN Pi1? (i.e.,      IF YES, Px1 MAY STAND FOR Pi1
IS Pi1 A SUBSET OF Px1? BFM'S?      IN THE RELATION r (PROVIDED
                                    THE BFM'S OF Pi1, IF ANY, ARE
                                    A SUBSET OF THE BFM'S OF Px1)

IS Pi2 A SUBSET OF Px1? BFM'S?      IF YES, Px1 MAY STAND FOR Pi2
       .                                    .
       .                                    .
IS Pin A SUBSET OF Px1? BFM'S?      IF YES, Px1 MAY STAND FOR Pin

IS Pi1 A SUBSET OF Px2? BFM'S?      IF YES, Px2 MAY STAND FOR Pi1
       .                                    .
       .                                    .
IS Pin A SUBSET OF Px2? BFM'S?      IF YES, Px2 MAY STAND FOR Pin

IS Pi1 A SUBSET OF Pxn? BFM'S?      IF YES, Pxn MAY STAND FOR Pi1
       .                                    .
       .                                    .
IS Pin A SUBSET OF Pxn? BFM'S?      IF YES, Pxn MAY STAND FOR Pin
```

----------

FOR ALL PERMUTATIONS OF Px'S STANDING FOR Pi'S,
RESPECTIVELY, COMPUTE WHETHER THE r IS TRUE (FROM THE VIEWPOINT
OF THE Lx/Vx OF THE APPROPRIATE "SELF" ROW OF THE Sx, I.E., THE
APPROPRIATE Px) CONSIDERING THE Vx'S AND Lx'S OF OTHER Px'S
STANDING FOR THE Pi'S OF THE RELATION r.

FOR ALL "TRUE" SUCH RELATION COMPUTATIONS, THERE IS SE
INCLUSION. OTHERWISE, NOT. [FOR Si INCLUSION DETERMINATION, THE
BOOLEAN COMPUTATIONS AMONG THE SE'S OF THE Si MUST BE DONE.]

FIG. 7A-1

```
{                    } Unit Si_mod; {                                    }
{== Purpose: ================================= Owner: TFL ==============}
  This is the main brain code. It determines the inclusionals for all
  decision making.
 |-- History: ----------------------------------------------------------
  2/25/91: Rick added support for Story telling data using lecture mode
           and added Dans extra parm in the relations call.
  04/10/91 - Changed method of testing for body relations. Now any Row
             can do a test for HHT's by specifying itself as the 1st
             ri, ri2=to rfs that refer to HHT regs, and relop=FEEL.
  05/13/91: Added code to continue scanning SE's, even if current SE
            fails when the NextOp is BOR.
  07/29/91: Added code to allow to handle "sortof" of invalid SE's.
            If your SE spec's an RI that cant be found, then it was
            assumed FALSE. Now, if the preceeding NextOp is BNOT, then
            that boolean will be applied, and the SE will become TRUE.

== Copyright (c) 1989-1991 Anthrobotics ==============================

Upcoming changes to SIMOD, because of TFL.

° Onehit will be replaced with Nhits. This allows for dsd averaging.
    (this can be up to 20, the size of the datalist buffer.)
  ° Relative row/relrownum need to be expanded in SxRow to n hits.

{                      } Interface {                                     }
 Uses NewTypes,Types,Lists,Relation,SiStuff,DatList,Sxsturf;
 Const  MaxSiHits : Integer = 1;      (Tells how many SIStatuss to allow)
{----------------------------------------------------------------------}
 PROCEDURE Situation_Inclusion(Var SiListToTest  : DataList; {What Sis to test;
set by Rxs}
                                Var SisThatHit    : DataList; (Returns list of Sis
that hit)
                                Var TheSx         : ListPtr;
                                Var SxIndex       : SxIndexArray;
                                    DefaultRow    : SxRowPtr);
{----------------------------------------------------------------------}
{                      } Implementation {                                }
 Uses RxStuff1,RiStuff,Strategy;
 Const BreakSi : Word = 0;  (used for debugging only!)
{----------------------------------------------------------------------}
{                        Situation Methods                               }
 PROCEDURE Situation_Inclusion(Var SiListToTest  : DataList; {What Sis to test;
set by Rxs}
                                Var SisThatHit    : DataList; (Returns list of Sis
that hit)
                                Var TheSx         : ListPtr;
                                Var SxIndex       : SxIndexArray;
                                    DefaultRow    : SxRowPtr);
{== Purpose: =========================================================
  This is it. The main cheese, where men are men and sheep are scared.
  This is where all the brain inclusionals occur.
                          Be in awe, mortal.

Var  SxRowPtr1,
     SxRowPtr2        : SxRowPtr;
     CurrentRI        : Array[0..1] of RiPtr;
     ValidRow         : Boolean;
     ANotSE,
     SIFailed,                        (Goes TRUE once we know weve failed.)
     SEPassedDefault,
     SEPassed,                        (The boolean status of the SE's so far.)
     SIStatus         : Boolean;
     CurrentSi        : SiPtr;
     SiNumber         : Byte;
     SENum       : Integer;
     SxRowCount1,
     SxRowCount2      : Byte;
     PrevHitRxs       : Array [0..1,1..MaxSesPerSI] of SxRowPtr;
     PrevHitRows      : Array [0..1,1..MaxSesPerSi] of Integer;
```

FIG. 7A-2

```
{------------------------------------------------------------}
   PROCEDURE Check_And_Set_PrevUsed_Ris(Var TheRow: SxRowPtr;
                                            RiNum,
                                            RiCol,
                                            SxRowNum : Integer);
   Var Col,Row : Integer;
   Begin
        PrevHitRows[RiCol,SENum]:=SxRowNum;
        PrevHitRxs[RiCol,SENum]:=TheRow;
        For Row:=1 to SENum do
            For Col:=0 to 1 do
               If CurrentSI^.SiRec.Ses[Row].TheRis[Col]=RiNum then
                  Begin
                       TheRow    := PrevHitRxs[Col,Row];
                       PrevHitRows[RiCol,SENum]:=PrevHitRows[Col,Row];
                       PrevHitRxs [RiCol,SENum]:=TheRow;
                       exit;
                   end;
    end; (check and set prevused ris)
{------------------------------------------------------------}
   FUNCTION SxRow_In_SubEval(RiNum,RiCol: Integer; Var TheSxRow: SxRowPtr; Var
Row: Byte): Boolean;
   Begin
        SxRow_In_SubEval:=True;
        TheSxRow:=DefaultRow;
        If RiNum<>SelfRI then
           Begin
                TheSxRow := SxRowPtr(TheSx^.Find_Element(SxIndex[Row].IndexPos));
                If RiNum<>AnyRi then
                   SxRow_In_SubEval:=TheSxRow^.Matches_Ri(CurrentRi[RiCol])
           end
        else If (Row>1) and (RiNum=SelfRi) then
              SxRow_In_SubEval:=False
   end; (SxRow in subeval)
{------------------------------------------------------------}
   FUNCTION Find_Ri(RiNum,RiCol,SkipRow: Integer; Var SxRow: SxRowPtr; Var Row:
Byte): Boolean;
   Var Hit : Boolean;
   Begin
        Hit:=False;
        If RiNum<>AnyRi then
           While (Not Hit) and (Row<TheSx^.Count) do
              Begin
                   Inc(Row);
                   If Row<>SkipRow then
                      Begin
                           Hit:=SxRow_in_SubEval(RiNum,RiCol,SxRow,Row);
                           If Hit then
                              Check_And_Set_PrevUsed_Ris(SxRow,RiNum,RiCol,Row)
                           else SxRow:=Nil
                      end
                   else SxRow:=Nil;
              end
        else
           Begin
                Hit:=True;
                Row:=TheSx^.Count;
                SxRow:=SxRowPtr(TheSx^.Find_Element(Row));
           end;
        Find_Ri:=Hit;
   end; (find ri)
{------------------------------------------------------------}
   PROCEDURE Combine_Boolean;
   Begin
        With CurrentSI^.SIRec do
           Begin
                If SENum>1 then with Ses[SENum-1] do
                   Case NextOp of
                        BNot,
                        BAnd : SIStatus := SIStatus and SEPassed;
                        BXor : SIStatus := SIStatus Xor SEPassed;
```

FIG. 7A-3

```
            BOr  : SIStatus := SIStatus or  SEPassed;
        end
    else SIStatus:=SEPassed;
    If (SEPassed) then DefaultRow^.Set_Rel_Row(SxRowPtr2);
    SIFailed:=(SIStatus=False) and (Ses[SENum].NextOp=BAnd); {lookahead
boolean shortcut}
        end;
  end; {Combine boolean}
{------------------------------------------------------------------}
 Begin
    For SiNumber:=1 to SiListToTest.Drec.Used do
        If (SiListToTest.Drec.Data[SINumber]<>0) then {loop for each SI until you
have a hit...}
    Begin
        If SiListToTest.Drec.Data[SiNumber]=BreakSI then {DEBUG}
            SENum:=0;
        CurrentSI :=
SiPtr(SiList.Find_Element(SiListToTest.DRec.Data[SiNumber]));   {Get current SI}
            SIStatus   := True;   {Until proven guilty...}
            SIFailed   := False;
            SENum      := 0;
            FillChar( PrevHitRxs,  SizeOf(PrevHitRxs), 0 );   {Clear PrevHitRxs}
            FillChar( PrevHitRows, SizeOf(PrevHitRxs), 0 );
            With CurrentSI^.SIRec do
            Repeat                  {Until no more subevals, or SI fails.}
                Inc(SENum);
                SxRowCount1:=0;
                ANotSE:=(SENum>1) and                {This handles special case
where se is true if}
                        (SEs[SENum-1].NextOp=BNot);  {no 2 RIs hit, but nextop =
NOT; (SE true)}
                SEPassedDefault:=ANotSE;
                SEPassed:=False;
                CurrentRi[0]:=RiPtr(RiList.Find_Element(Ses[SENum].TheRis[0]));
                With Ses[SENum] do
                    Repeat  {find ri0 loop}
                        If Find_RI(TheRis[0],0,0,SxRowPtr1,SxRowCount1) then
                            Begin
                                SxRowCount2:=0;   {search from top of sxlist}
                                Repeat  {find ri1 loop}
                                    CurrentRi[1]:=RiPtr(RiList.Find_Element(TheRis[1]));
                                    If Op=IsFeeling then
                                        Begin
                                            SxRowCount2:=TheSx^.Count;
                                            SxRowPtr2:=SxRowPtr1;
                                            SEPassed:=(SxRowPtr1^.Matches_Ri(CurrentRi[1]));
                                            If ANotSE then
                                                SEPassed:= (Not SEPassed);
                                            SEPassedDefault:=SEPassed;
                                        end
                                    else
                                        If
Find_RI(TheRis[1],1,SxRowCount1,SxRowPtr2,SxRowCount2) then
                                            Begin
                                                SEPassed:=(Relations[Op](SxRowPtr1^,SxRowPtr2^,
DefaultRow^,OpParm));
                                                If ANotSE then SEPassed:=Not SEPassed;
                                                SEPassedDefault:=SEPassed;
                                            end
                                        else If SxRowCount2>=TheSx^.Count then
                                            SEPassed:=SEPassedDefault;
                                Until (SEPassed) or (SxRowCount2>=TheSx^.Count);
                            end
                        else SEPassed:=SEPassedDefault;
                    Until (SxRowCount1>=TheSx^.Count) or (SEPassed);
                Combine_Boolean;
            Until (SIFailed) or              {means this SI has definately failed.}
                  (Ses[SENum].NextOp=NoOp);  {we hit last SE in the Si}
            If (SIStatus) and
               (SisThatHit.AppendItem(1,SiNumber)) then
                exit;
        end;
end; {Situation inclusional}{si mod unit}
```

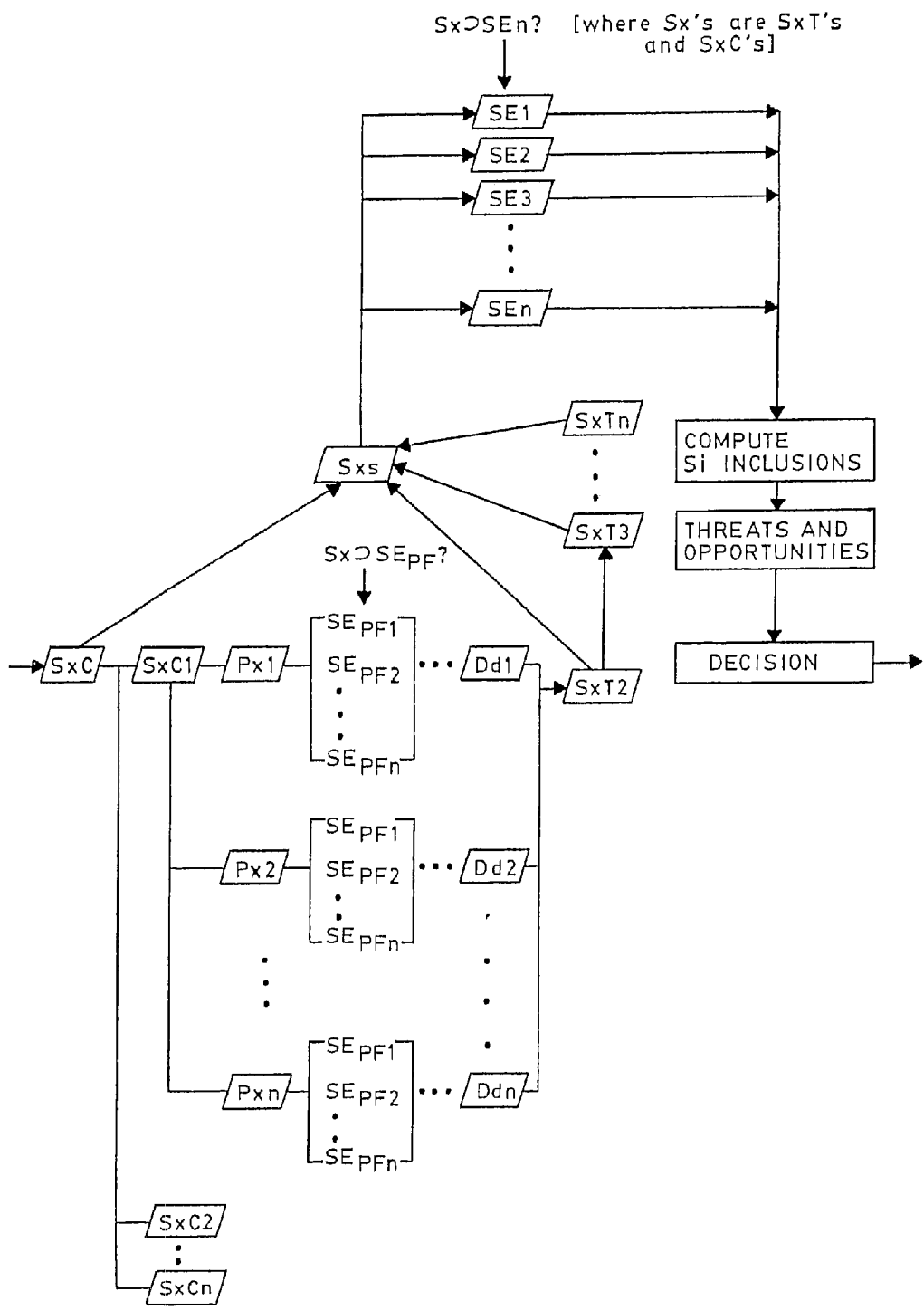

STEPS IN A COMPUTER PROGRAM IMPLEMENTING
NATURAL LANGUAGE AND STORY PRODUCTION
IN AUTONOMOUS DECISION SYSTEMS

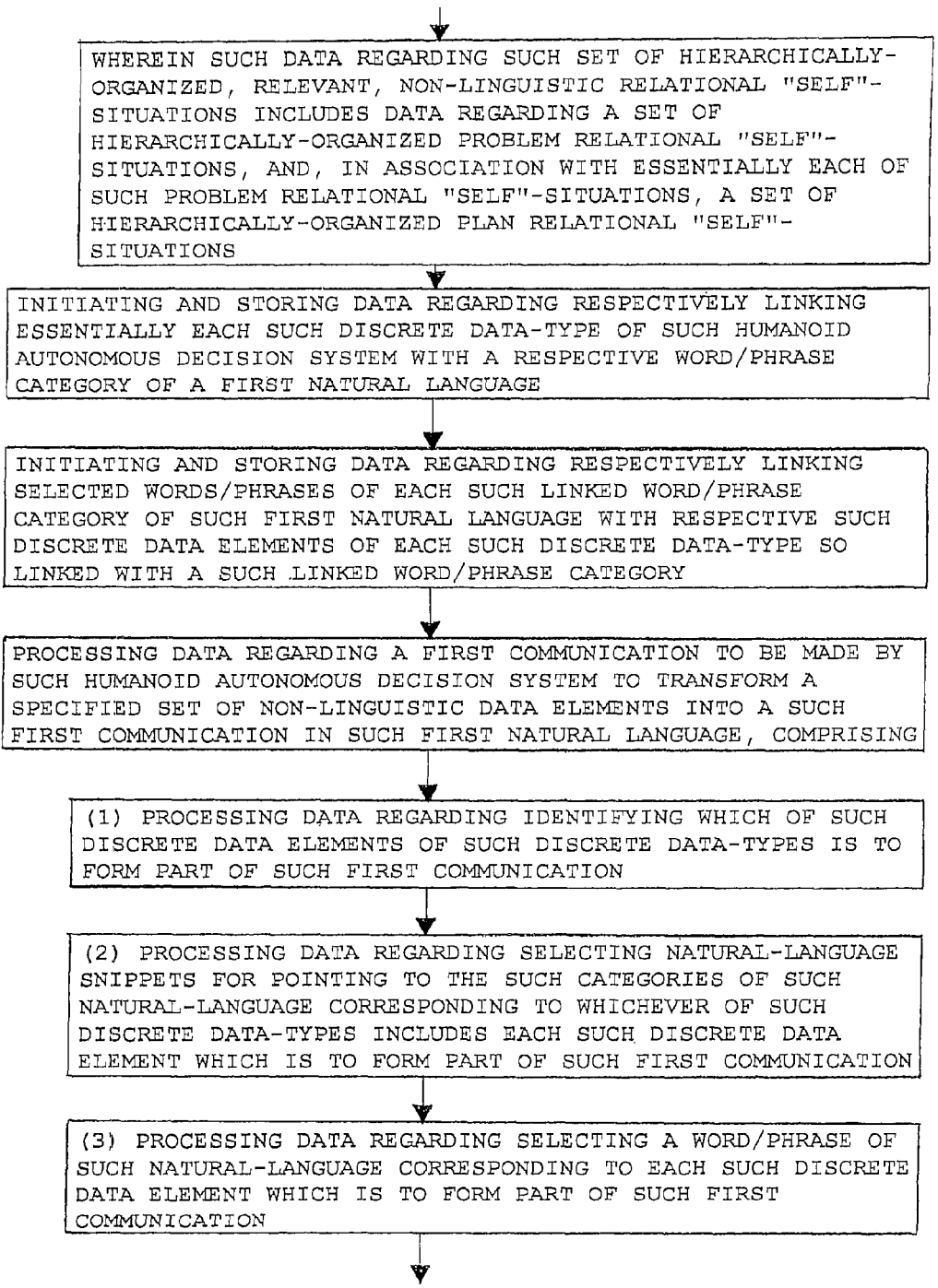

FIG. 9B-1

STEPS IN A COMPUTER PROGRAM FOR IMPLEMENTING
FIRST NATURAL LANGUAGE INTERPRETATION FUNCTIONS IN
A HUMANOID AUTONOMOUS DECISION SYSTEM INTERPRETING
INCOMING FIRST NATURAL LANGUAGE FROM AN OTHER

STORING IN A COMPUTER INFORMATION-STORAGE DEVICE DATA
COMPRISING NON-LINGUISTIC DISCRETE DATA-TYPES AND, CONFORMING
TO EACH OF SUCH DISCRETE NON-LINGUISTIC DATA-TYPES, A SET OF
NON-LINGUISTIC DISCRETE DATA ELEMENTS

↓

INITIATING AND STORING DATA REGARDING RESPECTIVELY LINKING
ESSENTIALLY EACH SUCH DISCRETE DATA-TYPE OF SUCH HUMANOID
AUTONOMOUS DECISION SYSTEM WITH A RESPECTIVE WORD/PHRASE
CATEGORY OF SUCH FIRST NATURAL LANGUAGE

↓

INITIATING AND STORING DATA REGARDING RESPECTIVELY LINKING
SELECTED WORDS/PHRASES OF EACH SUCH LINKED WORD/PHRASE
CATEGORY OF SUCH FIRST NATURAL LANGUAGE WITH RESPECTIVE SUCH
DISCRETE DATA ELEMENTS OF EACH SUCH DISCRETE DATA-TYPE SO
LINKED WITH A SUCH LINKED WORD/PHRASE CATEGORY

↓

PROVIDING INPUT INFORMATION ABOUT CHARACTERISTICS OF SUCH
INCOMING NATURAL LANGUAGE SUFFICIENT TO IDENTIFY EACH
VOCABULARY ELEMENT, SNIPPET TYPE FOR EACH SUCH ELEMENT, AND
GRAMMATICAL FUNCTION FOR EACH SUCH ELEMENT

↓

PROCESSING DATA REGARDING SUCH INPUT INFORMATION TO PROVIDE A
NON-NATURAL-LANGUAGE CONCRETE CIRCUMSTANCE INTERPRETATION OF
SUCH INPUT INFORMATION

↓

WHEREIN SUCH TRANSLATION MEANS COMPRISES NATURAL-LANGUAGE
DEFAULT-SELECTING MEANS FOR PROCESSING DATA REGARDING
SELECTION OF NON-NATURAL-LANGUAGE DATA TYPES AND DATA FOR
CORRESPONDENCE WITH SUCH INCOMING INFORMATION

```
{                       } Unit Sagetalk; {                                                    }
{ ┌── Purpose: ─────────────────────────────────────────── Owner: TFL ──┐
  │ This unit contains the code that generates story text, based on the │
  │ arousal record in the story2 unit. All kinds of substitutions occur.│
  ├── History: ─────────────────────────────────────────────────────────┤
  │ 3/26/91 : Added Marty's sagetalk changes. RG                        │
  │ 7/24/91 : Mods made to reflect use of new synonym calls and to reflect
  │           spec changes per file SPTELNW3.1SP. - DS                  │
  │ 7/31/91 : Mods made to reflect new face emotional settings per Jay's│
  │           spec, SAGEFACE.JAY. - DS                                  │
  └── Copyright (c) 1989-1991 Anthrobotics ═════════════════════════════┘ }
{                       } Interface {                                                         }
Uses Crt,Story2,Types,Playback;
FUNCTION  Describe_Story(Caps: Boolean): Integer;
PROCEDURE Intro_Phrase(Which: Integer);
PROCEDURE Then_Phrase(Which: Integer; Prefix,Suffix: Boolean);
PROCEDURE Problem_Phrase(Which: Integer);
PROCEDURE Strategy_Phrase(Which: Integer);
PROCEDURE Decision_Phrase(Which: Integer);
PROCEDURE NewDecision_Phrase(Which: Integer);
PROCEDURE Plan_Phrase(Which: Integer);
PROCEDURE NextNode_Phrase(Which: Integer);
PROCEDURE Node_Phrase(Which: Integer);
PROCEDURE Friend_Phrase(Which: Integer);
PROCEDURE Last_Phrase(Which: Integer);
PROCEDURE Describe_Arousals(Which:Integer);
PROCEDURE Get_Highest_Regs;
{                       } Implementation {                                                    }
Uses   General,NewTypes,Register,Face2,
       Terms4,Terms5,Terms6,
       DatList,Terms1,Terms2,Terms3,GoalStuff;

Const UseCaps: Boolean = False;   (if true, then sound_and_Text upcases 1st char)
      Spoke  : Boolean = False;

Type  Volume = (VSame,VLoud,VNorm,VSoft);
      Pitch  = (PSame,PHiHi,PHi,PNorm,PLo,PLoLo);
      Faces  = (FNorm,fSad,fGrim,fCTime);
{---------------------------------------------------------------}
PROCEDURE Output_Face_Command(Command: KeyWords; Parm1,Parm2,Parm3,Parm4:
ShortInt);
Begin
      StoryFile.fCurrentCommand.Bytes[1]:=parm1;
      StoryFile.fCurrentCommand.Bytes[2]:=Parm2;
      StoryFile.fCurrentCommand.Bytes[3]:=Parm3;
      StoryFile.fCurrentCommand.Bytes[4]:=Parm4;
      OutPut('',Command);
end; {output face change}
{---------------------------------------------------------------}
PROCEDURE Sound_And_Text(TheVolume: Volume; ThePitch: Pitch; S: Str150);
Const VolumeLevels : Array[Volume] of Byte = (0,6,5,4);
      PitchLevels  : Array[Pitch]  of Byte = (0,8,7,6,5,4);
Begin
      If UseCaps then S[1]:=UpCase(S[1]);
      Spoke:=True;
      UseCaps:=False;
      Save_Sound(0,VolumeLevels[TheVolume],PitchLevels[ThePitch],10);
      OutPut(S,Say);
end; {sound and text}
{---------------------------------------------------------------}
PROCEDURE Show_Blink;
Const Command : Array[1..6] of Keywords = (LEye,Reye,Display,Wait,Leye,Reye);
      Parm    : Array[1..6] of ShortInt = (100,100,0,125,-100,-100);
Var   I       : integer;
Begin
      For I:=1 to 6 do
          Output_Face_Command(Command[i],Parm[i],0,0,0);
end; {blink}
{---------------------------------------------------------------}
```

FIG. 9C-2

```
PROCEDURE Drive_Face(Var Comms,Prms; Count : Byte);
Var Commands : Array[1..1] of KeyWords absolute Comms;
    Parm     : Array[1..1,1..4] of ShortInt absolute Prms;
Var I        : Integer;
Begin
    For I:=1 to Count do
Output_Face_Command(Commands[i],parm[i,1],Parm[i,2],Parm[i,3],parm[i,4]);
end; {Drive face}
{------------------------------------------------------------}
PROCEDURE Show_Grim;
Const Command : Array[1..5] of Keywords = (Eyes,Leye,Reye,Nose,Mouth);
      Parm    : Array[1..5,1..4] of ShortInt =
((-15,0,15,0),(0,-15,-10,0),(0,-15,-10,0),(10,0,0,0),(-10,-20,-10,0));
Begin
      Drive_Face(Command,Parm,5);
end; {grim}
{------------------------------------------------------------}
PROCEDURE Show_Sad;
Const Command : Array[1..4] of Keywords = (Eyes,Leye,Reye,Mouth);
      Parm    : Array[1..4,1..4] of ShortInt =
         ((0,20,0,7),(20,0,-25,0),(20,0,-25,0),(-5,-50,10,0));
Begin
      Drive_Face(Command,Parm,4);
end; {sad}
{------------------------------------------------------------}
PROCEDURE Show_Fear;
Const Command : Array[1..6] of Keywords = (Eyes,Leye,Reye,Mouth,Pupils,Nose);
      Parm    : Array[1..6,1..4] of ShortInt =
         ((25,20,25,0),(1,50,0,0),(1,50,0,0),(-25,-50,60,0),(3,0,0,0),(3,0,0,0));
Begin
      Drive_Face(Command,Parm,6);
end; {show fear}
{------------------------------------------------------------}
PROCEDURE Show_Smile;
Const Command : Array[1..4] of Keywords = (Mouth,Eyes,Leye,Reye);
      Parm    : Array[1..4,1..4] of ShortInt =
         ((5,35,20,0),(-10,0,5,0),(0,15,0,0),(0,15,0,0));
Begin
      Drive_Face(Command,Parm,4);
end; {Smile}
{------------------------------------------------------------}
PROCEDURE Show_Wink;
Const Command : Array[1..6] of Keywords = (REye,Leye,Display,Wait,Reye,LEye);
      Parm    : Array[1..6,1..4] of ShortInt =
((100,-20,0,0),(0,30,0,0),(0,0,0,0),(127,0,0,0),(-100,20,0,0),(0,-30,0,0));
Begin
      Drive_Face(Command,Parm,6);
end; {Wink}
{------------------------------------------------------------}
PROCEDURE Move_Brows(Up: boolean);
Const Scalar : Array[Boolean] of ShortInt = (-20,20);
Begin
      Output_Face_Command(Leye,0,Scalar[up],0,0);
      Output_Face_Command(Reye,0,Scalar[up],0,0);
end; {Move Brows}
{------------------------------------------------------------}
PROCEDURE Tilt_Left_Brows(Up: boolean);
Const Scalar : Array[Boolean,1..3] of ShortInt = ((-20,-20,10),(20,20,-10));
Begin
      Output_Face_Command(Leye,0,Scalar[up,1],Scalar[Up,2],0);
      Output_Face_Command(Reye,0,Scalar[up,3],0,0);
end; {tilt left brows}
{------------------------------------------------------------}
PROCEDURE Look_Around;
Const Command : Array[1..7] of Keywords =
(Eyes,Display,wait,eyes,display,wait,eyes);
      Parm    : Array[1..7,1..4] of ShortInt =
((0,0,0,-14),(0,0,0,0),(127,0,0,0),(0,0,0,28),(0,0,0,0),(127,0,0,0),(0,0,0,-14));
Begin
      Drive_Face(Command,Parm,7);
end; {look around}
{------------------------------------------------------------}
```

FIG. 9C-3

```
PROCEDURE Init_Face(What: Faces);
Const Default : Array[1..15] of ShortInt =
(15,15,-10,-10,0,4,1,1,10,0,10,-10,0,30,1);
Begin
     If What=fCTime then
          Move(Default,StoryFile.fInput.fData,SizeOf(Default))
     else Move(LastCompFace,StoryFile.fInput.fData,SizeOf(Default));
     OutPut('',AbsFace);
     If What=fGrim then Show_Grim else
          If What=fSad then Show_Sad;
end; (init face)
{------------------------------------------------------------}
FUNCTION Describe_Story(Caps: Boolean): Integer;
Begin
     Spoke:=False;
     UseCaps:=Caps;
     With AStoryRec,StoryFile do
     Begin
          If (NowPorpoisePtr<>LastNowPorpoisePtr) then
               Begin
                    Problem_Phrase(AnyTerm);
                    If TheStratName<>'' then
                         Strategy_Phrase(Anyterm);
               end;
          If (HitSiNode<>LastStoryrec.HitSiNode) then
               If (PlanName<>'') and (SGName<>'') then
                    Plan_Phrase(Anyterm)
               else
          else If (SGName<>'') then Node_Phrase(Anyterm);
          If (NextSINode<>LastStoryrec.NextSiNode) and
               (NextSGName<>'') then
                    NextNode_Phrase(Anyterm);
          If (NowDSD<>LastStoryrec.NowDSD) then
               NewDecision_Phrase(Anyterm);
          If Spoke then
               Describe_Arousals(AnyTerm);
     end;
     Describe_Story:=StoryFile.fIOresult;
end; (describe story)
{------------------------------------------------------------}
PROCEDURE Intro_Phrase;
Var T1,T2,T3,T4: String[70];
Begin
     Init_Face(fCTime);
     UseCaps:=True;
     Which:=Determine_Which(Which,6);
     Case Which of
          1: Begin
                  T1:=Instantly_Terms(anyterm,false,false)+', ';
                  T2:='while'+In_Terms(AnyTerm,True,True)+MainFileName+', is ';
                  T3:='where it''s';
                  T4:=Really_Terms(True,True)+Happening_Terms(False,False)+'. ';
             end;
          2: Begin
                  T1:='Well, ';
                  T2:='I''m'+In_Terms(AnyTerm,True,True)+MainFileName+' and it''s
'+Today;
                  T3:=' as it''s all';
                  T4:=Really_Terms(True,True)+Happening_Terms(False,False)+'. ';
             end;
          3: Begin
                  T1:='It''s a dark and'+Really_Terms(true,true)+'stormy night,
'+UserName+', ';
                  T2:='and I''m'+In_Terms(AnyTerm,True,True)+MainFileName+'; ';
                  T3:='as I'+Usually_Terms(True,True)+'am, ';
                  T4:='minding my own business.';
             end;
          4: Begin
                  T1:='You won''t believe this, ';
                  T2:='but so help me ';
                  T3:='every word is'+Really_Terms(True,True)+'true, ';
                  T4:='It''s '+Today+' and
```

FIG. 9C-4

```
             I''m'+In_Terms(AnyTerm,True,True)+MainFileName+'. ';
                    end;
              5: Begin
                     T1:=Instantly_Terms(anyterm,false,false)+', ';
                     T2:='I''m'+In_Terms(AnyTerm,True,True)+MainFileName+' ';
                     T3:='on '+Today+' ';
                     T4:='and things are
    '+becoming_Terms(false,false)+Really_Terms(True,True)+'bad. ';
                    end;
              6: Begin
                     T1:=Instantly_Terms(anyterm,false,false)+', ';
                     T2:='it''s all'+Began_Terms(ANyTerm,True,True);
                     T3:='while I''m'+In_Terms(AnyTerm,True,True);
                     T4:=MainFileName+'. ';
                    end;
          end;
          Sound_And_Text(VNorm,PHi,T1);
          Show_Blink;
          Sound_And_Text(VNorm,PNorm,T2);
          Show_Fear;
          Sound_And_Text(VNorm,PHi,T3);
          Sound_And_Text(VSoft,PNorm,T4);
          Show_Blink;
    end; (intro phrase)
    {------------------------------------------------------------}
    PROCEDURE Problem_Phrase;
    Var temp : String[80];
    Begin
         Which:=Determine_WHich(Which,7);
         Case Which of
              1: Begin
                     temp:='the'+problem_Terms(AnyTerm,True,True);
                     Sound_And_Text(VNorm,PHi,temp);
                     Look_Around;
                     Sound_And_Text(VSoft,PNorm,'that''s facing me
    '+Instantly_Terms(Anyterm,False,True));
                     Show_Blink;
                     Sound_And_Text(VSoft,PHi,'is '+ProblemName+'. ');
                    end;
              2: Begin
                     Sound_And_Text(VNorm,PHi,'I''m'+Really_Terms(True,True)+'trying
    ');
                     Look_Around;
                     Sound_And_Text(VSoft,PNorm,'to avoid '+ProblemName+'. ');
                     Show_Blink;
                    end;
              3: Begin
                     Init_Face(FSad);
    Sound_And_Text(VNorm,PNorm,'I''m'+Began_Terms(AnyTerm,True,True)+'to have a' +
                     Problem_Terms(AnyTerm,True,True));
                     Look_Around;
                     Sound_And_Text(VSoft,PNorm,'trying to avoid ' +ProblemName+'.
    ');
                    end;
              4: Begin
                     If Caps then ProblemName[1] := UpCase(ProblemName[1]);
                     Sound_And_Text(VNorm,PHi,ProblemName+' is ');
                     Tilt_Left_Brows(True);
    Sound_And_Text(VNorm,PNorm,Really_Terms(False,True)+'a'+Problem_Terms(AnyTerm,True
    ,True)+'for me. ');
                     Show_Blink;
                    end;
              5: Begin
                     Init_Face(FSad);
                     temp:='talk about a' +Problem_Terms(AnyTerm,True,False)+'--';
                     Sound_And_Text(VNorm,PNorm,temp);
                     Show_Blink;
                     Output_Face_Command(Eyes,0,0,0,7);
                     Sound_And_Text(VNorm,PLo,'the one I am'
                         +Really_Terms(true,true)+'facing is '+ProblemName+'. ');
                    end;
```

FIG. 9C-5

```
        6: Begin
                Init_Face(FSad);
Sound_And_Text(VNorm,PHiHi,Instantly_Terms(AnyTerm,False,False)+', ');
                Show_Blink;
                Output_Face_Command(Eyes,0,0,0,7);
                Sound_And_Text(VNorm,PLo,'I''m confronting a new
'+Problem_Terms(Anyterm,False,false)
                       +', '+ProblemName+'. ');
           end;
        7: Begin
                Init_Face(FSad);
                temp:=ProblemName+' is the'+problem_Terms(AnyTerm,True,True);
                Sound_And_Text(VNorm,PNorm,temp);
                Show_Blink;
                Output_Face_Command(Eyes,0,0,0,7);
                Sound_And_Text(VNorm,PLo,'that is'+
                    Becoming_Terms(true,true)+'an aggravation. ');
           end;
      end;
      UseCaps:=True;
  end; {problem phrase}
{------------------------------------------------------------}
PROCEDURE Strategy_Phrase;
Begin
      Which:=Determine_Which(Which,6);
      If Which<>6 then Init_Face(fGrim);
      Case Which of
          1: Sound_And_Text(VNorm,PHi,'so, of course,
I'+Planned_To_Terms(AnyTerm,True,True)+TheStratName+'. ');
          2: Begin
                 Sound_And_Text(VNorm,PHi,'all I'+Really_Terms(True,True)+'care
about is ');
                 Output_Face_Command(Eyes,0,0,0,7);
                 Sound_And_Text(VNorm,PNorm,'that
I'+Planned_To_Terms(AnyTerm,True,True)+TheStratName+'. ');
             end;
          3: Begin
                 Sound_And_Text(VNorm,PHi,'to '+TheStratName+' ');
                 Sound_And_Text(VSoft,PNorm,'is what
I'+Really_Terms(True,True)+'am focused on. ');
             end;
          4: Begin
                 Sound_And_Text(VNorm,PHi,'I know if I can ' +TheStratName+' ');
                 Show_Blink;
                 Sound_And_Text(VSoft,PNorm,'I
will'+Usually_Terms(True,True)+'be all right'
                         +very_Soon_Terms(true,false)+'. ');
             end;
          5: Begin
                 Output_Face_Command(Eyes,0,0,0,-14);
                 Sound_And_Text(VNorm,PHi,'if I can only '+TheStratName+' ');
                 Output_Face_Command(eyes,0,0,0,14);
                 Sound_And_Text(VSoft,PNorm,'my'
+Problem_Terms(AnyTerm,True,True)+ 'will end. ');
             end;
          6: Begin
                 Output_Face_Command(Eyes,0,0,0,-14);
                 Sound_And_Text(VNorm,PHi,'but I
can'+Usually_Terms(True,True)+'handle it ');
                 Output_Face_Command(eyes,0,0,0,14);
                 Sound_And_Text(VSoft,PNorm,'if I can only '+TheStratName+'. ');
             end;
      end;
      UseCaps:=True;
  end; {strategyphrase}
{------------------------------------------------------------}
PROCEDURE Decision_Phrase;
Begin
      Which:=Determine_Which(Which,7);
      If Which<5 then Init_Face(fNorm);
      Case Which of
```

FIG. 9C-6

```
    1: Begin
Sound_And_Text(VNorm,PHi,instantly_Terms(anyterm,False,False)+', ');
                Sound_And_Text(VNorm,PNorm,'I am'+
Began_Terms(AnyTerm,True,True)+' to '+DfltDSDName+' ');
                Show_Fear;
Sound_And_Text(VNorm,PLo,'while'+becoming_Terms(true,true)+'concerned');
                Sound_And_Text(VSoft,PLo,'and'+Looking_For_Terms(True,True)+'a
plan. ');
            end;
        2: Begin
                Sound_And_Text(VNorm,PNorm,'I''m getting my brain in gear ');
                Show_Blink;
Sound_And_Text(VNorm,PLo,'and'+Began_Terms(AnyTerm,True,false)+' to
'+DfltDSDName+'. ');
            end;
        3: Begin
Sound_And_Text(VSoft,PNorm,'while'+Decision_Terms(AnyTerm,True,True));
                Move_Brows(True);
                Sound_And_Text(VSoft,PHi,'what else I might do, ');
                Move_Brows(False);
                Show_Blink;
                Sound_And_Text(VNorm,PNorm,'I
am'+Began_Terms(AnyTerm,True,True)+' to '+DfltDSDName+'  ');
                Show_Smile;
            end;
        4: Begin
                Sound_And_Text(VNorm,PNorm,Right_Now_Terms(False,False)+', I
am');
                Show_Blink;
                Sound_And_Text(VNorm,PNorm,Began_Terms(AnyTerm,True,True)+' to
'+DfltDSDName+' ');
                Show_Smile;
                Output_Face_Command(Eyes,0,0,0,-14);
                Sound_And_Text(VNorm,PLo,' and worrying less ');
                Output_Face_Command(Eyes,0,0,0,14);
                Sound_And_Text(VNorm,PLo,' while'
+Decision_Terms(AnyTerm,True,True)+'my ');
                Move_Brows(True);
                Sound_And_Text(VNorm,PLolo,'next step. ');
            end;
        5: Begin
                Sound_And_Text(VNorm,PNorm,'so I''m');
                Show_Blink;
                Sound_And_Text(VNorm,PLo,Began_Terms(AnyTerm,True,True)+' to
+DfltDSDName
                    +instantly_terms(anyterm,true,false)+'. ');
            end;
        6: Begin
Sound_And_Text(VNorm,PNorm,Instantly_Terms(anyterm,False,False)+
                    ', I''m '+Decision_Terms(AnyTerm,False,True));
                Show_Blink;
                Sound_And_Text(VNorm,PLo,'to start to '+DfltDSDName+' ');
                Show_Smile;
            end;
        7: Begin
                Sound_And_Text(VNorm,PNorm,'so, ');
                Show_BLink;
Sound_And_Text(VNorm,PNorm,'while'+Looking_For_Terms(True,True)+'some plan, ');
                Show_Smile;
                Output_Face_Command(Eyes,0,0,0,-14);
Sound_And_Text(VNorm,PLo,'I''m'+Began_Terms(AnyTerm,True,True)+' to
'+DfltDSDName+'. ');
                Move_Brows(True);
            end;
    end;
    UseCaps:=True;
end; {Decision phrase}
{--------------------------------------------------------------}
PROCEDURE Plan_Phrase;
Begin
    Which:=Determine_Which(Which,8);
    Init_Face(PNorm);
```

FIG. 9C-7

```
    Case Which of
         1 : Begin
Sound_And_Text(VNorm,PHi,Instantly_Terms(anyterm,False,False)+', I am '+SGName+'
');
                    Tilt_Left_Brows(True);
                    Sound_And_Text(VNorm,PNorm,'and
I'+Planned_To_Terms(AnyTerm,True,True)+PlanName+'. ');
                    Show_Blink;
                end;
         2 : Begin
                    Sound_And_Text(VNorm,PHi,'I find myself '+SGName+' ');
                    Show_Blink;
                    Show_Grim;
Sound_And_Text(VNorm,PNorm,'and'+Planned_To_Terms(AnyTerm,True,True)+PlanName+'.
');
                end;
         3 : Begin
                    Sound_And_Text(VSoft,PLo,'so here I am, ');
                    Show_Blink;
                    Sound_And_Text(VSoft,PLo,SGName+' ');
                    Tilt_Left_Brows(True);
                    Sound_And_Text(VNorm,PNorm,'and
I'+Planned_To_Terms(AnyTerm,True,True)+PlanName+'. ');
                end;
         4 : Begin
                    Sound_And_Text(VSoft,PLo,'anyway, ');
                    Show_Wink;
                    Sound_And_Text(VSoft,PLo,'I am '+SGName+' ');
                    OutPut_Face_Command(Eyes,0,0,0,-7);
Sound_And_Text(VSoft,PNorm,'and'+Planned_To_Terms(AnyTerm,True,True)+PlanName+'.
');
                end;
         5 : Begin
                    Sound_And_Text(VNorm,PHi,'here I''m '+SGName+' ');
                    Tilt_Left_Brows(True);
                    Sound_And_Text(VNorm,PNorm,'but
I'+Planned_To_Terms(AnyTerm,True,True)+PlanName+' next. ');
                    Show_Blink;
                end;
         6 : Begin
Sound_And_Text(VSoft,PLo,Instantly_Terms(anyterm,False,False)+' I''m ');
                    Show_Blink;
                    Sound_And_Text(VSoft,PLo,SGName+' ');
                    Tilt_Left_Brows(True);
                    Sound_And_Text(VNorm,PNorm,'but next
I'+Planned_To_Terms(AnyTerm,True,True)+PlanName+'. ');
                end;
         7 : Begin
Sound_And_Text(VSoft,PLo,Instantly_Terms(anyterm,False,False)+', while I''m ');
                    Show_Wink;
                    Sound_And_Text(VSoft,PLo,SGName+', ');
                    OutPut_Face_Command(Eyes,0,0,0,-7);
Sound_And_Text(VSoft,PNorm,'I'+Planned_To_Terms(AnyTerm,True,True)+PlanName+'. ');
                end;
         8 : Begin
                    Sound_And_Text(VSoft,PNorm,'I
next'+Planned_To_Terms(AnyTerm,True,True)+PlanName+' ');
                    Show_Blink;
                    Sound_And_Text(VSoft,PLo,'from where I am now '+SGName+'. ');
                    OutPut_Face_Command(Eyes,0,0,0,-10);
                end;
    end;
    UseCaps:=True;
end; {plan phrase}
{---------------------------------------------------------------}
PROCEDURE Node_Phrase;
Var St : String[40];
Begin
     Which:=Determine_Which(Which,7);
     Init_Face(fNorm);
     Case Which of
          1 : St:='I am';
```

FIG. 9C-8

```
            2 : St:='I find myself';
            3 : St:=Instantly_Terms(anyterm,false,false)+', I find myself';
            4 : St:='here I am';
            5 : St:=Instantly_Terms(anyterm,false,false)+', I am';
            6 : St:='I''m here';
            7 : St:='I''m';
        end; (case)
        If SGName[1]<>' ' then St:=St+' ';
        Sound_And_Text(VNorm,PHi,St+SGName+'. ');
        Move_Brows(True);
        UseCaps:=True;
    end; (node phrase)
    {---------------------------------------------------------}
PROCEDURE NextNode_Phrase;
Var St : STring[40];
Begin
        Which:=Determine_Which(Which,6);
        Init_Face(fGrim);
        Case Which of
            1 : St := 'I';
            2 : St := 'but I';
            3 : St := 'so I';
            4 : St := 'I know I';
            5 : St := 'without a doubt, I';
            6 : St := 'obviously, I';
        end; (Case)
        Sound_And_Text(VLoud,PHi,St+Really_Terms(True,True));
        Sound_And_Text(VNorm,PHi,Need_To_Be_Terms(AnyTerm,False,True)+NextSGName+'.
');
        UseCaps:=True;
    end; (next node phrase)
    {---------------------------------------------------------}
PROCEDURE NewDecision_Phrase;
Begin
        Which:=Determine_Which(Which,8);
        Init_Face(FNorm);
        Case Which of
            1 : Begin
                    OutPut_Face_Command(Eyes,0,0,0,8);
                    Sound_And_Text(VNorm,PHi,'I am'+Began_Terms(Which,True,True));
                    Sound_And_Text(Vnorm,PNorm,'to '+NowDSDName);
                    Show_Blink;
                    Show_Smile;
                    Sound_And_Text(VNorm,PNorm,'
while'+hoping_Terms(true,true)+'for the best. ');
                end;
            2 : Begin
                    Sound_And_Text(VLoud,PHi,'so, ');
                    Show_Blink;
Sound_And_Text(VNorm,PNorm,'I''m'+Began_Terms(Which,True,True));
                    Sound_And_Text(Vnorm,PHi,'to '+NowDSDName+'. ');
                end;
            3 : Begin
                    Sound_And_Text(VSoft,PLo,'to get to where I''m going, ');
                    Look_Around;
Sound_And_Text(VNorm,PNorm,'I''m'+Began_Terms(Which,True,True));
                    Tilt_Left_Brows(True);
                    Sound_And_Text(Vnorm,PHi,'to '+NowDSDName+'. ');
                end;
            4 : Begin
                    Sound_And_Text(VSoft,PNorm,'to move along my plan, ');
                    OutPut_Face_Command(Eyes,0,0,0,8);
                    OutPut_Face_Command(Eyes,0,0,0,-12);
Sound_And_Text(VNorm,PNorm,'I''m'+Began_Terms(Which,True,True));
                    Sound_And_Text(Vnorm,PHi,'to '+NowDSDName+'. ');
                end;
            5 : Begin
                    Tilt_Left_Brows(True);
Sound_And_Text(VNorm,PNorm,'I''m'+Began_Terms(Which,True,True));
                    Sound_And_Text(VNorm,PHi,'to '+NowDSDName+', ');
                    Show_Smile;
```

FIG. 9C-9

```
     Sound_And_Text(VNorm,PNorm,Hoping_Terms(False,True)+'to get to where I''m going.
');
                end;
         6 : Begin
                   Show_Blink;
    Sound_And_Text(VNorm,PNorm,'I''m'+Began_Terms(Which,True,True));
                   Sound_And_Text(VNorm,PLo,'to '+NowDSDName+', ');
                   Look_Around;
                   Sound_And_Text(VNorm,PNorm,Hoping_Terms(False,True)+'my plan
    works out. ');
                end;
         7 : Begin
                   Sound_And_Text(VLoud,PHi,'anyway,
    '+Hoping_Terms(False,True)+'for the best, ');
                   Show_Blink;
    Sound_And_Text(VNorm,PNorm,'I''m'+Began_Terms(Which,True,True));
                   Sound_And_Text(VNorm,PLo,'to '+NowDSDName+'. ');
                end;
         8 : Begin
                   Sound_And_Text(VLoud,PHi,'looking ahead, ');
                   Show_Blink;
    Sound_And_Text(VNorm,PNorm,'I''m'+Began_Terms(Which,True,True));
                   Sound_And_Text(VNorm,PLo,'to '+NowDSDName+'. ');
                end;
       end;
       UseCaps:=True;
    end; {new decision}
    {---------------------------------------------------------------}
    PROCEDURE Then_Phrase;
    Var St : String[20];
    Begin
         UseCaps:=True;
         Case Determine_Which(Which,7) of
              1 : St:='Then';
              2 : St:='Later';
              3 : St:='After a while';
              4 : St:='After that';
              5 : St:='Next';
              6 : St:='Then after that';
              7 : St:='Next thing';
         end;
         OutPut(Spacing[Prefix]+st+', '+Spacing[Suffix],Say);
         UseCaps:=False;
    end; {then phrase}
    {---------------------------------------------------------------}
    PROCEDURE Friend_Phrase;
    Var T1,T2 : String[80];
    Begin
         UseCaps:=True;
         Which:=Determine_Which(AnyTerm,6);
         If Which<4 then
         Begin
              Case Which of
                 1: Begin
                         Init_Face(fCTime);
                         T1:='your'+Friend_Terms(AnyTerm,True,True)+HeroName+' ';
                         T2:='could'+Really_Terms(True,True)+'use your help and
    advice, '+UserName+'. ';
                    end;
                 2: Begin
                         Init_Face(fNorm);
                         T1:='I tell you, '+UserName+', ';
                         T2:='your'+Friend_Terms(AnyTerm,True,True)+
                             HeroName+' is'+Really_Terms(True,True)+'in trouble. ';
                    end;
                 3: Begin
                         Init_Face(fNorm);
                         T1:='listen '+UserName+', ';
                         T2:='this time your'+Friend_Terms(AnyTerm,True,True)+
                             HeroName+' is'+Really_Terms(True,True)+'in a pickle.
                    end;
```

FIG. 9C-10

```
            end; (Case)
            Show_Wink;
            Sound_And_Text(VNorm,PLo,T1);
            Show_Blink;
            Show_Smile;
            Sound_And_Text(VNorm,PNorm,T2);
       end;
       UseCaps:=True;
 end; (Friend phrase)
{-------------------------------------------------------}
PROCEDURE Last_Phrase;
Const Words: Array[1..5] of String[12] =
       ('at last,','finally,','so finally,','in the end,','so at last,');
       EndPhrase : Array[0..1] of String[20] =
       (' I reached my goal. ',' my problem ended. ');
Begin
       Which:=Determine_Which(Which,5);
       UseCaps:=True;
       Init_Face(fCTime);
       Case PalDead of
            False : Begin
                         If SGName<>'' then
                             Sound_And_Text(VSoft,PNorm,Words[Which]+' I''m
'+SGName+'. ')
                         else
Sound_And_Text(VSoft,PNorm,Words[WHich]+EndPhrase[Random(2)]);
                         Describe_Arousals(AnyTerm);
                    end;
            True  : Sound_And_Text(VNorm,PNorm,Words[Which]+' I''m dead. ');
       end;
       UseCaps:=True;
 end; (last phrase)
{-------------------------------------------------------}
PROCEDURE Get_Highest_Regs;
Var Element,
     Where,
     Count    : integer;
     Regs     : ByteArray;
     St       : String[80];
Begin
     FillChar(Top3Arousals,SizeOf(Top3Arousals),0);
     Move(AStoryRec.Arousals,Regs,SizeOf(Regs));
     Regs[Ord(PainJoyRate)] :=0;  (NEVER talk about Pain, and always talk joy
(below))
     FillChar(Top3Regs,SizeOf(Top3Regs),0);
     TopRegVal:=0;  (needed in story)
     AStoryRec.ValidRegCount:=0;
     (* First, get top 3 registers  --*)
     With AStoryRec do
     For Count:=1 to 3 do
     Begin
          Where:=Find_Largest_Buffer_Value(Regs[9],5);
          If (Where<>0) and (Regs[8+Where]<>0) then
          Begin
               Inc(ValidRegCount);
               Where:=Where+8;
               Top3Regs[ValidRegCount]:=Where;
               If Regs[Where]>TopRegVal then
                    TopRegVal:=Regs[where];
               Regs[Where]:=0;
          end
     end;
     If (AStoryRec.ValidRegCount<3) and (Regs[Ord(TotalArousal)]>0) then
     Begin
          Inc(AstoryRec.ValidRegCount);
          Top3Regs[AStoryRec.ValidRegCount]:=Ord(TotalArousal);
     end;

(*-- Now convert top 3 regs into strings... --*)
     With AStoryRec do
     For Count:=1 to ValidRegCount do
     Begin
```

FIG. 9C -11

```
            St:=Amount_Of(Top3Regs[Count],0,255);
            Case Top3Regs[Count] of
                 8 : Top3Arousals[Count]:=St+Fear_Terms(AnyTerm,False,False);
                 9 : Top3Arousals[Count]:=St+Surprise_Terms(AnyTerm,False,False);
                10 :
Top3Arousals[Count]:=St+Disappointed_Terms(AnyTerm,False,False);
                11 : Top3Arousals[Count]:=St+Frustrated_Terms(AnyTerm,False,False);
                12 : Top3Arousals[Count]:=St+Hopeless_Terms(AnyTerm,False,False);
                14 : Top3Arousals[Count]:=St+Anxious_Terms(AnyTerm,False,False);
            end;
       end;
    end; {Get highest regs}
{-------------------------------------------------------------}
PROCEDURE Describe_Arousals;
Var Next    : Integer;
    Num     : Integer;
    TempStr : String[150];
Begin
    Which:=Determine_Which(Which,3);
    If AStoryRec.ValidRegCount>0 then
    Begin
        Init_Face(fCTime);
        Case Which of
             1 : TempStr:='I'+Felt_Terms(AnyTerm,True,True)+Top3Arousals[1];
             2 : TempStr:='Mainly,
I'+Felt_Terms(AnyTerm,True,True)+Top3Arousals[1];
             3 : Begin
                    OutPut_Face_Command(Eyes,0,0,0,7);
                    TempStr:='I''ve noticed I'+Felt_Terms(AnyTerm,True,True)+
Top3Arousals[1];
                 end;
        end;
        Sound_And_Text(VSoft,PHi,TempStr+'. ');
    end;
    If (AStoryRec.Arousals[13]<127) then
        Sound_And_Text(VNorm,PNorm,'I''m also feeling '+
        Amount_Of(AStoryRec.Arousals[13],0,127)+
        Better_Terms(anyterm,false,false)+'. ');
end; {Describe arousals}
{-------------------------------------------------------------}
end.

{                      } Unit Story2; {                                        }
{ /= Purpose: ================================================================\
 | This unit controls the output of story text in record mode, and handles    |
 | the real time changes to the face if telling a story in realtime mode.     |
 | -- History: ---------------------------------------------------------------|
 | 3/26/91 : Last Ctime of story, only output conclusion phrase. RG           |
 | 3/27/91 : If RiNum=AnyRi in convert_ri routine, kick out 1st SE.Ri. RG     |
 | 6/26/91 : Added arousal output to story file. This is to let the PAL       |
 |           talk 2 way about arousals in story files.                        |
 \= Copyright (c) 1989-1991 Anthrobotics =====================================/
{                      } Interface {                                          }
Uses Types,BlockFile,PlayBack,SiStuff,DatList,newTypes,General;
Type  StoryRecord = Record
                     HitSiNode,
                     NextSINode,
                     NowStratPtr,              {Set in goalstuf: What now
porpoise}
                     NowDsd,                   {Set in actions: Deep Thought}
                     DfltDsd    : PointPtr;    {Set in actions: Deep Thought}
                     ArousalLevel : integer;   {Set in SxStuff:
Incr_Arousal_Regs}
                     HitPlanRow,               {Set in }
                     HitPlanNum : Byte;        {Set in GoalStuf
Find_Strategy/Advanced_On_Plan}
                     Arousals   : ByteArray;   {Set in face2: Make_Comp_Face}
                     ValidRegCount : Byte;     {Set in sagetalk}
                   end; {storyrecord}
Const MinimumPain  : Integer = 20;             {Set in options unit}
      FearQuitLevel: Integer = 90;             {Set in options unit}
```

FIG. 9C-12

```
        MinimumJoy      : Integer = 90;
        Top3Regs        : Array[1..3] of byte= (0,0,0);
        TopRegVal       : Byte = 0;
        Top3Arousals    : Array[1..3] of String[30] = ('','','');
Const   ProblemName     : String[80] = '';   {set in goalstuf: What_Now_Porpoise}
        TheStratName    : String[80] = '';   {set in goalstuf: What_Now_Porpoise}
        PlanName        : String[80] = '';   {set in goalstuf: Find_Strategy}
        SGName          : String[80] = '';   {determined real time}
        DfltDsdName     : String[80] = '';   {determined real time}
        NowDsdName      : String[80] = '';   {determined real time}
        NextSGName      : String[80] = '';   {determined real time}
Var     AStoryRec,
        LastStoryRec    : StoryRecord;
PROCEDURE Try_To_Save_Story;
FUNCTION  Begin_Story(Var BeginStory: Boolean): Integer;
FUNCTION  Conclude_Story: Boolean;
PROCEDURE Terminate_Run;
PROCEDURE Convert_Terms;
PROCEDURE Save_Sound(Tone,Volume,Pitch,Speed: Integer);
FUNCTION  OutPut(S: Str150; Command: KeyWords): Integer;
PROCEDURE Expand_Synonyms(Var S: String; MaxLen: Word);
PROCEDURE Convert_Abstract_Ris_To_Pfs(Var Source: string);
PROCEDURE Convert_Ri_To_Rx(Var Source: String);
{                 } Implementation {
Uses Terms6,Terms5,Terms4,Terms2,Terms3,Terms1,
     SageTalk,Face2,RiStuff,Strucs,
     Printer,GrTool,GoalStuff,DsdStuff,Focus2,SxStuff,
     Relation,RxStuff1;
{-----------------------------------------------------------}
PROCEDURE Save_Sound(Tone,Volume,Pitch,Speed: Integer);
Begin
     StoryFile.fCurrentCommand.Bytes[1]:=Tone;
     StoryFile.fCurrentCommand.Bytes[2]:=Volume;
     StoryFile.fCurrentCommand.Bytes[3]:=Pitch;
     StoryFile.fCurrentCommand.Bytes[4]:=Speed;
     OutPut('',Sounds);
end; {save sound}
{-----------------------------------------------------------}
FUNCTION OutPut(S: Str150; Command: KeyWords): INteger;
Var I : Integer;
    Dont : Boolean;
Begin
     Dont:=False;
     If S<>'' then
         StoryFile.fInput.fStr:=S;
     StoryFile.fCurrentCommand.Command:=Command;
     If (StoryFile.fFileOpen) then
         OutPut:=StoryFile.mPut_Command
     else OutPut:=0;
     If OkToTalk then PlayBack_Command(storyfile,i,Dont);
end; {Output}
{-----------------------------------------------------------}
PROCEDURE Save_Composite_Face;
Var Speaking : Boolean;
Begin
     Speaking:=OkToTalk;
     OkTotalk:=True;
     OutPut('',Display); {Force first face update; compface was built in Face2}
     OkTotalk:=Speaking;
end; {save composite face}
{-----------------------------------------------------------}
FUNCTION Enough_Fear_For_A_Good_Story: Boolean;
   {This routine tests to see if the genetic fear level of the current
    goal is greater than some settable minimum. If not the brain isnt
    scared enough to tell a good story, and it should stop talking.}
Begin
     Enough_Fear_For_A_Good_Story:=
         SubGoalPtr(NowPorpoisePtr)^.ASubGoal.Arousal>FearQuitLevel;
end; {enough fear for a good story}
{-----------------------------------------------------------}
```

FIG. 9C-13

```
PROCEDURE Test_Arousal_MinMax;
   {This routine tests to see if the current arousal level is less than
    the lowest level of arousal so far, and if it exceeds the highest level
    of arousal so far. In either case, it saves the min and max.}
Begin
     If AStoryrec.ArousalLevel>ArousalMax then
        ArousalMax:=AStoryRec.ArousalLevel;
     If AStoryrec.ArousalLevel<ArousalMin then
        ArousalMin:=AStoryRec.ArousalLevel;
end; {Test arousal minmax}
{--------------------------------------------------------------------}
PROCEDURE Save_Arousal_Info;
   {This routine stores the 3 highest arousal registers into the
    current storyfile if the storyfile is open.}
Begin
     StoryFile.fCurrentCommand.Command:=ArousalInfo;
     Move(Top3Regs,StoryFile.fCurrentCommand.Bytes,3);
     StoryFile.fCurrentCommand.Bytes[4]:=TopRegval;
     StoryFile.mPut_Command;
end; {save arousal info}
{--------------------------------------------------------------------}
PROCEDURE Try_To_Save_Story;
Var FaceShown   : Boolean;
    BeginStory,
    Caps,
    ScaredEnuf  : Boolean;
    I           : integer;
Begin
     BeginStory:=False;
     FaceShown:=True;
     If Not OKToTalk then
        Save_Composite_Face
     else FaceShown:=False;
     Convert_Terms;
     With AStoryRec do
     If ((StoryFile.fValidStory) or
        (Begin_Story(BeginStory)=0)) then
     Begin
          FaceShown:=BeginStory;
          StoryFile.fIOresult:=0;    {Clear former errors}
          If (StoryFile.fFileOpen) then
          Begin
               StoryFile.fCurrentCommand.Command:=CTimeMarker;
               StoryFile.fCurrentCommand.Long:=NowTime;
               StoryFile.mPut_Command;
          end;
          Inc(StoryFile.fCTimesSaved);
          ScaredEnuf:=Enough_Fear_For_A_Good_Story;
          If (NowPorpoisePtr<>LastNowPorpoisePtr) or
             (AStoryRec.HitSiNode<>LastStoryRec.HitSINode) then
             Begin
                  If ScaredEnuf then
                     Begin
                          FaceShown:=Not BeginStory;
                          If Not BeginStory then
                             Then_Phrase(AnyTerm,True,True);
                          If (Not PalDead) then
                             If Describe_Story(BeginStory)=0 then;
                     end;
                  If BeginStory then
                     Friend_Phrase(AnyTerm);
             end;
          Test_Arousal_MinMax;
          If StoryFile.fFileOpen then
             Save_Arousal_Info;
          If (Not ScaredEnuf) or (PalDead) then
             FaceShown:=Conclude_Story;
          LastStoryRec:=AStoryRec;
     end;
     If Not FaceShown then
        Save_Composite_Face;
end; {Try to save story}
```

FIG. 9C-14

```
{-------------------------------------------------------------}
FUNCTION Begin_Story(Var BeginStory: Boolean): Integer;
Var Which,
    Result    : integer;
Begin
    With StoryFile do
        If (AStoryRec.ArousalLevel>=MinimumPain) then
            Begin
                BeginStory:=True;
                fValidStory:=True;
                FillChar(LastStoryRec,SizeOf(LastStoryRec),255);
                ArousalMax:=AStoryRec.ArousalLevel;
                ArousalMin:=AStoryRec.ArousalLevel;
                If (OutPut('',TopOfStory)=0) then
                    Begin
                        Intro_Phrase(Which);
                        StoryFile.fIOResult:=0;
                    end
                else Terminate_Run;
                Begin_Story:=0;
                FillChar(LastStoryRec,SizeOf(LastStoryRec),0);
            end
        else Begin_Story:=-1;
end; {begin story}
{-------------------------------------------------------------}
FUNCTION Conclude_Story: Boolean;
Begin
    Last_Phrase(AnyTerm);
    OutPut('',EndOfStory);
    StoryFile.fValidStory:=False;
    Conclude_Story:=True;
end; {conclude story}
{-------------------------------------------------------------}
PROCEDURE Terminate_Run;
Begin
    If StoryFile.mClose=0 then;
    {Stop the run...}
    {Show error}
end; {terminate run}
{-------------------------------------------------------------}
FUNCTION Get_Ri_To_Talk_About(Var Source: Str150; Var Where: Integer): String;
Var Next,
    Temp : Str150;
    EndPos : Integer;
Begin
    Where:=Pos('[',Source);
    If Where<>0 then
        Begin
            EndPos:=Pos(']',Source);
            If EndPos=0 then EndPos:=Succ(Length(Source));
            Get_Ri_To_Talk_About:=Copy(Source,Where+1,EndPos-Where-1);
            Delete(Source,Where,EndPos-Where+1);
        end
    else Get_Ri_to_Talk_About:='';
end; {Get ri to talk about}
{-------------------------------------------------------------}
FUNCTION Convert_Ri_To_Pf(Var Source: String): Boolean;
Var AnRi : RiPtr;
    Num,fNum: Integer;
Begin
    AnRi:=RiPtr(RiList.Whose_Name(Source,true,num,fnum));
    If AnRi<>Nil then
        AnRi^.Get_Best_PF_Match(Source)
    else Source:='';
    Convert_Ri_To_Pf:=Source<>'';
end; {convert ri to pf}
{-------------------------------------------------------------}
PROCEDURE Convert_Abstract_Ris_To_Pfs(Var Source: string);
Var I,Where : Integer;
    RiOrPF  : String[20];
Begin
    Where:=0;
```

FIG. 9C-15

```
      RiOrPf:=Get_Ri_To_Talk_About(Source,Where);
      While (RiOrPf<>'') do
      Begin
            If Convert_Ri_To_Pf(RiOrPf) then
                Insert(RiOrPf,Source,Where);
            RiOrPf:=Get_RI_To_Talk_About(Source,Where);
      end;
end; {convert abstract ris to pfs}
{------------------------------------------------------------------}
PROCEDURE Lower_Case(Var Source: Str150);
Var I : integer;
Begin
      For I:=1 to Length(Source) do
          If (Source[I]>'@') and
             (Source[I]<'[') then Inc(Source[I],32);
end; {lower case}
{------------------------------------------------------------------}
FUNCTION Determine_Table(Var S: String): Integer;
Var Temp,Err: integer;
    SubSt    : String(10);
Begin
     Temp:=0;
     While (S[temp+1] in ['0'..'9']) and (temp<4) do Inc(Temp);
     SubSt:=Copy(S,1,Temp);
     Delete(S,1,Temp);
     If SubSt<>'' then
         Begin
              Val(SubSt,Temp,Err);
              If Err<>0 then Temp:=0;
         end
     else Temp:=0;
     Determine_Table:=Temp;
end; {determine table}
{------------------------------------------------------------------}
FUNCTION Valid_Token(Var S: String; Var Table: Integer): Boolean;
Var TempSt: String;
Begin
     Table:=-1;
     If S[2] in ['0'..'9'] then
         Begin
              Delete(S,1,1);
              Table:=Determine_Table(S);
         end;
     Valid_Token:=Table>-1;
end; {valid token}
{------------------------------------------------------------------}
PROCEDURE Get_Syn1(Var S: String; Table: Integer);
Var St: STring(100);
    Suffix : Boolean;
Begin
     Suffix:=False;
     Case Table of   {tables 0..10}
          0 : St:=Tired_Terms(false,suffix);
          1 : St:=Signif_Terms(false,suffix);
          2 : St:=A_Bit_Terms(false,suffix);
          3 : St:=Becoming_Terms(false,suffix);
          4 : St:=Possibly_Terms(false,suffix);
          5 : St:=Very_Much_Terms(AnyTerm,false,suffix);
          6 : St:=At_The_Terms(false,suffix);
          7 : St:=Right_By_The_Terms(false,suffix);
          8 : St:=Near_The_Terms(false,suffix);
          9 : St:=Far_From_The_Terms(false,suffix);
         10 : St:=Very_Soon_Terms(false,suffix);
         11 : St:=Moving_Terms(false,suffix);
     end;
     S:=St+S;
end; {Get syn 1}
{------------------------------------------------------------------}
PROCEDURE Get_Syn2(Var S: STring; Table: Integer);
Var ST : String(100);
    Suffix : Boolean;
Begin
```

FIG. 9C -16

```
    Suffix:=False;
    Case Table of
        12 : St:=Toward_The_Terms(false,suffix);
        13 : St:=From_The_Terms(false,suffix);
        14 : St:=Boredom_Terms(false,suffix);
        15 : St:=Better_Terms(AnyTerm,false,suffix);
        16 : St:=Little_Terms(AnyTerm,False,suffix);
        17 : St:=Sort_Of_Terms(AnyTerm,False,suffix);
        18 : St:=Usually_Terms(False,suffix);
        19 : St:=Move_Terms(false,suffix);
        20 : St:=Picnic_Terms(False,suffix);
        21 : St:=Pretty_Much_Terms(AnyTerm,False,suffix);
        22 : St:=A_Lot_Terms(AnyTerm,False,suffix);
    end;
    S:=St+S;
end; {Get syn 2}
{------------------------------------------------------------}
PROCEDURE Get_Syn3(Var S: STring; Table: Integer);
Var suffix  : Boolean;
    St      : String[100];
Begin
    Suffix:=False;
    { suffix:=(S='') or (s[1]<>' '); }
    Case Table of   {Tables 21..30}
        23 : St:=Looking_For_Terms(False,suffix);
        24 : St:=Really_Terms(False,suffix);
        25 : St:=Find_Terms(False,suffix);
        26 : St:=Arousal_Terms(False,suffix);
        27 : St:=Fleeing_Terms(False,suffix);
        28 : St:=Happening_terms(False,suffix);
        29 : St:=Staying_Still_Terms(False,suffix);
        30 : St:=Escape_Terms(False,suffix);
        31 : St:=Eat_Terms(False,suffix);
        32 : St:=Rest_Terms(False,suffix);
        33 : St:=Nearby_Terms(False,suffix);
        34 : St:=Play_Terms(False,suffix);
    end;
    S:=St+S;
end; {Get syn 3}
{------------------------------------------------------------}
PROCEDURE Insert_Synonym(Var S: STring; Table: Integer);
Begin
    If Table>22 then
        Get_Syn3(S,Table)
    else If Table>11 then
        Get_Syn2(S,Table)
    else Get_Syn1(S,Table);
end; {insert synonym}
{------------------------------------------------------------}
PROCEDURE Expand_Synonyms(Var S: String; Maxlen: Word);
Var TokenPos, Table: Integer;
    TempSt          : String;
Begin
    Convert_Abstract_Kis_To_Pfs(S);
    TempSt:='';
    Repeat
        TokenPos:=Pos('@',S);
        If (TokenPos>0) then
            Begin
                TempSt:=TempSt+Copy(S,1,TokenPos-1);
                Delete(S,1,TokenPos-1);
                if Valid_Token(S,Table) then
                    Insert_Synonym(S,Table)
                else
                    Begin
                        TempSt:=TempSt+'@';
                        Delete(S,1,1);
                    end;
            end
    Until TokenPos=0;
    TempSt:=TempSt+S;
    S:=Copy(TempSt,1,MaxLen);
```

FIG. 9C-17

```
end; {expand synonyms}
{----------------------------------------------------------------}
PROCEDURE Convert_Ri_To_Rx(Var Source: String);
{ ┌─ Purpose: ══════════════════════════════════════════════════
  │ Converts Ris in user identifier names to the actual Rxs that were used
  │ in SiMod and decision making.
  │ ┌─ History: ─────────────────────────────────────────────
  │ │ 03/27/91 : If RiNum=AnyRi, kick out first SE.Ri.
                                                                     }
Var RxName,
    RiName       : Str80;
    RiNum,
    RxCount,
    Where,I      : Integer;
    Pt           : PointPtr;
Begin
    RxName:='';
    RiNum:=0;
    RiName:=Get_Ri_To_Talk_About(Source,Where);   {Strip ri from identfier}
    While RIName<>'' do
    Begin
         Pt:= RiList.Whose_Name(RiName,True,RiNum,i);
         If Pt<>Nil then
              Begin
                   RxCount:=RiPtr(Pt)^.Get_Best_Rx_Match(Sxx^,RxName);
                   If RxCount=1 then
                        Insert(RxName,Source,WHere)
                   else If (Convert_Ri_To_Pf(RIName)) then
                             Begin
                                  Insert(RIName,Source,Where);
                                  RxName:=RIName
                             end
                        else Insert('<UNKNOWN>',Source,Where);
              end
         else
              If (UpCase_String(RiName)='HIT') then
              Begin
RxName:=BrainRow^.SxRowRec.RelRow^.SxRowRec.Kind^.RxRec.Name;
                   Insert(RxName,Source,Where);
              end
              else
                   Insert('<NOHIT>',Source,Where);
         RiName:=Get_Ri_To_Talk_About(Source,Where);   {Strip ri from identfier}
    end;
    Expand_Synonyms(Source,255);
end; {Convert ri to rx}
{----------------------------------------------------------------}
PROCEDURE Convert_Terms;
Var S : String[150];
    P : Pointer;
Begin
{DEBUG
    Put_Text('Time: '+Int_Str(NowTime,1),10,10,15,True);
DEBUG}
    Convert_Ri_To_Rx(ProblemName);
    If (AStoryRec.HitSINode<>Nil) then
         Begin
              SGName:=AStoryRec.HitSINode^.Who_Am_I^;
              If SGName<>'' then
                   Convert_Ri_to_Rx(SGName)
         end
    else SGName:='';
    If AStoryRec.NextSINode<>Nil then
         Begin
              NextSGName:=AStoryRec.NextSINode^.Who_Am_I^;
              If NextSGName<>'' then
                   Convert_Ri_To_Rx(NextSGName)
         end
    else NextSGName:='';
    If (AStoryRec.NowStratPtr<>Nil) then  {Plan/Strategy names already set in
actions}
         Begin
```

FIG. 9C-18

```
            If TheStratName<>'' then
                Convert_Ri_To_Rx(TheStratName);
            If PlanName<>'' then
                Convert_Ri_To_Rx(PlanName);
        end;

If AStoryRec.DfltDsd<>Nil then
        Begin
            DfltDsdName:=AStoryRec.DfltDsd^.Who_Am_I^;
            If DfltDsdName<>'' then
                Convert_Ri_To_Rx(DfltDsdName);
        end
    else DfltDsdName:='';

If AStoryRec.NowDsd<>Nil then
        Begin
            NowDsdName:=AStoryRec.NowDsd^.Who_Am_I^;
            If NowDsdName<>'' then
                Convert_Ri_To_Rx(NowDsdName);
        end
    else NowDsdName:='';
    Get_Highest_Regs;

{DEBUG
     With AStoryRec do
     Begin
         Writeln(lst,'------[',NowTime,']------------------------------------');
         Writeln(Lst,'Problem : ',problem,' Ptr =
',seg(nowporpoiseptr^),':',ofs(nowporpoisePtr^));
         Writeln(Lst,'Strat   : ',Thestrat,' Ptr =
',seg(Strat^),':',ofs(Strat^));
         Writeln(Lst,'Plan    : ',Plan);
         Writeln(Lst,'SINode  : ',SG,' Ptr = ',seg(SiNode^),':',ofs(SiNode^));
         Writeln(Lst,'NextNode: ',NextSG,' Ptr =
',seg(NextNode^),':',ofs(NextNode^));
         Writeln(Lst,'DfltDSD : ',Story2.DfltDSD,' Ptr =
',seg(AStoryRec.DfltDSD^),':',ofs(AStoryRec.DfltDsd^));
         Writeln(Lst,'NowDSD  : ',Story2.NowDSD,' Ptr =
',seg(AStoryRec.NowDSD^),':',ofs(AStoryRec.NowDsd^));
         Writeln(Lst);
     end;
 DEBUG} end; {convert terms}

{---------------------------------------------------------------------------}
{                        Unit Initialization                                }
end. {story2 unit}
```

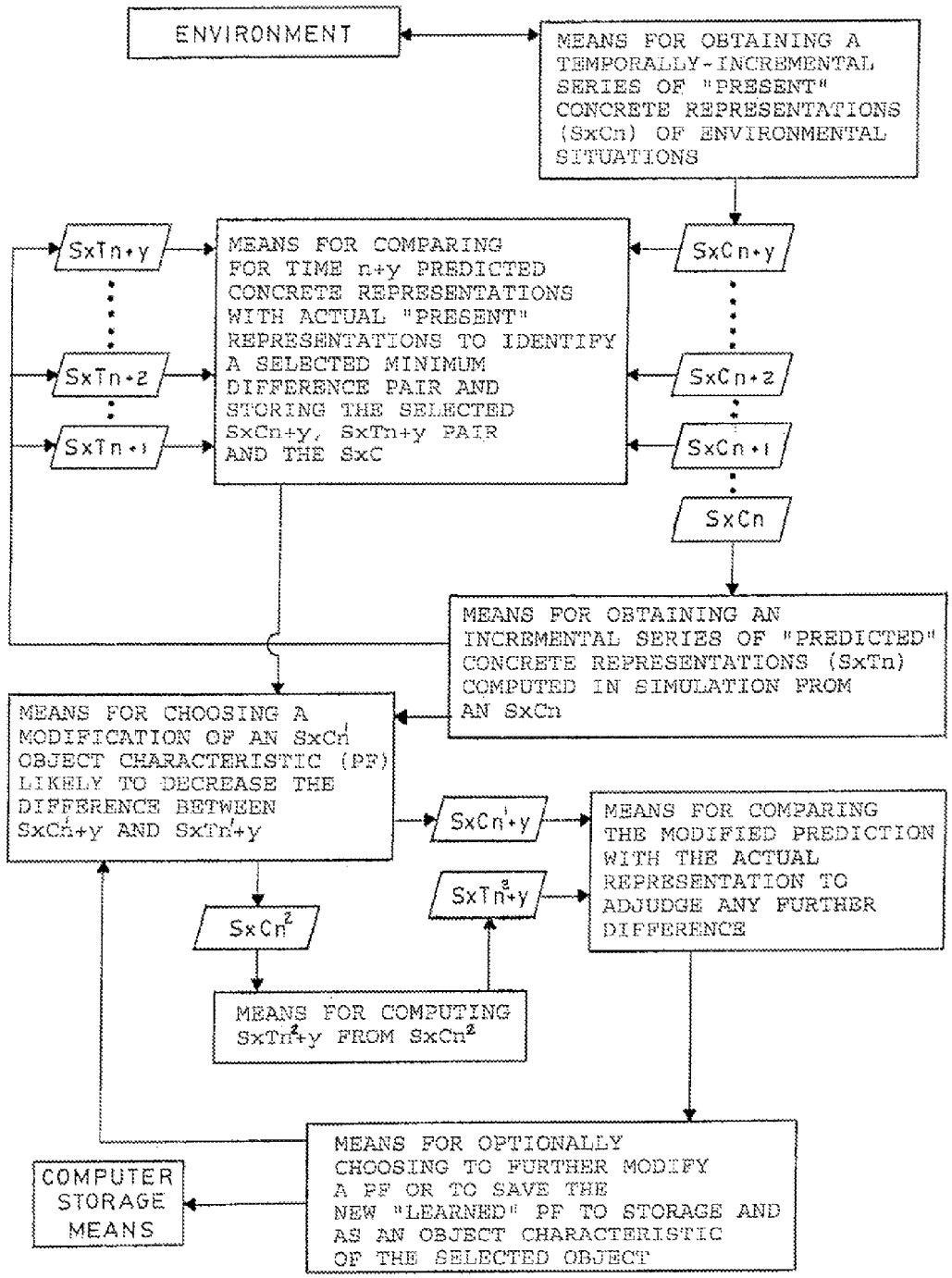

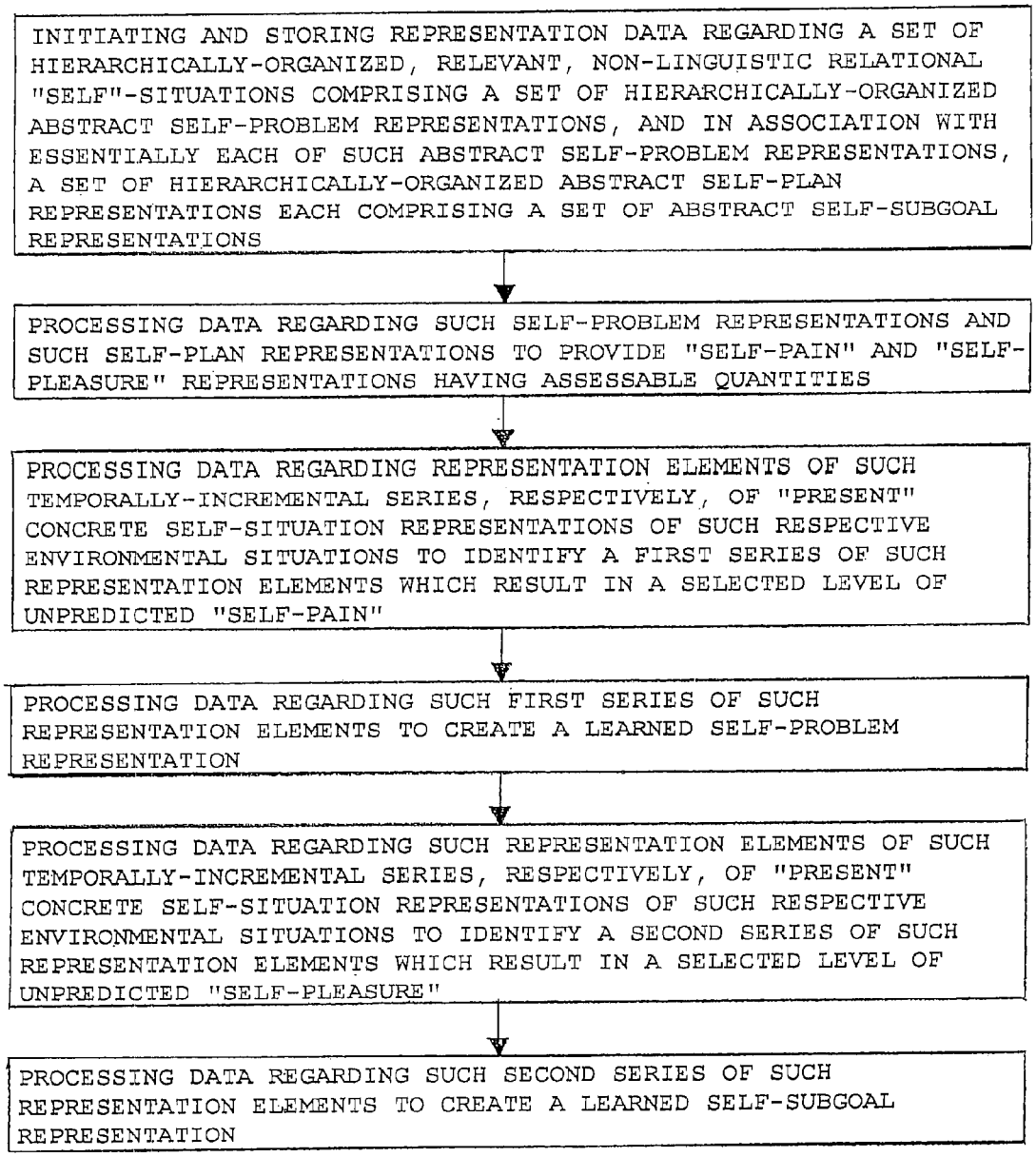

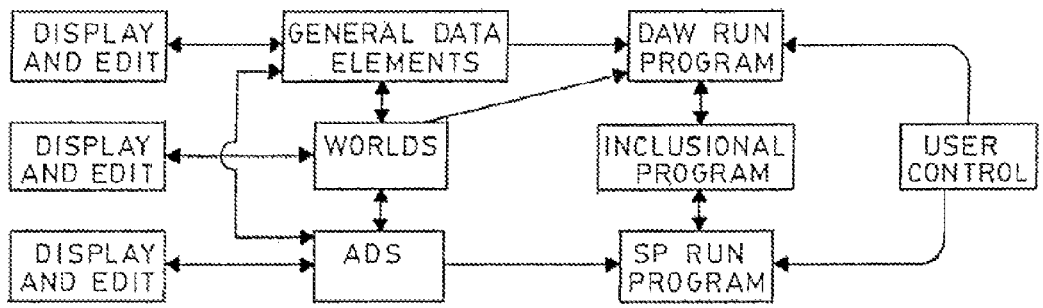

FIG. 11
HIGH LEVEL FLOW CHART OF ENTERTAINMENT SYSTEM

FIG. 12

```
         SUMMARY OF PRIMARY SOFTWARE SYSTEMS AND FUNCTIONS
World:
Data Building/Saving Interfaces
     Writing RF data           Writing RFM data
     Writing PFM data          Writing Ri/Pi/ data
     Writing r data                 Writing Si data
     Writing dsd data          Writing PF data
     writing SCAN data         Writing Metabolism Choices
Object Building/Saving Interfaces
     Selecting an Object Name
     Selecting RF's
     Selecting Doings and Animation
     Selecting Meta-PF's
Meta-PF Building/Saving Interfaces
     Writing Meta-PF's
World Building/Saving Interfaces
     Selecting a World Name
     Selecting an Object
     Plunking an Object
World Incremental Simulation ADS:
Data Building Interfaces
     Writing Problem Nodes:           Writing Plan Nodes: hierarchy,
          hierarchy, Sip, dD               Sigp, dD, dTd, dc
     Writing Emotional Attributes
     Writing Facial/Emotional Attributes
     Writing SCAN modes               Writing Questions
     Writing Story/Answer Snippets
     Writing Story/Answer Synonyms
Selecting ADS Attributes
     Selecting IQ
     Selecting Emotion/Face Attributes
     Selecting Story Start/Stop Attributes
Overall ADS-Run Systems
     Sensing What Situation
     Recognizing What Situation
     Deciding What Problem Node
     Deciding What Plan Node
     Look-For System to SCAN
     Emotional/Facial System
     Story-Telling System
     Question-Answering System
     Predicting Threats and Opportunities
     Making Action Decisions Run:
Selecting Screens To Show: World,
     Radar, Metabolism, Face
Selecting a World
Plunking an ADS
Selecting Tell/Story Modes
```

Figure 1: Window features

Figure 2: The Main Screen: A - No menus open, and B - the View menu open

Figure 3: What you see when you click on Open

Figure 4: The Thing Editor window, with several sub-windows

IQ Setting

FIG. 30A-1

```
[Get_Next_SX] - FantasyTime False
[Deep Thought] - Ctime: 1
Scanning strategy find something to do rfs:
  No rfs present.
Scanning @14 rfs:
  No rfs present.

SxC(1):
RxName      X    Y   Decision         Speed Rads   Reason   Situation
---------------------------------------------------------------------
StoryPAL   232  214  NIL                0   1.67   MARV     NIL
lion       243  254  race to LowI       0   2.62   RF-SCAN  LowINear
tree       108   50  don't move         0   6.28   RF-SCAN  Anything
native     269   10  wander             0   1.58   RF-SCAN  Anything
rabbit       2  259  explore            0   4.43   RF-SCAN  Anything
rabbit     257  111  explore            0   5.99   RF-SCAN  Anything
deer       441  314  patrol             0   1.84   RF-SCAN  Anything
grass       29  326  don't move         0   5.26   RF-SCAN  Anything
grass      323  347  don't move         0   0.38   RF-SCAN  Anything
grass      335   86  don't move         0   5.83   RF-SCAN  Anything

[What_Now_Porpoise] : FantasyTime False
  Problem: @33 [H1]
      Row: 1
      Dsd: @27 [H1]            180 20  2H1
      Reg: TIRED
    Value: 10
[Set_New_Problem]
[Find_Strategy]
[Find_Starting_Place_In_Strategy] - FantasyTime False
  SUB-P/SG NAME: seeing a struck [HI]
  SUB-P/SG NAME: safe @6 [HomeI]
  SUB-P/SG NAME: safe @6 [TopI]
  SUB-P/SG NAME: near [HI] & at [Imp]
  SUB-P/SG NAME: @8 [HomeI]
  SUB-P/SG NAME: @8 [TopI]
  HIT Strategy
    Strat.:@30 [H1]
      Plan:get @11 @12 [HomeI]
      Row:2
   SubGoal: @8 [HomeI]
       Row: 1

[Strat.Make_Decision]
[Predicting Strategy]  Try: 1 of 25
  Trial DSD: @19 @12 [HomeI]
[Get_Next_SX] - FantasyTime True Ending SxT(1):
RxName      X    Y   Decision         Speed Rads   Reason   Situation
---------------------------------------------------------------------
StoryPAL   219  197  @19 @12 [HomeI]   21   2.22   MARV     NIL
lion       236  230  race to LowI      24   1.84   RF-SCAN  LowINear
tree       108   50  don't move         0   6.13   RF-SCAN  Anything
native     268    1  wander            10   4.70   RF-SCAN  Anything
rabbit      11  259  explore           10   5.21   RF-SCAN  Anything
rabbit     264  104  explore           10   0.67   RF-SCAN  Anything
deer       435  292  patrol            22   1.84   RF-SCAN  Anything
grass       29  326  don't move         0   0.67   RF-SCAN  Anything
grass      323  347  don't move         0   1.52   RF-SCAN  Anything
grass      335   86  don't move         0   0.00   RF-SCAN  Anything

[What_Now_Porpoise] : FantasyTime True
[Next_N_Subgoals_Reached] - FantasyTime True
  SUB-P/SG NAME: safe @6 [HomeI]
  No next(n) subgoal found.

[Predicting Strategy]  Try: 2 of 25
  Trial DSD: @19 @12 [HomeI]
[Get_Next_SX] - FantasyTime True
```

FIG. 30A-2

```
Ending SxT(2):
RxName      X   Y   Decision         Speed Rads  Reason   Situation
--------------------------------------------------------------------
StoryPAL  206 180   @19 @12 [HomeI]    21  2.22  MARV     NIL
lion      225 208   race to LowI       24  2.05  RF-SCAN  LowINear
tree      108  50   don't move          0  6.13  RF-SCAN  Anything
native    267  10   wander             10  4.70  RF-SCAN  Anything
rabbit     13 268   explore            10  5.01  RF-SCAN  Anything
rabbit    273 104   explore            10  6.27  RF-SCAN  Anything
deer      429 270   patrol             22  1.84  RF-SCAN  Anything
grass      29 326   don't move          0  0.67  RF-SCAN  Anything
grass     323 347   don't move          0  1.52  RF-SCAN  Anything
grass     335  86   don't move          0  0.00  RF-SCAN  Anything

[What_Now_Porpoise] : FantasyTime True
[Next_N_Subgoals_Reached] - FantasyTime True
  SUB-P/SG NAME: safe @6 [HomeI]
  No next(n) subgoal found.

[Predicting Strategy]  Try: 3 of 25
  Trial DSD: @19 @12 [HomeI]
[Get_Next_SX] - FantasyTime True Ending SxT(3):
RxName      X   Y   Decision         Speed Rads  Reason   Situation
--------------------------------------------------------------------
StoryPAL  193 163   @19 @12 [HomeI]    21  2.22  MARV     NIL
lion      211 188   race to LowI       24  2.17  RF-SCAN  LowINear
tree      108  50   don't move          0  6.13  RF-SCAN  Anything
native    266  19   wander             10  4.70  RF-SCAN  Anything
rabbit     16 258   explore            10  1.20  RF-SCAN  Anything
rabbit    265  96   explore            10  2.36  RF-SCAN  Anything
deer      423 248   patrol             22  1.84  RF-SCAN  Anything
grass      29 326   don't move          0  0.67  RF-SCAN  Anything
grass     323 347   don't move          0  1.52  RF-SCAN  Anything
grass     335  86   don't move          0  0.00  RF-SCAN  Anything

[What_Now_Porpoise] : FantasyTime True
[Next_N_Subgoals_Reached] - FantasyTime True
  SUB-P/SG NAME: safe @6 [HomeI]

No next(n) subgoal found.

[Predicting Strategy]  Try: 4 of 25
  Trial DSD: @19 @12 [HomeI]
[Get_Next_SX] - FantasyTime True Ending SxT(4):
RxName      X   Y   Decision         Speed Rads  Reason   Situation
--------------------------------------------------------------------
StoryPAL  180 146   @19 @12 [HomeI]    21  2.22  MARV     NIL
lion      196 168   race to LowI       24  2.19  RF-SCAN  LowINear
tree      108  50   don't move          0  6.13  RF-SCAN  Anything
native    265  28   wander             10  4.70  RF-SCAN  Anything
rabbit     12 248   explore            10  1.96  RF-SCAN  Anything
rabbit    276  85   move from LowI     16  0.75  RF-SCAN  LowINear
deer      417 226   patrol             22  1.84  RF-SCAN  Anything
grass      29 326   don't move          0  0.67  RF-SCAN  Anything
grass     323 347   don't move          0  1.52  RF-SCAN  Anything
grass     335  86   don't move          0  0.00  RF-SCAN  Anything

[What_Now_Porpoise] : FantasyTime True
[Next_N_Subgoals_Reached] - FantasyTime True
  SUB-P/SG NAME: safe @6 [HomeI]
  No next(n) subgoal found.

[Predicting Strategy]  Try: 5 of 25
  Trial DSD: @19 @12 [HomeI]
[Get_Next_SX] - FantasyTime True
```

FIG. 30A-3

```
Ending SxT(5):
RxName      X    Y    Decision          Speed  Rads   Reason   Situation
--------------------------------------------------------------------------
StoryPAL   167  129   @19 @12 [HomeI]    21    2.21   MARV     NIL
lion       181  148   race to LowI       24    2.20   RF-SCAN  LowINear
tree       108   50   don't move          0    6.13   RF-SCAN  Anything
native     264   37   wander             10    4.70   RF-SCAN  Anything
rabbit      15  238   explore            10    1.22   RF-SCAN  Anything
rabbit     278   94   explore            10    5.01   RF-SCAN  Anything
deer       411  204   patrol             22    1.84   RF-SCAN  Anything
grass       29  326   don't move          0    0.67   RF-SCAN  Anything
grass      323  347   don't move          0    1.52   RF-SCAN  Anything
grass      335   86   don't move          0    0.00   RF-SCAN  Anything

[What_Now_Porpoise] : FantasyTime True
[Next_N_Subgoals_Reached] - FantasyTime True
   SUB-P/SG NAME: safe @6 [HomeI]
   No next(n) subgoal found.

[Predicting Strategy]  Try: 6 of 25
   Trial DSD: @19 @12 [HomeI]
[Get_Next_SX] - FantasyTime True Ending SxT(6):
RxName      X    Y    Decision          Speed  Rads   Reason   Situation
--------------------------------------------------------------------------
StoryPAL   154  112   @19 @12 [HomeI]    21    2.21   MARV     NIL
lion       166  128   race to LowI       24    2.21   RF-SCAN  LowINear
tree       108   50   don't move          0    6.13   RF-SCAN  Anything
native     263   46   wander             10    4.70   RF-SCAN  Anything
rabbit      24  237   explore            10    0.04   RF-SCAN  Anything
rabbit     277  103   explore            10    4.63   RF-SCAN  Anything
deer       405  182   patrol             22    1.84   RF-SCAN  Anything
grass       29  326   don't move          0    0.67   RF-SCAN  Anything
grass      323  347   don't move          0    1.52   RF-SCAN  Anything
grass      335   86   don't move          0    0.00   RF-SCAN  Anything

[What_Now_Porpoise] : FantasyTime True
   Failed worse because of higher problem: the [H1]'s bite-OUCH
   Strategy prediction Failed.

(S) LOST PLAN!
Problem: @33 [H1]
    Row: 1
  SubGoal: @8 [HomeI]
    Row: 1
    Dsd: @27 [H1]           180 20  2H1
    Reg: TIRED
   Value: 10
[Problem.Make_Decision]

StoryPAL registers:
HURT          0    HUNGER       52    TIRED        12    HURTRATE      0
HUNGERRATE    0    TIREDRATE     0    MOTORRATE    58    FEAR        230
SURPRISE      0    DISAPPOINT  230    FRUSTRATED  128    HOPELESS      0
PAIN/JOY    127    TOTAL       207                  0                  0
              0                  0                  0

SxX(1):
RxName      X    Y    Decision          Speed  Rads   Reason    Situation
--------------------------------------------------------------------------
lion       236  230   race to LowI       24    1.84   PLUNKED   LowINear
tree       108   50   don't move          0    5.36   PLUNKED   Anything
native     268    1   wander             10    4.70   PLUNKED   Anything
rabbit     671   75   explore            10    5.33   PLUNKED   Anything
rabbit     726  341   explore            10    5.09   PLUNKED   Anything
rabbit       1  254   explore            10    0.47   PLUNKED   Anything
rabbit     261  102   explore            10    1.05   PLUNKED   Anything
deer       435  295   patrol             19    1.84   PLUNKED   Anything
grass       29  326   don't move          0    0.50   PLUNKED   Anything
grass      323  347   don't move          0    2.17   PLUNKED   Anything
grass      758   94   don't move          0    3.37   PLUNKED   Anything
```

FIG. 30A-4

```
grass        335  86  don't move              0   4.03  PLUNKED  Anything
StoryPAL     226 193  @27 [H1]                21  1.84  MARV     NIL

[Get_Next_SX] - FantasyTime False
[Deep Thought] - Ctime: 2
Scanning strategy @30 [H1] rfs:
    Warm         HEAT      171   255
    Medium       SIZE       86   170
    Cool         HEAT        1    85
    Mixed hues   GREEN     128   255
    Yellow       GREEN       1   127
Scanning @33 [H1] rfs:
    Warm         HEAT      171   255
    Yellow       GREEN       1   127
    Medium       SIZE       86   170

SxC(2):
RxName       X    Y   Decision            Speed Rads  Reason   Situation
---------------------------------------------------------------------------
StoryPAL    226 193  NIL                     21  1.84  MARV     NIL
lion        236 230  race to LowI            24  1.84  RF-SCAN  LowINear
tree        108  50  don't move               0  5.36  RF-SCAN  Anything
native      268   1  wander                  10  4.70  RF-SCAN  Anything
rabbit        1 254  explore                 10  0.47  RF-SCAN  Anything
rabbit      261 102  move from LowI          10  1.05  RF-SCAN  LowINear
deer        435 295  patrol                  19  1.84  RF-SCAN  Anything
grass        29 326  don't move               0  0.50  RF-SCAN  Anything
grass       323 347  don't move               0  2.17  RF-SCAN  Anything
grass       335  86  don't move               0  4.03  RF-SCAN  Anything

[What_Now_Porpoise] : FantasyTime False
  Problem: @33 [H1]
      Row: 1
      Dsd: @27 [H1]             180  20  2H1
      Reg: TIRED
      Value: 10
[Find_Strategy]
[Find_Starting_Place_In_Strategy] - FantasyTime False
  SUB-P/SG NAME: seeing a struck [HI]
  SUB-P/SG NAME: safe @6 [HomeI]
  SUB-P/SG NAME: safe @6 [TopI]
  SUB-P/SG NAME: near [HI] & at [Imp]
  SUB-P/SG NAME: @8 [HomeI]
  SUB-P/SG NAME: @8 [TopI]
  HIT Strategy
    Strat.:@30 [H1]
      Plan:get @11 @12 [HomeI]
      Row:2
    SubGoal: @8 [HomeI]
      Row: 1

[Strat.Make_Decision]
[Predicting Strategy]  Try: 1 of 25
  Trial DSD: @19 @12 [HomeI]
[Get_Next_SX] - FantasyTime True Ending SxT(1):
RxName       X    Y   Decision            Speed Rads  Reason   Situation
---------------------------------------------------------------------------
StoryPAL    212 176  @19 @12 [HomeI]         21  2.26  MARV     NIL
lion        229 206  race to LowI            24  1.83  RF-SCAN  LowINear
tree        108  50  don't move               0  6.13  RF-SCAN  Anything
native      267  10  wander                  10  4.70  RF-SCAN  Anything
rabbit       10 257  explore                 10  5.96  RF-SCAN  Anything
rabbit      266  87  move from LowI          16  1.20  RF-SCAN  LowINear
deer        429 276  patrol                  19  1.84  RF-SCAN  Anything
grass        29 326  don't move               0  0.67  RF-SCAN  Anything
grass       323 347  don't move               0  1.52  RF-SCAN  Anything
grass       335  86  don't move               0  0.00  RF-SCAN  Anything
```

FIG. 30A-5

```
[What_Now_Porpoise] : FantasyTime True
[Next_N_Subgoals_Reached] - FantasyTime True
  SUB-P/SG NAME: safe @6 [HomeI]
  No next(n) subgoal found.

[Predicting Strategy]  Try: 2 of 25
   Trial DSD: @19 @12 [HomeI]
[Get_Next_SX] - FantasyTime True Ending SxT(2):
RxName       X    Y   Decision           Speed Rads   Reason    Situation
-----------------------------------------------------------------------------
StoryPAL    198  159  @19 @12 [HomeI]      21   2.26  MARV      NIL
lion        217  185  race to LowI         24   2.09  RF-SCAN   LowINear
tree        108   50  don't move            0   6.13  RF-SCAN   Anything
native      266   19  wander               10   4.70  RF-SCAN   Anything
rabbit       19  259  explore              10   5.98  RF-SCAN   Anything
rabbit      272   94  explore              10   5.42  RF-SCAN   Anything
deer        423  257  patrol               19   1.84  RF-SCAN   Anything
grass        29  326  don't move            0   0.67  RF-SCAN   Anything
grass       323  347  don't move            0   1.52  RF-SCAN   Anything
grass       335   86  don't move            0   0.00  RF-SCAN   Anything

[What_Now_Porpoise] : FantasyTime True
[Next_N_Subgoals_Reached] - FantasyTime True
  SUB-P/SG NAME: safe @6 [HomeI]
  No next(n) subgoal found.

[Predicting Strategy]  Try: 3 of 25
   Trial DSD: @19 @12 [HomeI]
[Get_Next_SX] - FantasyTime True Ending SxT(3):
RxName       X    Y   Decision           Speed Rads   Reason    Situation
-----------------------------------------------------------------------------
StoryPAL    184  142  @19 @12 [HomeI]      21   2.26  MARV      NIL
lion        202  165  race to LowI         24   2.20  RF-SCAN   LowINear
tree        108   50  don't move            0   6.13  RF-SCAN   Anything
native      265   28  wander               10   4.70  RF-SCAN   Anything
rabbit       27  253  explore              10   0.60  RF-SCAN   Anything
rabbit      284   83  move from LowI       16   0.72  RF-SCAN   LowINear
deer        417  238  patrol               19   1.84  RF-SCAN   Anything
grass        29  326  don't move            0   0.67  RF-SCAN   Anything
grass       323  347  don't move            0   1.52  RF-SCAN   Anything
grass       335   86  don't move            0   0.00  RF-SCAN   Anything

[What_Now_Porpoise] : FantasyTime True

[Next_N_Subgoals_Reached] - FantasyTime True
  SUB-P/SG NAME: safe @6 [HomeI]
  No next(n) subgoal found.

[Predicting Strategy]  Try: 4 of 25
   Trial DSD: @19 @12 [HomeI]
[Get_Next_SX] - FantasyTime True
Ending SxT(4):
RxName       X    Y   Decision           Speed Rads   Reason    Situation
-----------------------------------------------------------------------------
StoryPAL    170  125  @19 @12 [HomeI]      21   2.26  MARV      NIL
lion        187  146  race to LowI         24   2.23  RF-SCAN   LowINear
tree        108   50  don't move            0   6.13  RF-SCAN   Anything
native      264   37  wander               10   4.70  RF-SCAN   Anything
rabbit       32  261  explore              10   5.25  RF-SCAN   Anything
rabbit      274   82  explore              10   3.09  RF-SCAN   Anything
deer        411  219  patrol               19   1.84  RF-SCAN   Anything
grass        29  326  don't move            0   0.67  RF-SCAN   Anything
grass       323  347  don't move            0   1.52  RF-SCAN   Anything
grass       335   86  don't move            0   0.00  RF-SCAN   Anything
[What_Now_Porpoise] : FantasyTime True
[Next_N_Subgoals_Reached] - FantasyTime True
  SUB-P/SG NAME: safe @6 [HomeI]
  No next(n) subgoal found.
```

FIG. 30A-6

```
[Predicting Strategy]  Try: 5 of 25
  Trial DSD: @19 @12 [HomeI]
[Get_Next_SX] - FantasyTime True Ending SxT(5):
RxName     X    Y   Decision           Speed  Rads  Reason   Situation
---------------------------------------------------------------------------
StoryPAL  156  108  @19 @12 [HomeI]     21   2.26  MARV     NIL
lion      171  127  race to LowI        24   2.25  RF-SCAN  LowINear
tree      108   50  don't move           0   6.13  RF-SCAN  Anything
native    263   46  wander              10   4.70  RF-SCAN  Anything
rabbit     40  255  explore             10   0.62  RF-SCAN  Anything
rabbit    279   73  explore             10   0.98  RF-SCAN  Anything
deer      405  200  patrol              19   1.84  RF-SCAN  Anything
grass      29  326  don't move           0   0.67  RF-SCAN  Anything
grass     323  347  don't move           0   1.52  RF-SCAN  Anything
grass     335   86  don't move           0   0.00  RF-SCAN  Anything

[What_Now_Porpoise] : FantasyTime True
[Next_N_Subgoals_Reached] - FantasyTime True
  SUB-P/SG NAME: safe @6 [HomeI]
  No next(n) subgoal found.

[Predicting Strategy]  Try: 6 of 25
  Trial DSD: @19 @12 [HomeI]
[Get_Next_SX] - FantasyTime True Ending SxT(6):

RxName     X    Y   Decision           Speed  Rads  Reason   Situation
---------------------------------------------------------------------------
StoryPAL  142   91  @19 @12 [HomeI]     21   2.26  MARV     NIL
lion      156  108  race to LowI        24   2.24  RF-SCAN  LowINear
tree      108   50  don't move           0   6.13  RF-SCAN  Anything
native    262   55  wander              10   4.70  RF-SCAN  Anything
rabbit     30  259  explore             10   3.56  RF-SCAN  Anything
rabbit    284   64  explore             10   0.94  RF-SCAN  Anything
deer      399  181  patrol              19   1.84  RF-SCAN  Anything
grass      29  326  don't move           0   0.67  RF-SCAN  Anything
grass     323  347  don't move           0   1.52  RF-SCAN  Anything
grass     335   86  don't move           0   0.00  RF-SCAN  Anything
[What_Now_Porpoise] : FantasyTime True
[Next_N_Subgoals_Reached] - FantasyTime True
  SUB-P/SG NAME: safe @6 [HomeI]
  No next(n) subgoal found.
```

FIG. 32

SPACIO-TEMPORAL RELATIONSHIPS r
IN SOFTWARE EMBODIMENT

| Relational Operator | Meaning |
|---|---|
| NONE | This is the last line. Don't read any further. |
| DIST>X | The distance between Pi1 (usually the self-object, Ris) and Pi2 is greater than X |
| DIST<X | The distance between Pi1 and Pi2 is less than X |
| FASTER | Pi1 is moving faster (more units of distance per Current Situation) than Pi2 |
| SLOWER | Pi1 is moving slower (less units of distance per Current Situation) than Pi2 |
| TOWARD2 | Pi1 is moving toward Pi2 ("toward" = Radians in the Parm field. If the angle of movement is less than the Parm field's radians, Toward is True. Zero radians is East or to the Right on the screen) |
| TOWARD1 | Pi2 is moving toward Pi1 |
| AWAYFR2 | Pi1 is moving away from Pi2 (parenthetical note on TOWARD2 applies here) |
| AWAYFR1 | Pi2 is moving away from Pi1 |
| >ANGX | The angle between Pi1 and Pi2 exceeds X (X is in radians) |
| <ANGX | The angle between Pi1 and Pi2 is less than X (X is in radians) |
| MOVE>X | Pi1 is moving faster than X |
| <LOCX | Pi1 is at a location whose screen X-coordinate is less than X |
| >LOCX | Pi1 is at a location whose screen X-coordinate is greater than X |
| <LOCY | Pi1 is at a location whose screen Y-coordinate is less than Y |
| >LOCY | Pi1 is at a location whose screen Y-coordinate is greater than Y |
| 1CL2BYX | Pi1 is closer to Pi2 than X units of distance |
| 1FR2CYX | Pi1 is farther from Pi2 than X units of distance |
| FEEL | The self Pi is feeling as per what is here set out |

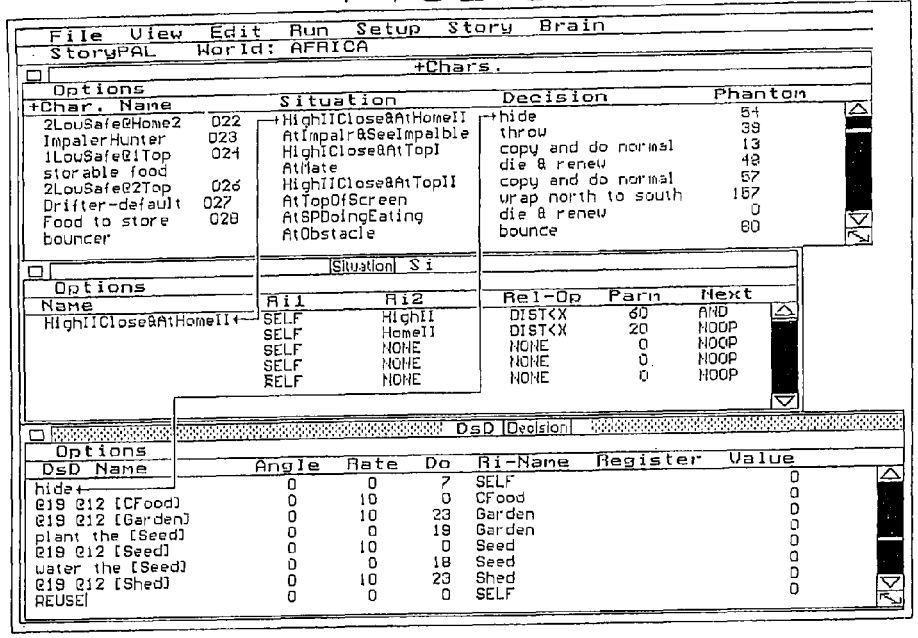

FIG. 33

FIG. 34  Do-ings Table

| Doing Number | Doing Description | Doing Number | Doing Description |
|---|---|---|---|
| -10 | Move the same way as the "Hit" Ri this time or this current situation. Used for "copying" some other Thing, as in flocking behavior. | 8 | Bitten |
| -9 | Make a buzzing sound | 9 | Pounce |
| -8 | Make a beeping sound | 10 | Throw |
| -7 | Make random, or randomize a value. | 11 | Catch |
| -6 | When Things move off the top of the screen, bring them back to the bottom of the screen. | 12 | Fly/Swim |
| -5 | Move absolute. A fixed compass setting as opposed to some degrees relative to something. | 13 | Satiated |
| -4 | Default (On the last page of the Thing Builder is the Thing's Default action) | 14 | Dead |
| -3 | Be dead | 15 | Hide/Sit |
| -2 | Move the same as the "Hit" Ri. | 16 | Light Fire |
| -1 | Do what you did the last move (same direction and rate) | 17 | Burn |
| 0 | Normal (This and the following Do-ings) | 18 | Douse Fire |
| 1 | Chase | 19 | Reach |
| 2 | Flee | 20 | Door Open |
| 3 | Hungry | 21 | Table Set |
| 4 | Hurt | 22 | Sit & Eat |
| 5 | Tired | 23 | Carry |
| 6 | Bite/Eat | 24 | Cooked |
| 7 | Rest | 25 | Cloaked (is there and can interact and be interacted with, but is invisible) |
|  |  | 26 | Using a tool |

FIG. 38

| File | View | Edit | Run | Setup | Story | Brain |
|------|------|------|-----|-------|-------|-------|

StoryPAL   World: AFRICA

Chars.

Options

| Char. Name | Register Used | Min | Max |
|------------|---------------|-----|-----|
| Small | SIZE | 1 | 85 |
| Medium | SIZE | 86 | 170 |
| Large | SIZE | 171 | 255 |
| Blue | BLUE | 1 | 127 |
| White | BLUE | 128 | 255 |
| Red | RED | 1 | 255 |
| Yellow | GREEN | 1 | 127 |
| Mixed hues | GREEN | 128 | 255 |
| Cool | HEAT | 1 | 85 |
| Tepid | HEAT | 86 | 170 |
| Warm | HEAT | 171 | 255 |
| Hungry | HUNGER | 106 | 155 |
| VeryHungry | HUNGER | 156 | 254 |
| Starving | HUNGER | 255 | 255 |
| MaxHunger | HUNGER | 254 | 255 |
| AnyHunger | HUNGER | 70 | 255 |
| NotHungry | HUNGER | 0 | 71 |
| Hurt | HURT | 106 | 155 |
| Suffer | HURT | 156 | 224 |
| AnyHurt | HURT | 71 | 255 |
| NeedHealin | HURT | 125 | 144 |
| MaxHurt | HURT | 255 | 255 |
| Tired | TIRED | 106 | 155 |
| Sleepy | TIRED | 156 | 224 |
| NeedRest | TIRED | 125 | 144 |
| AnyTired | TIRED | 71 | 255 |
| MaxTired | TIRED | 255 | 255 |
| LitingFire | DOING | 16 | 16 |
| UsingGTool | DOING | 26 | 26 |
| FireOn | DOING | 17 | 17 |
| do normal | DOING | 0 | 0 |
| Reaching | DOING | 19 | 19 |
| Open | DOING | 20 | 20 |
| end | | 0 | 0 |

FIG. 39

| File | View | Edit | Run | Setup | Story | Brain |
|------|------|------|-----|-------|-------|-------|

StoryPAL   World: AFRICA

Class Editor

Options

| Name | +Chars. | Chars. |
|------|---------|--------|
| OnFirePlac | place to make a fire | FireOn |
| | NONE | NONE |
| | NONE | NONE |
| | NONE | NONE |
| | NONE | NONE |

FIG. 40

Status

Options

| Name | Value | Move | Stopped | Height | FaceMin |
|------|-------|------|---------|--------|---------|
| HURT | 37 | -1 | -4 | 0 | 106 |
| HUNGER | 83 | 2 | 1 | 0 | 106 |
| TIRED | 0 | 2 | -4 | 0 | 106 |
| HURTRATE | -10 | 0 | 0 | 0 | -25 |
| HUNGERRATE | 0 | 0 | 0 | 0 | -56 |
| TIREDRATE | 0 | 0 | 0 | 0 | -25 |
| MOTORRATE | 13 | 8 | 3 | -100 | 11 |
| FEAR | 228 | 0 | 0 | 100 | 90 |
| SURPRISE | 0 | 0 | 0 | 40 | 0 |
| DISAPPOINT | 0 | 0 | 0 | 10 | 0 |
| FRUSTRATED | 0 | 0 | 0 | 10 | 0 |
| HOPELESS | 0 | 0 | 0 | 100 | 0 |
| PAIN/JOY | 0 | 0 | 0 | 0 | -127 |
| TOTAL | 215 | 0 | 0 | 0 | 0 |

FIG. 41

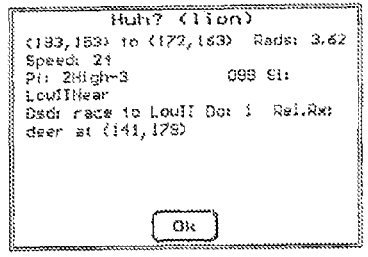

FIG. 42

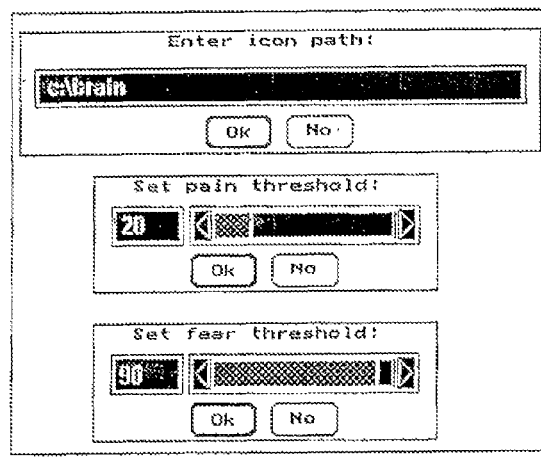

FIG. 43

| Data Structure | Created In Window... | Found In Menu... | Used In Other Data Structure Window(s)... |
|---|---|---|---|
| Pf or Rf (Class) | Class | Edit | Situation & Decision |
| RF or Rf (Char) | Chars. | Edit | Class |
| PF or Pf (+Char) | +Chars. | Edit | Class & MetaPf |
| Sf (Situation-abstracted) | Situation | Edit | +Char, Problem/Subgoal & Strategy |
| Problem/Subgoal | Problems | Brain | It isn't |
| Strategy & Plans | Strategy | Brain | Problem/Subgoal |
| Do-ing | Coded in the program | none | Decision |
| DsD (Decision) | Decision | Edit | +Char & Problem/Subgoal |
| MetaPf | Meta-Pf | Edit | It isn't |

FIG. 44A-1

STEPS IN A COMPUTER PROGRAM FOR
IMPLEMENTING EMOTIONAL EXPRESSION IN
AN AUTONOMOUS DECISION SYSTEM

STORING IN A COMPUTER INFORMATION-STORAGE DEVICE PLANNING DATA PROVIDING PLAN CAPABILITY TO SUCH AUTONOMOUS DECISION SYSTEM

↓

USING INFORMATION REGARDING ENVIRONMENTAL CIRCUMSTANCES OF SUCH AUTONOMOUS DECISION SYSTEM, PROVIDING PLANNING SELECTIONS AND PLANNING STATUS

↓

USING INFORMATION ABOUT CURRENT SUCH PLANNING STATUS, PROVIDING EMOTION-SOURCE DATA

↓

USING CURRENT SUCH EMOTION-SOURCE DATA, PROVIDING CURRENT EMOTION STATUS

↓

MAKING AND STORING IN SUCH COMPUTER INFORMATION-STORAGE DEVICE A SUBSET OF SUCH PLANNING DATA ABOUT (1) A FIRST PLAN REGARDING WHETHER THE SELF OF SUCH AUTONOMOUS DECISION SYSTEM IS THEN COPYING WITH A NON-SELF CREATURE OF SUCH ENVIRONMENTAL CIRCUMSTANCES, AND (2) A SECOND PLAN REGARDING WHETHER A SUCH NON-SELF CREATURE IS THEN COPYING WITH SUCH SELF

↓

WHEREIN SUCH PLANNING DATA COMPRISES: A SET OF HIERARCHICALLY-ORGANIZED ABSTRACT SELF-PROBLEM REPRESENTATIONS, AND IN ASSOCIATION WITH ESSENTIALLY EACH OF SUCH ABSTRACT SELF-PROBLEM REPRESENTATIONS, A SET OF HIERARCHICALLY-ORGANIZED ABSTRACT SELF-PLAN REPRESENTATIONS EACH COMPRISING A SET OF ABSTRACT SELF-SUBGOAL REPRESENTATIONS, WHEREIN AT LEAST ONE SUCH ABSTRACT SELF-PROBLEM REPRESENTATION IS THE PROBLEM OF THE SELF NOT-COPYING WITH A SUCH NON-SELF CREATURE

↓

AUTONOMOUS HUMANOID COGNITIVE SYSTEMS

The present application is a continuation-in-part and is related to and claims priority from application Ser. No. 11/423,382, filed Jun. 9, 2006, which application is a continuation-in-part and is related to and claims priority from application Ser. No. 10/716,640, filed Nov. 18, 2003, which application is a continuation-in-part and is related to and claims priority from application Ser. No. 09/302,010, filed Apr. 27, 1999, which application is a continuation-in-part and is related to and claims priority from application Ser. No. 08/621,426 (sic), filed Aug. 4, 1998 as a file-wrapper continuation application (given the parent's serial number and filing date), which application is a continuation and is related to and claims priority from application Ser. No. 08/621,426, filed Mar. 25, 1996, the contents of all of which are incorporated herein by this reference and are not admitted to be prior art with respect to the present invention by the mention in this cross-reference section.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

This invention relates to autonomous humanoid cognitive systems, including humanoid, social, and natural-languaging machines. More particularly, it relates to computer systems including autonomous decision systems which include means for determining relevancy, i.e., the threats to and opportunities of the autonomous decision system, present and predicted. Even more particularly, it relates to such intelligent and humanoid autonomous decision systems having a new and efficient ontology and constructed and arranged to interact comfortably with humans, including the use of social bonding and natural languages.

The microfiche filed in the parent application shows the source code for a preferred embodiment of the present invention in the form of an entertainment or "game" entitled "StoryPal"™ and an operating test software platform for humanoid robotics.

In the past, it has been a difficult and sought-after goal to provide general-purpose autonomous decision systems (herein also called "ADS's") which can efficiently determine threats and opportunities, i.e., relevancies. In addition, there have been further goals to make such autonomous decision systems seem more "humanoid" in the sense of abilities to perform some human-like functions like thinking, feeling, languaging, determining relevancy, etc. Further, in order to provide comfortable interaction between such ADS's and humans, especially in natural language transactions, requires at least that the way the ADS "makes sense" of what is going on itself "makes sense" to humans.

Several chief areas in which the systems used by the ADS must "make sense" to most humans are: (1) the system for categorization used by the ADS to break up the infinite variety of the world and construct a finite representation of it; (2) the system for making decisions used by the ADS, e.g., by testing alternative actions and comparing the resulting alternative consequences (i.e., using a "what-if" system); (3) the system for determining the "relevancy" or "meaning" to (i.e., threats to and opportunities of) the ADS of various circumstances or situations; and (4) other ADS systems for accommodating such functions as determining similarity, doing learning, implementing bonding and sociality, and handling memory/history. Perhaps the major advantage which such an ADS might have is the use (sending and receiving) of natural language in interactions with humans.

In the prior art, there have been many efforts over many decades to provide such an autonomous decision system, or to at least find a good starting place for such efforts. Many "fields" have attempted this, among them Artificial Intelligence, Cognitive Science, Artificial Life, and Robotics. But the goal has been elusive and there have been few serious proposals for a good starting place, even from major approaches like logic programming, "neural nets", expert systems, and "fuzzy logic".

As another example, philosophers of Artificial Intelligence are still today searching to agree upon good definitions of such common mammalian/human autonomy traits as "awareness". And the scientific literature is void even of good proposals for general humanoid or machine systems of internal representation, or for general-purpose object categorization, or useful mathematical or non-linguistic ontologies, as with primitives permitting "whether concrete is included in abstract" computation, or for bonding and sociality implementation.

OBJECTS AND FEATURES OF THE INVENTION

A primary object and feature of the present invention is the provision of a computer system providing an improved intelligent decision system, including such systems which implement sociality and bonding, learning, and natural languaging. Another primary object and feature of this invention is to provide an efficient autonomous decision computer system which is "aware" of the implications and relevancies of its circumstances, i.e., is "aware" of threats to it and of its opportunities, actual or impending. A further object and feature is to provide an improved system for machine use of natural language, particularly using a new ontology. Yet a further object and feature is to provide in an autonomous decision system a highly efficient system of internal representation, including a categorization system permitting efficient and computable relationships between abstracts and concretes; and further to provide such a system of internal representation having relationships which assist in providing efficiency in many areas and assists in providing natural-language abilities to an ADS. Even another object and feature is to provide separate improved systems involving subsystem inventions of the ADS of the present invention (e.g., a virtual reality engine) for use in other fields. Other objects and features of this invention will become apparent with reference to the following invention descriptions.

SUMMARY OF THE INVENTION

According to a preferred embodiment of this invention, it provides a computer system for implementing decisions of an autonomous decision system in an environmental situation, comprising: at least one computer processing device structured and arranged to process data; at least one computer storage device structured and arranged to store data on a storage medium; at least one computer interface device structured and arranged to providing temporally-incremental input data about a series of said environmental situations; at least one representation computer processing and storing device structured and arranged to process data regarding said temporally-incremental input data about said series of said environmental situations to provide a temporally-incremental series, respectively, of "present" concrete self-situation representations of said respective environmental situations, wherein each said self-situation representation comprises a self representation and a set of event representations, each said event representation being represented specifically spacio-temporally relative to said self representation, and each said event representation including a behavioral-type designation selected from a set of behavioral-type designations, each said behavioral-type designation of said set of behavioral-type designations being associated with a set of incremental behavioral self-tendencies for determining incrementally-predicted self-situation representations from a said presented self-situation representation; and a set of current-behavior designations associated with each said event representation specifying the current behaviors of each said event representation.

It further provides such a computer system wherein said at least one representation computer processing and storing device comprises data for representing a particular object as part of a collection of object representations, each said object representation of said collection comprising a said behavioral-type designation, and said at least one representation computer processing and storing device is further structured and arranged to: process and store data regarding assigning characteristics to each said object representation of said collection, wherein essentially each of said characteristics comprises a subset of a set of self-tendencies and a corresponding subset of a set of self-tendency markers, said set of self-tendency markers having a 1-to-1 correspondence with said set of self-tendencies, one unique marker from said set of self-tendency markers corresponding respectively with each self-tendency of said set of self-tendencies, said subset of self-tendencies being constructed and arranged to permit a determination of the expected behavior of each said object representation with respect to any mappable representation of other object representations from said collection of object representations, each said self-tendency consisting essentially of an instruction for self-behavior (of any first object representation to which said self-tendency may be assigned) on the condition that any mappable representation of object representations from said collection, including said first object representation, from the viewpoint of said first object representation, is included in a specified self-relation selected from a set of self-relations, where each self-relation of said set of self-relations comprises a specified space-time relation among a said first object representation and at least one said other object representation, each said other object representation being specified as a subset of a set of self-tendency markers, each said subset of self-tendency markers corresponding to the subset of self-tendencies assigned to each said other object representation. And it provides such a computer system wherein: each said self-tendency marker has a first marker part selected from a set of first marker parts and a second marker part selected from a set of second marker parts, said set of first marker parts having a 1-to-1 correspondence with said set of self-relations, and said set of second marker parts having a 1-to-1 correspondence with said set of instructions for self-behavior.

Also, according to a preferred embodiment thereof, it provides a computer system for implementing natural language functions in a humanoid autonomous decision system, comprising: at least one computer processor device structured and arranged to process data; at least one computer storage device structured and arranged to store data on a storage medium wherein said data comprises non-linguistic discrete data-types and, conforming to each of said discrete non-linguistic data-types, a set of non-linguistic discrete data elements; at least one computer input device structured and arranged to provide information about current circumstances of the humanoid autonomous decision system; at least one computer output device structured and arranged to implement decisions of the humanoid autonomous decision system; at least one computer processor and storage device structured and arranged to provide information regarding the relevance to the humanoid autonomous decision system of said current circumstances, comprising at least one computer processor structured and arranged to process data regarding "self" to provide at least one "self" representation, at least one computer processor structured and arranged to process data regarding said current circumstances to provide a first non-linguistic structured "self"-situation representation, at least one relational-situation computer storage device structured and arranged to provide data regarding a set of hierarchically-organized, relevant, non-linguistic relational "self"-situations, and at least one inclusional computer processor structured and arranged to process data to determine inclusions of a said first non-linguistic structured "self"-situation within said non-linguistic relational "self"-situations to determine any relevance of said first structured "self"-situation to a said "self" of said relevance means, wherein said data regarding said set of hierarchically-organized, relevant, non-linguistic relational "self"-situations includes data regarding a set of hierarchically-organized problem relational "self"-situations, and in association with essentially each of said problem relational "self"-situations, a set of hierarchically-organized plan relational "self"-situations; type-linking storage means for providing data regarding respectively linking essentially each said discrete data-type of said humanoid autonomous decision system with a respective word/phrase category of a first natural language, and respectively linking selected words/phrases of each said linked word/phrase category of said first natural language with respective said discrete data elements of each said discrete data-type so linked with a said linked word/phrase category; and at least one data-transformation computer processor structured and arranged to process data regarding a first communication to be made by said humanoid autonomous decision system to transform a specified set of non-linguistic data elements into a said first communication in said first natural language, and further comprising at least one identification computer processor structured and arranged to process data regarding identifying which of said discrete data elements of said discrete data-types is to form part of said first communication, at least one snippet computer processor structured and arranged to process data regarding selecting natural-language snippets for pointing to the said categories of said natural-language corresponding to whichever of said discrete data-types includes each said discrete data element which is to form part of said first communication, at least one vocabulary computer processor structured and arranged to process data regarding selecting a word/phrase of said natural-language corresponding to each said discrete data element which is to form part of said first communication, and at least one grammar computer processor structured and arranged to process data regarding producing from the grammar practices of said natural language and from said snippet selections and from said word/phrase selections said first communication in said natural language.

According to another preferred embodiment hereof, this invention provides a machine computational-processing system, for providing current simulated-emotion expression in at least one simulated-humanoid autonomous decision system having at least one ability to assess a set of environmental circumstances, comprising the steps of: storing in such at least one simulated-humanoid autonomous decision system planning data providing plan capability to such at least one simulated-humanoid autonomous decision system; using information about such set of environmental circumstances of such at least one simulated-humanoid autonomous decision system and such plan capability, computing at least one current planning selection; using information about such at least one current planning selection, computing at least one current planning status; using information about such at least one current planning status, computing current simulated-emotion-source data; and using such current simulated-emotion-source data, computing current simulated-emotion status. It further provides such a system further comprising the steps of: storing in such at least one simulated-humanoid autonomous decision system a subset of such planning data comprising at least one first plan regarding an extent to which at least one other (non-self) creature of such set of environmental circumstances is copying with such at least one simulated-humanoid autonomous decision system (self); computing at least one such extent of at least one such copying by making at least one similarity comparison of at least one decision of such at least one other (non-self) creature when in at least one first circumstance-in-relation-to-itself to at least one decision of such at least one simulated-humanoid autonomous decision system (self) if in such at least one first circumstance-in-relation-to-itself; computationally evaluating such at least one similarity comparison for extent of decision similarity; including, in such current simulated-emotion-source data, information correlated with such extent of decision similarity; and including, in such current simulated-emotion status, at least one status of copying simulated emotion of such at least one simulated-humanoid autonomous decision system.

The invention further provides such a system further comprising the steps of: assigning to such at least one non-self creature at least one kind-number representing at least one extent of relative similarity of such at least one non-self creature to such self's own kind; and computationally adjusting such at least one kind-number to at least partially reflect such at least one similarity comparison for extent of decision similarity by such at least one non-self creature. It also provides such a system further comprising the step of computationally assigning at least one current copying simulated-emotion amount, for association with such at least one current status of copying simulated-emotion of such current simulated-emotion status of such at least one simulated-humanoid autonomous decision system, essentially proportional to such at least one current kind-number associated with such at least one non-self creature. And it provides such a system wherein such planning data comprises: a set of hierarchically-organized abstract self-problem representations, and, in association with essentially each of such abstract self-problem representations, a set of hierarchically-organized abstract self-plan representations each comprising a set of abstract self-subgoal representations. It moreover provides such a system wherein such planning data comprises: a set of hierarchically-organized abstract self-problem representations, and, in association with essentially each of such abstract self-problem representations, a set of hierarchically-organized abstract self-plan representations each comprising a set of abstract self-subgoal representations, wherein at least one such abstract self-problem representation comprises at least one copying problem, about at least one extent of self-not-copying with at least one such non-self creature, a relevance of such at least one copying problem being essentially proportional to such at least one current kind-number associated with such at least one non-self creature.

Moreover, it provides such a system wherein such planning data comprises: a set of hierarchically-organized abstract self-problem representations, and, in association with essentially each of such abstract self-problem representations, a set of hierarchically-organized abstract self-plan representations each comprising a set of abstract self-subgoal representations, wherein at least one such abstract self-problem representation comprises at least one copying problem, about at least one extent of at least one such non-self creature not-copying with such self, a relevance of such at least one copying problem being essentially proportional to such at least one current kind-number associated with such at least one non-self creature. And it provides such a system wherein: such current simulated-emotion-source data comprises data regarding current simulated-fear, current simulated-hopelessness, and current simulated-disappointment, comprising incremental representations of current simulated-fear in amounts essentially hierarchically ordered according to such hierarchical set of self-problem representations, and incremental representations of current simulated-hopelessness in amounts depending essentially upon whether, in at least one such self-plan representation for at least one highest currently-relevant self-problem representation, no subgoal representations are currently relevant. It also provides such a system further comprising the step of using information about such current simulated-emotion status, computationally providing output signals to operate effectors to provide current simulated-emotion expression of such at least one simulated-humanoid autonomous decision system. And it provides such a system further comprising the steps of: using information about such current simulated-emotion status, computationally providing output signals to operate effectors to provide current simulated-emotion expression of such at least one simulated-humanoid autonomous decision system; wherein such current simulated-emotion expression comprises simulated-smiles and simulated-frowns; wherein such simulated-smiles are associated with such at least one simulated-humanoid autonomous decision system computing at least one relatively-high extent of at least one such non-self creature copying with such self; and wherein such simulated-frowns are associated with such at least one simulated-humanoid autonomous decision system computing at least one relatively-low extent of at least one such non-self creature copying with such self. And it provides such a system wherein such current simulated-emotion-source data further comprises data regarding current simulated-frustration, current simulated-surprise, and current simulated-muscle-relief.

Yet additionally, in accordance with a preferred embodiment hereof, this invention provides a machine computational-processing system, for implementing decisions of at least one autonomous decision system in environmental situations, such at least one autonomous decision system having at least one input system for providing temporally-incremental input data about a series of such environmental situations, comprising the steps of: computationally processing such temporally-incremental input data about such series of such environmental situations to provide a temporally-incremental series, respectively, of "present" self-situation representations of such respective environmental situations, wherein each such "present" self-situation representation comprises a self representation and a set of event representations, each such event representation being represented spacio-temporally relative to each such self representation, wherein each such event representation comprises at least one behavioral-type designation selected from a set of behavioral-type designations, each such at least one behavioral-type designation of such set of behavioral-type designations being associated with a set of incremental behavioral self-tendencies for determining incrementally-predicted self-situation representations from each such "present" self-situation representation, and a set of current-behavior designations associated with each such event representation specifying the current behaviors of each such event representation; computationally processing data regarding at least one such "present" self-situation representation of such respective environmental situation to determine the representations of a set of incrementally-predicted self-situations, predicted as incremental consequences from such at least one "present" self-situation representation; storing data for hierarchical planning comprising a hierarchical set of n problem representations; and m plansets of hierarchical subgoal representations, each said planset of hierarchical subgoal representations being associated with at least one of said set of n problem representations; and computationally comparing such data for hierarchical planning with such data about each such "present" self-situation representation and each such incrementally-predicted self-situation to determine at least one self-relevancy of each such presented self-situation representation and at least one self-relevancy of each such incrementally-predicted self-situation representation; wherein any threat to and any opportunity of such at least one autonomous decision system may be determined. And it provides such a system further comprising the step of from such information determined about any such threat to and any such opportunity of such at least one autonomous decision system, computationally determining at least one decision of such autonomous decision system.

Additionally, it provides such a system wherein such computational comparing step comprises: computationally determining which of such hierarchical set of n problems includes at least one such "present" self-situation representation; computationally determining which of such hierarchical subgoal representations includes at least one such "present" self-situation representation; and computationally determining which of such problem representations and which of such subgoal representations include at least one such incrementally-predicted self-situation representation. And it provides such a system further comprising the steps of: computationally specifying at least one self trial decision for use in what-iffing; and computationally determining, using such at least one self trial decision, at least one set of such incrementally-predicted self-situation representations.

Yet further, according to a preferred embodiment thereof, this invention provides a machine computational-processing system, for implementing natural language functions in at least one simulated-humanoid autonomous decision system, comprising the steps of: storing in at least one computational storage system data comprising non-linguistic discrete data-types and, conforming to each of such discrete non-linguistic data-types, a set of non-linguistic discrete data elements; storing in at least one computational storage system data respectively linking essentially each such discrete data-type of such simulated-humanoid autonomous decision system with a respective word/phrase category of at least one first natural language, and respectively linking selected words/phrases of each such linked word/phrase category of such at least one first natural language with respective such discrete data elements of each such discrete data-type so linked with a such linked word/phrase category; using information about at least one set of current circumstances of such at least one simulated-humanoid autonomous decision system, computationally determining at least one relevance to the simulated-humanoid autonomous decision system of such current circumstances; using information about such at least one relevance, computationally specifying at least one set of relevant such non-linguistic discrete data elements; using such specification of such at least one set of relevant such non-linguistic discrete data elements, computationally determining at least one first communication to be made by such simulated-humanoid autonomous decision system to transform such specified set of non-linguistic discrete data elements into such at least one first communication in such first natural language; wherein such step of computational determining comprises computationally processing data regarding identifying which of such discrete data elements of such discrete data-types is to form part of such at least one first communication, computationally processing data regarding selecting natural-language snippets for pointing to the such categories of such natural-language corresponding to whichever of such discrete data-types includes each such discrete data element which is to form part of such at least one first communication, computationally processing data regarding selecting a word/phrase of such natural-language corresponding to each such discrete data element which is to form part of such at least one first communication, and computationally processing data regarding producing from grammar practices of such natural language and from such snippet selections and from such word/phrase selections such at least one first communication in such natural language.

In addition, it provides, in accordance with a preferred embodiment thereof, a machine computational-processing system for implementing first natural language interpretation functions in at least one simulated-humanoid autonomous decision system interpreting incoming first natural language from at least one other, comprising the steps of: storing in at least one computational storage system data comprising non-linguistic discrete data-types and, conforming to each of such discrete non-linguistic data-types, a set of non-linguistic discrete data elements; storing in at least one computational storage system data respectively linking essentially each such discrete data-type of such simulated-humanoid autonomous decision system with a respective word/phrase category of at least one first natural language, and respectively linking selected words/phrases of each such linked word/phrase category of such at least one first natural language with respective such discrete data elements of each such discrete data-type so linked with a such linked word/phrase category; computationally processing such incoming natural language sufficiently to provided data identifying each vocabulary element, snippet type for each such element, and grammatical function for each such element; computationally processing such identifying data to provide a non-natural-language concrete circumstance interpretation of such incoming natural language; computationally determining at least one relevance to such at least one simulated-humanoid autonomous decision system of such circumstance interpretation; wherein such computational determining comprises storing data regarding a set of hierarchically-organized, relevant, non-linguistic relational "self"-situations, and computationally processing to determine inclusions of such non-natural-language concrete circumstance interpretation within such non-linguistic relational "self"-situations to determine any relevance of such non-natural-language concrete circumstance interpretation to such at least one simulated-humanoid autonomous decision system, wherein such data regarding such set of hierarchically-organized, relevant, non-linguistic relational "self"-situations includes data regarding a set of hierarchically-organized problem relational "self"-situations, and in association with essentially each of said problem relational "self"-situations, a set of hierarchically-organized plan relational "self"-situations.

And it provides such a system wherein such interpreting simulated-humanoid autonomous decision system possesses abilities to select for use in interpretation similar cognitive, relevancy, and emotion systems to those of the at least one other; and, further, wherein such step of computational processing of such incoming natural language comprises natural-language default-selecting to process data regarding selection of non-natural-language data types and data for correspondence with such incoming information. It also provides such a system further comprising the steps of: computationally processing data regarding at least one story-series of such incoming information to provide at least one story-series of such non-natural-language concrete circumstance interpretation; and computationally processing data regarding such at least one story-series of such non-natural-language concrete circumstance interpretation to provide at least one learned modification of at least one such non-linguistic discrete data element, wherein such story-series of such non-natural-language concrete circumstance interpretation is treated as at least one temporally-incremental series, respectively, of "present" concrete self-situation representations of at least one temporally-incremental series of respective environmental situations.

Even further, this invention provides, according to a preferred embodiment hereof, a machine-data ontology system, for use in computational processing of cognitive information within at least one autonomous decision system having at least one input system for providing input data about at least one circumstance among objects, comprising the steps of: storing within such at least one autonomous decision system a large set of non-linguistic data "primitives", such primitives being structured and arranged to classify objects according to which subset of such primitives is assigned to a particular object; and computationally non-linguistically classifying particular objects; wherein such non-linguistic classifying comprises computationally assigning a representation comprising a set of such primitives to a particular object, wherein such set of assigned primitives comprises information about behavioral tendencies of such particular object; wherein a less abstract such representation comprises n such primitives; wherein such assigned less-abstract representation may be made progressively more abstract by progressively removing subsets x of such assigned set of primitives; and wherein a most abstract such representation comprises one such assigned primitive (n−x=1).

Also the present invention provides, in accordance with a preferred embodiment thereof, a computer system for implementing decisions of an autonomous decision system in an environmental situation, comprising: computer processing means for processing data; storage means for storing data on a storage medium; input means for providing temporally-incremental input data about a series of such environmental situations; concrete-situation means for processing data regarding such temporally-incremental input data about such series of such environmental situations to provide a temporally-incremental series, respectively, of "present" concrete self-situation representations of such respective environmental situations, wherein each such self-situation representation comprises a self representation and a set of event representations, each such event representation being represented specifically spacio-temporally relative to such self representation, and each such event representation including a behavioral-type designation selected from a set of behavioral-type designations, each such behavioral-type designation of such set of behavioral-type designations being associated with a set of incremental behavioral self-tendencies for determining incrementally-predicted self-situation representations from a such presented self-situation representation; and a set of current-behavior designations associated with each such event representation specifying the current behaviors of each such event representation.

Further, this invention provides such a computer system wherein such representation means comprises data means for representing a particular object as part of a collection of object representations, each such object representation of such collection comprising a such behavioral-type designation, and such representation means further comprising: assignment means for processing and storing data regarding assigning characteristics to each such object representation of such collection, wherein essentially each of such characteristics comprises a subset of a set of self-tendencies and a corresponding subset of a set of self-tendency markers, such set of self-tendency markers having a 1-to-1 correspondence with such set of self-tendencies, one unique marker from such set of self-tendency markers corresponding respectively with each self-tendency of such set of self-tendencies, such subset of self-tendencies being constructed and arranged to permit a determination of the expected behavior of each such object representation with respect to any mappable representation of other object representations from such collection of object representations, each such self-tendency consisting essentially of an instruction for self-behavior (of any first object representation to which such self-tendency may be assigned) on the condition that any mappable representation of object representations from such collection, including such first object representation, from the viewpoint of such first object representation, is included in a specified self-relation selected from a set of self-relations, where each self-relation of such set of self-relations comprises a specified space-time relation among a such first object representation and at least one such other object representation, each such other object representation being specified as a subset of a set of self-tendency markers, each such subset of self-tendency markers corresponding to the subset of self-tendencies assigned to each such other object representation.

Even further, this invention provides such a computer system wherein: each such self-tendency marker has a first marker part selected from a set of first marker parts and a second marker part selected from a set of second marker parts, such set of first marker parts having a 1-to-1 correspondence with such set of self-relations, and such set of second marker parts having a 1-to-1 correspondence with such set of instructions for self-behavior. And it provides such a computer system further comprising: prediction means for processing data regarding such "present" concrete self-situation representations of such respective environmental situations to determine the representations of a set of incrementally-predicted self-situations, predicted as incremental consequences from such presented self-situation representation; and relevancy means for processing relevancy data to determine the self-relevancy of a such presented self-situation representation; and the self-relevancy of such set of incrementally-predicted self-situation representations; whereby threats to and opportunities of such autonomous self decision system may be determined. It also provides such a computer system wherein such prediction means comprises: means for processing data for incremental computation, considering each such set of incremental behavioral self-tendencies associated with a such behavioral-type designation of each such event representation, of the expected incremental changes in each such event representation of each such presented self-situation representation and of each such incrementally-predicted self-situation representation for a selected number, I, of increments, thereby producing, by such incremental computation, a series of I incrementally-predicted self-situation representations from such presented self-situation representation.

In addition, this invention provides such a computer system wherein such relevancy means comprises: means for storing data for hierarchical planning comprising a hierarchical set of n problem representations; and m plan-sets of hierarchical subgoal representations, each such plan-set of hierarchical subgoal representations being associated with at least one of such set of n problem representations. And it provides such a computer system wherein such problem representations and such subgoal representations of such relevancy means comprise expression types from the class consisting of relational-geometric expressions and relational-quantity expressions; and, further, wherein such relevancy means comprises: first situation-inclusional means for processing data for comparing such presented self-situation representation and such set of incrementally-predicted self-situation representations with such problem representations and such subgoal representations, including problem means for processing data for determining which of such hierarchical set of n problems includes a particular such self-situation representation, plan means for processing data for determining which of such hierarchical subgoal representations includes a particular such self-situation representation, and predictive planning means for processing data for determining incrementally which incrementally-predicted self-situation representations are included in which problem representations and which subgoal representations. And it also provides such a computer system wherein: each such incremental self tendency comprises an instruction for incremental self-behavior (of any first such event representation to which such incremental self-tendency may be assigned) on the condition that any such self situation representation including such first event representation, from the viewpoint of such first event representation, is included in a specified self-relation; and such prediction means comprises second situation-inclusional means for processing data for comparing such self-situation representation including such first event representation, from the viewpoint of such first event representation, and such specified self relation of such each incremental self tendency.

It also provides such a computer system wherein: such first situation-inclusional means (of such relevancy means) consists essentially of first computational means; such second situation-inclusional means (of such prediction means) consists essentially of second computational means; and such first computational means comprises such second computational means; and, further, wherein such first computational means and such second computational means comprise a single parallel processing system. And it provides such a computer system further comprising: feeling means for processing data for providing to such self representation information about self-emotions and self-metabolism; and recognition means for processing data regarding sensor status and a list of object representations each with an associated normal sensor identification and an associated of behavioral-type designations, to provide a recognized object representation; wherein such recognition means comprises association means for processing data regarding associating with a such object representation an identified first set of recognition factors selected from a second set of recognition factors; wherein each such recognition factor consists essentially of a marker-reference to a specified range or specified reading of an input means representation; and wherein a set of such behavioral-type designations assigned to such object representation depends upon such identified first set of recognition factors associated with such object representation.

Moreover, this invention provides a computer system further comprising what-iffing means for processing data for selecting and specifying a self trial decision to such presented self representation for use in determining such set of predicted self-situation representations. And it provides such a computer system wherein: such relevancy data comprises a set of hierarchically-organized relevance self-relations, where essentially each relevance self-relation of such set of relevance self-relations comprises a specified space-time relation among a such self representation and at least one such other object representation, each such other object representation being specified as a subset of such set of self-tendency markers, each such subset of self-tendency markers corresponding to the such subset of self-tendencies assignable to each such other object representation; and such computer system further comprises a first situation-inclusional means for processing data regarding determining which of such relevance self-relations include any such self situation representations. And it provides such a computer system wherein such prediction means comprises: simulation means for processing data for simulating through time from a beginning structured-situation of the circumstances of any objects of such collection which are in any mapping representation, such simulation means including means for processing data for selecting, from each such subset of self-tendencies so constructed and arranged to permit a determination of the expected behavior of each such object with respect to any mappable representation of other objects from such collection, the beginning incremental behavioral tendency of each object of such beginning structured-situation of the given beginning mapping representation of objects; means for processing data for performing, with respect to such beginning structured-situation, such beginning incremental behavioral tendency of each such object, to transform such beginning structured-situation to a first amended structured-situation; means for processing data for selecting, for each such object of such first amended structured-situation, the next incremental behavioral tendency of each such object; means for processing data for performing, with respect to such first amended structured-situation, such next incremental behavioral tendency of each such object, to transform such first amended structured-situation to a second amended structured-situation; and means for processing data for continuing to perform, for a selected period, appropriate succeeding incremental behavioral tendencies of each such object to continue to transform each succeeding amended structured situation to a next succeeding structured-situation. It also provides such a computer system wherein such second situational inclusional means comprises a set of parallel computing structures, each one of such parallel computing structures being constructed and arranged to determine the inclusion within a specified such relational self-situation of any presented such structured self-situation.

According to a preferred embodiment thereof, this invention also provides a computer system for providing emotional expression in an autonomous decision system, comprising: computer processing means for processing data; storage means for storing data on a storage medium; planning-data means for storing data for providing plan capability to such autonomous decision system; planning means for processing data regarding circumstances of such autonomous decision system to provide planning selections and planning status; status means for processing data regarding current planning status to provide emotion-source data; and emotion means for processing data regarding emotion-source information to provide current emotion status. It further provides such a computer system further comprising expression means for processing data regarding current emotion status to provide body-expression data. And it provides such a computer system further comprising: sensor means for providing sensor data for the autonomous decision system; and effector means for processing data regarding body expression to provide output signals for effectors; and, further, wherein: such autonomous decision system is humanoid; such expression means for processing data regarding current emotion status to provide body-expression data comprises a provider of facial-expression data including data regarding smiles and frowns; and, further, wherein such emotion means for processing data regarding emotion source information to provide current emotion status comprises a provider of current status of not-copying arousal of such humanoid autonomous decision system, including data regarding self not-copying and other not-copying; and, further, wherein such status means for processing data regarding current planning status to provide emotion-source data comprises a provider of data regarding fear, hopelessness, and disappointment; and, further, wherein such status means for processing data regarding current planning status to provide emotion-source data further comprises a provider of data regarding frustration, surprise, and muscle relief.

Even moreover, this invention provides such a computer system further comprising: social data means for processing data regarding a non-self life form for assigning to such non-self life form a kind-number representing a relative similarity of such non-self life form to the self's own kind; social processing means for processing data for making a similarity comparison of a decision of a such non-self life form when in a first situation to a decision of the self if the self were in such first situation and evaluating such comparison for degree of decision similarity and adjusting such kind-number to reflect such decision similarity of such non-self life form. It also provides such a computer system further comprising: planning means for providing plan capability to such autonomous decision system, wherein such planning means comprises a set of hierarchically-organized abstract self-problem representations, and in association with essentially each of such abstract self-problem representations, a set of hierarchically-organized abstract self-plan representations each comprising a set of abstract self-subgoal representations, wherein at least one such abstract self-problem representation is the problem of the self not-copying with a such non-self life form; wherein such status means for processing data regarding current planning status to provide emotion-source data comprises a provider of data regarding fear, hopelessness, and disappointment, comprising incremental representations of "fear" in amounts essentially hierarchically ordered according to such hierarchical set of self-problem representations, and incremental representations of "hopelessness" depending essentially upon whether, in the operation of such planning means, in the self-plan representation for the highest active hierarchical self-problem representation, none of the subgoal representations is active; and wherein an emotion amount associated with such problem of the self not-copying with such non-self life form is structured and arranged to be essentially proportional to such kind-number associated with such non-self life form.

Also, in accordance with a preferred embodiment hereof, this invention provides a computer system for implementing natural language functions in a humanoid autonomous decision system, comprising: computer processing means for processing data; storage means for storing data on a storage medium wherein such data comprises non-linguistic discrete data-types and, conforming to each of such discrete non-linguistic data-types, a set of non-linguistic discrete data elements; input means for providing information about current circumstances of the humanoid autonomous decision system; output means for implementing decisions of the humanoid autonomous decision system; relevance means for providing information regarding the relevance to the humanoid autonomous decision system of such current circumstances, comprising self-representation means for processing data regarding "self" to provide at least one "self" representation, structured-situation means for processing data regarding such current circumstances to provide a first non-linguistic structured "self"-situation representation, relational-situation storage means for providing data regarding a set of hierarchically-organized, relevant, non-linguistic relational "self"-situations, and inclusional means for processing data to determine inclusions of a such first non-linguistic structured "self"-situation within such non-linguistic relational "self"-situations to determine any relevance of such first structured "self"-situation to a such "self" of such relevance means, wherein such data regarding such set of hierarchically-organized, relevant, non-linguistic relational "self"-situations includes data regarding a set of hierarchically-organized problem relational "self"-situations, and in association with essentially each of such problem relational "self"-situations, a set of hierarchically-organized plan relational "self"-situations; type-linking storage means for providing data regarding respectively linking essentially each such discrete data-type of such humanoid autonomous decision system with a respective word/phrase category of a first natural language, and respectively linking selected words/phrases of each such linked word/phrase category of such first natural language with respective such discrete data elements of each such discrete data-type so linked with a such linked word/phrase category; and data transformation means for processing data regarding a first communication to be made by such humanoid autonomous decision system to transform a specified set of non-linguistic data elements into a such first communication in such first natural language, comprising identification means for processing data regarding identifying which of such discrete data elements of such discrete data-types is to form part of such first communication, snippet means for processing data regarding selecting natural-language snippets for pointing to the such categories of such natural-language corresponding to whichever of such discrete data-types includes each such discrete data element which is to form part of such first communication, vocabulary means for processing data regarding selecting a word/phrase of such natural-language corresponding to each such discrete data element which is to form part of such first communication, and grammar means for processing data regarding producing from the grammar practices of such natural language and from such snippet selections and from such word/phrase selections such first communication in such natural language.

Additionally, it provides such a computer system further comprising: what-if means comprising trial-decision means for providing data regarding, in association with each of such relevance self-relations, a set of hierarchically-organized "self" trial decisions; selecting means for processing data regarding such "self" trial decisions to provide data regarding, when a such relevance self-relation has included a such specific circumstance, a current selected such "self" trial decision; trial-decision-testing means for processing data regarding using such relevance means to determine the relevance of selected amended structured-situations arising by simulation from using a selected such "self" trial decision for the "self" object within the then such specific circumstance; and self-decision-selecting means for processing data regarding selecting, depending upon the then specific relevances upon operation of such trial-decision-testing means, a such "self" trial decision as a then self-decision of such intelligent system. And it provides such a computer system further comprising: sequential story data means for acquiring, when such first communication is to be the telling of a "true" and "interesting" "personal history" story about the experiences of such humanoid autonomous decision system, sequential data for use in such telling, comprising: for use in a first story element of such story, first means for processing data, when a first selected level of a self-pain signal has been attained by such humanoid autonomous decision system, regarding first data about a current time and a current place and a "concretized" current problem relational "self"-situation to provide data regarding the concrete objects of a then current structured "self"-situation which are included in such current problem relational "self"-situation; for use in a second story element of a such story, second means for processing data, when a such then current structured "self"-situation is included in a first plan relational "self"-situation, regarding second data about a current strategy and a "concretized" current such plan relational "self"-situation, to provide data regarding the concrete objects of a such then current structured "self"-situation which are included in such first plan relational "self"-situation; for use in a third story element of a such story, third means for processing data, when a such then current structured "self"-situation is included in a second plan relational "self"-situation, regarding third data about a current strategy and a "concretized" such second plan relational "self"-situation, to provide data regarding the concrete objects of a such then current structured "self"-situation which are included in such second plan relational "self"-situation; for use in a sequential story element of a such story, fourth means for processing data, when a such sequential current structured "self"-situation is included in a next identified plan relational "self"-situation, regarding sequential data about a then current strategy and a "concretized" such next identified plan relational "self"-situation, to provide data regarding the concrete objects of a such sequential current structured "self"-situation which are included in such next identified plan relational "self"-situation; and for use in a final story element of a such story, fifth means for processing data, when a second selected level of a self-pleasure signal has been attained by such humanoid autonomous decision system, regarding final data about a "concretized" such identified goal plan relational "self"-situation, to provide data regarding the concrete objects of a such final current structured "self"-situation which are included in such identified goal plan relational "self"-situation. Even additionally, this invention provides such a computer system further comprising: means for storing data regarding such sequential data for use in such telling of a such story; means for processing data regarding searching of any such stored sequential data to provide user-controlled selection among such stored sequential data; and means for processing data regarding a user-selected later use of such sequential data to provide a later telling of a story based upon such stored sequential data.

Yet further, according to a preferred embodiment thereof, the present invention provides a computer system for implementing first natural language interpretation functions in a humanoid autonomous decision system interpreting incoming first natural language from an other, comprising: computer processing means for processing data; storage means for storing data on a storage medium wherein such data comprises non-linguistic discrete data-types and, conforming to each of such discrete non-linguistic data-types, a set of non-linguistic discrete data elements; type-linking storage means for providing data regarding respectively linking essentially each such discrete data-type of such humanoid autonomous decision system with a respective word/phrase category of such first natural language, and respectively linking selected words/phrases of each such linked word/phrase category of such first natural language with respective such discrete data elements of each such discrete data-type so linked with a such linked word/phrase category; input means for providing input information about characteristics of such incoming natural language sufficient to identify each vocabulary element, snippet type for each such element, and grammatical function for each such element; translation means for processing data regarding such input information to provide a non-natural-language concrete circumstance interpretation of such input information; relevance means for providing information regarding the relevance to the humanoid autonomous decision system of such circumstance interpretation, comprising relational-situation storage means for providing data regarding a set of hierarchically-organized, relevant, non-linguistic relational "self"-situations, and inclusional means for processing data to determine inclusions of such non-natural-language concrete circumstance interpretation within such non-linguistic relational "self"-situations to determine any relevance of such non-natural-language concrete circumstance interpretation a such "self" of such relevance means, wherein such data regarding such set of hierarchically-organized, relevant, non-linguistic relational "self"-situations includes data regarding a set of hierarchically-organized problem relational "self"-situations, and in association with essentially each of such problem relational "self"-situations, a set of hierarchically-organized plan relational "self"-situations.

Yet additionally, it provides such a computer system wherein such interpreting humanoid autonomous decision system has abilities to select for use in interpretation similar cognitive, relevancy, and emotion systems to those of the other; and, further, wherein such translation means comprises natural-language default-selecting means for processing data regarding selection of non-natural-language data types and data for correspondence with such incoming information. And it provides such a computer system further comprising: story-interpretation means for processing data regarding a story-series of such incoming informations to provide a story-series of such non-natural-language concrete circumstance interpretations; and learning means for processing data regarding such story-series of such non-natural-language concrete circumstance interpretations to provide a learned modification of a such non-linguistic discrete data element, wherein such story-series of such non-natural-language concrete circumstance interpretations is treated as a temporally-incremental series, respectively, of "present" concrete self-situation representations of a temporally-incremental series of respective environmental situations.

Yet moreover, it provides such a computer system wherein: each story element of such story-series of such non-natural-language concrete circumstance interpretations comprises a self representation and a set of event representations, each such event representation being represented specifically spacio-temporally relative to such self representation, and each such event representation including a behavioral-type designation selected from a set of behavioral-type designations, each such behavioral-type designation of such set of behavioral-type designations being associated with a set of incremental behavioral self-tendencies for determining incrementally-predicted self-situation representations from a such presented self-situation representation; and a set of current-behavior designations associated with each such event representation specifying the current behaviors of each such event representation. Also, it provides such a computer system wherein essentially each such event representation comprises an object representation representing a particular object as part of a collection of such object representations, each such object representation of such collection comprising a such behavioral-type designation comprising characteristics of each such object representation of such collection, wherein essentially each of such characteristics comprises a subset of a set of self-tendencies and a corresponding subset of a set of self-tendency markers, such set of self-tendency markers having a 1-to-1 correspondence with such set of self-tendencies, one unique marker from such set of self-tendency markers corresponding respectively with each self-tendency of such set of self-tendencies, such subset of self-tendencies being constructed and arranged to permit a determination of the expected behavior of each such object representation with respect to any mappable representation of other object representations from such collection of object representations, each such self-tendency consisting essentially of an instruction for self-behavior (of any first object representation to which such self-tendency may be assigned) on the condition that any mappable representation of object representations from such collection, including such first object representation, from the viewpoint of such first object representation, is included in a specified self-relation selected from a set of self-relations, where each self-relation of such set of self-relations comprises a specified space-time relation among a such first object representation and at least one such other object representation, each such other object representation being specified as a subset of a set of self-tendency markers, each such subset of self-tendency markers corresponding to the subset of self-tendencies assigned to each such other object representation.

Also, this invention provides such a computer system wherein: such data regarding a set of hierarchically-organized, relevant, non-linguistic relational "self"-situations comprises a set of hierarchically-organized abstract self-problem representations, and in association with essentially each of such abstract self-problem representations, a set of hierarchically-organized abstract self-plan representations each comprising a set of abstract self-subgoal representations. And it provides such a computer system further comprising: means for processing data regarding such self-problem representations and such self-plan representations to provide "self-pain" and "self-pleasure" representations having assessable quantities; means for processing data regarding such story elements of such story-series of such non-natural-language concrete circumstance interpretations to identify a first series of such story elements which result in a selected level of unpredicted "self-pain"; and means for processing data regarding such first series of such story elements to create a learned self-problem representation. It further provides such a computer system further comprising: means for processing data regarding such story elements of such story-series of such non-natural-language concrete circumstance interpretations to identify a second series of such story elements which result in a selected level of unpredicted "self-pleasure"; and means for processing data regarding such second series of such story elements to create a learned self-subgoal representation.

Also, in accordance with a preferred embodiment thereof, this invention provides a computer system for machine learning from an environmental situation in an autonomous decision system, comprising: computer processing means for processing data; storage means for storing data on a storage medium; input means for providing temporally-incremental input data about a series of such environmental situations; concrete-situation means for processing data regarding such temporally-incremental input data about such series of such environmental situations to provide a temporally-incremental series, respectively, of "present" concrete self-situation representations of such respective environmental situations, wherein each such self-situation representation comprises a self representation and a set of event representations, each such event representation being represented specifically spacio-temporally relative to such self representation, and each such event representation including a behavioral-type designation selected from a set of behavioral-type designations, each such behavioral-type designation of such set of behavioral-type designations being associated with a set of incremental behavioral self-tendencies for determining incrementally-predicted self-situation representations from a such presented self-situation representation; and a set of current-behavior designations associated with each such event representation specifying the current behaviors of each such event representation.

And this invention also provides such a computer system further comprising: predicted-situation means for processing data regarding a first of a such series of "present" concrete self-situation representations of such respective environmental situations to provide an incremental simulation of a set of "predicted" concrete self-situation representations; comparing means for processing data regarding, for a corresponding particular time, a such "predicted" concrete self-situation representation with a such corresponding "present" concrete self-situation representation to identify any selected minimum event differences between such compared concrete representations; difference-storing means for storing data regarding such concrete self-situation representations having at least such identified minimum event difference and such particular "present" concrete self-situation representation from which such identified "predicted" concrete self-situation representation was computed; choosing means for processing data regarding choosing a modification in a such incremental behavioral self-tendency likely to decrease such event difference between such compared representations; testing means for processing data regarding, for such corresponding particular time, a such "predicted" concrete self-situation representation and a such corresponding "present" concrete self-situation representation to provide a new identified "predicted" concrete self-situation representation using such modification chosen for such incremental behavioral self-tendency; new-prediction means for processing data regarding comparing such new identified "predicted" concrete self-situation representation with such corresponding former "predicted" concrete self-situation representation to identify any remaining such event differences; and heuristic means for processing data regarding such modification and such event differences to heuristically choose further processing of data among at least the following: test a further modification of a such incremental behavioral self-tendency, or select for storage a modified incremental behavioral tendency, or combine for storage a such modified incremental behavioral tendency with a corresponding original incremental behavioral tendency as a replacement incremental behavioral tendency.

Further, this invention provides such a computer system wherein; each representation of such temporally-incremental series, respectively, of "present" concrete self-situation representations of such respective environmental situations comprises a self representation and a set of event representations, each such event representation being represented specifically spacio-temporally relative to such self representation, and each such event representation including a behavioral-type designation selected from a set of behavioral-type designations, each such behavioral-type designation of such set of behavioral-type designations being associated with a set of incremental behavioral self-tendencies for determining incrementally-predicted self-situation representations from a such presented self-situation representation; and a set of current-behavior designations associated with each such event representation specifying the current behaviors of each such event representation. And it provides such a computer system wherein essentially each such event representation comprises an object representation representing a particular object as part of a collection of such object representations, each such object representation of such collection comprising a such behavioral-type designation comprising characteristics of each such object representation of such collection, wherein essentially each of such characteristics comprises a subset of a set of self-tendencies and a corresponding subset of a set of self-tendency markers, such set of self-tendency markers having a 1-to-1 correspondence with such set of self-tendencies, one unique marker from such set of self-tendency markers corresponding respectively with each self-tendency of such set of self-tendencies, such subset of self-tendencies being constructed and arranged to permit a determination of the expected behavior of each such object representation with respect to any mappable representation of other object representations from such collection of object representations, each such self-tendency consisting essentially of an instruction for self-behavior (of any first object representation to which such self-tendency may be assigned) on the condition that any mappable representation of object representations from such collection, including such first object representation, from the viewpoint of such first object representation, is included in a specified self-relation selected from a set of self-relations, and where each self-relation of such set of self-relations comprises a specified space-time relation among a such first object representation and at least one such other object representation, each such other object representation being specified as a subset of a set of self-tendency markers, each such subset of self-tendency markers corresponding to the subset of self-tendencies assigned to each such other object representation.

Yet in addition, it provides such a computer system further comprising: means for storing representation data regarding a set of hierarchically-organized, relevant, non-linguistic relational "self"-situations comprising a set of hierarchically-organized abstract self-problem representations, and in association with essentially each of such abstract self-problem representations, a set of hierarchically-organized abstract self-plan representations each comprising a set of abstract self-subgoal representations; and, also, further comprising: means for processing data regarding such self-problem representations and such self-plan representations to provide "self-pain" and "self-pleasure" representations having assessable quantities; means for processing data regarding representation elements of such temporally-incremental series, respectively, of "present" concrete self-situation representations of such respective environmental situations to identify a first series of such representation elements which result in a selected level of unpredicted "self-pain"; and means for processing data regarding such first series of such representation elements to create a learned self-problem representation; and, also, further comprising: means for processing data regarding such representation elements of such temporally-incremental series, respectively, of "present" concrete self-situation representations of such respective environmental situations to identify a second series of such representation elements which result in a selected level of unpredicted "self-pleasure"; and means for processing data regarding such second series of such representation elements to create a learned self-subgoal representation.

Yet moreover, according to a preferred embodiment thereof, this invention provides a computer system for an entertainment system, comprising: computer simulation means for processing data regarding a user-selected "world"-representation containing user-selected spacio-temporally located "object"-representations to provide incremental simulation-stepping of such "world"-representation; computer interface means for processing data for providing a natural-language interface for user selection of non-natural-language characteristics of a such "object"-representation; computer interface means for processing data for providing an interface for user placement of a such "object"-representation into such "world"-representation; computer interface means for processing data for providing an interface for placement into such "world"-representation, as a such "object"-representation, of an autonomous decision system; wherein such autonomous decision system comprises representation means for processing data essentially from such "world"-representation for presenting a selected self-situation (for such autonomous decision system) representation, such presented self-situation representation comprising a self representation and a set of event representations, each such event representation being represented specifically spacio-temporally relative to such self representation, and prediction means for processing data for determining the representations of a set of incrementally-predicted self-situations, predicted as incremental consequences from such presented self-situation representation; wherein such prediction means comprises such simulation means.

It also provides such a computer system wherein such autonomous decision system further comprises: relevancy means for processing data for determining the self-relevancy of a such presented self-situation representation; and determining the self-relevancy of such set of incrementally-predicted self-situation representations; whereby threats to and opportunities of such autonomous self decision system may be determined. And it also provides such a computer system wherein such autonomous decision system further comprises: feeling means for processing data regarding such incremental self-relevancies to determine the relative values of a set of selected simulated-"emotions"; and look-for means for processing data regarding planning status of such autonomous decision system to provide assistance to a sensor system regarding what to look for. And it further provides such a computer system further comprising: display means for displaying a created face of such autonomous decision system; and facial-expression means for processing data regarding such feeling means to determine appropriate facial-expression instructions for creating such face; and, further, wherein such display means comprises lip-synch means for processing data for simulating mouth movement of such face in simulated correspondence to human natural languaging.

Yet even further, it provides such a computer system wherein such autonomous decision system further comprises: storage means for data wherein such data comprises non-linguistic discrete data-types and, conforming to each of such discrete non-linguistic data-types, a set of non-linguistic discrete data elements; type-linking storage means for providing data regarding respectively linking essentially each such discrete data-type of such humanoid autonomous decision system with a respective word/phrase category of a first natural language, and respectively linking selected words/ phrases of each such linked word/phrase category of such first natural language with respective such discrete data elements of each such discrete data-type so linked with a such linked word/phrase category; and data transformation means for processing data regarding a first communication to be made by such humanoid autonomous decision system to transform a specified set of non-linguistic data elements into a such first communication in such first natural language, comprising identification means for processing data regarding identifying which of such discrete data elements of such discrete data-types is to form part of such first communication, snippet means for processing data regarding selecting natural-language snippets for pointing to the such categories of such natural-language corresponding to whichever of such discrete data-types includes each such discrete data element which is to form part of such first communication, vocabulary means for processing data regarding selecting a word/phrase of such natural-language corresponding to each such discrete data element which is to form part of such first communication, and grammar means for processing data regarding producing from the grammar practices of such natural language and from such snippet selections and from such word/phrase selections such first communication in such natural language; and, further, wherein such first communication is simulated to originate in such face of such autonomous decision system.

And it also provides such a computer system further comprising: metabolism means for processing data for determining the values of a set of simulated-"metabolism" quantities for a such "object"-representation; and display means for selectively displaying such values of such set of simulated-"metabolism" quantities for a such "object"-representation; wherein such simulation means comprises such metabolism means. It also provides such a computer system further comprising: animation means for processing data for selecting and displaying a viewable animation of such "object"-representation; wherein such simulation means comprises a set of current-behavior designations associated with each such "object"-representation of a such "world"-representation specifying the current behaviors of each such "object"-representation; and wherein such animation means uses such set of current-behavior designations associated with each such "object"-representation of a such "world"-representation in such selecting of a such viewable animation of such "object"-representation; and, further, wherein such relevancy means comprises such non-linguistic discrete data elements and such data transformation means comprises story-telling means for processing data regarding data elements from such relevancy means for instructing story-telling elements to provide story-telling by such autonomous decision system. And it also provides such a computer system further comprising story-saving means for processing data to provide saving and later re-telling of stories created by such story-telling means; and, also, further comprising: interface means for providing an interface and for processing data for user-asking of questions of such autonomous decision system.

Yet additionally, in accordance with a preferred embodiment thereof, this invention provides a computer program for computationally-efficient representation for classifying natural objects along a concrete-to-abstract scale in such manner as to support improved correspondence with natural languages, comprising, in combination, the steps of: storing in a computer information-storage device a set of non-natural-language markers, each such marker being unique; associating a subset of such set with a representation of a such natural object; and identifying a more-abstract representation of such natural object by a sub-subset of such subset. And it provides a computer program wherein such more-abstract representation of such natural object is identified by one of such non-natural-language markers. It also provides a computer program comprising the steps of: storing in such computer information-storage device a set of non-natural-language behavioral self-tendencies, each such self-tendency being unique; and associating each such unique marker of such set of markers, 1-to-1, with a corresponding such unique self-tendency; wherein each such self-tendency comprises a form attachable to any such natural object for predictive purposes; and, further, wherein essentially each such self-tendency comprises a spacio-temporal relationship between a self representation and at least one other representation of a such natural-object; and, further, wherein such at least one other representation of a such natural-object comprises at least one such marker.

And this invention provides such a computer program wherein a such self-tendency comprises "doing" information about a such representation in such spacio-temporal relationship. Also, it provides such a computer program further comprising the step of: associating an identifying unique natural-language string in a first natural language to essentially each of such representations of a such natural object; wherein each such natural-language string identifies each such representation of a such natural object in such first natural language along a concrete-to-abstract scale reflecting a relative number of such markers associated with such each representation of a such natural object.

Yet in addition, according to a preferred embodiment thereof, this invention provides a computer program for making a mapping representation of "concrete" objects, usable in a computer simulation program, comprising the steps of: storing in computer storage representations of a set of "concrete" objects; associating with each such "concrete"-object representation an identified first set of prediction factors selected from a second set of prediction factors; wherein each such prediction factor of such second set of prediction factors consists essentially of an instruction rule for the incremental simulation-type movement of such associated "concrete"-object representation when in a specified spacio-temporal relationship with a set of identified "abstract"-object representations; and wherein each such "abstract"-object representation comprises a prediction-factor marker, each such prediction-factor marker having a 1-to-1 correspondence with a unique one of such second set of prediction factors. And it also provides such a computer program wherein: such identified first set of prediction factors is hierarchically organized; and such identified first set of prediction factors is sufficient for the determination of an incremental simulation-type movement of such associated "concrete"-object representation when such associated "concrete"-object representation is in any mapping representation with a set of other "concrete"-object representations.

Also, this invention provides such a computer program further comprising the step of: associating with such "concrete"-object representation an identified first set of recognition factors selected from a second set of recognition factors; wherein each of such second set of recognition factors consists essentially of a reference to a specified range or specified reading of a specified sensor device wherein such identified first set of prediction factors associated with such "concrete"-object representation depends upon such identified first set of recognition factors associated with such "concrete"-object representation; wherein such identification of each such "abstract"-object representation comprises a first set of prediction-factor name-markers selected from a second set of prediction-factor name-markers; and wherein such second set of prediction-factor name-markers has a 1-to-1 correspondence with such second set of prediction factors. And it further provides such a computer program further comprising the step of: associating a unique natural-language reference with such representations of each such "concrete" object and each such "abstract" object.

Further, according to a preferred embodiment thereof, this invention provides a computer program for providing emotional expression in an autonomous decision system, comprising the steps of: storing in a computer information-storage device planning data providing plan capability to such autonomous decision system; using information regarding environmental circumstances of such autonomous decision system, providing planning selections and planning status; using information about current such planning status, providing emotion-source data; using current such emotion-source data, providing current emotion status. And it provides such a computer program further comprising the steps of: making and storing in such computer information-storage device a subset of such planning data about: a first plan regarding whether the self of such autonomous decision system is then copying with a non-self creature of such environmental circumstances, and a second plan regarding whether a such non-self creature is then copying with such self; evaluating an extent of a such copying by: making a similarity comparison of a decision of a such non-self creature when in a first circumstance situation to a decision of the self if the self were in such first circumstance situation and evaluating such comparison for degree of decision similarity; including in such emotion-source data information correlated with such extent of a such copying; and including in such current emotion status a status of not-copying emotion of such autonomous decision system.

Even further, it provides such a computer program further comprising the steps of: assigning to such non-self creature and storing in such computer-information storage device a kind-number representing an extent of relative similarity of such non-self creature to such self's own kind; and adjusting such kind-number to at least partially reflect such extent of a such copying by such non-self creature. And it provides such a computer program further comprising the step of: assigning an emotion amount, for association with such emotion-source data effecting such current emotion status of such not-copying emotion of such autonomous decision system, essentially proportional to a current such kind-number associated with such non-self creature. It also provides such a computer program wherein: such planning data comprises a set of hierarchically-organized abstract self-problem representations, and in association with essentially each of such abstract self-problem representations, a set of hierarchically-organized abstract self-plan representations each comprising a set of abstract self-subgoal representations, wherein at least one such abstract self-problem representation is the problem of the self not-copying with a such non-self creature.

Moreover, this invention provides such a computer program wherein: such emotion-source data comprises data regarding fear, hopelessness, and disappointment, comprising incremental representations of "fear" in amounts essentially hierarchically ordered according to such hierarchical set of self-problem representations, and incremental representations of "hopelessness" depending essentially upon whether, in the operation of such planning means, in the self-plan representation for the highest active hierarchical self-problem representation, none of the subgoal representations is active; and such emotion-source data comprises an emotion amount associated with such problem of the self not-copying with such non-self creature which is structured and arranged to be essentially proportional to such kind-number associated with such non-self creature.

And it provides such a computer program further comprising the steps of: providing sensor means for providing sensor data for such autonomous decision system; using such current emotion status, providing data regarding body expression to provide output signals for use by effectors; wherein such data regarding body expression comprises data regarding smiles and frowns; and wherein a smile is associated with a creature feeling copied with and a frown is associated with a creature feeling not copied with. And it provides such a computer program wherein: such emotion-source data further comprises a provider of data regarding frustration, surprise, and muscle relief.

In accordance with another preferred embodiment hereof, this invention provides a computer system for implementing natural language functions in a humanoid autonomous decision system, comprising: at least one computer processor device structured and arranged to process data; at least one computer storage device structured and arranged to store data on a storage medium wherein such data comprises non-linguistic discrete data-types and, conforming to each of such discrete non-linguistic data-types, a set of non-linguistic discrete data elements; at least one computer input device structured and arranged to provide information about current circumstances of the humanoid autonomous decision system; at least one computer output device structured and arranged to implement decisions of the humanoid autonomous decision system; at least one computer processor and storage device structured and arranged to provide information regarding the relevance to the humanoid autonomous decision system of such current circumstances, comprising at least one computer processor structured and arranged to process data regarding "self" to provide at least one "self" representation, at least one computer processor structured and arranged to process data regarding such current circumstances to provide a first non-linguistic structured "self"-situation representation, at least one relational-situation computer storage device structured and arranged to provide data regarding a set of hierarchically-organized, relevant, non-linguistic relational "self"-situations, and at least one inclusional computer processor structured and arranged to process data to determine inclusions of a such first non-linguistic structured "self"-situation within such non-linguistic relational "self"-situations to determine any relevance of such first structured "self"-situation to a such "self" of such relevance means, wherein such data regarding such set of hierarchically-organized, relevant, non-linguistic relational "self"-situations includes data regarding a set of hierarchically-organized problem relational "self"-situations, and in association with essentially each of such problem relational "self"-situations, a set of hierarchically-organized plan relational "self"-situations; type-linking storage means for providing data regarding respectively linking essentially each such discrete data-type of such humanoid autonomous decision system with a respective word/phrase category of a first natural language, and respectively linking selected words/phrases of each such linked word/phrase category of such first natural language with respective such discrete data elements of each such discrete data-type so linked with a such linked word/phrase category; and at least one data-transformation computer processor structured and arranged to process data regarding a first communication to be made by such humanoid autonomous decision system to transform a specified set of non-linguistic data elements into a such first communication in such first natural language, and further comprising at least one identification computer processor structured and arranged to process data regarding identifying which of such discrete data elements of such discrete data-types is to form part of such first communication, at least one snippet computer processor structured and arranged to process data regarding selecting natural-language snippets for pointing to the such categories of such natural-language corresponding to whichever of such discrete data-types includes each such discrete data element which is to form part of such first communication, at least one vocabulary computer processor structured and arranged to process data regarding selecting a word/phrase of such natural-language corresponding to each such discrete data element which is to form part of such first communication, and at least one grammar computer processor structured and arranged to process data regarding producing from the grammar practices of such natural language and from such snippet selections and from such word/phrase selections such first communication in such natural language. In accordance with another preferred embodiment hereof, this invention provides a machine computational-processing method, for providing current simulated-emotion expression in at least one simulated-humanoid autonomous decision system having at least one ability to assess a set of environmental circumstances, comprising the steps of: storing in such at least one simulated-humanoid autonomous decision system planning data providing plan capability to such at least one simulated-humanoid autonomous decision system; using information about such set of environmental circumstances of such at least one simulated-humanoid autonomous decision system and such plan capability, computing at least one current planning selection; using information about such at least one current planning selection, computing at least one current planning status; using information about such at least one current planning status, computing current simulated-emotion source data; and using such current simulated-emotion-source data, computing current simulated-emotion status. Further, it provides such a machine computational-processing method further comprising the step of using information about such current simulated-emotion status, computationally providing output signals to operate effectors to provide current simulated-emotion expression of such at least one simulated-humanoid autonomous decision system. In accordance with another preferred embodiment hereof, this invention provides a machine computational-processing method, for implementing decisions of at least one autonomous decision system in environmental situations, such at least one autonomous decision system having at least one input system for providing temporally-incremental input data about a series of such environmental situations, comprising the steps of: computationally processing such temporally-incremental input data about such series of such environmental situations to provide a temporally-incremental series, respectively, of "present" self-situation representations of such respective environmental situations, wherein each such "present" self-situation representation comprises a self representation and a set of event representations, each such event representation being represented spacio-temporally relative to each such self representation, wherein each such event representation comprises at least one behavioral-type designation selected from a set of behavioral-type designations, each such at least one behavioral-type designation of such set of behavioral-type designations being associated with a set of incremental behavioral self-tendencies for determining incrementally-predicted self-situation representations from each such "present" self-situation representation, and a set of current-behavior designations associated with each such event representation specifying the current behaviors of each such event representation; computationally processing data regarding at least one such "present" self-situation representation of such respective environmental situation to determine the representations of a set of incrementally-predicted self-situations, predicted as incremental consequences from such at least one "present" self-situation representation; storing data for hierarchical planning comprising a hierarchical set of n problem representations, and m plan-sets of hierarchical subgoal representations, each such plan-set of hierarchical subgoal representations being associated with at least one of such set of n problem representations; and computationally comparing such data for hierarchical planning with such data about each such "present" self-situation representation and each such incrementally-predicted self-situation to determine at least one self-relevancy of each such presented self-situation representation, and at least one self-relevancy of each such incrementally-predicted self-situation representation; wherein any threat to and any opportunity of such at least one autonomous decision system may be determined.

Even further, it provides such a machine computational-processing method further comprising the step of, from such information determined about any such threat to and any such opportunity of such at least one autonomous decision system, computationally determining at least one decision of such autonomous decision system. Even further, it provides such a machine computational-processing method wherein such computational comparing step comprises: computationally determining which of such hierarchical set of n problems includes at least one such "present" self-situation representation; computationally determining which of such hierarchical subgoal representations includes at least one such "present" self-situation representation; and computationally determining which of such problem representations and which of such subgoal representations include at least one such incrementally-predicted self-situation representation. Even further, it provides such a machine computational-processing method further comprising the steps of: computationally specifying at least one self trial decision for use in what-iffing; and computationally determining, using such at least one self trial decision, at least one set of such incrementally predicted self-situation representations.

In accordance with another preferred embodiment hereof, this invention provides a machine computational-processing method, for implementing natural language functions in at least one simulated humanoid autonomous decision system, comprising the steps of: storing in at least one computational storage system data comprising non-linguistic discrete data-types and, conforming to each of such discrete non-linguistic data-types, a set of non-linguistic discrete data elements; storing in at least one computational storage system data respectively linking essentially each such discrete data-type of such simulated-humanoid autonomous decision system with a respective word/phrase category of at least one first natural language, and respectively linking selected words/phrases of each such linked word/phrase category of such at least one first natural language with respective such discrete data elements of each such discrete data-type so linked with a such linked word/phrase category; using information about at least one set of current circumstances of such at least one simulated-humanoid autonomous decision system, computationally determining at least one relevance to the simulated-humanoid autonomous decision system of such current circumstances; using information about such at least one relevance, computationally specifying at least one set of relevant such non-linguistic discrete data elements; using such specification of such at least one set of relevant such non-linguistic discrete data elements, computationally determining at least one first communication to be made by such simulated-humanoid autonomous decision system to transform such specified set of non-linguistic discrete data elements into such at least one first communication in such first natural language; wherein such step of computational determining comprises computationally processing data regarding identifying which of such discrete data elements of such discrete data-types is to form part of such at least one first communication, computationally processing data regarding selecting natural-language snippets for pointing to the such categories of such natural-language corresponding to whichever of such discrete data-types includes each such discrete data element which is to form part of such at least one first communication, computationally processing data regarding selecting a word/phrase of such natural-language corresponding to each such discrete data element which is to form part of such at least one first communication, and computationally processing data regarding producing from grammar practices of such natural language and from such snippet selections and from such word/phrase selections such at least one first communication in such natural language. In accordance with another preferred embodiment hereof, this invention provides a machine computational-processing method for implementing first natural language interpretation functions in at least one simulated-humanoid autonomous decision system interpreting incoming first natural language from at least one other, comprising the steps of: storing in at least one computational storage system data comprising non-linguistic discrete data-types and, conforming to each of such discrete non-linguistic data-types, a set of non-linguistic discrete data elements; storing in at least one computational storage system data respectively linking essentially each such discrete data-type of such simulated-humanoid autonomous decision system with a respective word/phrase category of at least one first natural language, and respectively linking selected words/phrases of each such linked word/phrase category of such at least one first natural language with respective such discrete data elements of each such discrete data-type so linked with a such linked word/phrase category; computationally processing such incoming natural language sufficiently to provided data identifying each vocabulary element, snippet type for each such element, and grammatical function for each such element; computationally processing such identifying data to provide a non-natural-language concrete circumstance interpretation of such incoming natural language; computationally determining at least one relevance to such at least one simulated-humanoid autonomous decision system of such circumstance interpretation; wherein such computational determining comprises storing data regarding a set of hierarchically-organized, relevant, non-linguistic relational "self"-situations, and computationally processing to determine inclusions of such non-natural-language concrete circumstance interpretation within such non-linguistic relational "self"-situations to determine any relevance of such non-natural-language concrete circumstance interpretation to such at least one simulated-humanoid autonomous decision system, wherein such data regarding such set of hierarchically-organized, relevant, non-linguistic relational "self"-situations includes data regarding a set of hierarchically-organized problem relational "self"-situations, and in association with essentially each of such problem relational "self"-situations, a set of hierarchically-organized plan relational "self"-situations. Even further, it provides such a machine computational-processing method wherein such interpreting simulated-humanoid autonomous decision system possesses abilities to select for use in interpretation similar cognitive, relevancy, and emotion systems to those of the at least one other. Even further, it provides such a machine computational-processing method wherein such step of computational processing of such incoming natural language comprises natural-language default-selecting to process data regarding selection of non-natural-language data types and data for correspondence with such incoming information. Even further, it provides such a machine computational-processing method, further comprising the steps of: computationally processing data regarding at least one story-series of such incoming information to provide at least one story-series of such non-natural-language concrete circumstance interpretation; and computationally processing data regarding such at least one story-series of such non-natural-language concrete circumstance interpretation to provide at least one learned modification of at least one such nonlinguistic discrete data element, wherein such story-series of such non-natural-language concrete circumstance interpretation is treated as at least one temporally-incremental series, respectively, of "present" concrete self-situation representations of at least one temporally-incremental series of respective environmental situations.

BRIEF DESCRIPTION OF THE DRAWINGS

FIG. 1B is a chart showing the primary ADS data types of a preferred embodiment of the present invention, their brief nomenclature, and brief data-structure interdefinitions.

FIG. 6 shows a flowchart of an example computation to determine whether a concrete situation is included in an abstract situation (one sub-evaluation at a time).

FIG. 7 illustrates an example coding implementation of the kind of computation illustrated in FIG. 6, in the Turbo-Pascal language.

FIG. 8 shows a representative diagram/chart of a way to do parallel processing of SE's from the relevancy system; as well as SE's from the PF's in doing simulation.

FIG. 9C shows an example coding implementation of story-telling.

FIG. 10A shows a flowchart of cognitive learning.

FIG. 10B illustrates preferred steps of relevancy learning.

FIG. 11 shows a high-level flow chart of the entertainment system.

FIG. 12 shows a summary of the primary software systems and functions of the entertainment system.

FIG. 30 shows a print-out of part of a Thought Log, used for debugging purposes.

FIG. 32 shows of the spacio-temporal relationships (r) as in the software embodiment.

FIG. 33 shows three open windows of the expert system: +Chars. (PF's); Situation (Si); and Decision (DsD or dsd).

FIG. 34 shows a chart describing Do-ings.

FIG. 38 shows a portion of the Chars (RF) screen.

FIG. 39 shows a portion of the Class Editor screen.

FIG. 40 shows the Status window.

FIG. 41 shows the "Huh?" window.

FIG. 42 shows the screen to enter the icon path and set pain and fear thresholds for starting and ending a story.

FIG. 43 shows a chart summarizing access to the data structures of the entertainment system.

FIG. 44 illustrates preferred steps of an emotional system, including sociality and bonding elements.

DETAILED DESCRIPTION OF A PREFERRED EMBODIMENT AND THE BEST MODE OF PRACTICE

Figure 1A:
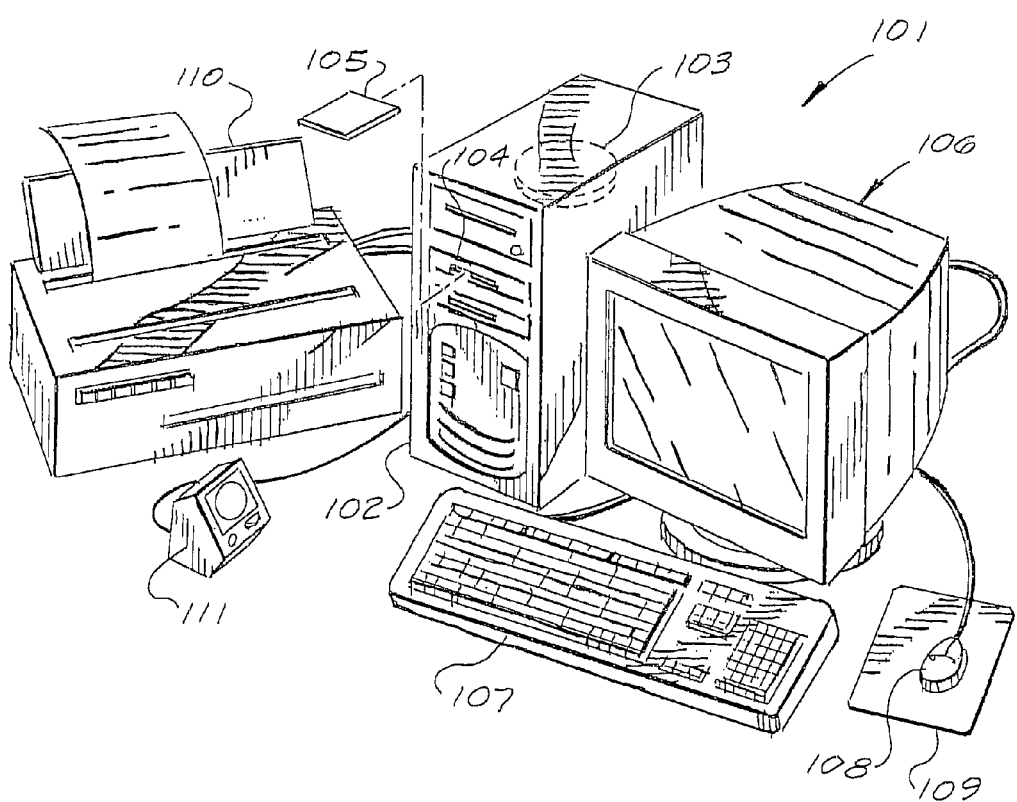
FIG. 1A is perspective diagram illustrating the computer system elements normally used in association with preferred embodiments of the present invention, including the described entertainment system.

FIG. 1A shows a computer system 101 of the type used to run the entertainment system of this invention and suitable for using and/or implementing the intelligent systems of this invention, as described herein. Computer system 101, as illustrated, includes a normally-cased computer processor 102, such case also including a hard disk drive 103 and floppy disk drive 104 for using a floppy disk 105. Computer system 101 also includes a monitor 106, keyboard 107, mouse 108, mouse pad 109, printer 110, and a speaker 111, preferably a Covox™ speaker, as later discussed in connection with the detailed description of the entertainment system of the present invention. In the state of the art of digital processing, there will continue to be changes and improvements in processing units, storage units, etc., and this progress should not restrict the future implementations of embodiments of the instant invention using such different or future units.

Figures 1, 9A:
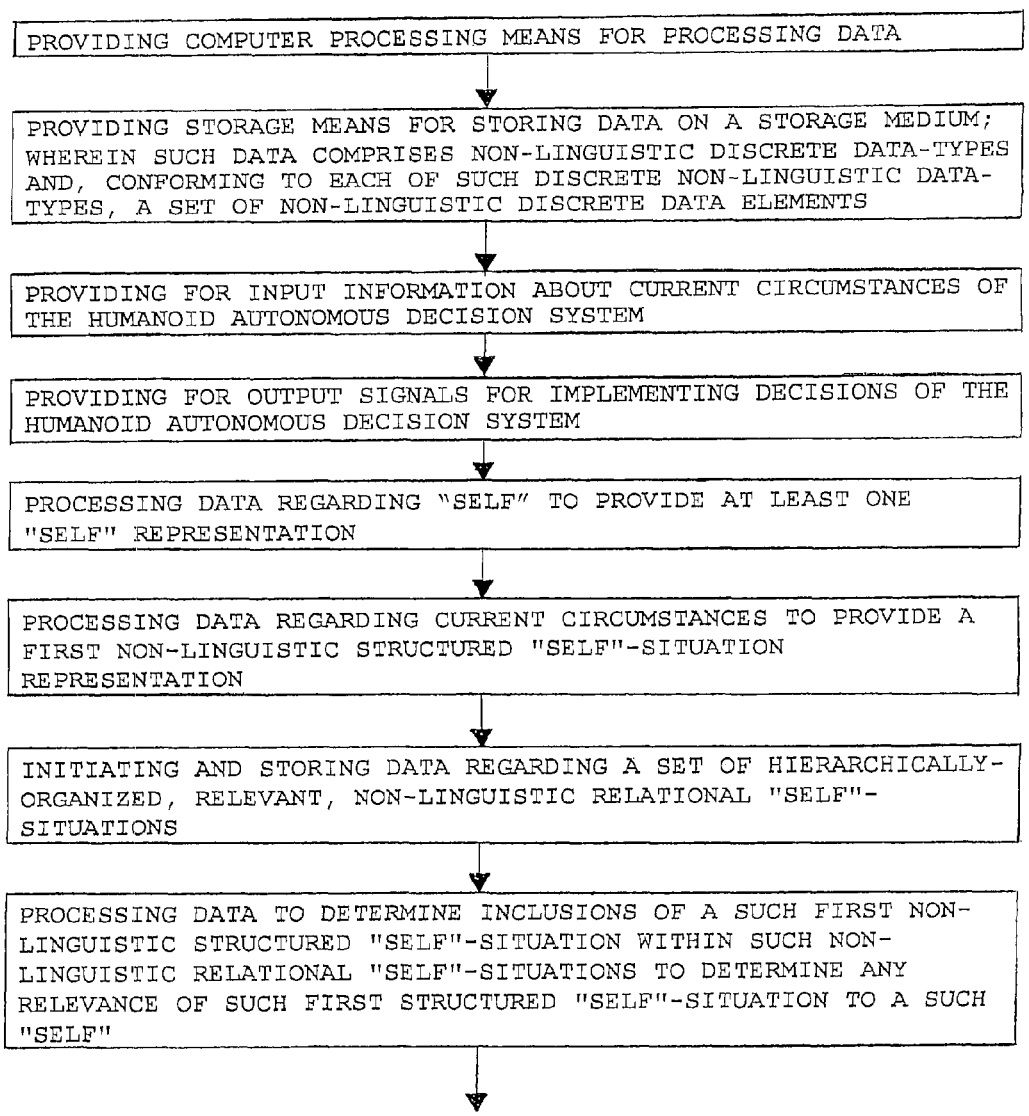
FIG. 9A illustrates preferred steps of natural language production, including a preferred story-telling system.
Figures 3, 9A:
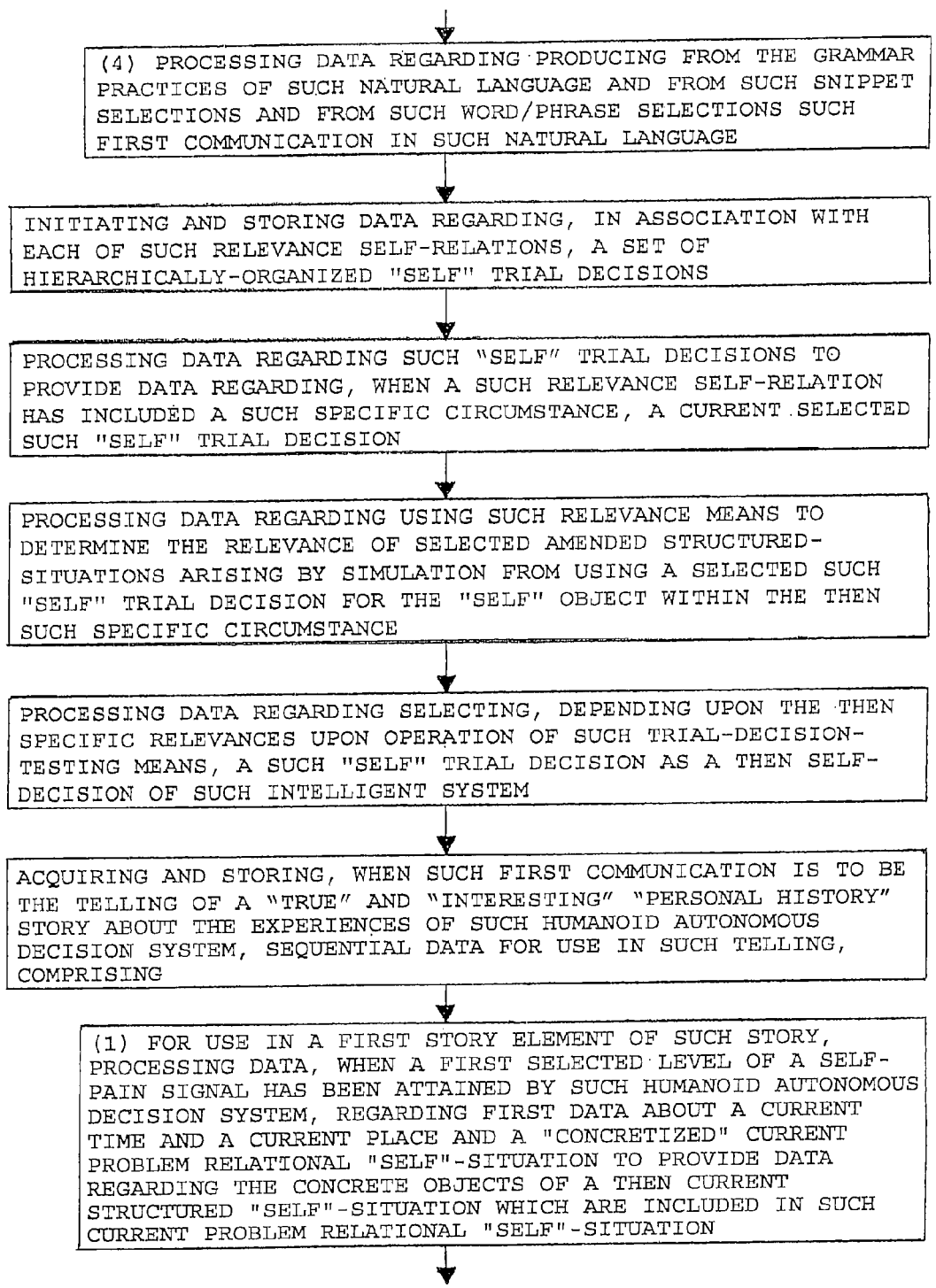
FIG. 3 illustrates, by subsystem-box diagram flowchart, a preferred embodiment of the overall autonomous decision system of the present invention.
Figures 4, 9A:
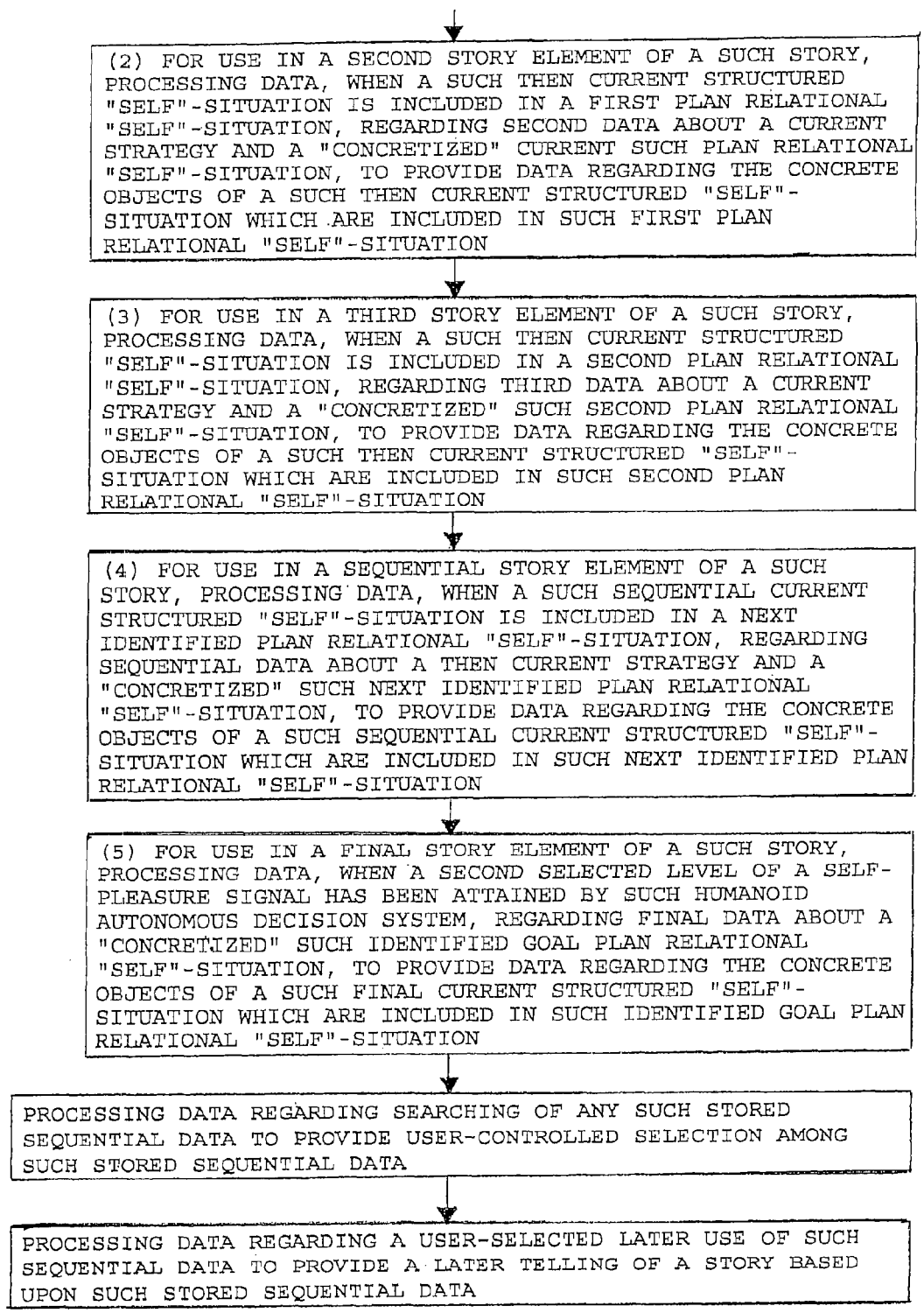
Figures 2, 9B:
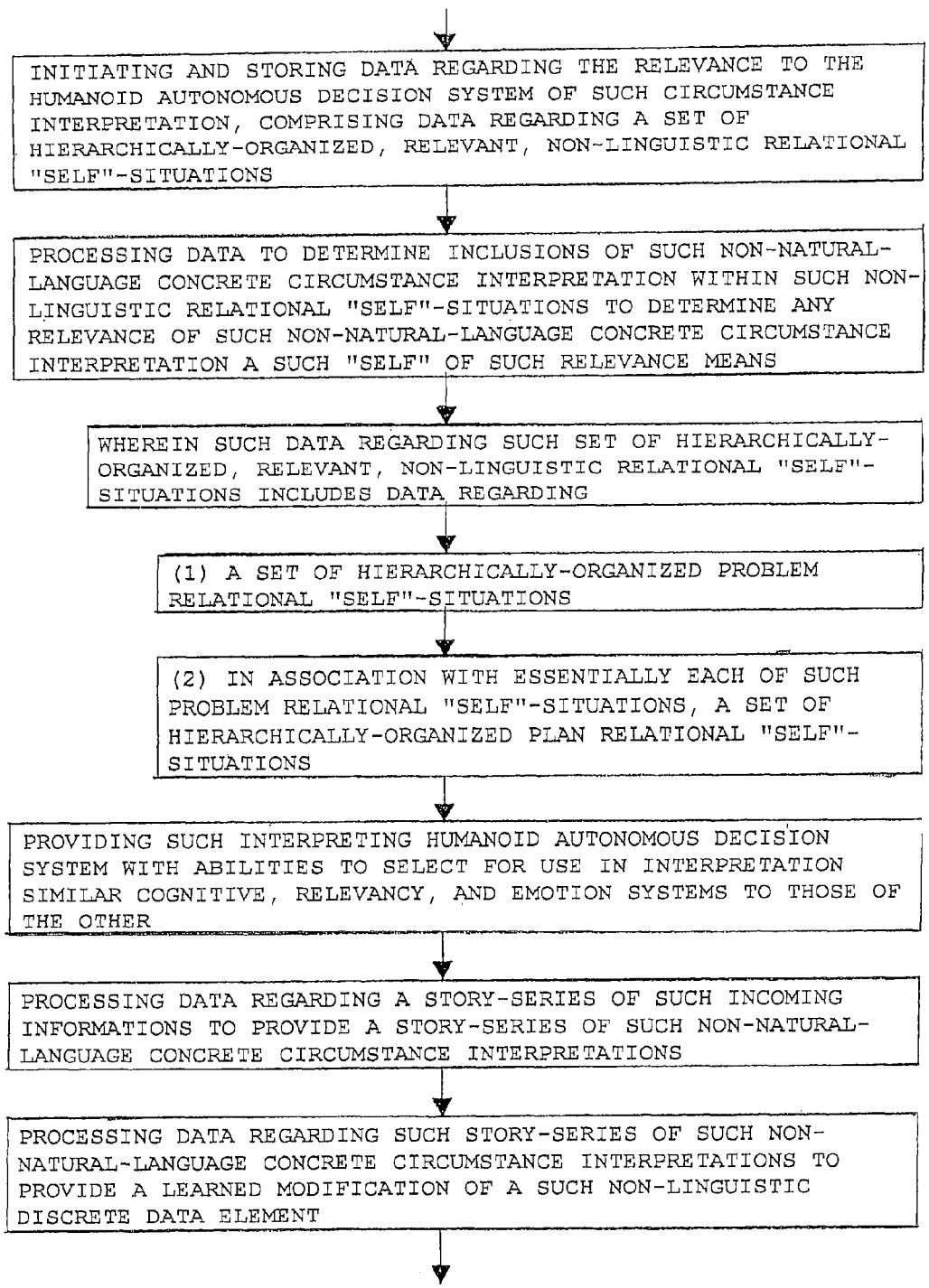
FIG. 2 illustrates, by subsystem-box diagram flowchart, a preferred embodiment of the basic autonomous decision system of the present invention.
FIG. 9B illustrates the preferred steps of natural language interpretation, including a preferred story interpretation system.
Figures 3, 9B:
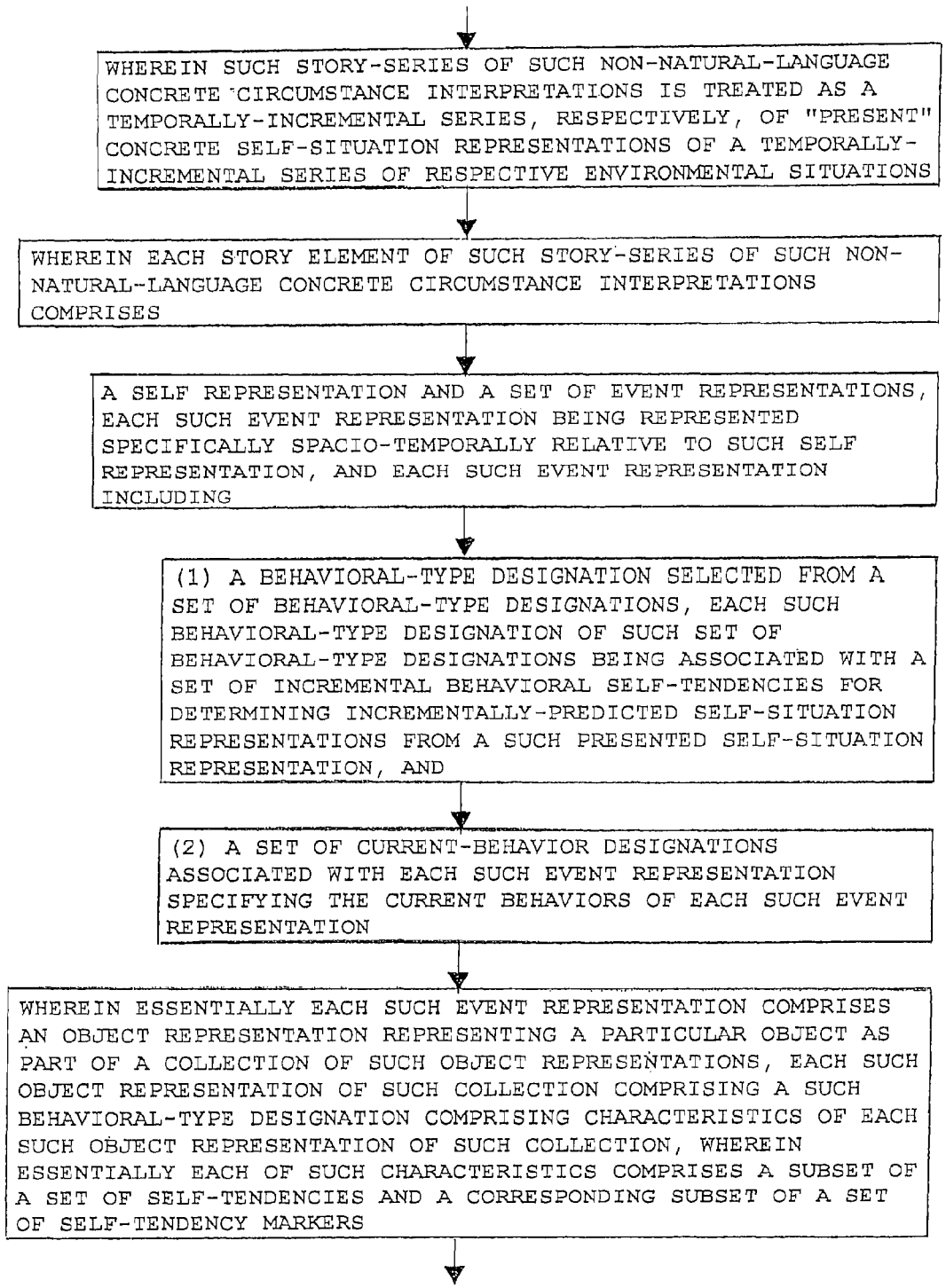
Figures 4, 9B:
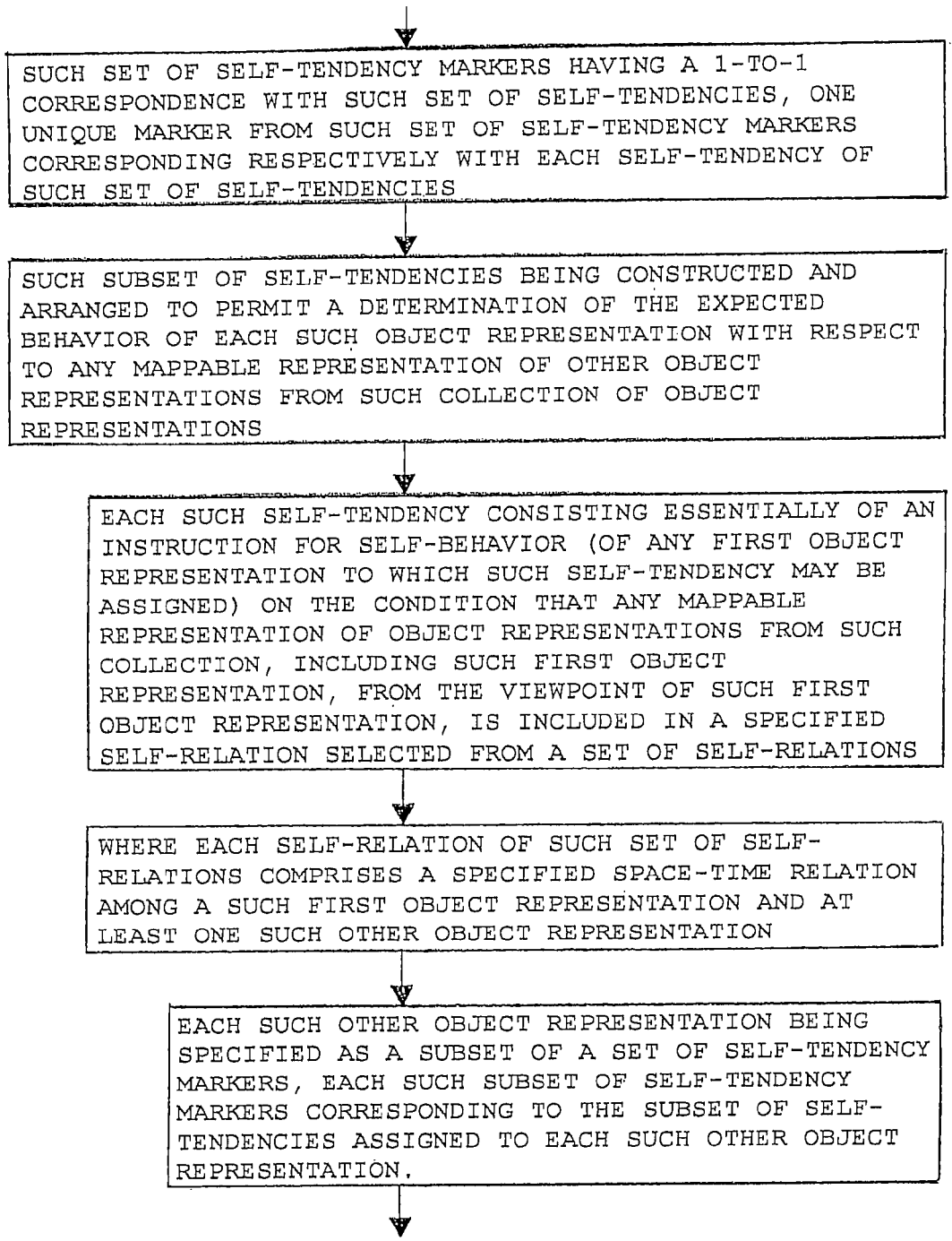
Figures 5, 9B:
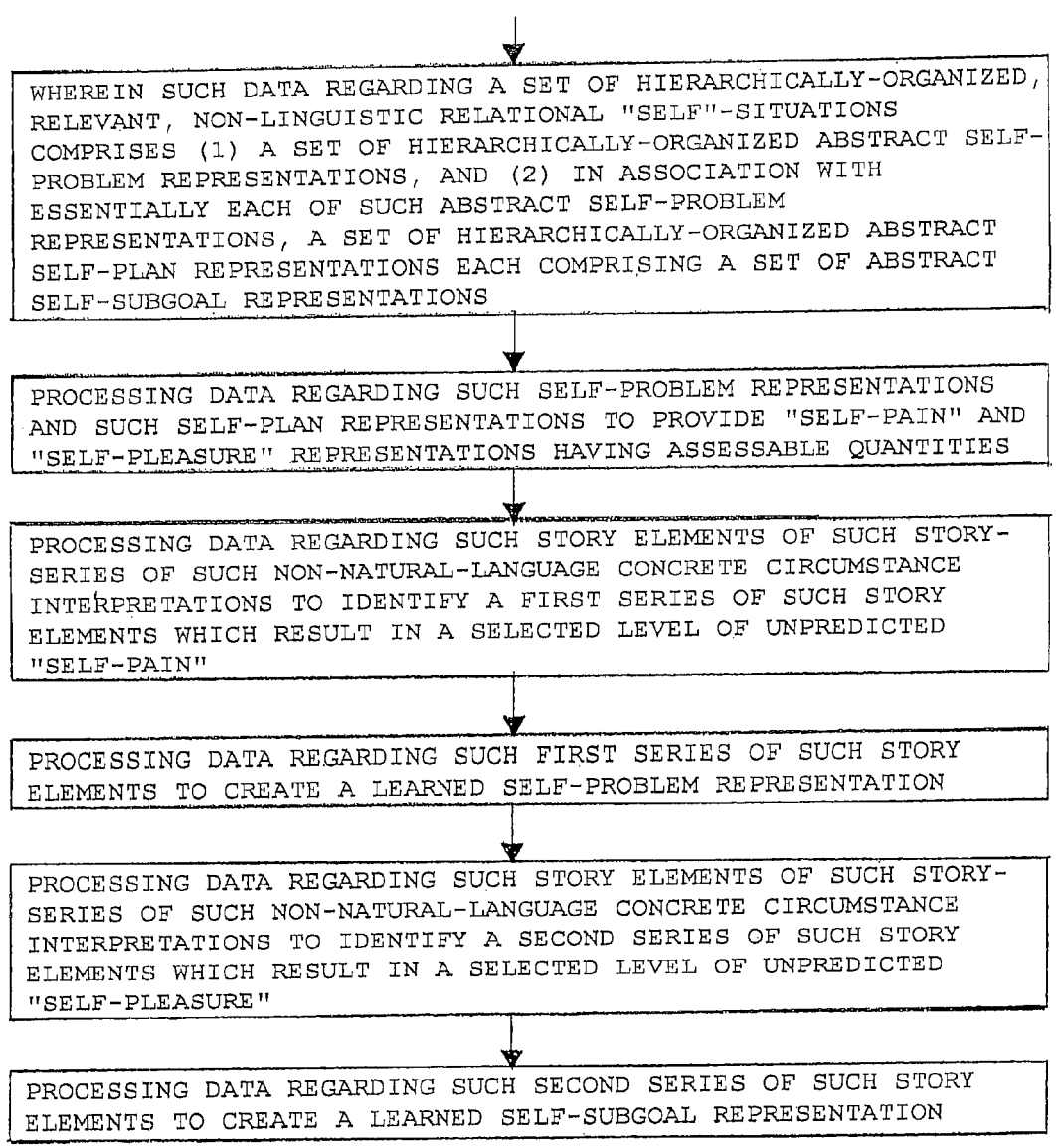

For vocabulary and teaching purposes, FIG. 1B is a chart showing and interdefining the primary data types of a preferred ADS (autonomous decision system) according to the present invention; and the abbreviations shown in FIG. 1 for the various data types will frequently herein be used. FIG. 2 shows a high-level flowchart diagram of an ADS of this invention, and illustrates five high level subsystems: Input, Recognition, Decision, Action, and Output. FIG. 3 shows a similar flowchart but breaking up Recognition and Decision into lower level subsystems. It is noted that, in FIG. 3, the Decision system includes an "Inclusional" subsystem; and this single subsystem performs the necessary "whether a concrete situation is included in an abstract situation" computation for the other three subsystems shown—Prediction, Problem, and Decision—in the manner and for the purposes later herein described.

Creating "Awareness" in an Autonomous Decision System

Figure 4:
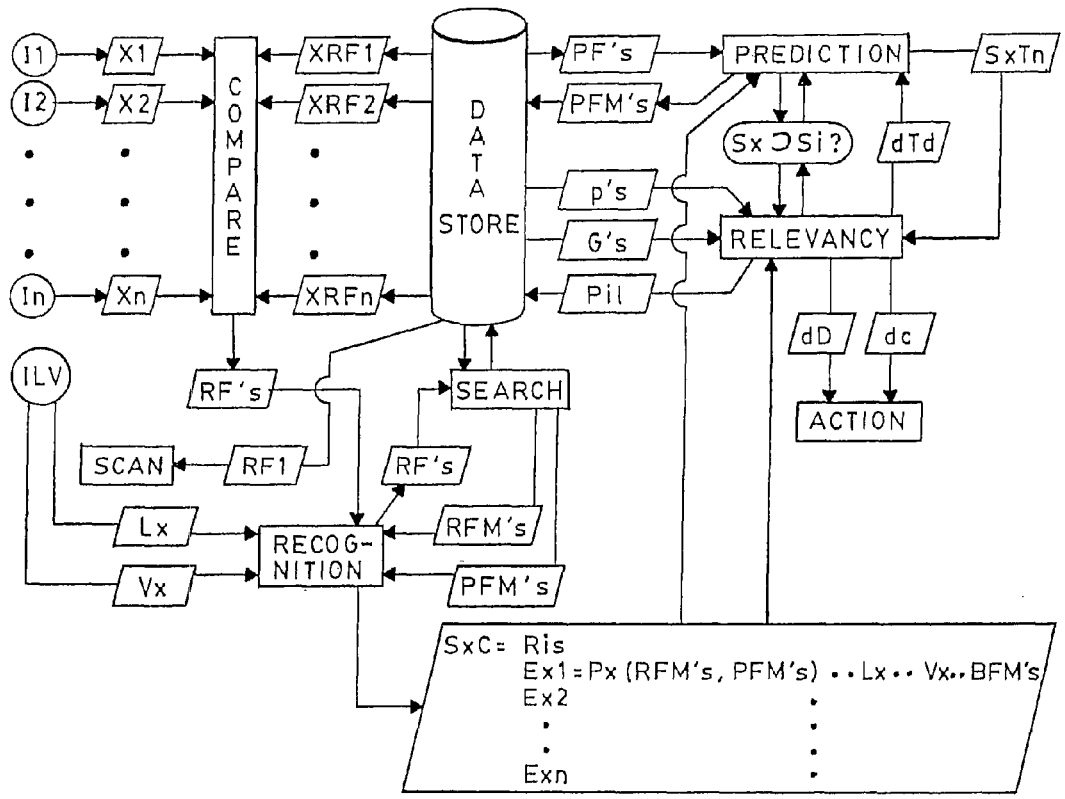
FIG. 4 illustrates, by flowchart, the primary data flow in a preferred embodiment of the autonomous decision system of the present invention.

Whether an "aware" ADS is operating in a "real-world" setting or in a computer or virtual world, it must have sensors (or sensor-like abilities) with which to apprise itself at least of nearby potential events. And, according to the present invention, it must be normally able to make a mapping representation (also called herein "structured situation") of its specific ("concrete") circumstances/environment. FIG. 4 is an example flowchart of an ADS showing data flow, beginning with (from the left) a preferred noticing system for beginning to make the desired mapping representation. [Refer to FIG. 1B and the below descriptions for explanations of the abbreviations of FIG. 4.]

Prediction

Further, according to the present invention, an autonomous decision system (ADS), even if presented with an adequate mapping representation of its specific circumstances/environment, its "structured situation", should also understand the implications of its circumstances; it should be trying to, or able to, predict at least the immediate futures, the consequences, of its present situation.

Relevancy

And before it may be said to be "aware", the ADS should also know, or be trying to know (according to this invention), its organism-environment ("O/E") "relevancies" within its present situation and within its predicted future situations. Thus, the ADS should have a relevancy system, according to the present invention, preferably its hierarchically-organized representations of its problems and plans, and its plans including its subgoals and goals. And its present and predicted circumstances (within its O/E transactional "field") should be constantly compared to its relevancy system for the ADS to understand the relevancies in its present circumstances. It would seem that, if anything may be called "awareness" in an autonomous decision system, it would be the CONTINUOUS and SIMULTANEOUS operation of prediction and relevancy functions, of implication and meaning functions, providing, in its transacting with its environment, an often-chaotic interactive prediction/relevancy "field" for making choices.

What-if Trial Actions

Furthermore, according to this invention, the ADS should have a what-if system within which it can internally "try out" its proposed decisions, its trial actions, to predict the relevancies, the alternative consequences, of its proposed decisions and choose which decision to take in its real world.

Look-for System

And, according to this invention, the ADS should have a "look-for" system whereby information about what things to best then look for with its senses may be transmitted to sensorimotor areas from its prediction/relevancy field. Continuous assessment of relevancies, of threats and opportunities, of positions and status of plans, etc., permits informing the perception system of "what things to look for". (See again FIG. 4 showing a flowchart of a preferred ADS including all the above-discussed systems.) Since, by their nature, most relevancy systems are made up of abstract situations defined in part be abstract objects, the abstract-object representations of the active part of the current plan, for example, may be saved; and then a dictionary look-up with some easy computation tells what percepts to "scan for". For example only (until the primitives of this invention are further described), according to the present invention, the ADS may contain a table of all of its known concrete-object representations, which are defined as sets of the primitives of this invention (elsewhere herein specifically described). Searching may then provide a list of all of these concrete-object representations which contain the primitive(s) of the abstract objects being looked for. From such list may be taken all instances of perceivable primitives (or recognizable characteristics) compiled by number of occurrences; and then a minimum of one (more if desired) highest-frequency such characteristic become(s) the percept(s) "scanned for".

Efficient Computation

Furthermore, the system of internal representation (as described hereinafter) of the ADS should permit efficient computation in all of the above areas, as in the present invention as described herein. Such efficient computation requires that the categorization/representation system selected permit easy computation of "whether a concrete situation/object is included in an abstract situation/object".

Natural Language

Further, according to the present invention, it would seem that a useful way to look broadly at natural language is to see it functioning as "substitute experience" in its ability to present a mapping representation, a structured situation, in interaction with a human or ADS. From this viewpoint, "understanding the meaning" of natural language is metaphored by having an ACTUAL experience and assessing the meaning of this actual experience from what happens in the human's body/brain systems (or ADS systems) responsive to this experience, i.e., what happens with prediction/relevancy "awareness", with emotion, with associations and memories, with metabolism, etc. Thus, according to the present invention, natural language meanings/understandings depend upon language evoking responses/occurrences in (e.g., "mammalian-type") NON-LINGUISTIC, "UNDERLYING", SUBSTRATE SYSTEMS of an autonomous decision system. Thus, according to the present invention, in a digital system, the data-structure types and the data within each type are what must be primarily communicated from one ADS to another in order to do such evocation and have "understanding". Ideally, two digital ADS's may transfer such information instantly in parallel; but humans do not have that ability and must make such transfers serially (and slowly). Of course, in modern human communication, these data are often mixed and overlaid with approval-disapproval language, logic language, etc., all of which must be dealt with for full communication abilities. Still, according to this invention, natural language may be roughly seen and processed as (1) a series of serial clues, e.g., language "snippets", to inform as to what data-type is coming in what location in the statement/sentence, and (2) natural-language words/phrases corresponding to data of the type "expected" from such clue. And since the language receiver (among humans) has about the same kinds of data-types and data as the sender, such communication often works. According to the present invention, ADS's, by using data-types as taught by the instant invention and the clues/snippets of the present invention and a human natural-language to correspond to specific data and for forming such clues (and synonym lists for both the snippets and the data), may communicate in natural language with humans, all as further illustrated by the described embodiments. As mentioned, FIG. 1B shows a chart briefly describing some of the primary data-types of the ADS of the present invention.

Translation

In fact, translation may be seen as the use of a first natural language for giving data to an ADS and the use by the ADS of a second natural language in reporting its internal data, preferably after the "incoming" data is used to operate the ADS systems, for expanded "meanings", to a human native speaker in the second natural language.

Determining Meaning

Thus, according to the present invention, the best way to determine natural language "meaning" is to provide an appropriate autonomous decision system and an interface system which transforms and uses elements of (a first) natural language to produce modifications and stimulation in the non-linguistic elements and systems of the substrate ADS. Then, when desired, the ADS can produce (if desired, a second) natural language showing the "meaning" which has been "transmitted" by the natural language input to such interface system. According to the present invention, natural language "syntax" problems arise when there can be no direct simultaneous transmission of all data-type/data available from one ADS to another.

Thought Elements

So non-linguistic elements of the ADS (the data in the data-types mentioned), i.e., non-linguistic representations, according to the present invention, preferably bear certain relationships to natural language, relationships of the type permitting, e.g., learning by analogy, metaphor, example, etc. And so such non-linguistic representations (which are hereinafter sometimes called "thought elements") should preferably bear precise similarity relationships among them, as for use by learning programs and natural-language use.

Thus, according to a preferred embodiment of the present invention, the selection of thought elements should ideally provide: efficient "awareness" (as set out briefly above and hereinafter) computation both in prediction and in relevancy areas; efficient "fit" with human knowledge and learning in areas like "similarity" and "metaphor"; efficient use cross-culturally and in translation and other compatibilities with human thought and languaging; efficient data storage of minimum elements; efficient "computability" among data elements; and efficient hardware and software "parallelism", etc. The most important of these thought elements are below discussed.

"Primitives" in Data Structures

It is preferred to start with representing a set of categorization "primitives" with which to begin the task of categorizing the infinite variety of the world and usefully construct a finite representation of it, hopefully resulting in a relatively small set of such primitives and in a method of categorization comparable to that of humans and at the least comfortable to and understandable by humans. What is desired to start with is a way to categorize "things" or "objects" (in that this is the chief way that humans begin to break down the world).

Prediction Factors

According to the present invention, one primitive to be selected should be a "prediction factor" (PF) in that its form of expression should be such as to be efficiently computable, e.g., by simulation methods, in predicting the consequences of the object (having the PF) within a mappable representation of objects, a structured situation (Sx). As a preferred digital data structure, an Sx may be seen as a set of event rows (Ex), each event row including at least: (1) a "concrete" object representation (Px), (2) a location representation (Lx), (3) a movement or vector representation (Vx), and (4) at least one "doing" or bodily-movement representation (Bx or BFM).

According to a preferred embodiment of this invention, the form of representation which should be given to a prediction factor (PF) is, put very briefly and roughly, as follows: a (hierarchied) self-tendency of a "self-thing" to make a specified incremental self-action when that "self-thing" is in a specified state and/or in a specified relation with at least one other specified type of thing, said type being specified by the inclusion therein of specified self-tendency-name-markers. A PF may be seen as a self-tendency in the form of a PF-rule; and a unique self-tendency-name-marker or PF-name marker (PFM) is attached (in a one-to-one relationship) to each PF. Thus it may be said that the size of the set of PF's is the same number as the size of the set of PFM's.

To be more complete, a self-tendency or prediction factor or PF may take the form of an if-then rule (PF-rule) which may be stated as follows:

If the instant "thing or object self", i.e., the one to which this PF has been assigned (whose potential "move" is being chosen, dependent on rule-hierarchy factors), is in a specific geometrical structure (within the current self-situation, Sx, i.e., the set of events in the Sx from the viewpoint of the instant "thing") which is included in a set of specified relations [the "self"-relational situation, Si, of this PF, i.e., a specified boolean set of sub-evaluation (SE) relations (etc., see definition of SE) seen from the viewpoint of the "instant" self, with the "self-event", Ris, being one of the events in this set of specified relations, and the other events of this set of relations being selected from the total Sx events by inclusion, respectively, in the other Pi's—in effect, "abstract" objects—of this set of specified relations], then the instant "thing" may do the incremental "move" (of this PF), otherwise not; where each "abstract" object Pi (or numbered Pi, i.e., "Pin") consists essentially of at least one of a 1st set of PF-name-markers (PFM's), said set of 1st PF-name-markers having a 1-to-1 correspondence with the set of all PF-rules; and where the more-"concrete" object representation which is part of each said event (in the Sx) includes a 2nd set of PF-name-markers (corresponding to the PF's assigned to each said event at recognition, as set forth below), which said 2nd set is a subset of said 1st set of PF-name-markers.

One of the important factors which limits the number of PF primitives necessary to real categorization is that each PF takes full operation only with reference to the "self" to which such PF is assigned. In this sense, each PF may do multiple "duty". It is noted that this "self-" form of PF and its use in simulation may be a basis for a humanoid ADS having "empathy" and ability to "play" at "being" anything in the world.

It will continue herein to become clearer that the PF thought element or data structure is not the complete story about primitives. Nor is the PF-name-marker thought element. There will be the functions of "RF's" (recognition factors, herein described) and various sorts of "situations" to consider. But, in terms of a clear example of obtaining an efficient object categorization system, in which levels of concrete/abstract are clear and computable and do-able by set-inclusion in simple ways, the main categorization tool is the PF-name-marker or "PFM". So the single PF-name-marker usually serves as the most abstract "Pi", i.e., the most abstract object-type; and, further according to the present invention, for useful categorization purposes in the representation system of an ADS, most "concrete" objects may most usefully be seen as collections or groups of PF-name-markers. It may then be seen that, according to the present invention, one may measurably and computably describe (step-wise) more-and-more-"abstract" objects by removing from such concrete object representation (say, one at a time) an included sub-group of PF-name-markers. Conversely, one may start with a most-abstract object-representation, a Pi or single PF-name-marker, and then add groups of one or more additional PF-name-markers to such representation to make it more concrete. Thus, with this system of representation, of categorization, one may determine with efficient computation whether a certain concrete object type is included in the abstract object type specified by a rule or proposition or other such abstraction. And thus, as shown herein, the "inclusion" computations required for such things as simulation and planning become efficiently manageable. And this efficient manageability is maintained even if we see each PFM as having two independent parts—a first marker part of a set in a 1-to-1 relation with the set of all incremental PF "moves"—and a second marker part of a set in a 1-to-1 relation with the set of all "self"-relational Si's of all the PF's.

Recognition

Also, importantly, according to the present invention, "recognition" of a "thing" or "object" by an ADS having a sensory system depends (again, briefly and roughly) on (1) a 1st categorizing (by Recognition Factors, RF's, each such factor specifying a selected range within the output of each piece of sensory equipment focused on the "thing" or "object", for example) of a "concrete" object or "thing" based on the sensory information coming from a small space (the location of the "thing"), representable as part of a geometrical situation, a structured situation, during a small time period; (2) a 2nd categorizing [by Prediction Factors, PF's] of a "concrete" object or "thing" based on the tendency(s) of the object/ "thing" to behave, through time, in certain specific ways in certain kinds of specified relational situations, depending upon the 2nd categories (types) of other "local" things in said geometrical situation [which other local "things" act/react to the 2nd-categorizing type of said "thing"]; and (3) given a set of said 1st categorizings of a "thing", the assignment, on the basis of said set of said 1st categorizings (using, for example, a look-up table), of a set of said 2nd categorizings (by PF's) of said "thing". Until PF's ("hierarchied" or ordered in a useful order) have been assigned to each event representation of a presented structured self-situation, there has not been complete "recognition". The set of RF's (or RFM's) and the set of PF's (or PFM's) so assigned to a thing will sometimes be hereinafter called its "concrete" object representation.

Thus, according to this invention, for a thing/object to be called "recognized", one must be able: to incrementally predict about the thing in the relevant geometrical situation which includes said thing, in the framework of the total set of 2nd categorizings of things, and to determine the "meaning(s)" involving the thing (as it is, within its specified local geometrical situation), in the framework of the total set of 2nd categorizings of things. The act of "recognition" may be defined, according to the present invention, as the act of assigning a "sufficient" representation to the object/thing. A "sufficient" representation (which makes an object "concrete") is one which has sufficient information to enable a participation by the object representation in a simulation (as herein exampled) with its current environment or mapping representation for predicting the immediate consequences of the object-and-situation.

Simulation/Prediction

Thus, it is seen that the nature of a PF is a ("hierarchied", i.e., in some suitable (often heuristic) hierarchical order for purposes of simulation/prediction) tendency for the "self-thing" or self-object to do a specified incremental act/move if (geometrically) "in" a relational-situation specified as between/among abstract objects, "Pi's" (herein sometimes also referred to, and sometimes in the Figures referred to, as "Ri's"). And the nature ("essentially") of a Pi as a more-abstract thing is that it may consist of as few as one of a set of "thing-2nd-categorizing-markers", i.e., PFM's, each member of said set having essentially a 1-1 relationship with each member of a corresponding set of PF's (i.e., PF rules). In effect a Pi/Ri is composed usually of a small set of name/reference-markers (PF Markers or "PFM's"), each referring to a specified tendency of a "thing" to do a specified act in a situation specifiable essentially only with reference to other similar names/reference-markers. The 2nd categorizing above of the things in a situation must permit the simulation, by small incremental actions of each thing, of the futures, the predicted consequences, of that situation.

In such simulations, as will become more clear after discussion of the relevancy system of the ADS of the preferred embodiment of the present invention, the "self"-event may be incrementally moved in simulation by a selected or given decision instruction, rather than by PF's as for the other events in the situation. However, a set of PFM's roughly corresponding to the ADS self-tendencies should be assigned to the ADS "self"-event for use by the other events in computing their incremental "moves". Thus, generally, for simulating the predicted "futures" of the events/objects of structured situation (i.e., a mapping representation of objects from a collection of objects), the prediction means, comprises simulation means for processing data for simulating through time from a beginning structured-situation of the circumstances of any objects of such collection which are in any mapping representation, such simulation means including means for processing data for selecting, from each such subset of self-tendencies so constructed and arranged to permit a determination of the expected behavior of each such object with respect to any mappable representation of other objects from such collection, the beginning incremental behavioral tendency of each object of such beginning structured-situation of the given beginning mapping representation of objects; means for processing data for performing, with respect to such beginning structured-situation, such beginning incremental behavioral tendency of each such object, to transform such beginning structured-situation to a first amended structured-situation; means for processing data for selecting, for each such object of such first amended structured-situation, the next incremental behavioral tendency of each such object; means for processing data for performing, with respect to such first amended structured-situation, such next incremental behavioral tendency of each such object, to transform such first amended structured-situation to a second amended structured-situation; and means for processing data for continuing to perform, for a selected period, appropriate succeeding incremental behavioral tendencies of each such object to continue to transform each succeeding amended structured situation to a next succeeding structured-situation. In accordance with the present invention, this simulation system may be used not only within an autonomous decision system, but also as the "engine" to "run" a reality simulation or a "virtual" reality or as an engine for a game, etc. (see the description hereinafter of the entertainment system of this invention).

Relevancy Nodes

Figure 5:
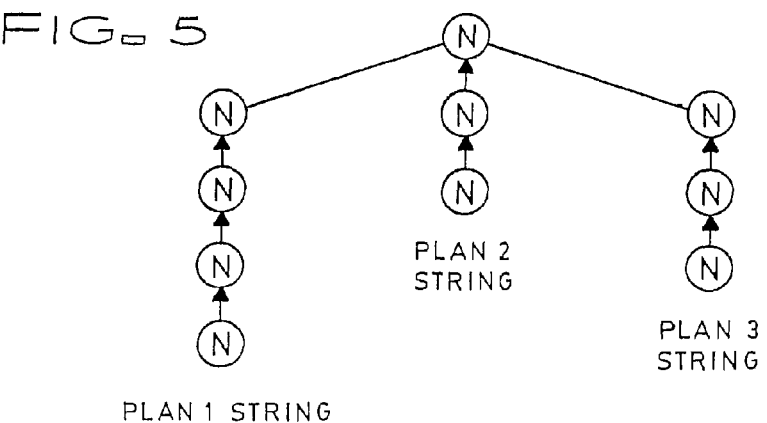
FIG. 5 shows, by diagram flowchart, an example of hierarchied nodes (N) in three plans to alleviate a single problem.

As stated herein, for an ADS to be "aware", it must do more than run predictions; and one of the other things it must do is to compare such predictions (and its recognized situations that are the start of the predictions, of course) with a relevancy system to begin to determine its threats and opportunities. According to a preferred embodiment of the present invention, a relevancy system includes a hierarchied set of problems and hierarchied sets of plan-strings associated with each problem. Each problem "node" and each "node" of each plan include a representation of an inclusional situation, an Si (also sometimes called herein a "self-relation" or a "relational situation"), in the same form as the inclusional situation of a PF (i.e., in the form of a boolean set of SE's, as more specifically set forth below). Each such "node" identifies at least one "abstract" situation or Si whose specific relevancy depends upon the position of its node in the hierarchically-organized set (and upon other factors associated with a node, as hereinafter described). For an example of hierarchied plan nodes, see the diagram of FIG. 5, showing by diagram flowchart, an example of hierarchied nodes (N) in three plans to alleviate a single problem.

Inclusional Situation (Si)

An Si may be defined as a boolean string of sub-evaluations or SE's, where an SE may be either (1) a relation r between the "self" and at least one other object/event, as defined by PFM's and RF's (in the form of RF Markers, i.e., RFM's) or (2) a range of a self-sensor (an Ri of the "self" in the current computation). The rule of a node or meaning structure (a relevancy structure with an Si) states:

If the instant specific recognized-by-this-machine geometrical structure (w/in the "self"-Sx, the set of events in the Sx from the viewpoint of the "self"-machine) is included in a set of specific relational structures (a "self"-SE of this machine, this set of relations seen from the viewpoint of the "instant" self, w/ the "self-event", Ris (or Pis), being one of the events in this set of specified relations, and the other events of this set of relations being selected from the total Sx events by inclusion, respectively, in the other Pin's (abstract thing-types, e.g., Pi1. Pi2, . . . Pin) of this set of specified relations), then the instant "self"-machine may (depending on the "place" of this meaning structure in the overall meaning system of this meaning) take the set of "actions" associated with this meaning structure, otherwise not;

where each Pin consists essentially of a small number (often one) of a 1st set of PF-name-markers, such set of 1st PF-name-markers having a 1-to-1 correspondence with the set of all PF-rules known to this machine; and where the "thing" representation of each such event includes (over and above its RF's or RFM's) a 2nd set of PF-name-markers (the thing's "type"), which such 2nd set is a subset of such 1st set of PF-name-markers.

The data structures in an SE (several of which SE's can be algebraically combined in boolean form to form an Si) are:

a. r=general geometrical relationship between Pi's ("abstract thing-types", including the self-thing, the Ris/Pis), usually no more than 2-4 Pi's;

b. parms (parameters)=specific numbers in a particular r;

c. each Pi=small subset of PFM's and small subset of RFM's restricting/defining the "thing-type";

d. BF "doings" (in the form of BF Markers, i.e., BFM's), normally assume one per Pi, but multiple are permitted.

Parallel Processing

The currently-recognized concrete representation of the ADS "self" and its environment (SxC) may be compared to each of the relevancy-node abstract situations, IN PARALLEL if desired, to determine all inclusions—all "hits"—so that all "relevancies" of the current representation are determined rapidly. Similarly, to the extent desired, any PREDICTED consequence-situation (SxT) of the current situation may be compared to all relevancy-node situations simultaneously in parallel. Once the entire set of "relevancy" information is computed about a specific represented situation, standard computation (i.e., expert systems and/or "neural nets" and/or fuzzy logic and/or symbolic logic, and/or heuristic systems, etc.) may select potential "decisions" or groups of hierarchied "decisions". And any ADS decision may be "tried out" in a "what-iffing" mode applied to fast-forward-consequence determination.

Same Parallel System for Prediction as for Relevancy

And the described form of the representation permits the same parallel processing system to participate in the "fast-forward-simulation" of the current representation to compute its immediate consequences (using "default" ADS self-actions or self-inactions). I.e., the process of simulation/prediction may use the same parallel processing system that is used to determine a current representation's relevancy-inclusion in the relevancy-planning set of nodes. In each case, the main computation is to determine any inclusion of a structured situation in a relational situation, i.e., whether an Sx is included in an SE (and, eventually, in an Si, which may be composed of a boolean set of SE's). FIG. 6 shows a flowchart of this basic computation and FIG. 7 illustrates a coding implementation of this kind of computation in the Turbo-Pascal language.

In doing parallel processing, if each parallel processing module represents a specific genetic or learned "sub-evaluation" (SE), i.e., specifies the existence of certain abstract things (Pi's) and any space-time relation (r) between/among them, etc., as above discussed, each Px (set of RFM's and PFM's of the Sx to be tested for inclusion in the SE) may be tested in parallel in each such processing module and any Px inclusion(s) or "hit(s)" stored. Then each specific space-time geometry between/among specific Px's from the viewpoint of each Px [so that all relations r are included] may be tested in parallel in each such processing module. Thus each processing module could have the parallel, simultaneous ability to test a given SE from each of many "Px viewpoints" [the number of viewpoints will usually, at least for most perceptual systems, be a low number, probably 5 to no more than 20]. See FIG. 8 for a representative diagram/chart of one way to do such parallel processing of SE's from the relevancy system and SE's from the PF's in doing simulation.

Each processing module which "satisfies" both requirements, i.e., the general relation has "hit" between "hit" Px's, sends a signal to each appropriate "summary" processing module (one for each Px viewpoint), which keeps updated on all combinations of SE's which are "interesting" Si's; and each processing module reports on Si "hits" from its viewpoint to its decision processing module (which could be the same processing module as its summary processing module). Each decision processing module, which keeps updated on all decisions for any Si's (including any "hierarchical" rules), selects a decision for its viewpoint Px in this situation. One (or more) decision processing module(s) is a problem/plan processing module for keeping track of decision-making and what-iffing, etc. When a new Sx is recognized, or prediction decisions/actions of all Px's of the Ex's are reflected in a new SxT, the described process is started again, appropriately.

To make all such SE processing modules "the same", they would have to include general relation-testing submodules as well as general set-inclusion submodules (as well as a "viewpoint" and "hit" memory). And they would then be temporarily or permanently adapted to test for a specific SE (e.g., "firmware"). The capability for some on-the-spot modifications would be helpful for implementing learning, etc. As mentioned elsewhere, "fuzzy logic" or "neural nets" or other methods could be involved in the work of the summary decision-choice steps, if desired, after the "hit" SE's have been determined.

"Feelings" Generation

According to a preferred embodiment of the present invention, an ADS may include a feelings system for generating and using representations of various simulated feelings or "emotions". A set of registers is provided for the below purposes, and the "amount" of a particular feeling will be roughly proportional to the number in such register. For most of the feelings registers of the ADS, the incremental additions (in numbers) to such registers will be in terms called "arousal" and the incremental subtractions will be called "relief".

Although the source of the various arousal incremental additions is varied, the source of the relief incremental subtractions is a quantity proportional to the "muscle action" or movement of the ADS (with a relatively fixed "basal-metabolism" quantity). For example, if the emotion means of the ADS provides, for use by the autonomous decision system, incremental representations of "fear" in amounts essentially hierarchically ordered according to inclusions of the mapping representation Sx in the hierarchical set of n problem representations, there may be, say, an increment of 100 (on a scale of 0-255) of arousal generated as an incremental amount of "fear" and going to the fear register (until replaced by the next fear increment); and this increment is added to a "total arousal" (or "excitement") register (which register also receives arousal increments from other sources, as will be described). If, at the beginning of an increment time, the total arousal register is at 200 (on a scale of 0-255), and if for that increment fear of 100 and other arousals of 80 are added to the total arousal register, and if for that increment, a relief decrement of 200 is subtracted from the total arousal register, then, for the next increment, the total arousal register starts out with a reading of 180.

Further, for example, the ADS may include emotion means for providing, for use by the ADS, incremental representations of "hopelessness" depending essentially upon whether, in the operation of the planning means, in the plan-set for the highest hierarchical problem representation in which the mapping representation (Sx) is included, such mapping representation is included in none of the subgoal representations associated with such plan-set; and a hopelessness register (similar to the fear register) is provided for incremental storage.

Further, for example, the ADS may include emotion means for providing, for use by the ADS, incremental representations of "disappointment" depending essentially upon whether, in the operation of the predictive planning means, when it is predicted that a "future" such mapping representation will be included in a next subgoal representation, such "future" mapping representation is in fact not included in a next subgoal representation; and a disappointment register (similar to the fear register) is provided for incremental storage.

Further, for example, the ADS may include emotion means for providing, for use by the ADS, incremental representations of "surprise" depending essentially upon whether, in the operation of the predictive planning means, when it is predicted that a "future" such mapping representation will not be included in a next subgoal representation or one subsequent thereto (i.e., closer to the "goal" of eliminating the current problem), such "future" mapping representation is in fact included in a next or subsequent subgoal representation; and a surprise register (similar to the fear register) is provided for incremental storage. However, the contents of this register will be deducted rather than added to the total arousal register so as to increase pleasure (reduce pain) as described shortly hereinafter.

During any one increment of time, the number in the total arousal register will be an additive function of the incremental arousals of all such specific arousal registers like those described. And, in this case, the total arousal register will be an indicator of the general feelings of excitement/calmness of the ADS depending upon the highness/lowness of the register contents. Also, other arousal registers may be used for other purposes, for example, an unpredictability arousal increment when either (1) an object can not be "recognized" or (2) a predicted situation does not in reality occur (as in surprise and disappointment scenarios, etc.). This unpredictability register reading is useful in signaling when cognitive learning should be initiated, as mentioned below.

According to the present invention, the rate of change of the number in the total arousal register from time increment to time increment may be used as a rough indicator of pain/pleasure of the ADS depending upon the highness/lowness of a rate-of-change-of-total-arousal register. That is, the faster total arousal is going up, the more pain; and the faster total arousal is going down, the more pleasure.

Figures 2, 44A:
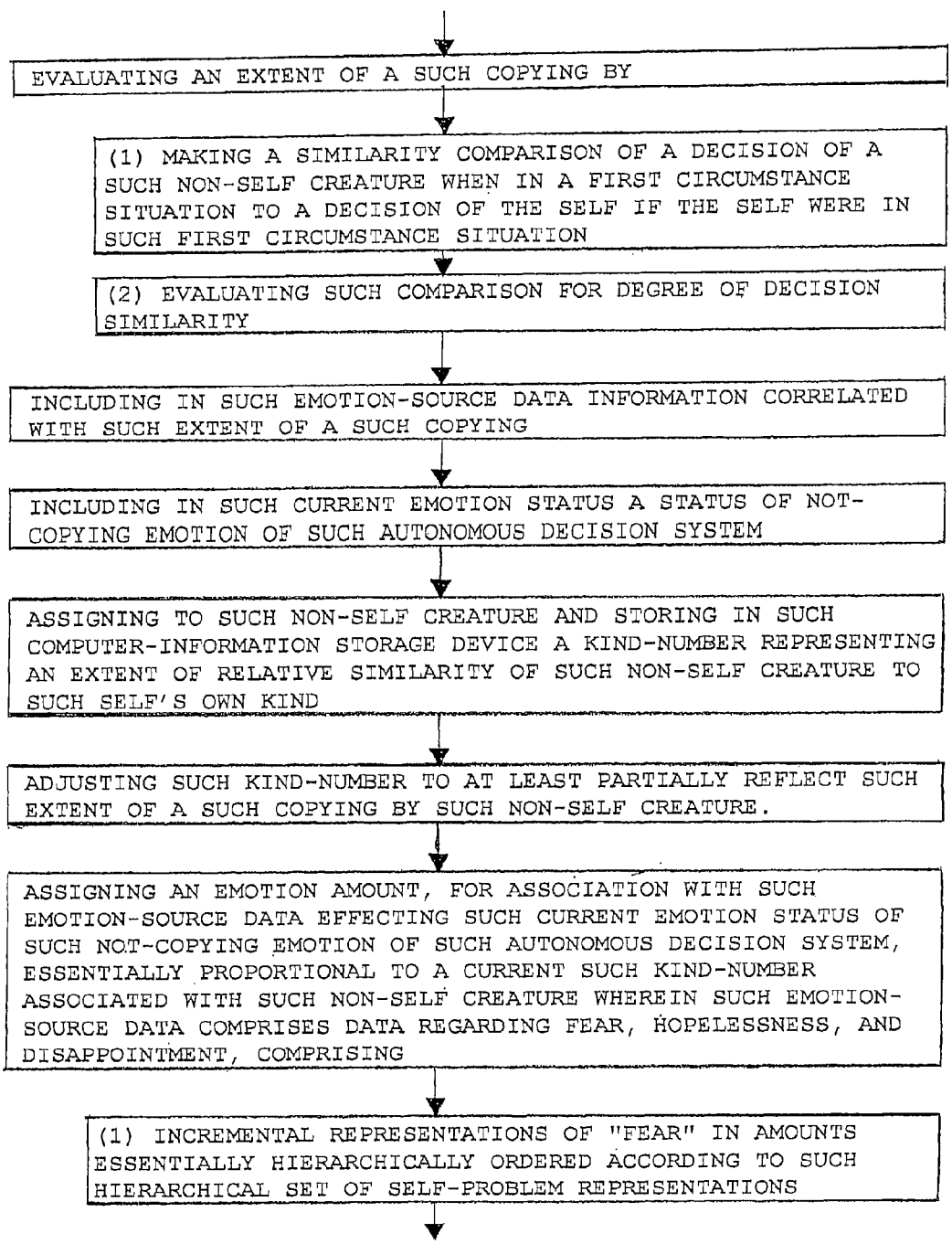
Figures 3, 44A:
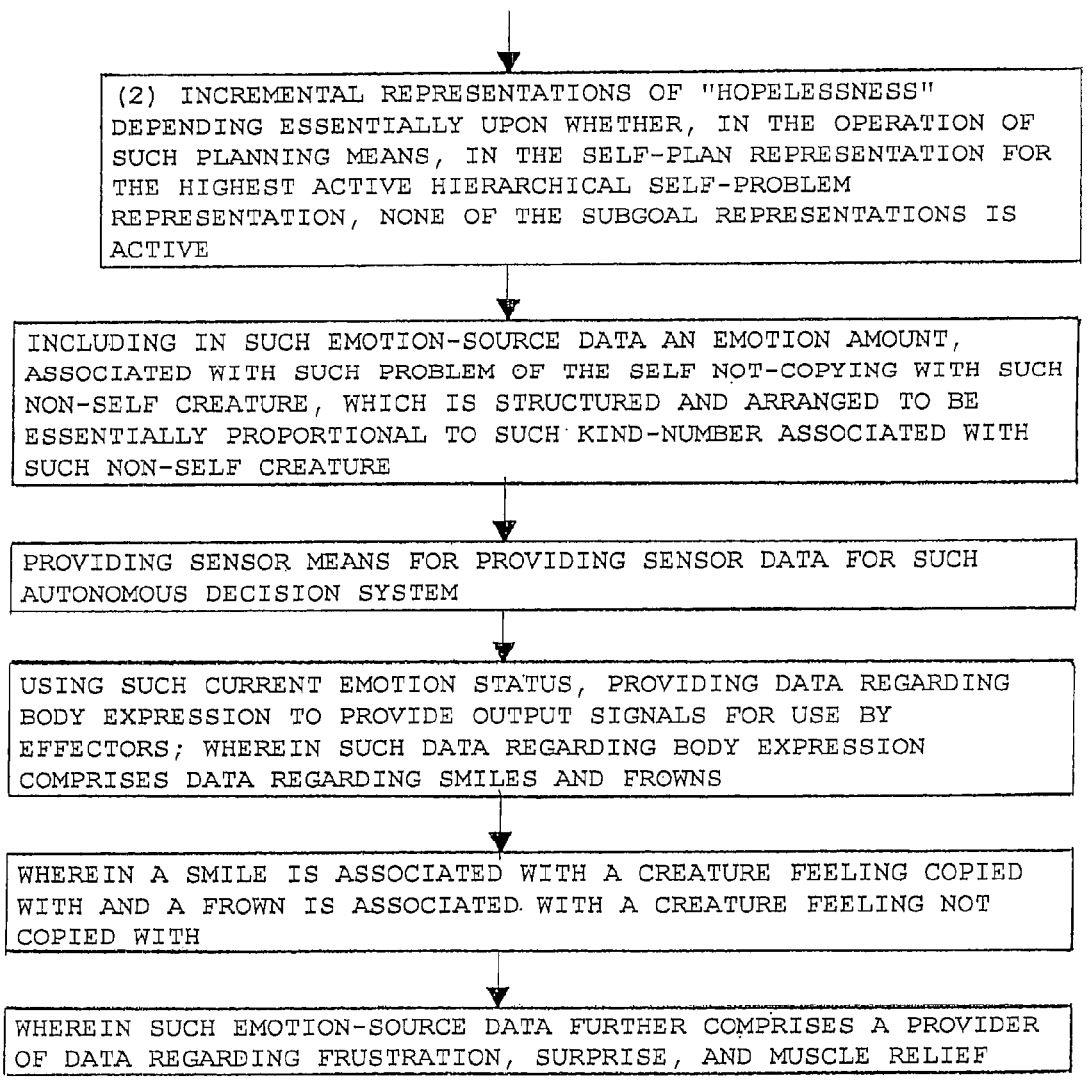

FIG. 44 illustrates steps in a preferred computer program for implementing emotional expression in an autonomous decision system in an effort to implement in a machine such things as human or humanoid-type emotion, bonding, sociality, etc. From the within disclosures, it is seen that the following are important steps in such implementation: storing in a computer information-storage device planning data providing plan capability to such autonomous decision system; using information regarding environmental circumstances of such autonomous decision system, providing planning selections and planning status (i.e., as discussed, by the doing of the inclusions of a "concrete" circumstance representation within "abstract" nodes of a plan system); using information about current such planning status, providing emotion-source data (usually incremental data, as exampled herein); using current such emotion-source data, providing current emotion status (usually register data, as exampled herein); making and storing in such computer information-storage device a subset of such planning data about (1) a first plan regarding whether the self of such autonomous decision system is then copying with a non-self creature of such environmental circumstances, and (2) a second plan regarding whether a such non-self creature is then copying with such self (see also discussions herein of "sociality"); wherein such planning data comprises: a set of hierarchically-organized abstract self-problem representations, and in association with essentially each of such abstract self-problem representations, a set of hierarchically-organized abstract self-plan representations each comprising a set of abstract self-subgoal representations, wherein at least one such abstract self-problem representation is the problem of the self not-copying with a such non-self creature (all as discovered according to the present invention in its efforts to simulate in a machine such things as human bonding and social behavior); evaluating an extent of a such copying by (1) making a similarity comparison of a decision of a such non-self creature when in a first circumstance situation to a decision of the self if the self were in such first circumstance situation (i.e., assuming in such calculations the point-of-view or position of such non-self creature); (2) evaluating such comparison for degree of decision similarity; including in such emotion-source data information correlated with such extent of a such copying; including in such current emotion status a status of not-copying emotion (usually computer arousals as discussed herein) of such autonomous decision system; assigning to such non-self creature and storing in such computer-information storage device a kind-number representing an extent of relative similarity of such non-self creature to such self's own kind; adjusting such kind-number to at least partially reflect such extent of a such copying by such non-self creature; assigning an emotion amount, for association with such emotion-source data effecting such current emotion status of such not-copying emotion of such autonomous decision system, essentially proportional to a current such kind-number associated with such non-self creature wherein such emotion-source data comprises data regarding fear, hopelessness, and disappointment, comprising (1) incremental representations of "fear" in amounts essentially hierarchically ordered according to such hierarchical set of self-problem representations and (2) incremental representations of "hopelessness" depending essentially upon whether, in the operation of such planning means, in the self-plan representation for the highest active hierarchical self-problem representation, none of the subgoal representations is active; including in such emotion-source data an emotion amount, associated with such problem of the self not-copying with such non-self creature, which is structured and arranged to be essentially proportional to such kind-number associated with such non-self creature; providing sensor means for providing sensor data for such autonomous decision system; using such current emotion status, providing data regarding body expression to provide output signals for use by effectors; wherein such data regarding body expression comprises data regarding smiles and frowns; wherein a smile is associated with a creature feeling copied with and a frown is associated with a creature feeling not copied with (as discovered according to the present invention to efficiently simulate in a machine human methods of training, communication, etc.); wherein such emotion-source data further comprises a provider of data regarding frustration, surprise, and muscle relief.

"Metabolism" Feelings

According to this invention, computations from simulated (or real, from robot sensors) metabolism, may be made from appropriate incremental additions to appropriate registers representing such things as amount of hurt or hunger or tired of the ADS; and from appropriate incremental subtractions from such registers respectively of healing-done or food-eaten or rest-had.

Face-Driving System

Also, according to the present invention, once the amounts of various feeling-representations are determinable, these may be used to "drive" a human-face-representation, e.g., by using drawing formulas for the various lines of the face (e.g., eyes, eyebrows, eyelids, mouth, forehead creases, nose, cheek creases, etc.) and providing formulas linking the amounts in the various feelings registers to the various face-draw formulas. In this manner, the "true" emotions/feelings of the ADS may be observed by others, similarly to human interaction, as with smiles, frowns, eye-pupil size, etc.

Story-Telling System

Further, according to the present invention, the ADS may be given a system for telling "true" and "interesting" stories about the experiences of the ADS within its virtual or real worlds. It has been discovered, in accordance with this invention, that human-type storytelling (and "episodic memory") may be efficiently simulated by saving data according to the following techniques: (1) at an appropriate "high" (selected) level of pain, to start the story, save the time and place and the "concretized" current problem situation/node (i.e., for the structured situation which is included in the relational situation of such problem node, save the included concrete objects of the structured situation along with the node information); (2) save as the next story element the current strategy and the first plan node found to be included, along with the concretized relevant data and the action being tried to overcome the problem (and any "high" feelings at this time and at any further node report); (3) then save such information about the next plan node reached and any further action to be tried and any what-iffing predictions; (4) then continue to so save about any next plan node reached and any further action to be tried and any what-iffing predictions; and (5) end the story about reaching a goal when there is a "high" (selected) level of pleasure. The story should preferably, in accordance with this invention, report (following the "rules" of the selected natural language) in the concrete terms of the structured situations, not in the abstract terms of the relational situations. See, as a further example, the coding implementation of FIG. 9C of this computation in the Turbo-Pascal language.

Language Production

For this story-telling use of the ADS, or to have the ADS answer questions, or for other language production uses, the language production program or module must of course have access to the pertinent thought elements (data) representing the material to be reported. Then, for, and depending upon, the specific natural language in which the report is to be made, the ADS must have access to (1) the normal order of reporting, both within sentences and among sentences; (2) the "snippets" or phrase structures which signal to a listener that the included word(s) represents a certain kind of data; (3) usual connectives; and (4) the word(s) which represent the data to be reported. For variety, the ADS should have access to synonymous or alternate acceptable ways to use such orders, snippets, data-word(s), etc. (All the above is more particularly described in the entertainment system description hereinafter.)

FIG. 9A illustrates preferred steps in a computer program implementing natural language and story production in autonomous decision systems, such steps being as follows: providing computer processing means for processing data; providing storage means for storing data on a storage medium; wherein such data comprises non-linguistic discrete data-types and, conforming to each of such discrete non-linguistic data-types, a set of non-linguistic discrete data elements; providing for input information about current circumstances of the humanoid autonomous decision system (usually from sensors); providing for output signals for implementing decisions of the humanoid autonomous decision system (as, for example in the entertainment system embodiment); processing data regarding "self" to provide at least one "self" representation; processing data regarding current circumstances to provide a first non-linguistic structured "self"-situation representation (as discussed, in its "concrete" form); initiating and storing data regarding a set of hierarchically-organized, relevant, non-linguistic relational "self"-situations (a relevancy system, as herein discussed); processing data to determine inclusions of a such first non-linguistic structured "self"-situation within such non-linguistic relational "self"-situations to determine any relevance of such first structured "self"-situation to a such "self"; wherein such data regarding such set of hierarchically-organized, relevant, non-linguistic relational "self"-situations includes data regarding a set of hierarchically-organized problem relational "self"-situations, and, in association with essentially each of such problem relational "self"-situations, a set of hierarchically-organized plan relational "self"-situations; initiating and storing data regarding respectively linking essentially each such discrete data-type of such humanoid autonomous decision system with a respective word/phrase category of a first natural language; initiating and storing data regarding respectively linking selected words/phrases of each such linked word/phrase category of such first natural language with respective such discrete data elements of each such discrete data-type so linked with a such linked word/phrase category; processing data regarding a first communication to be made by such humanoid autonomous decision system to transform a specified set of non-linguistic data elements into a such first communication in such first natural language, comprising (1) processing data regarding identifying which of such discrete data elements of such discrete data-types is to form part of such first communication, (2) processing data regarding selecting natural-language snippets for pointing to the such categories of such natural-language corresponding to whichever of such discrete data-types includes each such discrete data element which is to form part of such first communication, (3) processing data regarding selecting a word/phrase of such natural-language corresponding to each such discrete data element which is to form part of such first communication, and (4) processing data regarding producing from the grammar practices of such natural language and from such snippet selections and from such word/phrase selections such first communication in such natural language; initiating and storing data regarding, in association with each of such relevance self-relations, a set of hierarchically-organized "self" trial decisions; processing data regarding such "self" trial decisions to provide data regarding, when a such relevance self-relation has included a such specific circumstance, a current selected such "self" trial decision; processing data regarding using such relevance means to determine the relevance of selected amended structured-situations arising by simulation from using a selected such "self" trial decision for the "self" object within the then such specific circumstance; processing data regarding selecting, depending upon the then specific relevances upon operation of such trial-decision-testing means, a such "self" trial decision as a then self-decision of such intelligent system; acquiring and storing, when such first communication is to be the telling of a "true" and "interesting" "personal history" story about the experiences of such humanoid autonomous decision system, sequential data for use in such telling, comprising (1) for use in a first story element of such story, processing data, when a first selected level of a self-pain signal has been attained by such humanoid autonomous decision system, regarding first data about a current time and a current place and a "concretized" current problem relational "self"-situation to provide data regarding the concrete objects of a then current structured "self"-situation which are included in such current problem relational "self"-situation, (2) for use in a second story element of a such story, processing data, when a such then current structured "self"-situation is included in a first plan relational "self"-situation, regarding second data about a current strategy and a "concretized" current such plan relational "self"-situation, to provide data regarding the concrete objects of a such then current structured "self"-situation which are included in such first plan relational "self"-situation, (3) for use in a third story element of a such story, processing data, when a such then current structured "self"-situation is included in a second plan relational "self"-situation, regarding third data about a current strategy and a "concretized" such second plan relational "self"-situation, to provide data regarding the concrete objects of a such then current structured "self"-situation which are included in such second plan relational "self"-situation, (4) for use in a sequential story element of a such story, processing data, when a such sequential current structured "self"-situation is included in a next identified plan relational "self"-situation, regarding sequential data about a then current strategy and a "concretized" such next identified plan relational "self"-situation, to provide data regarding the concrete objects of a such sequential current structured "self"-situation which are included in such next identified plan relational "self"-situation, and (5) for use in a final story element of a such story, processing data, when a second selected level of a self-pleasure signal has been attained by such humanoid autonomous decision system, regarding final data about a "concretized" such identified goal plan relational "self"-situation, to provide data regarding the concrete objects of a such final current structured "self"-situation which are included in such identified goal plan relational "self"-situation; processing data regarding searching of any such stored sequential data to provide user-controlled selection among such stored sequential data; and processing data regarding a user-selected later use of such sequential data to provide a later telling of a story based upon such stored sequential data.

It is noted that other technologies, e.g., parsing or logic or speech production or prosody or speech recognition, may be combined with the instant invention where desired.

Language Interpretation

FIG. 9B illustrates preferred steps in a computer program for implementing first natural language interpretation functions in a humanoid autonomous decision system interpreting incoming first natural language from an other, according to the following steps: storing in a computer information-storage device data comprising non-linguistic discrete data-types and, conforming to each of such discrete non-linguistic data-types, a set of non-linguistic discrete data elements; initiating and storing data regarding respectively linking essentially each such discrete data-type of such humanoid autonomous decision system with a respective word/phrase category of such first natural language (these linking steps are also used in language production, as discussed herein); initiating and storing data regarding respectively linking selected words/phrases of each such linked word/phrase category of such first natural language with respective such discrete data elements of each such discrete data-type so linked with a such linked word/phrase category; providing input information about characteristics of such incoming natural language sufficient to identify each vocabulary element, snippet type for each such element, and grammatical function for each such element (as discussed, known methods of parsing, etc., as may be helpful, may be used to assist in this step); processing data regarding such input information to provide a non-natural-language concrete circumstance interpretation of such input information; wherein such translation means comprises natural-language default-selecting means for processing data regarding selection of non-natural-language data types and data for correspondence with such incoming information (see, for an example of a way to do this step, the meta-interface of the described entertainment system); initiating and storing data regarding the relevance to the humanoid autonomous decision system of such circumstance interpretation, comprising data regarding a set of hierarchically-organized, relevant, non-linguistic relational "self"-situations; processing data to determine inclusions of such non-natural-language concrete circumstance interpretation within such non-linguistic relational "self"-situations to determine any relevance of such non-natural-language concrete circumstance interpretation a such "self" of such relevance means; wherein such data regarding such set of hierarchically-organized, relevant, non-linguistic relational "self"-situations includes data regarding (1) a set of hierarchically-organized problem relational "self"-situations and (2) in association with essentially each of such problem relational "self"-situations, a set of hierarchically-organized plan relational "self"-situations; providing such interpreting humanoid autonomous decision system with abilities to select for use in interpretation similar cognitive, relevancy, and emotion systems to those of the other (found to usually give a more accurate interpretation); processing data regarding a story-series of such incoming informations to provide a story-series of such non-natural-language concrete circumstance interpretations; processing data regarding such story-series of such non-natural-language concrete circumstance interpretations to provide a learned modification of a such non-linguistic discrete data element wherein such story-series of such non-natural-language concrete circumstance interpretations is treated as a temporally-incremental series, respectively, of "present" concrete self-situation representations of a temporally-incremental series of respective environmental situations; wherein each story element of such story-series of such non-natural-language concrete circumstance interpretations comprises a self representation and a set of event representations, each such event representation being represented specifically spacio-temporally relative to such self representation, and each such event representation including (1) a behavioral-type designation selected from a set of behavioral-type designations, each such behavioral-type designation of such set of behavioral-type designations being associated with a set of incremental behavioral self-tendencies for determining incrementally-predicted self-situation representations from a such presented self-situation representation, and (2) a set of current-behavior designations associated with each such event representation specifying the current behaviors of each such event representation; wherein essentially each such event representation comprises an object representation representing a particular object as part of a collection of such object representations, each such object representation of such collection comprising a such behavioral-type designation comprising characteristics of each such object representation of such collection, wherein essentially each of such characteristics comprises a subset of a set of self-tendencies and a corresponding subset of a set of self-tendency markers such set of self-tendency markers having a 1-to-1 correspondence with such set of self-tendencies, one unique marker from such set of self-tendency markers corresponding respectively with each self-tendency of such set of self-tendencies, such subset of self-tendencies being constructed and arranged to permit a determination of the expected behavior of each such object representation with respect to any mappable representation of other object representations from such collection of object representations, each such self-tendency consisting essentially of an instruction for self-behavior (of any first object representation to which such self-tendency may be assigned) on the condition that any mappable representation of object representations from such collection, including such first object representation, from the viewpoint of such first object representation, is included in a specified self-relation selected from a set of self-relations, wherein each self-relation of such set of self-relations comprises a specified space-time relation among a such first object representation and at least one such other object representation, each such other object representation being specified as a subset of a set of self-tendency markers, each such subset of self-tendency markers corresponding to the subset of self-tendencies assigned to each such other object representation (i.e., using the preferred categorization system of this invention); wherein such data regarding a set of hierarchically-organized, relevant, non-linguistic relational "self"-situations comprises (1) a set of hierarchically-organized abstract self-problem representations, and (2) in association with essentially each of such abstract self-problem representations, a set of hierarchically-organized abstract self-plan representations each comprising a set of abstract self-subgoal representations; processing data regarding such self-problem representations and such self-plan representations to provide "self-pain" and "self-pleasure" representations having assessable quantities (preferably as described in connection with the discussions herein regarding emotional systems); processing data regarding such story elements of such story-series of such non-natural-language concrete circumstance interpretations to identify a first series of such story elements which result in a selected level of unpredicted "self-pain"; processing data regarding such first series of such story elements to create a learned self-problem representation; processing data regarding such story elements of such story-series of such non-natural-language concrete circumstance interpretations to identify a second series of such story elements which result in a selected level of unpredicted "self-pleasure"; processing data regarding such second series of such story elements to create a learned self-subgoal representation (i.e., doing relevancy learning from such a story interpretation).

"Meta"-Interface System

For ease of use in designing objects for "worlds" for simulation computation according to this invention, or for fast entry of appropriate "defaults" in using incoming language to evoke the ADS, it will be most efficient to be able to assign numerous PF's to an object (and to "lock out" from assignment other PF's). For this purpose, according to this invention, a "meta"-interface system may be used in which the user selection screens have natural-language categories of behavior, etc., which may be selected for each object; and such selection at the top user level enforces the desired specific PF assignments/lock-outs to be made. According to the present invention, such meta-PF "buttons" may be "cascaded" in multiple levels to efficiently permit selection of even many dozens of PF's with one top-level selection (as more particularly described in the entertainment system description hereinafter).

Sociality

The ways in which the ADS' feelings and social interaction are systematized may provide "empathic" maximum "user-friendliness" between humans and the ADS's of the present invention. Briefly, to begin to achieve such sociality according to the present invention, the ADS should be given, as a problem very high in its hierarchy, the "goal" of avoiding situations where it is not "copying" (like imitation, empathy, agreement, etc.) with the humans in its immediate company. The learning which will occur in this problem area will be of the "cultural" type so that the ADS will "fit in" to the "culture" or "civilization" in which it exists and will be under pain to learn the rules of such culture.

Friendship and Love

Also, according to this invention, the ADS should constantly compare its behaviors under specified circumstances with those of each human (or other humanoid ADS) around it and fix for each such "other" a number (say, from 0 to 100) for the relative number of behaviors in common with it; the ADS will thus determine which others are the most the "same kind" as the ADS and in what hierarchical amounts and order (called herein the "kind-number" or "K-Number" or "K#" assigned to each such "other" by such comparison program). Then, according to this invention, the K# will be used so that, in the ADS interrelating with a specific other, the amount of fear and other emotions associated with such aforementioned "not-copying" problem will vary roughly according to such K#. Thus, to the ADS, a K# of, say, 50 might represent a strong "love" relationship, and a K# of, say, 25 might represent a friendship; while a K# of, say, 8 might represent an alien or stranger.

Learning

According to the present invention, learning by an ADS may be seen as the addition of new thought-element data or the modification of existing thought-element data. For learning, there must be: (1) an internal signal that the current situations (the "now" as herein defined) require learning; (2) the saving or ability to save the "now" data for use in learning; (3) the kinds of defined-similarity provided by the thought elements of this invention, so that learning can proceed in an orderly manner beginning with small changes in previous most-similar data; (4) ways to indicate that learning of an appropriate nature has occurred; and (5) a learning procedure or program appropriate to the kind of learning being attempted.

According to the present invention, an ADS should "save" and store temporarily, for possible use in learning, a selected number of Sx's (structured situations), say about the previous (from current) eight seconds worth. Thus, for example, if about three Sx's are perceived each second, there will be (for a selected saving-period of eight seconds) 24 Sx's always temporarily so saved.

And the fast-forward simulation program used by the instant predictive planning system may be used to compute and so temporarily save, say, about the next eight seconds predicted to occur. Thus, for example, if about 10 Sx's are predicted-computed each second, there will be (for a selected saving-period of eight seconds) 80 consecutive "future" structured situations always so saved. When the "16-second window" comprising the "now" may be herein mentioned, it refers to this continuous temporary saving of "now" data for storing and use whenever a mentioned learning signal occurs.

Cognitive Learning

According to this invention, cognitive learning in an ADS has to do with (1) maintaining appropriate assignment of PF's (and RF's) to thing-types or Px's for use in "recognition", and (2) modifying existing PF's or adding to the store of PF's. The signal that cognitive learning should be done (using the current or "now" data to be saved upon such signal), according to this invention, will be either (1) inability to perform "recognition" of something during a construction of an Sx, which signal may be used to add to the feelings system as an "unpredictability arousal" contributing by addition to total arousal and thus pain/pleasure, or (2) inadequate prediction (see the flowchart of FIG. 10A) by the system predicting/simulating the "future", discovered by regularly comparing predicted Sx's (for a selected time-frame) with actual perceived Sx's in that time-frame, which signal may be also be used to add (to the feelings system) unpredictability arousal. It is noted that, in the predictive planning system, failure to real-time achieve a predicted plan-node status is a similar signal as for unpredictability arousal and also may form the basis of a separate "disappointment arousal". Similarly in the case of surprise.

The cognitive learning procedure for an ADS, according to this invention, constitutes experiment, either by external "playing"/experimenting in the real world or by internal experiment in which possible new PF data is "tried" in the prediction system to measure whether (and how much) the data substitution helps to make the predicted outcome equal the saved actual outcome. And the order of such data changes to be attempted will be from most similar to gradually less similar data, reminding that in the PF structures of the present invention, the degree of similarity is defined (by the relative "distance" from "sameness").

Briefly, according to a preferred embodiment hereof, for such cognitive learning, we provide a computer system for machine learning from an environmental situation in an autonomous decision system, comprising: computer processing means for processing data; storage means for storing data on a storage medium; input means for providing temporally-incremental input data about a series of such environmental situations; concrete-situation means for processing data regarding such temporally-incremental input data about such series of such environmental situations to provide a temporally-incremental series, respectively, of "present" concrete self-situation representations of such respective environmental situations, wherein each such self-situation representation comprises a self representation and a set of event representations, each such event representation being represented specifically spacio-temporally relative to such self representation, and each such event representation including a behavioral-type designation selected from a set of behavioral-type designations, each such behavioral-type designation of such set of behavioral-type designations being associated with a set of incremental behavioral self-tendencies for determining incrementally-predicted self-situation representations from a such presented self-situation representation; and a set of current-behavior designations associated with each such event representation specifying the current behaviors of each such event representation; and further comprising predicted-situation means for processing data regarding a first of a such series of "present" concrete self-situation representations of such respective environmental situations to provide an incremental simulation of a set of "predicted" concrete self-situation representations; comparing means for processing data regarding, for a corresponding particular time, a such "predicted" concrete self-situation representation with a such corresponding "present" concrete self-situation representation to identify any selected minimum event differences between such compared concrete representations; difference-storing means for storing data regarding such concrete self-situation representations having at least such identified minimum event difference and such particular "present" concrete self-situation representation from which such identified "predicted" concrete self-situation representation was computed; choosing means for processing data regarding choosing a modification in a such incremental behavioral self-tendency likely to decrease such event difference between such compared representations; testing means for processing data regarding, for such corresponding particular time, a such "predicted" concrete self-situation representation and a such corresponding "present" concrete self-situation representation to provide a new identified "predicted" concrete self-situation representation using such modification chosen for such incremental behavioral self-tendency; new-prediction means for processing data regarding comparing such new identified "predicted" concrete self-situation representation with such corresponding former "predicted" concrete self-situation representation to identify any remaining such event differences; and heuristic means for processing data regarding such modification and such event differences to heuristically choose further processing of data among at least the following: test a further modification of a such incremental behavioral self-tendency, or select for storage a modified incremental behavioral tendency, or combine for storage a such modified incremental behavioral tendency with a corresponding original incremental behavioral tendency as a replacement incremental behavioral tendency.

Relevancy Learning

According to this invention, relevancy learning in an ADS has to do with (1) addition of problem nodes or (2) addition of plan nodes. The signal that relevancy learning should be done (using the current or "now" data to be saved upon such signal), according to this invention, will be either (1) an unexpected (unpredicted) pain or fear in an amount exceeding a preselected threshold, signaling an unexpected problem situation (and thus requiring a new problem node), or (2) an unexpected (unpredicted) pleasure or fear-lowering in an amount exceeding a preselected threshold, signaling an unexpected problem alleviation (and thus requiring a new plan node). The relevancy learning procedure for an ADS, according to this invention, constitutes using the saved "now" experience [in the form of a short series of concrete situations or Sx's just preceding an unexpected pain or pleasure (or fear or fear-lowering)] and data-similarity considerations to write an appropriate new node, to be tested by its adequacy in further experience. Thus, briefly, in such computer system for saving and comparing such present and predicted representations, we provide such a system further comprising: means for processing data regarding such self-problem representations and such self-plan representations to provide "self-pain" and "self-pleasure" representations having assessable quantities; means for processing data regarding representation elements of such temporally-incremental series, respectively, of "present" concrete self-situation representations of such respective environmental situations to identify a first series of such representation elements which result in a selected level of unpredicted "self-pain"; and means for processing data regarding such first series of such representation elements to create a learned self-problem representation.

Further, FIG. 10B illustrates preferred steps in a computer program for implementing relevancy learning in an autonomous decision system, according to the following steps: initiating and storing representation data regarding a set of hierarchically-organized, relevant, non-linguistic relational "self"-situations comprising a set of hierarchically-organized abstract self-problem representations, and in association with essentially each of such abstract self-problem representations, a set of hierarchically-organized abstract self-plan representations each comprising a set of abstract self-subgoal representations; processing data regarding such self-problem representations and such self-plan representations to provide "self-pain" and "self-pleasure" representations having assessable quantities; processing data regarding representation elements of such temporally-incremental series, respectively, of "present" concrete self-situation representations of such respective environmental situations to identify a first series of such representation elements which result in a selected level of unpredicted "self-pain"; processing data regarding such first series of such representation elements to create a learned self-problem representation; processing data regarding such representation elements of such temporally-incremental series, respectively, of "present" concrete self-situation representations of such respective environmental situations to identify a second series of such representation elements which result in a selected level of unpredicted "self-pleasure"; and processing data regarding such second series of such representation elements to create a learned self-subgoal representation.

Motor Learning

According to this invention, motor learning in an ADS has to do with (1) selection of a set of serial motor actions to be learned and (2) practice of such ordered set of actions until the initiation of the set produces a smooth, coordinated finishing of the set. The signals/occasions for motor learning (using the current or "now" data to be saved upon such signal), according to this invention, will be either (1) the attempt to copy the actions of a nearby other of the same "kind" as the ADS (i.e., the ADS has a relatively high K# for the other), signaled by "not-copying arousal" in proportion to such K#, or (2) the attempt to externally experiment (or "play") with a thing in a non-coordinated way required by cognitive learning, using the signals and procedures of such cognitive learning.

Learning from Language

According to the present invention, in which natural language is seen as evoking substitute experience, similar ADS learning as set forth above may occur as a result of natural language. For example, language such as analogy and metaphor provides the "now"-data for the ADS and points (usually) to the similar cognitive data to be changed by experiment. Also, for example, language such as images and stories (involving "empathy" or "identification" of the ADS with a certain character) provide the ADS with experiences of pain and pleasure at certain points of "now"-data, permitting relevancy nodes to be changed by such experience. Also, for example, the natural language items or stories which the ADS "wants" to remember (for more "copying" with others, for instance) may be practiced as motor actions (called by us in this case "membering") until they may be "re-membered" by initiation of such motor action "string".

The Entertainment System

Figure 13:
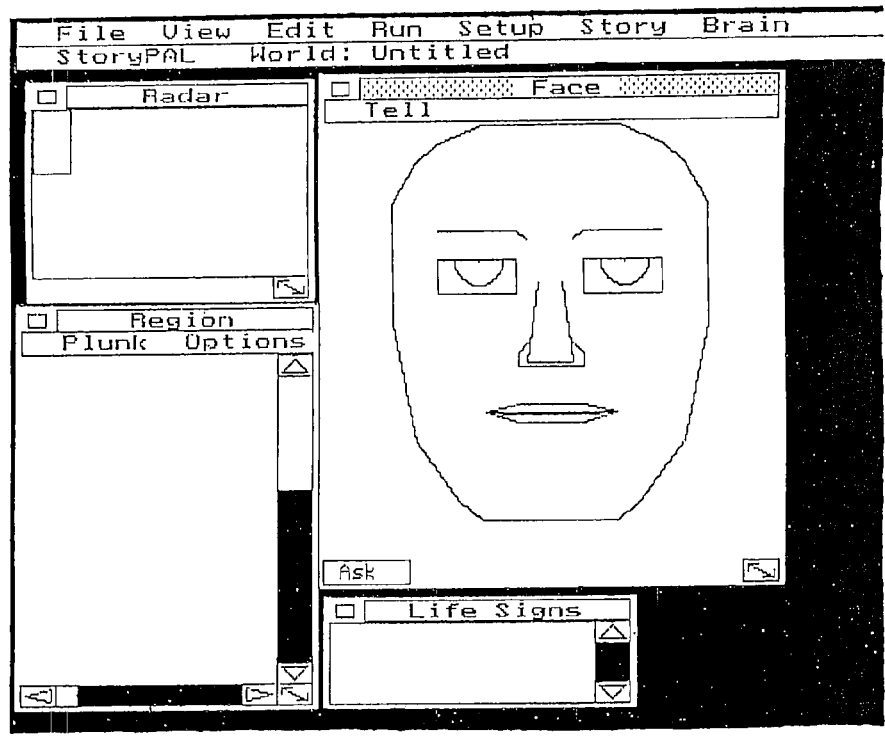
FIG. 13 shows a representative computer screen setup that a user might choose in "running" StoryPal.

The microfiche filed in the parent application shows the source code for a preferred embodiment of the present invention in the form of an entertainment or "game" entitled "StoryPal"™. This entertainment has two primary modes, delineated as "Design-A-World" and "StoryPal", or simply DAW and SP. Briefly, DAW permits the design of objects and worlds which can then be "run" (as in simulation); and SP permits an ADS (called "StoryPal") to be placed in a designed world to "live", tell "true" stories, etc. FIG. 11 shows a high level flow chart of this entertainment system; FIG. 12 shows a summary of the primary software systems and functions of this entertainment system; and FIG. 13 shows a representative computer screen setup that a user might choose in "running" StoryPal.

The source code is written in Turbo-Pascal language and may be compiled into executable disk files for loading onto a hard drive to run the program described. This program will run on the CPU platform of an IBM PC (or compatible), DOS version 2.2 or higher, minimum ram of 640 KB (one megabyte minimum is recommended), with available hard-disk space of about two megabytes plus room for user-created data (such as user-built worlds). The screen may be Hercules, CGA, and ATT400 in high resolution modes, EGA, VGA, and all associated monochrome versions of these standards. Any Microsoft (or compatible) serial or bus mouse will work, as will any PC analog joystick, and any printer. Sound output works using The Speech Thing™ produced by Covox, Inc. The program should be installed in a hard drive directory which also contains the SpeechV3 program (a TSR) to run The Speech Thing™; and there should be a \ICONS subdirectory for holding icon data; and there should be a \WORLDS subdirectory for holding worlds data.

The order in which the StoryPal embodiment of the present invention will be described is that, first, the screens and actions which will interest a "novice" user (who, e.g., does not want to create such user's own PF data) are described, and second, the additional screens and actions available to an "expert" user (who wishes fuller access to data additions and modifications, etc.) will be described. The style of description is that one might find in "manuals" for using these programs.

Design-a-World (DAW)

Some features of Design-A-World permit the user to select or design 2-dimensional computer "worlds" which is are complex, fully-interactive simulations or "artificial realities".

Using easy, natural-language interfaces, the user can design the "Things" of a world, including the use or design of icons (screen pictures) and some animation. At any time, the user may place a Thing in a world, move it, delete it, modify it, etc. With any world-design, the user may at any time "Run" the world in either continuous fashion or one step at a time, while looking at all or any part of the world the user wishes, or "Enter" the world by "becoming" any Thing in it and moving around by joystick or keyboard to interact with other Things, or Focus on any creature of the world, and display its metabolic life-signs (hurt, hungry, tired).

Watch how each independent thing interacts with all other things in the artificial reality.

StoryPAL (SP)

Some features of StoryPAL permit the user, at any time, to place the humanoid, StoryPAL, into any world to "live" there; to view a close-up of the emotive face of StoryPAL; and to view StoryPAL's life-signs. With StoryPAL in any world-design, the user may . . .

Have StoryPAL tell true stories (with true emotive face and lip-synch) about StoryPAL's experiences, even while the user is viewing those experiences, or "Pause" StoryPAL's experiences/stories to ask StoryPAL questions about the experience or the world or StoryPAL's feelings or remembering or thought-system, or Save StoryPAL's stories (while the user is present or not) and replay them at will, or trade stories/worlds with other users.

General System

A computer mouse may come in a variety of forms and may have from one to three buttons, or more. For those with three, the middle button is never used in StoryPAL, but only the left and right. The right button is used for only one function (called Plunking) and the left button is used for all other mouse clicking functions. Therefore, unless specified otherwise, all references to a mouse button mean the LEFT mouse button.

Figure 14:
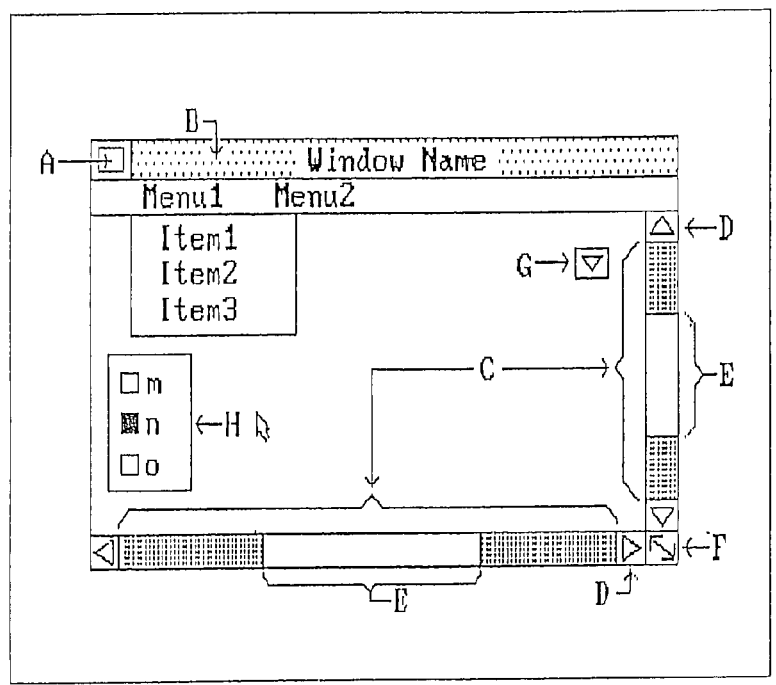
FIG. 14 illustrates the windowing system of the described entertainment embodiment.

StoryPal has its own windowing system. The following illustration of a window is not typical—it has more features in it than any window in the system, but each of the reference-letters in the window will be covered to illustrate our terminology. With particular reference to FIG. 14:

A refers to the "Close Box". Clicking in here with the mouse cursor arrow (see h. below) causes the window to go away or "close". If a window is on the screen that the user wants off the screen, use the close box.

B refers to the "Title Bar". As the name implies, it contains the name of the window. The title bar is more than the name of the window; it means the rectangle containing the window name and the dotted area around the window name. The title bar is used to move a window. If the mouse cursor arrow is anywhere in the title bar and the left mouse button is held down while the mouse is moved, the entire window moves with the mouse movements. Use this feature to relocate windows on the screen to desired locations. Moving a window is also called "dragging" a window (i.e. the window is "captured" by holding down the mouse button when the mouse cursor is in the Title Bar, then it can be "dragged" from one place to another). Also, if more than one window is open on the screen, only one is what is called "active". The active window is the only one in which or with which the user can perform activities. A user cannot perform any activities in an Inactive window. To "activate" a window click the mouse button anywhere in that window. What does that have to do with the Title Bar? The Title Bar is full of dots if the window is active, but the Title Bar has no dots in it if the window is inactive.

C refers to the "Scroll-Bar". Windows may have a vertical scroll bar, a horizontal scroll bar, a combination of vertical and horizontal scroll bars. (Some have no scroll bars at all). Sometimes what can be seen in a window is only a portion of what could be seen in it if that window was much bigger. The window might contain lines of text, but there are more lines than will fit at one time, and no text windows can be made larger by the user anyway. In StoryPAL a window called the Region window (which is re-sizeable by the user but isn't a text window) shows a portion of a whole world, but it is usually too small to show all of it. When a window shows a portion of a whole world and the user wants to change which portion is seen in the window, the process of changing which portion is seen is called "scrolling". The entire length of the scroll-bar represents the entirety of what could be seen. The thumbprint (see e. below) represents what the user is looking at, at the time. Changing what is seen (i.e. moving the thumbprint within the scroll-bar) is accomplished with the arrows described below in d., with the thumbprint (d.), with the up and down keyboard arrows, or with the Pg Up and Pg Dn keys. Note that ALL SCROLL-BARS ARE NOT ALIKE in that some have some of the scroll-bar-related features described here and some have others. Also note that there is an easier way to scroll the Region window; reference the Region Box in the Radar window description.

D refers to the "Scroll-Bar Arrows". Scroll in the direction of the arrow by clicking with the mouse while the mouse cursor arrow is on the scroll-bar arrow. A click on the up-pointing arrow in a vertical scroll-bar will scroll up. "Scroll up" means that the user will be able to see what is "above" that which is in the window now. Obviously "scroll down" means that the user will be able to see what is "below" that which is in the window now. Likewise, in the case of the Region window, "scroll right" and "scroll left".

E refers to the "Thumb-Print". Scrolling with the thumb-print can be accomplished by putting the mouse cursor arrow on the thumb-print, holding down the mouse left button and moving the mouse in the direction the user wants the thumb-print to move. The thumb-print will move in the direction of the mouse movement. The user can also put the mouse cursor arrow in the scroll-bar where the thumb-print is not (in the dotted portion) but where the user wishes the thumb-print were. Then press the mouse button and hold it down until the scroll-bar moves to that point. In some windows there is no way to move the thumb-print by clicking on the thumb-print or in the dotted area around it, but only by using the methods described above in d.

F refers to the "Size Box". Some windows sizes can be adjusted by the user. If they can, a size box is part of the window. A size box allows itself to be moved up and left to make a window smaller or down and right to make it bigger. Any combination of movements is allowed. For example, moving the size box to the left and down will make a window narrower but taller. Put the mouse cursor arrow on the size box, hold down the left mouse arrow and move the mouse until the size box is where it is desired. Releasing the mouse button will result in the window re-sizing itself to agree with the location of the size box.

G refers to the "Next Page Arrow" (and the "Previous Page Arrow"). Some windows (particularly those called "dialogue boxes") are not scrollable. In that case, if there is too much data to fit in the box an arrow like this one is seen. Clicking the mouse button with the mouse cursor arrow on this arrow causes the window or box to go to the next page of data. If the arrow points up (instead of down per the illustration) clicking on the arrow will move back to the previous page of data.

H illustrates how some lists are used for selection. As shown, there are three choices: m, n, and o. If the mouse cursor arrow is put on one of the boxes (or even if the user gets a little "sloppy" and puts the arrow on the word to the right of the box—e.g. in the illustration that would be one of the letters, since there aren't any words there) and click with the mouse button, the box will fill in solid indicating that item has been selected. In the example the user put the mouse cursor arrow on the letter "n" or on the box to the left of the letter "n" and clicked. That caused the box associated with "n" to fill in solid. This method of selection is used for the selection of Behaviors in the Thing Builder and for asking questions of StoryPAL.

Other items to note in the window illustration: The arrow to the right of the letter H in the illustration is the "Mouse Cursor Arrow". When the user wants to use it, make sure the point of the arrow is on or overlaying where the user wants to click. Menu1 is "open", meaning that its elements are showing. That would happen if the user puts the mouse cursor arrow on the word "Menu1" and pressed the mouse button. To keep the menu open the user would have to keep the mouse button pressed. If the user wanted to select Item2 the user would move the mouse cursor arrow down to "Item2" (while keeping the mouse button pressed) and would then release the mouse button. Item2 would then "happen". Menu2 is "closed", meaning that its list of selections is not showing.

If the user doesn't have or elects not to use a mouse, do the following:

2. Use the keyboard arrows to move the mouse in the direction desired. This must be accompanied by other keys as described following in 2.
3. While pressing the arrow keys, hold down the Shift key or pressing the arrow keys will not move the mouse cursor arrow.
4. While holding down the Shift key and pressing an arrow key the mouse cursor arrow will move
   a. A SMALL amount per arrow press if Caps Lock is OFF.
   b. A LARGE amount per arrow press if Caps Lock is ON.
5. Holding down the left Shift key while pressing the Enter key substitutes for the left mouse button. To be the equivalent of a mouse click, hold down the left Shift key while pressing the Enter key, THEN RELEASE BOTH, not just the Enter key.
6. Holding down the right Shift key while pressing the Enter key substitutes for the right mouse button. To be the equivalent of a mouse click, hold down the right Shift key while pressing the Enter key, THEN RELEASE BOTH, not just the Enter key.

Novice Main Screen Menus

Virtually all of the significant functions of the system are gotten to by starting with the Main Screen menus. With them worlds are opened, created or erased, what gets displayed on the screen is chosen, creatures (called Things) are created, stories are recorded, and the system is turned off.

Figure 15:
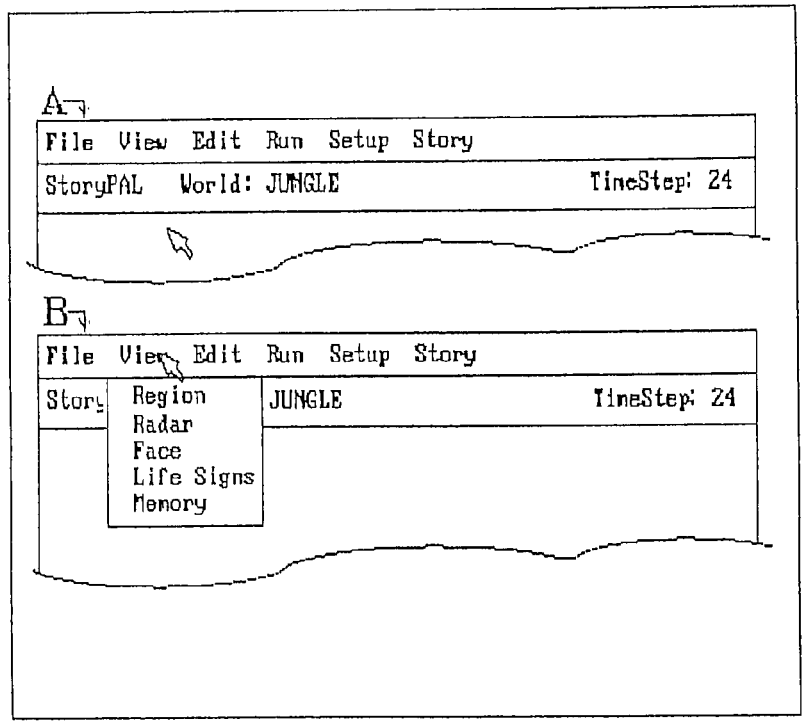
FIG. 15 shows the main screen of the entertainment embodiment, with no menus open and with the View menu open.

The menu titles for the Main Screen are always present at the top of the computer's display no matter what else is going on in the system. FIG. 15 shows the Main Screen. The top illustration (A) shows that portion which is always on the screen. The bottom illustration (B) shows one of the Main Screen's menus open, namely the View menu.

When the user is through running StoryPAL, exit the software by selecting Quit in the File Menu.

Selections having to do with recording and telling stories, narrating what is happening "real time", and asking StoryPAL questions are primarily found in the Face menu's Tell menu, although a couple items are in the Main Screen's Story menu. Note that there are two menus related to story telling, namely the Story menu on the Main Screen and the Tell menu in the Face window.

The File Menu

The File Menu is the "passport" to all of the worlds in the user's universe of worlds. With this menu the user can use, change, or erase those worlds that exist and can create worlds that don't yet exist. In StoryPAL a world is a place where pretend animals, plants, and non-living objects exist. We refer to all of these kinds of creatures and objects as "Things". A deer is a Thing. A tree is a Thing, and grass is a Thing. A rock is a Thing.

Within certain limits the user can control which things are in a world, how they behave, and where they are located in that world. The user can also name and rename a world. The user can "call up" an existing world, change it to suit and Save the changed world under a new name so that both the old and the new world are saved. And much more.

The details follow in the explanations of the individual File Menu choices:

Open

Figure 16:
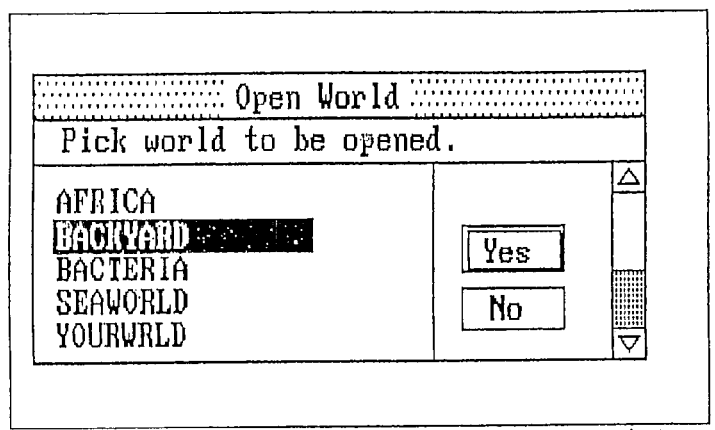
FIG. 16 shows the Open World dialogue box of the screens of the entertainment embodiment.

The user cannot use an existing world in any way (e.g. to run or change it) unless it is first "Opened". If the user initiates Opening of a world (by clicking on Open), a box containing the list of existing worlds opens up on the screen. Any one of them can be opened. Initially the top world is highlighted (in FIG. N-3 following, the world named Backyard is highlighted) but the highlighted bar can be moved to any world name in the usual manner (keyboard arrow or mouse). There may be more worlds saved than can appear in the box, so use the scroll-bar on the right edge of the box to find the one desired (or repeatedly click the down arrow on the right or repeatedly press PgDn or the down arrow key). Once the name of the world desired is highlighted, it can be selected by clicking on the Yes button on the right of the box, or by pressing the Enter key. If a world is open, and Open is selected again without closing that world, and any changes have been made to the already-opened world, a dialogue box will open asking whether or not to save the world that is opened in the changed condition. An answer of Yes means that the already-opened world will be re-saved as changed, and a No means the world will remain in its previously saved condition. If the user wishes to exit selecting a world to open, click on the No button (or press the Esc key) in the Open World dialogue box. FIG. 16 shows the Open World dialogue box.

Save

At any point while in Edit the user can select Save. What gets saved is the setup of the open world at the moment Save is selected, which includes what Things are available for plunking in that world (i.e. Things that have been built using the Thing Builder), which Things have been plunked, how many of each have been plunked, and the location in which each is plunked. Also saved is some world-specific Setup information such as world size and StoryPAL's IQ. First, if the user wants to open a world, modify it and Save it in place of the old version of it, use Save. Save takes what ever world is open on the screen and saves it under the same name used to Open it. That REPLACES the way this world was with the way it is now. When the box opens on the screen (the one saying "Save World, Please enter filename:"), the name of the world as it was opened appears. To Save the world on the screen under that same name, simply hit the Enter key. Second, if the user wants to open a world, modify it and save it IN ADDITION TO the old version, NOT eliminating the old version, use Save As.

TO USE SAVE AS, remove or erase the current name by typing Ctrl-Y (hold down the Ctrl key while pressing and releasing the Y key), then type the new name decided upon for the world (up to a maximum of eight characters). Certain characters aren't allowed in a world name. The user doesn't need to learn what these character are, because if disallowed characters are input, nothing will happen, so just select another character. If the user does want to learn which characters ARE allowed, they are the alphabet (A . . . Z), the numeric digits (0 . . . 9), the back-slash (\), the colon (:), the dash (-), and the underline (_).

If the user builds a world starting with New, that world does not have a name until the user gives it one. Therefore, after building a new world, when Save is selected, a name will not be seen in the "Save World, Please enter filename:" box. The user will have to enter a name (up to a maximum of eight characters as described above). File names are checked for error, and if the user enters an invalid file name a beep will sound, indicating the file name must be re-entered.

The new name is different from the old name if even one character is different (for example MYWORLD1 is different from MYWORLD2, even though only one of the eight characters is different). As an illustration, assume that a world called FETCH already exists and is Opened. Two more Things are added to that world, so that it is now different from when it was Opened. If the user wants FETCH still saved the way it was when it was opened, just AVOID saving any changed version of FETCH under the name FETCH. That can be done by saving what's on the screen with any other name. Saving what's on the screen as NEWFETCH (i.e. doing a Save As), or FETCH1, or FETCHIT, or DOG-GET, or anything else but FETCH will serve to end up with two worlds:, namely the original one still named FETCH and a new one (for example, DOG-GET). It is this ability to call up (Open) a world, change it a little or a lot without completely redoing it, and then saving it as a world with another name than enables the user to create new worlds from old ones without having to start from nothing and without having to lose the old world.

COPY A WORLD: The user can copy a world on a disk that can be given to another person for use in their computer (use "export" via copying, and THEY "import" that world via the Import menu item described below). Copying is effected by saving to a disk other than the one on which the user normally stores worlds (usually the hard drive, or C: disk), and to a device that writes on a medium that can be read on another computer. The most common device onto which the user would export a world is "floppy drive" A:, which is most likely a drive that writes on 3½ inch and 5¼ inch "floppies" which can be passed between users. To put a world on a floppy disk to give to a friend select the Save menu item, and when the Save World box opens on the screen, instead of just the world name, include the complete path-name, e.g., assuming the world on the screen is called FOREST, and the user wants to put the world on disk drive A:, type A:\FOREST. Doing so will Save the world FOREST to the disk in drive A: instead of the hard drive device C:. Be aware that saving to A: means it was NOT saved to C:, so if saving a world for the user and someone else also, do the following: First, Save to the file name only (e.g. FOREST), which will save the world to where it is usually stored (probably hard drive C:), then Save it again to A:\FOREST.

Sometimes the user may wish to re-Save a previously saved world after it has run a while (i.e. has been in Run-Go for a while). The positions or locations of the Things in the world are saved as of the instant Save is selected. If interrupted in the middle of a run and the computer is shut off, select Stop, then Save, and Save under another world name (i.e. a Save As).

This would mean that the world was saved once as it originally was under one name and saved again as it was after running a while under another name.

Close

Close removes the world currently Open, but first, if any Things were added or modified, a dialogue box will open asking if the user wants to save the world that is opened in any changed condition. An answer of Yes means that the already-opened world will be re-saved as changed, and a No means the world will remain in its previously saved condition. Close enables the user to do two things: First, the user can create a New world, do what is desired with it (such as set it up with Things and Run it), and then get it off the screen and out of the system without Saving it. The user might do that if that world isn't interesting. Second, the user may want to Open an old world, change it, run it, and want to get the changed world off the screen and out of the system without Saving it, while leaving the old version of it as it was before it was Opened.

After selecting Close, the screen has the same appearance as it does after selecting New (described below). However, opening the Thing Builder in the Edit menu right after selecting Close shows that, other than Shapes, there are no selections available, while all selections are available after selecting New. Close leaves the user needing to make one of several choices: Open another world? Select Open. Create a new world? Select New. Want to bring a friend's world into the system? Select Import. Through running StoryPAL for a while? Select Quit. If the user wants to build a New world, select New.

New

When StoryPAL finishes its start-up (i.e. finishes booting), the user is in the same situation exactly as if New were clicked. Sometimes the user will want to start a new world from scratch, a world with nothing in it. That may be because a new world is desired that is nothing like an old world, or even if it's something like an old world, there are so many differences it isn't worth the bother to open an old world and change it. If a world is already open on the screen when New is selected, that world will be Closed without Save and the user will be ready to Edit with the Thing Builder when it is opened, which will enable the user to introduce Things into this new world. When building the Things desired in the world, open the Region window and plunk them.

Please note that selecting New, plunking Things in it and then even Running it doesn't Save that world. No world is Saved until Save/Save As has been done for that world. Therefore, until a New world is Saved, it will "go away" if it is Closed without a Save, or if New is selected again without Saving the New world that was just finished. Avoid letting the hard, creative work of building a world go unsaved.

There is a world called NEW that is the base data for all worlds, and it sits in the same subdirectory as the executable StoryPAL, and is not in the WORLDS subdirectory. Therefore, if New is clicked, the world titled New is loaded from the executable StoryPAL subdirectory. However, if a world is saved as the name NEW, that Save will go to the WORLDS subdirectory, which leaves the NEW world in the executable StoryPAL subdirectory unchanged. Why? So that it can be used again to build another world from scratch—over and over. If the NEW world becomes corrupted in the executable StoryPAL subdirectory, just reload it into the executable StoryPAL subdirectory from the disk supplied.

Change Dir

If the user wants the current DOS directory to be other than the one now pointed to, click on this item. Doing so will open a window indicating the DOS directory currently pointed to. Using the Ctrl-Y, Delete, and/or Backspace keys remove the indications of the current directory and then type in the preferred current directory. The Install program sets up directory paths that will prevail if they conflict with what is set with Change Dir. If the user wants to specify the paths for such items as where to save a world on an "as-you-go" basis instead of simply letting the Setup System Paths handle it, blank out the Setup System Paths and use Change Dir. If all the Setup System Paths are in place and changes aren't desired, then don't use Change Dir.

Import

The purpose of this menu item is to enable the exchange of worlds between StoryPAL users. Import enables the user to bring into StoryPAL worlds Copied by someone else. Copy enables a user to copy a world he or she owns onto a device that another user can use to bring into their system (usually a floppy disk). See Save for a description of how to copy a world onto a device (such as a disk) that can be handed to someone so they can Import that world into their computer. If Import is selected, a box (titled Enter Import Pathname:) will open on the screen indicating the device the StoryPAL system intends to look for. The usual import device is from A:, but if importing from a device other than A:, simply enter the complete path-name and then press the Enter key. After the Enter key has been pressed, another box will open on the screen that looks like the one in Open or Copy that shows world names. In this case, the worlds shown are the ones in the Import device specified, and not the ones already in the system. Move the highlighted bar to select the world and copy it into the system and either press Enter or click on OK. That will cause the world highlighted to be opened on the screen. At that point the selected world is not yet copied into the drive in the computer where the user's already-existing worlds are.

If the user wants the world now on the screen from the import device saved in the computer's drive where the rest of the user's worlds reside, then Save it by using the Save item in this menu, the File menu. Note that if the name of the world on the screen (from the Import device) is exactly the same as a world in the current system, Saving the one on the screen will overlay or replace the one in the current drive, and the existing one in the current system will be lost. If the name of the world on the screen matches a name in the system and the user does not want the world in the system replaced, simply change the name to a unique name before it is Saved. If the user specifies a device from which to import a world and StoryPAL cannot find a world on that device, a message will appear on the screen so indicating, and no importing can take place. The necessary format for importing is to have a subdirectory whose name is the same as the world's name, and all necessary files describing the world must be under that subdirectory, and have the same name as the world-name/subdirectory's name (only the extensions vary).

Erase

Erase eliminates an existing world from the StoryPAL system. It's as though it never existed. Selecting Erase opens up a box that looks like the Open box (except that the title indicates Erase instead of Open), namely a box that lists the existing worlds for selection for Erase. Why might the user Erase a world? Because it is not liked, it's not interesting, it hasn't been run for a long time, the list of Worlds too long to go through to find the one desired and getting rid of some old worlds will help, or that the drive Worlds are stored on is getting too full and it's time to free up some storage space. Erasing a record erases it from off its storage device (e.g. the hard drive), but if that world is open on the screen it does not Close the world. So if the world exists on disk and on the screen, to eliminate it completely, both Erase it and Close it.

About

This item opens a box which tells about the StoryPAL version running. No functionality regarding the system is accessed or initiated through this box.

Quit

Note that Quit is ineffective if in Run-Go mode. If the user is in Run-Go mode and wants to Quit, go back to the Run menu and select Stop. Then select Quit. Selecting this item exits out of StoryPAL and back to DOS. The user can restart StoryPAL by typing in "StoryPAL" at the DOS input prompt. If a world is open, and Quit is selected and any changes have been made to the already-opened world, a dialogue box will open asking whether to save the world that is opened in the changed condition. An answer of Yes means that the already-opened world will be re-saved as changed before StoryPAL exits to DOS, and a No means that StoryPAL will exit to DOS without executing any data saving routines. IF THE USER SELECTS QUIT AND CHANGES HIS MIND (doesn't want to Quit after all, or it was selected by accident), instead of clicking on Yes or No in the dialogue box, press the Esc key.

The View Menu

The View menu enables the opening of the Region, Radar, Face, Life Signs, and Memory windows (FIG. N-2 above shows the Main Screen with the View Menu open). These windows (excepting Memory) enable the user to view an Opened world, or see the detail of part of it, see StoryPAL's face so that its emotion can be seen and so that StoryPAL can communicate with the user, and see the levels of Hurt, Hunger, and Tiredness for any of the creatures on the screen. Once a particular window has been opened (e.g. by clicking on Region), trying to open it again (e.g. by clicking on Region again) has no effect.

Region

Selecting this item opens up the Region window. The Region window shows just a portion of a world (i.e. just a region of the world is shown, unless the world is quite small, in which case the entire world will be shown in the Region), but shows that portion or Region in detail, with an identifiable picture (icon) for each Thing within its field of view. The Region window is used to introduce Things into a world at a specific location (called Plunking). Details on the workings of the Region window will be hereinafter supplied.

Radar

Selecting this item opens up the Radar window. The Radar window shows all of the world, no matter what its dimensions, but each Thing is represented only as a dot to mark its location in the world. Details on the workings of the Radar window will be hereinafter supplied.

Face

Selecting this item displays the Face window on the screen. The Face shows emotion, tells stories, enables selection of the kind of story to tell, and some other controls. Details on the workings of the Face window will be hereinafter supplied.

Life Signs

Selecting this item displays the LifeSigns window on the screen. Each Thing in a world has "registers" (places to store number values) to show how much that Thing has been Hurt, or is Hungry, or is Tired. The LifeSigns window shows the values at any point in time for any Thing's Hurt, Hunger, or Tired registers. The display is a small window with the name of the Thing at the top and a number next to the name. The number is to enable the user to distinguish between multiples of the same kind of Thing in the world. For example, if four rabbits are plunked in the world, each rabbit's LifeSigns window would say Rabbit, but each would have a different number. The values for Hurt, Hunger, and Tired are shown as a horizontal bar graph with minimum (zero) being the bar at the far left and maximum being the bar extended all the way toward the right. The user can change which Thing's Life-Signs is showing by clicking in the up or down arrows on the right of the box. When the LifeSigns window is first opened, StoryPAL's LifeSigns window shows automatically.

Memory

The window that opens shows how much free RAM (main memory) is available both with a number and with a horizontal bar graph. If RAM memory is at a premium, it can be maximized by being sure unneeded programs (TSR's) are not in memory. This may require modifications to the AUTOEX-EC.BAT program which may be loading unnecessary TSR's in memory.

The Edit Menu

The Edit Menu opens up only one window (if an icon editor included, it will be a selection in the Edit menu, meaning there would be two choices in the Edit menu: Thing and Icon), namely the one used to edit the Things which can be placed into a world, and that window is called the Thing Builder. Actually the Thing Builder is a series of windows used to create a Thing. The Thing Builder enables the user to change the characteristics of an existing Thing, create a new Thing by assigning it a name and various characteristics, and eliminate or destroy a Thing that is already in a world.

Things are "world specific", meaning that a Thing that is in one world does not automatically exist in another world. As an example, if the user creates a Rabbit in FARMWRLD, that Rabbit exists only in FARMWRLD. The user cannot transport or copy that same Rabbit into other worlds. If the user wants a Rabbit to exist in WOODSWLD that is exactly the same as the Rabbit in FARMWRLD, make notes about all the selections regarding the Rabbit's appearance and behaviors as they were set up in FARMWRLD and create a Rabbit in WOODSWLD by selecting the same characteristics. There is a limit of ten different Things that can be created to exist in any one world.

Things need several characteristics to work in a world and to enable StoryPal and other Things to recognize, interface, or interact with them. These characteristics fall into the categories of sensed characteristics (i.e. able to be detected by the senses), and behaviors. The sensed characteristics of a Thing determine how that Thing is perceived by other Things. The behaviors of a Thing determine how other Things predict that Thing will tend to act. It is important to note that sensed characteristics and behaviors may appear to contradict. As an example, some insects have the sensed characteristic of being a vegetable because they look like a leaf, but they behave like an animal, namely an insect. Thus, the user may want to create a Thing that is an animal that has a shape of some vegetable.

To move from one Thing to another, the scroll-bar on the far right of the full Thing Builder window is used. That scroll-bar is part of all windows related to a Thing except for the Behavior windows. Clicking on the up or down arrow in the scroll-bar area moves to the prior or next Thing for editing.

The Thing Builder is unique in that it is not a single window but rather a series of windows. Each kind of window is accessed from the Select menu in the Thing Builder. The window types are outlined following, then detailed explanations for building a Thing follow.

1. The sensed characteristic windows. These all show the Thing's Name, Shape (picture or icon), and a list of the possible choices in each category of sensed characteristic. The various windows are selected in the Select menu.

a. SHAPE: Shape is the window that appears when the StoryPAL system starts. There are too many shape-names to fit in one window, so StoryPAL starts out with multiple pages of shape-names. It is in the Shape window(s) that the Thing's Name and Shape are usually selected.
b. SIZE: There are only three choices for size.
c. COLOR: There are five choices for color.
d. TEMPERATURE: There are three choices for temperature.
2. The Behaviors windows. These windows contain their own instructions and are a bit more complicated to use than the sensed characteristics windows. Selections here determine how the Thing will behave in relation to its surroundings and in reaction to its own body signals.

The Select Menu

Figure 17:
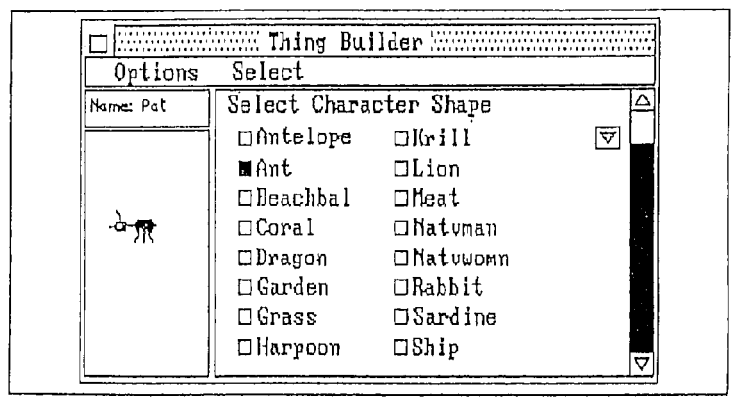
FIG. 17 shows the Thing Builder's first window.

FIG. 17 shows the Thing Builder's first window. The following describes the functions that can be performed by any and all windows that result from selecting any item in the Thing Builder's Select menu.

Name

To activate the Name area to enter or change the Thing's name, click anywhere in the Name box. The Name can be entered while any of the Shape, Size, Color, or Temperature windows (see the Select menu) is on the screen, but since a Thing is usually named early in its "creation", it is usually done from the Shape window. If there is no Name yet for the active Thing, with the cursor at the first (left-most) space in the Name space of the Thing Builder (see FIG. N-4 above), type in the Name desired. If there is a Name already in place and it needs to be changed, move the cursor to the place in the name using the keyboard arrow keys, then use the Delete and BackSpace keys to get rid of unwanted characters. The user can eliminate the whole name with the same keys, or move the cursor to the first letter of the name and press the "Y" key while holding down the Control key. Ctrl-Y eliminates from the cursor to the right, so if the cursor is in the middle of the name when Ctrl-Y is used the right half of the name will be eliminated.

The Name can be anything, and need not be the same as the Shape's name. One impact elsewhere in StoryPAL of selecting a Name is that if the Names On option in the Region window is selected, the Name used for a Thing will be the Name that will appear in the Region and Radar windows. Another is that this is the Name StoryPAL will use for the Thing when StoryPAL tells a story involving the Thing, or StoryPAL is answering questions. As with the Things around the "real world", having a word to refer to them is handy. Sometimes the name of the Shape is also used for the Name, but not necessarily so. For example, the user could pick Lion for the Shape and see a lion-shaped icon appear in the icon sub-window. Lion could be used for the Name. But so could Leo or Liz. The user could even use the Name Cow along with the Shape of Lion.

Shape

The Shape can only be edited from the Shape window (see the Select menu). Even though the icon also appears in the Size, Color, and Temperature windows, it cannot be changed from any of them. In the right-hand two-thirds of the Shape window are the Shape choices, each with a small box in front of it. The names in the Shape windows are in alphabetical order to help in finding the one desired. Some of the names are abbreviations because the Shape names are the names of the file name of the icon, and that is limited to eight characters. [If an icon editor included in StoryPAL to enable the user to add or change icons, StoryPAL icons are in BGI format with a unique header. Any shapes a user might add would be included in the same list in the Shape windows, all alphabetized together. Each icon has a picture or visible shape, such as the shape of a tree, and also an icon shape. The picture is within and part of the whole icon. The part of the icon that is not the picture is the same color as the background and therefore invisible. It is always rectangular. The upper-left corner of the total icon is a dot called the "Hot Spot". No matter which direction the picture is facing or which direction the icon is moving, the Hot Spot is the upper-left corner of the icon. When Things/Icons interact, it is only the Hot Spots which interact, i.e. pictures don't interact with pictures, but rather dots called Hot Spots interact with Hot Spots, and regarding interaction, the rest of the icon is not relevant.]

Clicking on the Shape name or in the small box in front of the Shape name will cause that small box to change from being outlined to being filled or solid and will put the icon associated with the selected Shape in the box that shows the icon for that Thing. Shape names are too numerous to fit in one window, so there is a little box near the right-hand edge of the window, just to the left of the scroll-bar with an arrow in it pointing down. If the user clicks in that arrow box the next group of Shape names will appear. In the next window there's also a box with an up arrow in it so the user can go back to the previous set. As long as a window of Shape names has a down arrow in it, it means there is another group of Shape names. When there is only an up-arrow box the user is at the last Shape window. StoryPAL starts with two full windows of choices plus a partial third window.

Most shapes have more than one icon associated with them. This is so that the icon will change so that the Thing will look like it's doing different actions. As an example, all the Lion icons look like a lion, but while there is one that appears if the Lion is just standing there, there is one that shows the Lion running as if it's chasing something, and one that makes the lion look like it's sleeping. In fact, there are ten different icons for the Lion. There are twenty-one icons for the Native Man. If the mouse cursor arrow is put anywhere in the icon image window and clicked, and if there is a Shape there that has more than one icon, StoryPAL will scroll through all of them. The icons will be used in the Region window, which is described elsewhere. The various choices of icon for the any one shape will change depending upon what the Thing is doing at the moment. If the user fails to select a Shape, then in the Region window, in place of an icon will be a dotted box with a question mark, which is true even if the user leaves out selections other than a Name. Failure to select a Name means the Thing does not even exist.

Size

Figure 18:
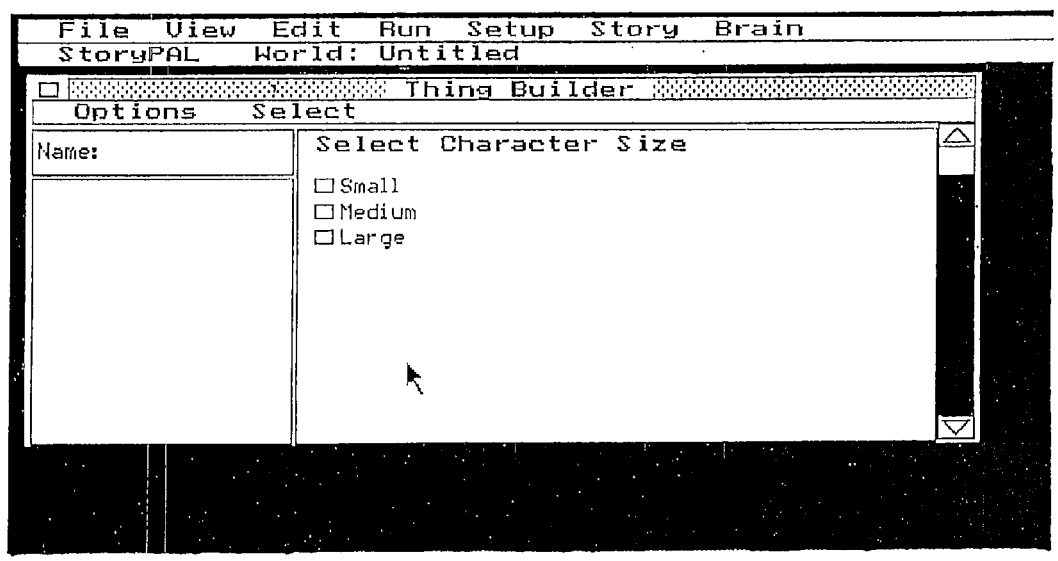
FIG. 18 shows the Thing Builder's size selection window.

FIG. 18 shows the Thing Builder's size selection window. Size can be selected or changed only in the Size window (select Size in the Select menu). The Size selected need not be consistent with what may be considered "logical" from the Name and Shape. For example, the user could name the Thing Monster, select a Shape of Whale, and set the Size as Small. There are three sizes available, the "traditional" Small, Medium, and Large.

Color

Figure 19:
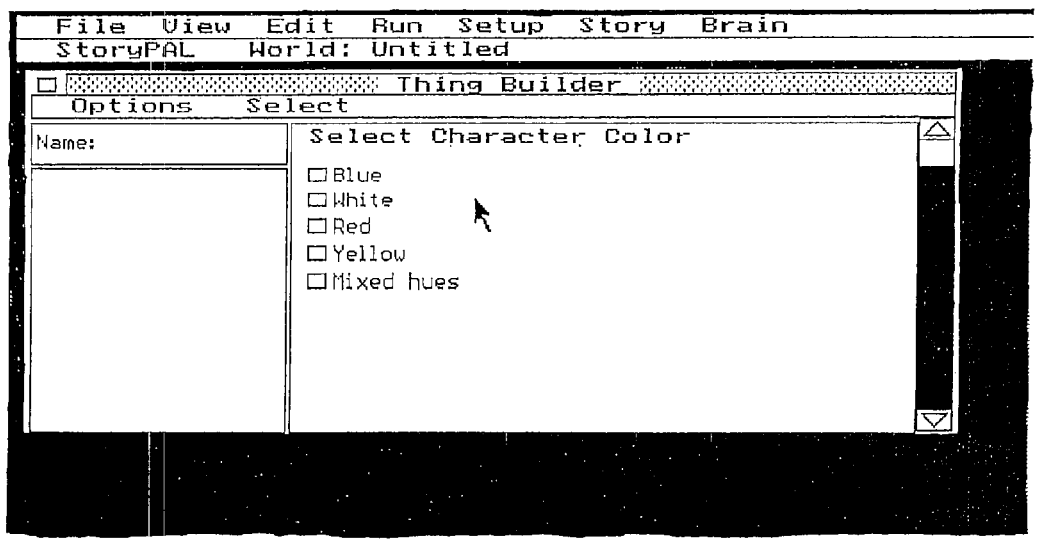
FIG. 19 shows the Thing Builder's color selection window.

FIG. 19 shows the Thing Builder's color selection window. Color can be selected or changed only in the Color window (select Color in the Select menu). The Color selected need not be consistent with what may be considered "logical" from the Name and Shape. For example, the user could name the Thing "Monster", select a Shape of Whale, see a gray icon (if the user has a color monitor), and set the color as Red. Regardless of how many colors the user's monitor shows or doesn't show, the choices in this window are limited to Blue, Yellow, Red, White, and Mixed Hues.

Temp

Figure 20:
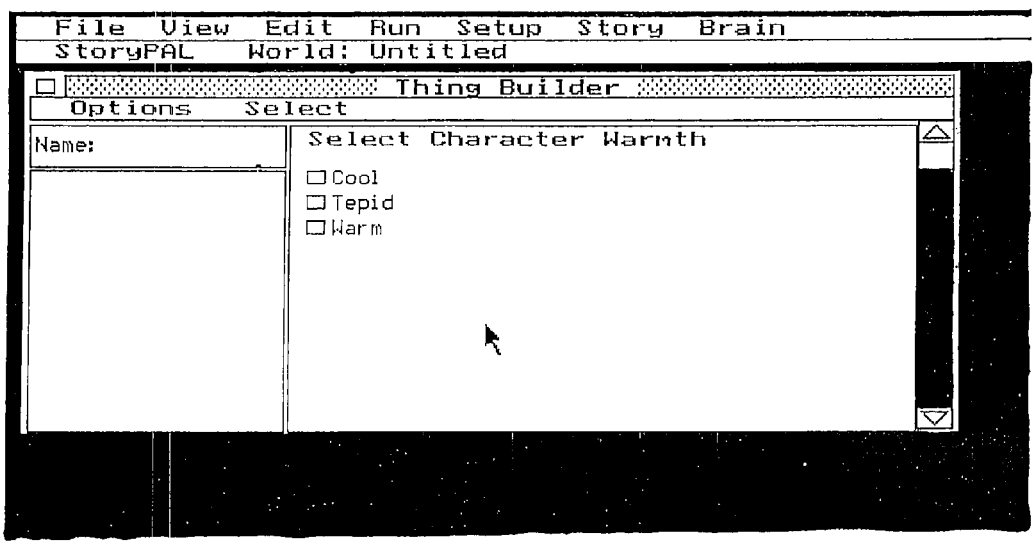
FIG. 20 shows the Thing Builder's temperature selection window.

FIG. 20 shows the Thing Builder's temperature selection window. Temperature can be selected or changed only in the Temp. window (select Temp. in the Select menu). The choices are Warm, Tepid (meaning moderately warm or lukewarm), and Cold. If desired, the user could have a Cold lion. Or even a creature that's really warm (e.g. the lion again), but wearing a shield to keep from being detected by infrared sensors, so the user could select Cold for how another Thing would sense the lion.

Behaviors

In the Select Menu click on Behaviors. There are five Behaviors pages. Each contains instructions at the top and the first four pages have additional instructions mixed in with the choices.

At the far right of each page are up to three buttons the user can click on:

NEXT takes the user to the next Behaviors page. If there isn't a Next button it's because it's the last Behaviors page.

PREV(ious) takes the user back to the previous Behaviors page, or if at the first Behaviors page, it takes the user back to which ever sensed characteristic window was showing before Behaviors was Selected.

DONE is a shortcut button. To illustrate how it helps, if the user is in the fifth Behaviors window and wants to get out of the Behaviors windows to the Shape window. Without a Done button the user would have to click on Prey five times to get to Shape. But when Done is clicked, the user is returned to the sensed characteristics window.

Several Behaviors are mutually exclusive. For example, one Thing cannot be both a fetchable thing (such as a ball) and a fetcher (such as a dog). Therefore, there are some Behaviors, which once they are selected, lock out the selection of other Behaviors. In the first Behaviors window select Live-vegetable-like. Now select Mineral-like. It doesn't work. If the user wants to select Mineral-like, first click again on Live-vegetable-like (which de-selects it as evidenced by the box returning to outline form from filled form).

Now, going through the Behavior windows one at a time:

First Page

Figure 21:
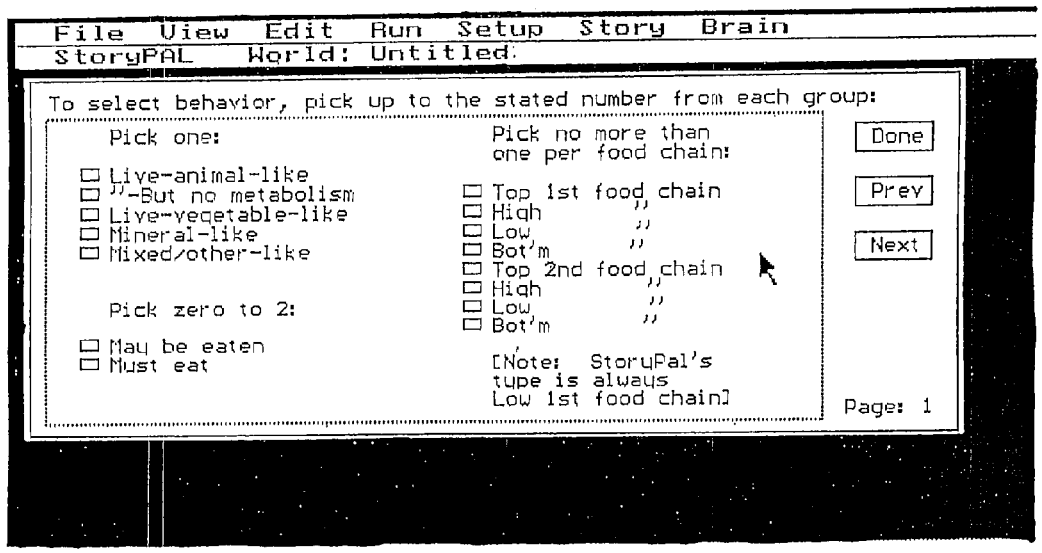
FIG. 21 shows the first page of the Behaviors windows.

FIG. 21 shows the first page of the Behaviors windows. Pick one, but only one, from the first group (upper left), except that one can select both a live animal and no metabolism. A live animal with no metabolism means it doesn't get hurt, hungry, or tired, and therefore doesn't die from injury, starvation, or exhaustion. From the second group (lower left) pick neither of them, either one, or both. From the third group (right side), select how the Thing fits in either or both food chains (ignore this group if this Thing doesn't fit in a food chain, e.g. a tree, a picnic blanket, or a cave may not fit in a food chain).

A food chain is a hierarchy where some creatures eat others and are eaten by others. A food chain example could start with a Lion at the Top which eats the Dog which eats the Rabbit which eats the Grass which is at the Bottom of the chain. StoryPAL allows for two food chains maximum and a maximum of four levels in each food chain. It is not required that both food chains be used, nor is it required that all four levels in a food chain be used. The hierarchy is Tops eat Highs which eat Lows which eat Bottoms. Tops do not eat Lows and Highs do not eat Bottoms (i.e. a Thing only eats a Thing immediately below it in its own food chain and does not eat Things two levels down in its own food chain). Tops eat but are not eaten (one cannot have both "May be eaten" and "Top 1st food chain" turned on for the same Thing—StoryPAL prevents it). Bottoms are eaten but don't eat (therefore the "Must eat" and "Bot'm 1st food chain" cannot be on simultaneously). Both Highs and Lows eat and are eaten. Things in the first food chain do not eat anything that is only in the second food chain and vice-versa. Something may get eaten in both food chains, but that will only happen if it is deliberately placed in both food chains. Any one Thing may be in either the first food chain, the second food chain, or both. However, it can occupy only one place in any one food chain. If a Thing is in both food chains it does not have to be at the same level in both chains. The Lion could be at the Top of the first food chain, but be High in the second food chain. StoryPAL is in a food chain. StoryPAL is only in the first food chain and its position is Low. That is not alterable by a user.

Second Page

Figure 22:
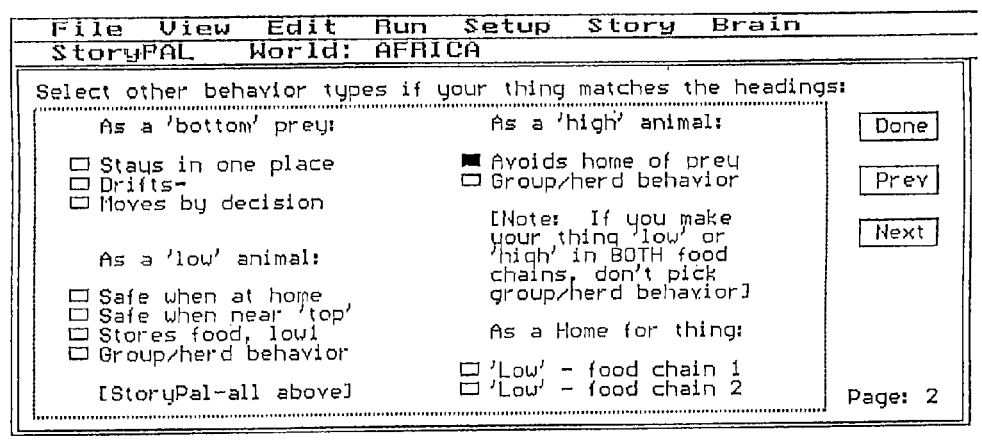
FIG. 22 shows the second page of the Behaviors windows.

FIG. 22 shows the second page of the Behaviors windows. "As a 'bottom' prey" refers to Things that are at the Bottom of either the first or second food chain. "Moves by decision" would apply to an animal such as a rabbit or a mouse. The rabbit would move according to a decision it made after evaluating its surroundings and its own condition. If it does not move by decision, it either stays in one place (like grass normally does) or drifts (on the wind or in sea currents).

Regarding Low creatures, "Safe when at home" means that a High cannot eat a Low if the Low is at its home. The grouping at the bottom right allows a Thing to be designated as a Home for a Low Thing. Typically a tree or a cave may be designated as a Home for Low Things, in which case Low Things will seek out their home for safety if threatened by a High. In a food chain it may be that the Low is safe from the High if the Low is near the Top in its food chain. In the Lions eat Dogs eat Rabbits eat Grass food chain, one can select this option to cause the Rabbit to seek out the Lion as a safe place to be if the Dog is a threat.

"Stores food" is limited to the Low in the first food chain and means that it will store storable food it finds if it is not hungry. Otherwise, the Low only seeks food (i.e. Things at the Bottom of the food chain) if it is hungry, then it eats it on the spot. Group/herd behavior is the tendency to get and stay close to other plunked same Things. Building a Thing does not mean it can only appear in a world once. If one builds a Rabbit, the user can plunk several Rabbits in the world. If they have group/herd behavior the several Rabbits will tend to get and stay close to each other. Observe the note that if one selects to place a Thing as High and/or Low in BOTH food chains, do not select group/herd behavior for that Thing.

Third Page

Figure 23:
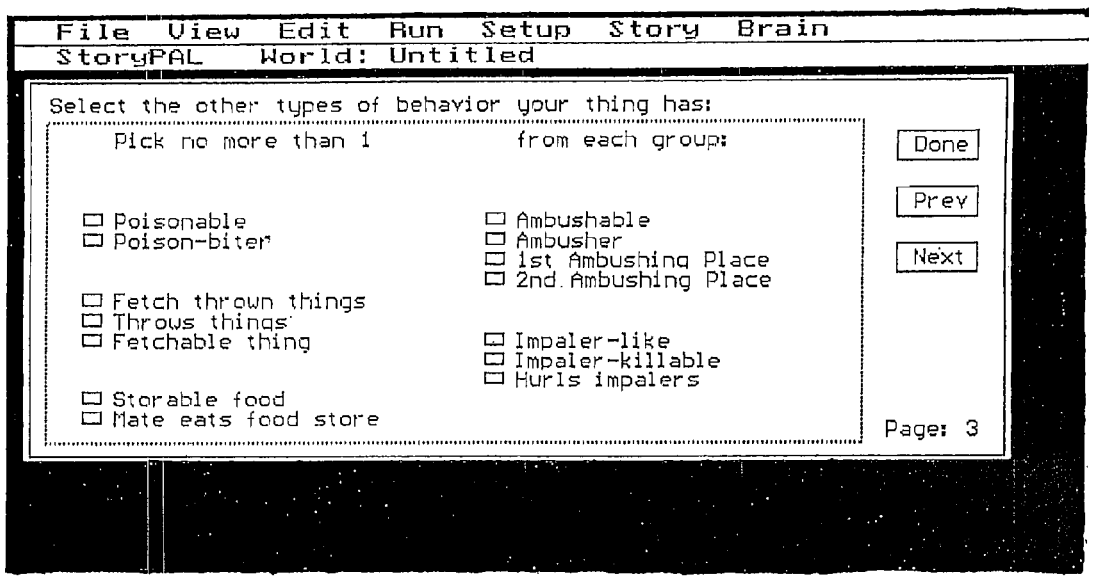
FIG. 23 shows the third page of the Behaviors windows.

FIG. 23 shows the third page of the Behaviors windows. The user doesn't have to select anything in this window. If not, a predator will go after its prey by chasing and catching it. Ambushers need places to hide. They don't chase their prey. They hide and wait for it to come close, then they pounce on it. For an ambushable situation to occur, three things are needed: a predator that ambushes (so make one Thing an Ambusher), a prey that is ambushable (so make one other Thing Ambushable), and a hiding place (or several of them) for the Ambusher (so make at least one other Thing an Ambushing Place).

Impalers are things like spears and harpoons. A spear is Impaler-like. A hunter hurls impalers. Something that will die if speared, is impaler-killable.

Fourth Page

Figure 24:
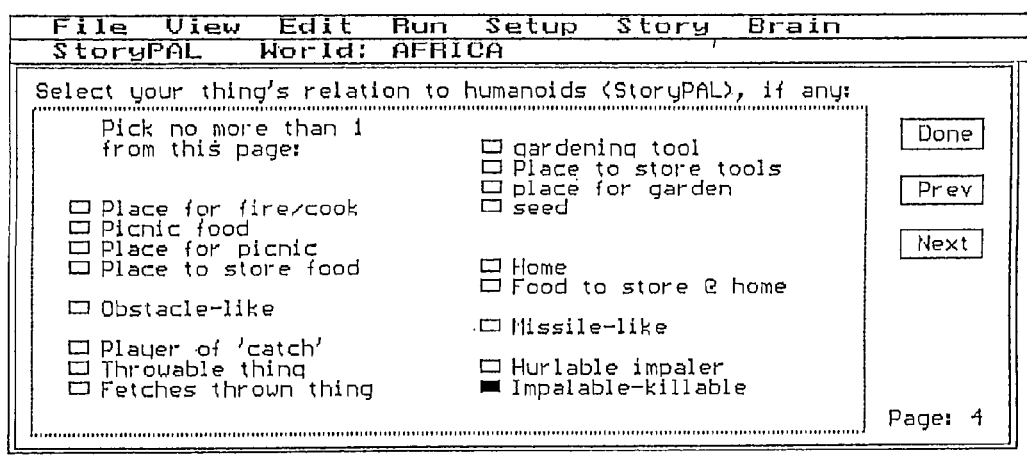
FIG. 24 shows the fourth page of the Behaviors windows.

FIG. 24 shows the fourth page of the Behaviors menu. This page is mostly for "civilized" worlds, not "wild" worlds. Note that one Thing can only be one of the items on this page. For the most part, the way to decide what, if anything, to pick on this page, consider StoryPAL existing in a world picnicking, playing catch, playing fetch with a pet, or gardening. Now consider how a Thing would relate to StoryPAL in that context. Examples: A steak might be "Picnic food" for StoryPAL, a hoe might be a "Gardening tool" for StoryPAL, and a dog might be something that "Fetches thrown things" for StoryPAL.

A Missile is a relatively fast-moving object which hurts live animals with metabolism. It bounces off the edges of the world (angle of incidence equal to angle of reflection) and is not stopped by anything in its path. Obstacles are Things which Things like StoryPAL cannot encounter without some injury and therefore avoid (change their course so as to avoid contact). "Stays as obstacle" is to be used for objects that are simply there and must be avoided by moving Things. DO NOT USE "STAYS AS OBSTACLE" FOR A HOME FOR A LOW THING. Avoiding obstacles takes priority over getting to a safe home, therefore if something is to be avoided as an obstacle it will not, in fact, be used as a home.

Fifth Page

Figure 25:
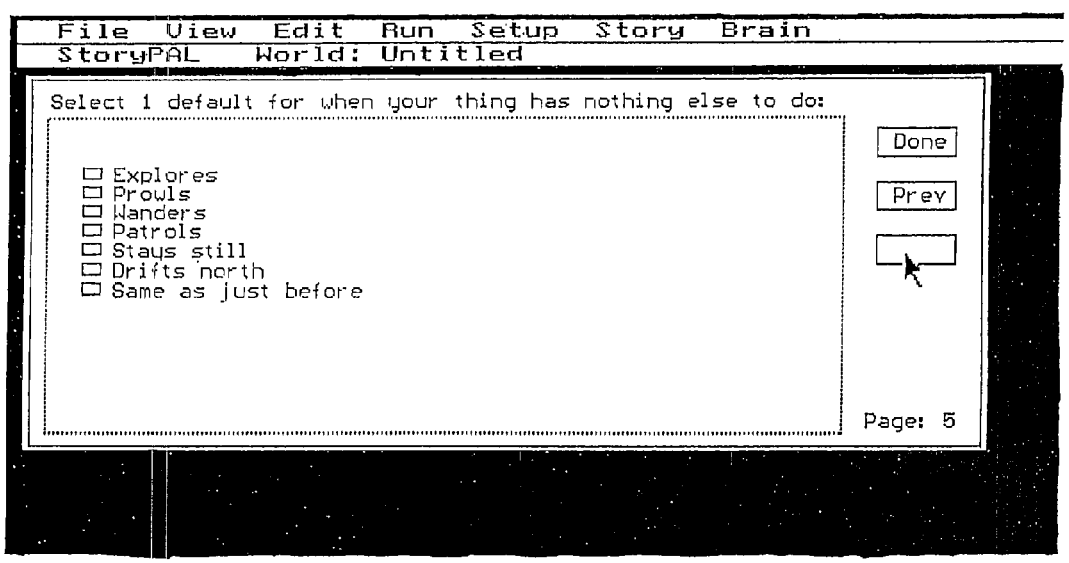
FIG. 25 shows the fifth page of the Behaviors windows.

FIG. 25 shows the fifth page of the Behaviors menu. The user must select one, but only one item from this page. This tells the Thing what to do if there's else nothing to do. In the case of some Things it is the only action (or lack of it) the Thing does. If a Lion has nothing else to do maybe it prowls. Maybe in an ocean the krill simply drifts north (from the bottom to the top of the screen). "Same as just before" means that this Thing will "do what it was doing when it had something to do". Staying still means simply that if the Thing has nothing to do it stops moving. This is for Things that tend to move if they have something to do, for example they go looking for prey if they are hungry or they look for a home if they are threatened, but they sit still if idle.

This ends the descriptions of the functions that can be performed by any and all windows that result from selecting any item in the Thing Builder's Select menu.

The Options Menu

Find

If the Name of a specific Thing is known, one can bring up its Thing Builder window by selecting Find, typing in the Name of the Thing in the dialogue box that opens, and pressing Enter. Note that only the first part of a name will work too, e.g. "ap" will find "ape", but it will also find "apple". If a partial entry matches more than one Thing's name it will stop on the first match it encounters.

Delete

Selecting Delete will remove the Thing that is on the screen from existing in the world. If that Thing happens to be plunked already, it will be unplunked (in other words, one can't have a Thing plunked in the world that no longer exists in the world). If the user is in the middle of building a Thing and doesn't want to continue (maybe it would be easier to start over, or simply decide to not want a Thing like this in the world) just select Delete and the partially-completed Thing will be deleted from the screen. If the user selects Delete, there's still a chance to change one's mind, as a dialogue box opens asking the user to select Yes, delete this thing, or No, don't. Selecting No returns the user to the Thing Builder as if Delete had not been selected.

The Run Menu

At some point while running a world with StoryPAL in it a High-1 (that's short for "A Thing that's designated as High in the 1st food chain") may catch and bite StoryPAL enough times for StoryPAL's Hurt (as seen in the LifeSigns window) to hit maximum, and StoryPAL will die. StoryPAL will also die if its Tired register reaches maximum (but StoryPAL will not die if its Hunger register reaches maximum). When StoryPAL dies (and stories are NOT being recorded) the world stops running and a dialogue box opens with a message announcing StoryPAL's demise along with an instruction to hit the Esc key. Doing so will make that dialogue box go away. Running stays on Stop, however, until the user selects Run then Go. Before doing so, one may wish to move StoryPAL or move the "killer" High-1 to avoid a quick repeat of StoryPAL's dying. (See Record On in the Main Screen's Story menu for what happens when StoryPAL dies and stories are being recorded). The other event that happens when StoryPAL dies is that its Hurt, Hunger, and Tired registers reset to the low values StoryPAL normally starts with.

Go/Stop

Selecting Go starts the Things moving around the World (and if Things are already moving, Stop makes them stop moving, but one will have to hold down the mouse button on Run until the mouse click "takes", as it only "takes" and opens the Run menu between TimeStep numbers). Since Go starts Things moving, a World must be open for Run to be meaningful. Should one select Go, then interrupt with Stop, then select Go again, the Things will start moving from the exact same position as when they were interrupted, as each Thing "decides" what to do that TimeStep based upon its environment at the instant of decision, just as real Things do. Thus it is not harmful in any way to interrupt the running of the World with Stop. When one has set up a new World on the screen the next step probably is to select Go and see if the Things behave as hoped. If not, select Stop and either rebuild a Thing or two, or just move one or more of them to different locations and Go again.

Run-Go Mode

In a number of places herein the phrase "Run-Go mode" is used. That means one has selected Go in the Run menu, and either Things are moving (which can be seen if the Region or the Radar window is open), or the user might be paused to ask StoryPAL questions because one has clicked on Ask in the Face window. Even if the user is paused to ask questions, the system can still be such to be in Run-Go mode, because as soon as the user is done asking questions the world (i.e. the Things in it) will automatically start moving again. The Quit function in the File menu will not work when in the Run-Go mode. This helps avoid "trashing" a running but perhaps unsaved world by forcing the user to select Run-Stop before Quitting. Sometimes the user may wish to re-Save a previously saved world after it has run a while (i.e. has been in Run-Go for a while). The positions or locations of the Things in the world are saved as of the instant Save is selected. If one is interrupted in the middle of a run and have to shut off the computer, select Stop, then Save, and Save under another world name (i.e. a Save As). This would mean the user would have the world saved once as it originally was under one name and saved as it was after running a while under another name.

Step

If one watches the TimeStep in the second line near the top, right side of the Main Screen, one will see it increment by one as the running of the World progresses. If the user wants to have the World run one step at a time, select this menu item. Doing so will cause the StoryPAL system to advance one TimeStep and then stop. To advance another TimeStep, select Step again . . . and again . . . and again. When through with the Step mode of running, switch to continuous run by selecting Go. Why might one select Step mode for a run or for part of it? It's a bit like slow motion. If one wants to see details of just when something happens Step mode can help. It also gives an opportunity to stop in between TimeSteps and maybe move a Thing or two, then step again for just one TimeStep to see what happens.

Reset Time

Selecting this item resets the TimeStep to zero. The TimeStep is automatically reset to zero every time a new World is opened. How far will the TimeStep display go before it resets itself to zero and starts over? More than 2 billion. If running a World, select Stop run and then later, without closing that World, select Run, the TimeStep will NOT automatically reset. If the user wishes to have the TimeStep reset to zero for some reason while the same World is open one would have to do it with this item. Why might one want to use the TimeStep as a reference? Perhaps to see how long (i.e. how many TimeSteps) StoryPAL survives in the World. The user might want to reset the TimeStep if it is used as a reference for some reason, e.g. if one Stops the World, change it (e.g. Plunk a new Thing in it), and then re-start (Go) the World.

The Setup Menu

System Paths

The StoryPAL software looks for Worlds, Icons for Things, and certain system-level files (e.g. graphics driver, character style files) in specific subdirectories. Unless one has sufficient DOS knowledge to set up one's own preferable subdirectories, leave the directories as we prefer. Changing them without setting up new subdirectories properly and moving the correct files into the proper subdirectories will result in the system having such failures as not being able to "find" the icons and therefore not showing any in the Region, not able to display screens at all or improperly because the system cannot find its graphics driver, etc.

Story Delay

Selecting this item can slow down StoryPAL's talking rate whether or not a Covox Speech Thing™ "voice" is attached to the computer and is on. The delay is placed between text strings of words that are sent to the Covox Speech Thing™ and the face as text. Unless the number is very big, it will not be apparent that it is effecting a slow-down if the Covox Speech Thing™ is on. If a Covox Speech Thing™ is not attached, the words can go racing by in the Face Window faster than they can be read. If the user finds the need for a delay in StoryPAL's talking rate, start with a value of 1000 for this value and adjust from there. The unit of measure associated with this value is milliseconds, so a value of 1000 is one second.

User Name

This is how the user introduces himself to the StoryPAL system so that when StoryPAL tells the user stories about what is going on in its life, StoryPAL can address the user by name. Try different spellings if StoryPAL mis-pronounces name, e.g. "Eileen" will not be pronounced "eye-leen", but will be pronounced "ill-in"; however "I-leen" sounds just right.

Joystick

This one is easy. Different joysticks and different computers result in varying minimum and maximum values being effective. A calibration is needed so that the joystick works properly for controlling Youser. One does NOT need to be an expert in joysticks and computer characteristics to set these values properly. Plug in any circuit board needed for a joystick into the computer. Plug in the joystick into the port. Start (load) StoryPAL. Select this menu item. A dialogue box will open with four values in it. Now move the joystick all around, including as far as it will go forward, back, to the right, to the left, in a circle, and untouched in the straight up position. StoryPAL will detect whether the values need to be changed and what to change them to. Any time computers and/or circuit boards and/or joysticks are changed, recalibrate by following this procedure. After recalibrating, BE SURE AND SAVE THE SETUP.

Stick Speed

If the user is going to have a Youser on the screen a decision has to be made about how fast Youser moves. Speed in StoryPAL means how far (how many pixels) Youser moves each TimeStep. All Thing movement in the system can be translated into pixels per TimeStep. What ever value a user enters here is how many pixels Youser will move each TimeStep if the Joystick is "maxed out" or "hard over" (as far in one direction as it will go). Moving the Joystick less than maximum in a direction will make the speed proportional to maximum.

A goal of selecting a speed might be to make becoming Youser in the World interesting. That might mean that a user can stay alive, but it's not easy. On the other hand, maybe just for fun every now and then, the user might prefer to make Youser fast in a World where everything else is slower, and enjoy an easy life for a while.

Brain IQ

Figure 26:
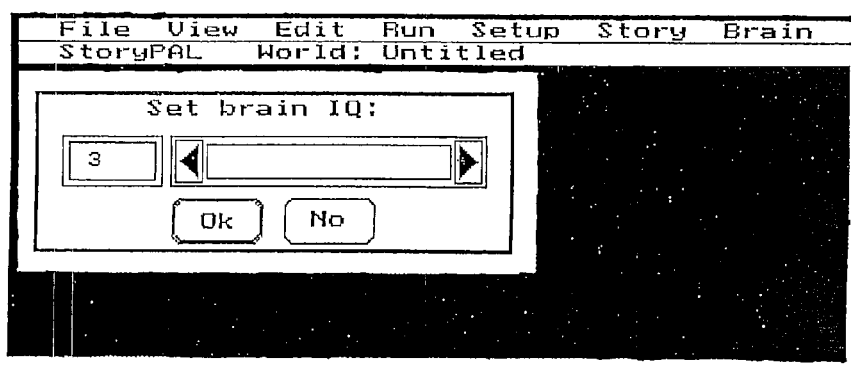
FIG. 26 shows the IQ selection screen.

One major function of a brain is to "what if" whether a possible action choice will "work" or not (i.e. "'What if' I do this action; what will happen?"). If it looks like the action will work, then take that action. If it doesn't, then do a "what if" on another action. Some creatures with brains run their "what ifs" further into the possible future than other creatures do. We could say that a creature that "what ifs" further into the future is "smarter" than one who doesn't. That's what we mean here by "IQ". "IQ" is conveniently short as a way of indicating how far into the future StoryPAL plays "what if". "What if-ing" into the future is helpful in surviving (i.e. a creature will survive longer if it does "what if-ing" than if it doesn't). However, "what if-ing" more than a short distance into the future is of little or no use because the accuracy of a "what if" rapidly deteriorates after a very short time. Therefore, the "what if" method that works best is to constantly do "what ifs" that look only a short distance into the future. The odds that a one-minute "what if" will turn out to be inaccurate are many, many, many times higher than that a fifteen-second "what if" will turn out to be inaccurate. This is linked to the chaotic or unpredictable interventions, which as we know, constantly enter our lives. So while it is more helpful for survival purposes to do "what ifs" than not to, past a certain point it is not increasingly helpful. And after all, in just a very short time the user gets to run a new "what if" based on new data from a changed situation anyway. StoryPAL's IQ, meaning how far into the future StoryPAL can play "what if" about a possible action, is adjustable between three and fifteen. These numbers represent ratios, fifteen being five times further than three, for example. The user can experiment to determine how much benefit is gained from certain levels of IQ. FIG. 26 shows the IQ selection screen. If a user wishes to change the IQ number, select this item and type in the value desired between three and fifteen in the window on the screen. The Brain IQ is saved with each world (enabling a different value to be saved for each world). Save in the Setup menu does not save the Brain IQ; Save in the Main menu's File menu does.

World Size

The size of Worlds in total (not just that portion seen in the Region) is defaulted at 800-by-400 (800 wide by 400 high). That means it is 800 pixels wide by 400 pixels high, which is bigger than a monitor's screen. This size is adjustable for any specific run of any particular World. Once the World is opened, simply select this item and then change the dimensions in the dialogue box. The World Size is saved with each world, and therefore, any change made can be saved by saving the world (Save in the File menu), but not by saving the Setup.

Save

The Setup specifics for System Paths, Story Delay, User Name, Joystick, and Stick Speed, as they exist when this item is selected are saved. Two items in the Setup menu are not saved with this menu item because they are saved with each world. These two exceptions are Brain IQ and World Size. These are saved when a world is saved using Save in the Main Screen's File menu. If any of the Setup items System Paths, Story Delay, User Name, Joystick, and Stick Speed, is changed during a session and the user wants those settings to be the same the next time StoryPAL is run, after setting or resetting any of the Setup item values, select this item. This does not mean a user will necessarily want to save the current Setup every time it is changed. The user may have settings to be used every time StoryPAL is run (and that may be the values that come with the system), but temporarily the user may want one or more settings changed. If that is the case, make the changes temporarily desired, but do NOT use Save in the Setup menu. Then when the user Quits the System, those old base settings will be in effect when StoryPAL is run the next time.

The Story Menu

Record On/Off

No stories will be recorded unless this item is selected as On. Recording currently going on will stop as soon as this item is selected as Off. When Record On is selected a dialogue box with the title "Record Story" opens. The user will need to type in the name of the file to which stories will be recorded. Any name will do. The user can even use a name previously used, but a warning will ask if the old file is to be overwritten. Please note that when the dialogue box opens, a path is already there, and the user will need to add the file name for stories at the end of that path (the far right). If the cursor is not at the far right, and there is no reason to change the path, simply press the End key to move the cursor, then type in the story file name.

Several minimal conditions must exist before story recording actually takes place:

1. A World must be Open. There's nothing to tell stories about unless there's a World to put StoryPAL in.
2. StoryPAL must be in the open World. StoryPAL's the only Thing with a brain and the only one who tells stories, so no story teller, i.e. no StoryPAL, no stories.
3. Record Stories must be On. That's how StoryPAL knows what stories to remember.
4. The World must be Running. If the World isn't in Run-Go mode, nothing's happening, so there's nothing to talk about.

One of the time-consuming activities the computer does in StoryPAL is update the screen with the visible graphics. If the user wants to record stories for later playback it can be done while the computer shows all of StoryPAL's activities on the screen in the Region along with showing all the other Things moving around in the World. A user may very well enjoy watching that and later playing back stories about what happens to StoryPal. A user may even have the face on the screen showing StoryPAL's feelings while "living" the experiences shown. However, a user may prefer not to watch all the screen activity and wish only to come back later and play back the stories, letting StoryPAL simply tell what happened. The stories will be recorded a little faster if StoryPAL can run faster.

The way StoryPAL can run a little faster is to avoid writing graphics to the screen. That's what we might call "Fast Record" mode is: run the World, record the stories, but don't show anything on the screen. The way to use Fast Record is to open a World, put StoryPAL into the World in the Region window (unless StoryPAL is already there), select a record mode (Record On and Auto-Stop—see Auto-Stop below), close all open windows, and select Run, Go. Doing that will start the open World running while recording, but no activity on the screen will be shown. If Auto-Stop was selected, then after the specified number of TimeSteps or Stories (which ever comes first) the program will put a message on the screen when it is finished recording (or a user can intervene by clicking on Story then Record Off and then on Run then Stop.

Now StoryPAL can tell the experiences it experienced by clicking on the right menu items in the Face window.

Auto Stop

A user is prompted in a dialogue box for how many Time Counts maximum and how many Stories maximum are to be recorded. Story recording will stop when StoryPAL first reaches either of these numbers. A user may be tempted to input a very large numbers (e.g. "save me a thousand stories or record for 20,000 Time Counts"), but there are two reasons to reconsider such a choice: First, it could take a very long time to generate a very large number of stories, and second, as soon as the hard drive runs out of storage space in which to put all those stories, StoryPAL will stop recording stories anyway. The maximum values in these fields are 100 Stories and 30,000 Time Counts. Note that in normal running with StoryPAL in a world, should StoryPAL die, the run stops (although it can be restarted easily enough). However, if stories are being recorded, and if StoryPAL dies, a story is ended, but StoryPAL is automatically re-plunked elsewhere in the world and Run/Go is automatically resumed.

About Icons

The little pictures that move around the Region window are called "icons". An icon is simply an image or picture, such as a picture of StoryPAL, or a lion, or a tree. The StoryPAL system's icons have three parts relevant to a user. The descriptions following refer to the reference letters in FIG. 27, which shows the parts of an icon.

A: Unfortunately the word "icon" is used to mean both the parts A and B in FIG. 1, so for A we'll use the phrase "full icon" and for B we'll use the word "picture". Full icons are always rectangles and are at least as big as the picture, and, in fact, are almost always larger. Frequently the full icon boundary is made as small as possible given that it has to contain the picture, but not always, as explained below in B where the "picture" is described. The portion of the full icon that is not part of the picture is the same color as the screen background color, meaning that it is invisible, which is possibly why just the picture part is often called the icon.

B: When someone points to the screen and says something like "the whale icon" or "the tree icon" they usually mean just the picture of the whale or the picture of the tree. In other chapters of this documentation, unless specified otherwise, we also will mean the picture when we use the word "icon". Some full icons have a lot of non-picture space to one side of the picture or the other, usually the top. That is so that when the "hot spots" (see C below) of two icons are "on top of" each other the picture are in a proper relationship to each other.

C: When two icons interact, it is neither the total icons nor the pictures that interact, but rather the "hot spots", and only the hot spots. The hot spot is the single dot or pixel that is the upper-left-hand corner of the full icon. If the Antelope will run when the Lion gets less than, for example, three inches away, that is calculated as the distance from the Antelope's hot spot to the Lion's hot spot (it is not the distance between the two closest points of their pictures). Similarly, The Antelope and the Lion are not "touching" unless their hot spots are touching.

The Icon Editor

An "icon editor" is a tool for drawing and editing or modifying icons. The StoryPAL icon editor is activated by selecting (in the Main Screen) Icons in the Edit menu. Once through using the icon editor, click in the Done box in that editor to be returned to exactly the same place in the StoryPAL system as before the Icon Editor was selected.

Figure 28:
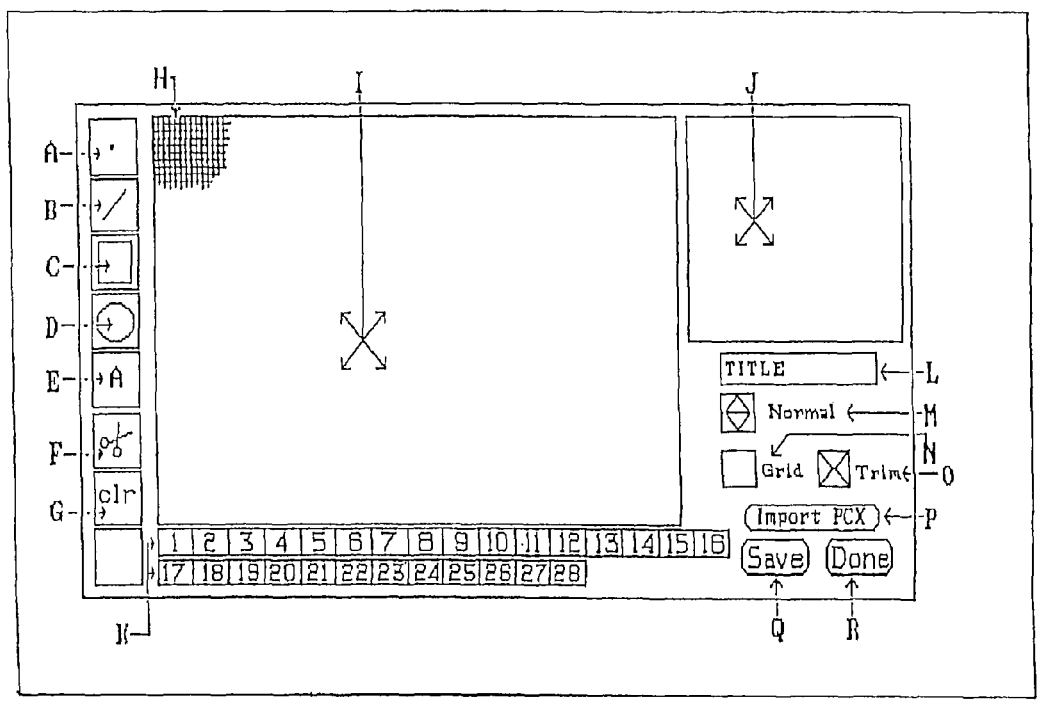
FIG. 28 shows the icon editor menu screen.

The icon editor will be described by using the reference letters (the ones that have corresponding arrows pointing to parts of the editor) in FIG. 28, which shows the icon editor menu screen.

A-G These are the icon editor "tools". Click with the mouse cursor arrow somewhere in the box for any of the tools to activate that tool. The box outline around the active tool is thicker than that around inactive tools. Use the tools A-E to draw in either the large image window (I) or the smaller one (J). Do any drawing with the point of the mouse cursor arrow. The tool selected does its drawing only if the left mouse cursor arrow is held down, therefore the usual sequence of use is:

First, select the tool by clicking in the box of desired, then

Second, move the mouse cursor arrow point to the location desired in either of the image windows (I or J), then Third, press and hold down the left mouse button to use the tool, then Fourth, release the left mouse button to stop the tool from working.

A The dot means that when a user draws with the point of the cursor arrow a line that follows your hand movements will result, like a pencil. The color of the line is controlled by the color selection (assuming color capability). If the cursor is moved fast the line becomes dots, and if the cursor is moved slowly the line is solid.

CTRL-DOT SPRAY CAN: Hold down the keyboard's Ctrl (Control) key while using this function to get a "spray can" effect, i.e. a spray effect is produced instead of a narrow line.

CTRL-ALT-DOT RANDOM SPRAY CAN. Hold down both the Ctrl and the Alt (Control and Alternate) keys while using this function and, instead of the spray being in the selected color, it will be in random colors.

B This is the straight line tool. Since most of us have a problem drawing straight lines there is a tool to help. Press the mouse button to specify one end of the line. Then, keeping the mouse button pressed, move the mouse. A straight line with the mouse cursor arrow specifying the other end of the line will be shown. When the mouse button is released, the straight line shown will be drawn (in the selected color).

ALT-LINE. Hold down the Alt key, press the mouse button and hold it, specify a line, then release the mouse button but keep the Alt key pressed, and move the mouse cursor arrow in a circle, a series of lines in a fan-like motif will be drawn.

SHIFT-LINE. An exactly horizontal or exactly vertical line can be tricky even with a line tool. Hold down the Shift key while using the line tool and move the mouse cursor in an upward direction to get a vertical line even if the cursor arrow is not tracked precisely vertically from its starting point. The same idea holds with moving the mouse cursor in a sideways direction.

C The rectangle is used for drawing rectangles! It works something like the line tool in that the starting and ending locations are described by pressing and releasing the mouse button. In the case of the rectangle tool, the starting and ending locations are diagonal corners from each other in the resulting icon. For example, if the mouse cursor is moved down and to the right after pressing the mouse button, then the starting location is the upper-left of the rectangle, and the ending location is the bottom-right. The rectangle drawn will be of the selected color and will be a rectangle outline.

CTRL-RECTANGLE: If the Ctrl key is held down while using this tool, the rectangle will not be outlined but will be filled with the selected color and fill pattern.

ALT-RECTANGLE: If the Alt key is held down while using this tool, the rectangle will be outlined and the corners will be rounded.

CTRL-ALT-RECTANGLE: If both the Ctrl and Alt keys are held down while using this tool, the rectangle will both have rounded corners and be filled with the selected color and fill pattern.

D This is the ellipse tool. When it is used it starts out looking like the rectangle tool in that a rectangle is seen on the screen, but when the mouse button is released a rectangle is not drawn, rather an ellipse is drawn that fits in the rectangle. If the rectangle is a square, a circle will be drawn (but that takes a steady hand and a good eye). The ellipse is an outline in the selected color.

CTRL-ELLIPSE: If the Ctrl key is held down when the tool is used, the ellipse will be filled with the selected color and fill color.

E Don't be confused by an E pointing to an A. This is the typing tool ("A" as in "ABC"—and more, e.g. 123 or $-]). It has a limitation that above items A-D do not have in that it can only be used in the small drawing window (J). After selecting this tool, put the mouse cursor arrow in the small drawing window (J) and click (press and immediately release) the mouse button. A vertical line will appear in the window. That is where the typing will begin. Now go to the keyboard and start typing. The type appears in the window. Note that nothing appears in the large drawing window (I). However, when the Enter key is pressed (and released), or another tool is selected, the same letters will then appear in the large drawing window.

The following keyboard keys are useful while using this tool:

Home: This will move the typing cursor to the left-most position in the typing line.

End: This will move the typing cursor to the left-most position in the typing line.

Arrows: (Left and Right only—Up and Down don't have any effect) Moves the typing cursor left and right one space at a time.

Del(ete): Deletes the character at the position of the typing cursor.

Back Space: Deletes the character to the immediate left of the position of the typing cursor.

Ctrl-Y: Deletes all characters from the position of the typing cursor to the end of line.

The insert mode: This is not a function, but to point out that if the typing cursor is in the middle of a group of characters and new character is typed, it will be inserted without typing over the existing character at the typing cursor position.

F This is not a drawing tool, but a tool for moving all or part of the icon. After selecting this tool, START to use it like the rectangle tool, i.e. go to the image window and describe a rectangle. The rectangle can include all or part of the icon. The rectangle is a dotted one.

1 Put the cursor in the small image window (J), somewhere inside the dotted box. Press the mouse button and hold it down. Now move the mouse cursor. The area described by the dotted rectangle moves with the cursor (called "dragging"). When the mouse button is released, the image is done moving and will stay at that location.

2 Assume that part of the icon bounded by the dotted box. Ctrl-X (hold down the Ctrl key, press and release the "X" key and then release the Ctrl key), will make the image portion inside the dotted rectangle will disappear. That image portion is gone from the icon, but not from the StoryPAL system, i.e. it is not "lost". It is saved in a place in the StoryPAL system called the "image buffer", a small memory area available for just this reason. This is called "CUT", as in cutting something out and placing it in the image buffer. The image buffer only holds one image portion at a time, so if something is in that buffer and there is another Cut or Copy, what was in there is lost and replaced by what was just Cut or Copied. On the other hand, the only actions that will replace what's in that buffer are a new Cut or Copy or exiting the Icon Editor.

3 To Copy an image use Ctrl-C instead of Ctrl-X as above. Now the image portion inside the dotted rectangle is still there, but it is also in the image buffer. This is called "COPY", as in cut something out, copy it into the image buffer, but then the original image remains.

4 Now do Ctrl-P. What is in the image buffer is placed right in the middle of the icon image in the image window. It can be moved by dragging it (see F1 above). This is called "PASTE", or pasting the contents of the image buffer onto an icon. Also note that the image is also still in the image buffer. A user can do a cut or a copy, then call up another icon and paste the image in the image buffer in that icon. In other words, changing icons does not erase the image buffer contents.

G This is the Clear tool. The contents of the image windows (I & J) are cleared out, meaning no image will remain in the windows, and any that was there is erased.

H If a graph-paper-type grid in the large window (I) will help to draw icons, do a mouse click on N, the Grid button. An "X" will appear in the Grid button and the large image window (I) will be completely criss-crossed with grid lines like those H points to. If there are grid lines showing, clicking on the Grid button (N) will make them disappear.

I&J These have already been discussed above. Most draw functions can be performed in either window, but as already pointed out, some can only be performed in the small window. Why are there two windows that seem to do the same thing? The large window (I) shows everything "larger than life" which makes it easier to draw detail as there is a magnification factor involved to make it larger than life. The smaller window (J) is the actual size the icon will be when used in the StoryPAL window.

K There are two rows, the top one being colors and the bottom one being fill patterns.

Figure 27:
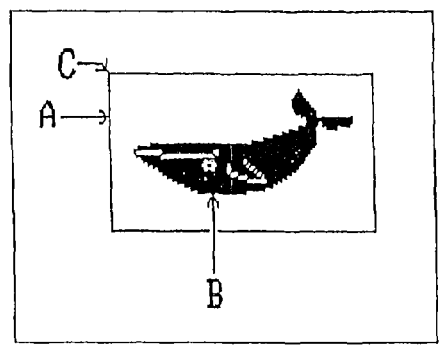
FIG. 27 shows the parts of an icon.

COLOR (top row): In FIG. 27 there are sixteen color choices shown (boxes numbered 1-16), but that would show in the icon editor only if a user's particular system has sixteen colors or more available. If a monochrome system is used there will only be two choices (boxes 1 and 2) showing. Point the cursor arrow to the color desired, do a mouse click, and the drawing functions (see A-D above) will be done in that color. Note that box 1 is the background color, so drawing with that as the current color will produce invisible results. So why have it as a choice? If the user wants to erase a rectangular portion of an icon, select this as the color and draw a box (per C above).

FILL PATTERN (bottom row): Filled rectangles and circles don't have to be a solid pattern, but can be filled with any of these patterns (boxes numbered 17-28). The left-most box (17) is the background color (just like box 1). Drawing a filled rectangle or circle with this pattern will result in the same image as drawing an outlined (non-filled) rectangle or circle. Filling with the next box (18) will result in a solid fill with the selected current color. Filling with any of the other boxes (19-28) will fill with the pattern shown inside the rectangle or circle outline (dots, cross-hatched, etc.). Point the cursor arrow to the pattern desired, do a mouse click, and the filled drawing functions (see A-D above) will be done in that pattern.

L This is the name or title of the icon's shape. The Normal version of the icon (see M below) will show in the Thing Editor as a Shape choice. A user is limited to eight characters for the name, and "illegal" characters will not be accepted. To erase what's already in the box do Ctrl-Y.

M If StoryPAL runs any one Thing in the Region window that moves will probably change icon doings depending on what's going on around it. For example, in AFRICA world at the beginning the Lion may be just standing there, but if it gets close enough to a prey it will look like it's running to chase the prey. It's still a Lion, but the system changed its pose to reflect what the system says it is doing. The various poses that reflect what a Thing is doing can be seen while flipping though the name for those poses or doings. Do that flipping by clicking on the top half of the box or the bottom half to move through the list one direction or the other.

"Normal" is the initial doing for each Thing and each Thing should always have a Normal doing. If the StoryPAL system decides a Thing should be doing a certain thing and there is not an icon to reflect it, the Normal icon will be used instead. To do a full array of poses or doings for a particular Thing, do NOT change the Title (L), just change this pose or doing name (M). For an example, a user wants to put a cow in a world. Draw a cow-looking icon with Normal as the pose or doing, and put in Cow as the Title. Then Save the icon (Q below). Then click on the bottom of the box (the down arrow) by Normal which will cause Normal to change to Chase. Now draw a picture of a Cow looking like it's Chasing something. Keep the title the same, namely Cow, and save. There are now two icons for a Cow: Normal and Chase. If the user wants the Cow's Chase to look like Normal with a few changes draw and Save Cow Normal, then Copy the whole picture (see F above). Next, click on pose or doing until Normal changes to Chase. Then do a Paste (again see F above) which puts the Normal Cow right there in the image windows as Chase Cow. Now do some modification of the Cow's picture (e.g. redraw the legs in a running pose, put a snarl expression on its face, draw some lines or dots that make it look like the wind is rushing past the Cow) and Save it for a nice Chasing Cow icon.

Not all poses or doings are usually appropriate for all Things (but all may be appropriate for creative, wild and crazy people). For example, if a user drew a Normal House with the front door closed, drawing another with Door Open would be usual. Drawing a Chasing or Fleeing House would not be usual (but who's to say it wouldn't be fun). Cloaked means the Thing is present, but is invisible. This icon cannot really be drawn. Simply keep the Title (L) the same, click on the pose/doing box until Cloaked appears and then Save. This is used, for example, when StoryPAL puts the Hoe in the Shed. The Hoe is there for StoryPAL to go get, but is not visible.

N See H above. This turns the Grid on and off in the large image window (I).

O Click on the Trim box to make the "X" appear or disappear. If the "X" is there Trim is on (it will be done), but if the "X" is not there, Trim will not take place. A user will probably draw a lot of icons that are smaller than the image windows provide room for. If they are Saved (Q) without trimming, the StoryPAL system will make a file for the icon that includes the full image window's worth of icon, which may be much more than is needed to show the picture. Trim the icon file to save it only as big as it must be do accommodate the drawing. This keeps the Hot Spot (see About Icons, C at the beginning of this chapter) near the picture and saves some storage space. A user may elect not to trim if the picture needs to be away from the hot spot. For example, if a user wants to draw a baseball bat and have StoryPAL hold it near its hands instead of looking like its carrying the bat on its head, draw the bat down a bit from the top of the total icon so that there's enough invisible background color above the bat to give that effect.

P The StoryPAL system uses icons that are in a proprietary format. Many draw and paint programs use a format called "PCX". An icon from a draw or paint program that generates PCX format icon files can be used in StoryPAL. Put the file name of the PCX icon file in the Title box (L), then click on this Import PCX button. This icon editor will go find the named PCX file and will convert it to StoryPAL icon format for use in StoryPAL.

R Clicking here exits the Icon Editor and puts the user into StoryPAL proper again.

The Region Window

The Region Window is opened by selecting Region in the Main Screen's View menu.

The Plunk Menu

Plunking has to do with placing Things into a world at specific locations in that world. Even though the locations of the plunked Things are very specific, determining those locations can vary from the user determining where to plunk a Thing, to letting the system determine where. Also, after Things are plunked they can be moved by a user at any time or relocated by the system.

Who

When Who is selected a dialogue box opens (titled Plunk Who) that contains the names of the Things available to this world (the ones that came with StoryPAL for that world, if any, plus or minus any created or deleted with the Thing Builder). Since there may be as many as eleven Things available to a world (ten through the Thing builder plus StoryPAL), some scrolling may be needed to find the specific Thing desired to Plunk (StoryPAL is always at the end of the list and is automatically available in every world). Move the highlighted bar until it is on the Thing to Plunk. Select the Thing by hitting the Enter key or by clicking on the Yes button. The Thing window will close, but the Region window will remain open. Then Plunk in either the Region window or the Radar windows (assuming the Radar window is open on the screen). Plunk by placing the mouse cursor arrow tip (point) where the Thing is to be, and click with the RIGHT-most mouse button (this is the StoryPAL system's only use of the right-most mouse button). A Thing will now be in the opened world at that location.

To plunk a different Thing select Who in the Plunk menu again, select a different Thing and plunk it. It is not necessary to re-select Who to plunk the latest selected Thing at any time during the run, e.g. if the last Thing selected was a snake for plunking, then Run-Go a while and then decide another snake is needed in the world, just point the cursor and hit the right-most button. The snake stays selected as available for plunking until another Thing is selected or another world is opened. As many of the same Thing as desired can be put in the world by clicking with the right-most mouse button as many times as desired in the same or (more likely) different locations, with an over-all limit of fifty plunkings in a world at any one time (e.g. twenty-five each of two different Things, or ten each of five different Things, or one each of fifty different Things).

If a bear is available in the open world, a user could select the bear for plunking, put the mouse cursor arrow at one place in the Region window or Radar window, click the right-most mouse button, move the mouse cursor arrow to another place, click again, and move the mouse cursor arrow to another place and click again. There would now be three bears in the world at three different locations. Why not fill this world with dozens of Things? For one reason, a world that is very crowded with Things may be uninteresting when it is run, and for another reason, the more Things in the world, the slower the world will run (the slow-down will be more noticeable the slower the computer's processing speed).

Random

Random plunks a specified number of new Things in a world at random locations. It is an alternative to selecting where to plunk a Thing. Which Thing gets plunked is the latest Thing selected from the Plunk Who dialogue box after selecting Plunk and Who. When Random is selected a dialogue box opens up titled "How many of type nnnnnnnn?" (where "nnnnnnnn" is the name of the Thing currently available for plunking). Enter the number of Thing "nnnnnnnn"'s to be plunked and press the Enter key. That will affect the plunking. To cancel random plunking, press the Esc key. That will exit the Random function without plunking any of the Things selected for plunking.

Re-Initialize

At any point in time in any world the Things that move have specific directions in which they are headed. Re-initialize randomly resets those directions. It also resets the Hurt, Hunger, and Tired values (for those Things with metabolism) to low initial values.

Scramble

If a world is open and is not in Run-Go, selecting Scramble will cause the relocation of all Things already plunked in the world. Each Thing's new location is determined randomly by the system. After Scrambling, the Region window and the Radar windows will show all the Things new locations. After Scrambling, to look at the new randomized locations and change the locations of one or more Things, click on an icon and move it before Running or Saving the world. In other words, a user may want to do a combination of Scramble followed by specific relocation to rearrange the open world. How to move an icon in the Region window is described under "Moving An Icon" in "Non-Menu Features" below.

The Options Menu

Track On/Off

To keep a particular Thing in the Region window at all times no matter where in the world it moves, use Track. Instead of having to make that happen by scrolling the Region window manually, a user can select the Thing for Tracking. Tracking on a Thing automatically keeps it in the Region window regardless of where it moves in the world. First, select the Thing to be tracked (by clicking on its icon, which will cause a dotted box to appear around the icon). Then open the Region window menu and select the Track On item. That Thing will now be Tracked, that is, kept within the Region window (it will be kept at or near the center of the Region window).

WARNING: The ability to scroll the Region Window with either its scroll-bars or in the Radar Window with the Region Box are taken away with Track On. Track On must do its own control of what portion of the whole world the Region Box sees in order that it may keep the selected Thing at or near the center of the Region Window. If a user wishes to keep the icon selected (which keeps the dotted box around it) during Run-Go, that is allowed. It does not interfere with other functions of the system. If the icon is de-selected (by clicking away from any icon somewhere in the Region window) the dotted box will disappear, but that will NOT turn off the Tracking of the Thing. To stop the Tracking of the Thing, open the Region window menu and select Track Off.

Youser On/Off

First, select the icon in the Region window to be controlled by the user (by clicking on its icon, which will cause a dotted box to appear around the icon). StoryPal is not allowed to be selected as Youser. Then select Youser On. The selected Thing (icon) in the Region window is now referred to as Youser and will now have its movement direction and whether to move or not controlled by the joystick (or the keyboard alternatives). Youser's movement speed is determined by the Stick Speed menu item in the Main Screens Setup menu. To return a Thing from the user's control to the system's control, return to the Region window menu and select Youser-Off.

To move the Youser (instead of as the StoryPAL system sees fit) use a joystick. Joysticks have two control factors, namely direction and degree of intensity. The joystick can be moved "full circle", i.e. 360-degrees, which is used to specify direction. The joystick moves from dead center, or straight up to fully pushed in some direction as far as it goes. The distance from center to extreme controls intensity. For a couple illustrations, pushing the stick straight left as far as it will go is full speed left while straight back half way to the edge is half speed down the screen. Straight up and down is "don't move". To use this function without a joystick, use the arrow keys and the space bar. The arrow keys, unlike the joystick, can only go one of four direction at a time as opposed to the infinite direction choices of a joystick. Also, there is no keyboard equivalent of degrees of intensity (speed). It's full out, period. The space bar is equivalent to straight up, namely "don't move". Don't hold down an arrow key, just hit it and release it and the next TimeStep will use the key hit.

Show/Hide Names

This selection turns on (Show Names) and off (Hide Names) the showing of the names of Things in the Region window. Following each Name in the Region window is a reference number that coincides with a reference number after each name in the LifeSigns window. This is to enable a match-up of Thing icons in the Region window with Things in the LifeSigns window. This kind of matching reference is needed when, for example, there are four rabbits plunked. "Which rabbit's LifeSigns data goes with which rabbit icon?". It may be helpful to have a word label for each Thing showing, at least temporarily, so give Show Names a try.

Non-Menu Features

Selecting A Region's Thing/Icon

There are several functions available that require selecting one of the several or many icons that may be in the Region in an open world. To select an icon put the mouse cursor arrow on the icon to be selected and click. A dotted box will appear surrounding the icon picture indicating that it has been selected. To de-select the icon put the mouse cursor at any location in the Region background (anywhere there is not a Thing's icon) and click again. The dotted box will go away.

Deleting (Un-Plunking) An Icon

This is not about deleting a Thing from the Thing Builder, but rather is about deleting a Thing that is already plunked, i.e. UN-plunking a Thing so that it is not in the Radar window or the Region window. To un-plunk an icon, first select it (see immediately above), then when the dotted box around the icon appears press the Del(ete) key. The icon will disappear, there will be no LifeSigns window for it anymore, and no other Thing will "think it exists".

Moving An Icon (i.e. moving a thing in the Region window) Moving a Thing (moving the Thing's icon) is done in the Region window. Any icon in the world on the screen that is visible in the Region can be moved to any location in the Region. Just as moving a window can be called "dragging" a window, so moving an icon can be called "dragging" and icon. Start the process by selecting (by clicking on) the icon to be moved (once selected, it will have a dotted box around it). Place or keep the mouse cursor arrow inside the dotted box, depress the mouse button, and while keeping the button pressed, move the mouse cursor arrow to the desired location somewhere in the Region. This "drags" the dotted box to that location (but it does not move the icon—yet). When the dotted box is at the desired location, release the mouse button. The icon will then "jump" to the new location defined by the dotted box. To move the icon to a part of the world outside of the Region (i.e. to somewhere in the world not presently within view of the Region window), move the icon to the edge of the Region in the direction desired. Then move the Region in the same direction, leaving the icon just at the opposite edge of the Region. Continue doing this "leap-frogging" until both the icon and the destination are within the Region, at which point the icon can be dragged to the desired location. If it's too far away for this "leap-frogging" to be practical, delete this icon and re-plunk in the desired new location.

The Radar Window

Full World Shows

The Radar window displays the full world, not just part of it, no matter what its dimensions are. All Things that exist within an open world are shown in the Radar window at their proper location. However, those Things are not shown as pictorial icons but rather as dots.

Region Outline and Movement

Unless the world is re-sized by the user (with the World Size item in the Main Screen's Setup menu) to a size small enough to allow the entire world to be displayed in the Region window, the Region window shows less than the full world. If the Region window shows less than all of the world, that portion of the world seen in the Region window is indicated in the Radar window by a rectangle, which indicates not only the proportionate share of the world seen in the Region window, but the location of that share. If the user clicks in the Radar window the box representing what the Region window shows will move such that its center is at the tip of the mouse arrow. This is the easiest way to move what part of the world the Region window shows.

The Face Window

The Face window is opened by selecting Face in the Main Screen's View menu. The

Face is StoryPAL's face. StoryPAL's face has two main functions: (1) the telling of stories about StoryPAL's "adventures", and (2) the displaying of StoryPAL's feelings or emotions. Note that the Face window has a re-sizing box in the bottom-right of the window, which means that the Face can be made much larger if, for example, stories are being told and the Face window is the only window open on the screen.

Showing Feelings

To see the facial impact of StoryPAL's emotions, open the Face window while a world is opened and the system is in Run-Go mode. If those conditions exist, StoryPAL's face will show what StoryPAL is feeling as it gets chased by a lion, escapes it, gets hungry, eats, and so forth. There is no feelings on/off switch, as none is needed.

Talking

HOW does StoryPAL talk? StoryPAL "gets the message across" three ways: (1) in printed text toward the bottom of the Face window, (2) in printed text to the printer, and (3) through the Covox Speech Thing's™ speaker. If a Covox Speech Thing™ is not present StoryPAL's speech cannot be heard, but StoryPAL doesn't say anything that can't also be printed as text in the Face window or on the printer.

WHEN does StoryPAL talk? There are three possibilities: (1) when "living" in a world (i.e. in Run-Go mode in a world) StoryPAL can narrate what's going on as it happens, (2) when called upon to tell a story about some adventure StoryPAL had in the recent or distant past (reference the Tell menu in the Face window described below), and (3) when answering questions (reference the Ask Button described below). Note that to stop the telling of an in-process story, press the Esc key. Note that doing so will change Talk On to Talk Off.

Everything Not "Remembered"

StoryPAL's memory is not a one-hundred-percent accurate video or audio tape recorder. Everything in StoryPAL's world is not stored away as part of StoryPAL's "story" about what happened.

The Tell Menu

About

This menu item enables the user to hear a story about a specific Thing. "About a specific Thing" means that a story has a mention of that Thing. It does not simply mean that such Thing is plunked in the world the story is about. The mere presence of a particular Thing in a world does not necessarily make it worth mentioning in a story. For example, if someone entered the woods and wound up chased by a bear, but escaped to tell about it, that person would not consider the story to be "about" most of the trees or about all of the creek. On the other hand, if that someone escaped by climbing a particular tree or by crossing the creek at a particular point, they would include that in their story and therefore could say the story was "about" that tree or that creek. The same applies to our use of the word "about". If a Thing factored into StoryPAL's story then, the searching the story for being "about" that Thing will succeed, otherwise the story will not come up as being "about" that Thing. Here's how About works:

1. Selecting it on the menu results in a dialogue box appearing asking "Pick a world to read story". Select one.
2. Stories are saved in "books", so in the next dialogue box ("Pick storybook to read") the name of one or more books will appear (if none appear, no stories are saved for that world). Select one.
3. The third and last dialogue box asks the user to type in the name of a Thing ("Get story about"). StoryPAL will look in the specified Storybook for a story about that Thing.

If a Thing is specified that isn't in any story in that Storybook no story will be told and the third dialogue box will reopen asking for another Thing to tell a story about. Also, at the end of an "about" story that third dialogue box will reappear asking whether to tell a story about another Thing. If the user no longer wishes to hear an "about" story press the Esc key.

Best

The "best" story in a storybook that has more than one story is the one that generated the strongest feelings in StoryPAL (e.g. the most excitement or fear and the following big relief). The storybook specified is searched for which story is "best" and then that story is told. Here's how Best works:

1) Selecting it on the menu results in a dialogue box appearing asking "Pick a world to read story". Select one.
2) Stories are saved in "books", so in the next dialogue box ("Pick storybook to read") the name of one or more books will appear (if none appear, no stories are saved for that world). Select one. The best story in that storybook will now be told.

Pick

Pick allows the selection of a single specific story that has been saved (and not erased) to be told. Here's how Pick works:

1) Selecting it on the menu results in a dialogue box appearing asking "Pick a world to read story". Select one.
2) Stories are saved in "books", so in the next dialogue box ("Pick storybook to read") the name of one or more books will appear (if none appear, no stories are saved for that world). Select one.
3) A third dialogue box appears with the heading "Enter story number (1-n)", where "n" represents the number of separate stories in the storybook. For example, if there are 5 stories in the storybook selected the heading is "Enter story number (1-5)". Enter 1, 2, 3, 4, or 5 to select which of the five stories to be heard and then press Enter. The story selected will now be told.

Untold

Within a particular storybook, this selection tells the latest story not yet told. This allows the user to avoid keeping track of which stories have and which have not been told yet (Pick, for example, might show that the selected storybook has six stories in it and asks which one to tell).

Print

Print works exactly the same as Pick except that the selected story is output to a printer instead of being output in text in the Face window and the Covox Speech Thing™.

Erase

When selected this item opens a dialogue box listing the storybooks saved at that point. To eliminate any, move the highlighted bar to the one to be erased and select Yes. Please note that this will effectively eliminate that portion of StoryPAL's memory.

Import

As mentioned, this will enable users to trade stories, as in "Have I got a great story. It's on this disk. Listen to it.".

Speak/Mute

For StoryPAL to narrate what it's experiencing "real time" as it lives in the world (in Run-Go mode), open the Face window, open the Tell menu in the Face window, and select Speak. This doesn't generate a story that can be told later, but it results in the "real time" narration. While Speak does not result in a story being saved for telling later, neither does it prohibit that. Selecting both Record On in the Main Screen's Story menu (which is the menu item that turns on StoryPAL's remembering a story to be told later) and Speak in the Face's Talk menu is allowed and results in both the recording of a story for later telling and a "live", "real time" narration. To turn Speak off, select Mute.

The Ask Button

The Ask button is at the bottom-left of the Face window. It has to do with asking StoryPAL questions and getting answers. Clicking on that button is effective only under two circumstances: (1) in Run-Go mode (i.e. click on Ask while a world is actually running), or (2) click on Ask just before selecting Run-Step mode. Clicking on Ask in Run-Go mode stops the running of the world and opens up a dialogue box that starts the questioning-of-StoryPAL process. Clicking on Ask just before selecting Run-Step opens up the dialogue box just after the next TimeStep. Asking StoryPAL questions and getting answers is described in detail hereinafter.

Asking StoryPAL Questions

Asking StoryPAL questions involves the use of the Ask button in the Face window. Properly clicking on the Ask button (refer to The Ask Button at the end of the previous chapter) opens up a dialogue box that starts the questioning-of-StoryPAL process. When through asking StoryPAL questions, click on the Done button in the starting Ask StoryPAL dialogue box. Clicking on Done will make the dialogue box go away (which takes the user out of Ask/Question-StoryPAL mode) and will return the mode it was in when Ask was selected.

Clicking on Ask is a bit tricky since reaching a point where StoryPAL's running can be interrupted within the system is involved. Put the mouse cursor arrow point on the Ask button and hold down the mouse's left-most button until the Ask button flashes for an instant, then release the mouse button. After selecting Ask in that manner the Run-Go mode will reach a point where it can be interrupted, will do so and will open up the initial dialogue box which is headed "Ask Story-PAL".

Asking StoryPAL questions involves selecting a series of choices. The mechanics of making the selection are the same as those used in making selections of Behaviors in the Thing Builder, namely words with outlined boxes preceding them and clicking in the box or on a word results in the box filling in to indicate that item has been selected. The following details are structured around the four question categories that appear in the initial Ask dialogue box. Note again that the Done button in that box means Done Asking questions.

At some point the user will see a Backup button in an Ask dialogue box. Backup buttons move back up one "level" of dialogue box (the initial box is Level 1 and selecting an item at Level 1 takes one to a Level 2 dialogue box, and in some cases selecting a particular Level 2 item may take one to a Level 3 dialogue box). Some dialogue boxes have more data to present than the space for the dialogue box will allow, so as with the Behaviors dialogue boxes, the up and down arrows move from page-to-page within the same level.

About the Now

This leads to questions (in the Level 2 dialogue box) having to do with how StoryPAL reads its condition as of the instant of the Ask interrupt. Some will provide an answer after selecting a question in the Level 2 dialogue box (e.g. "What's your goal?" will lead immediately to an answer in the Face window and Covox Speech Thing™ of perhaps "My goal is to get away from the lion"). On the other hand, if at Level 2 the user asks "How are you feeling", instead of an answer, the user will be taken to a Level 3 window where one must select a feeling before StoryPAL answers. After getting the answer from StoryPAL, the user will be returned to the Level 1 dialogue box.

About this World

These questions have to do with the sensed characteristics and behaviors of the Things related to the world (whether plunked or not). All of these Level 2 questions lead to a Level 3 dialogue box, one of them being a multi-page box ("What things are" leads to a Level 3 dialogue box that is several pages long).

About History

The "history" in question is that remembered in SAVED STORIES about this world. It is not about something that may have just happened during the current Run-Go, or that happened some time back but never remembered as a story, or that was saved but later erased or deleted. Please note that if in Run-Go mode with Story Record-On, those stories that currently are being recorded are NOT YET SAVED, and thus not a part of StoryPAL's history until the user either selects Story Record-Off or exits the currently open world. There is nothing different about proceeding through the Levels of dialogue boxes from what works in About The Now and About This World.

About StoryPAL's Brain

These questions have to do with what is in StoryPAL's basic brain structures. Examples would be what StoryPAL looks for if trying to locate a certain Thing (what are its shape, size, color, temperature), or what StoryPAL's plan of action would be given certain circumstances. Every one of these questions goes to Level 3 before answering.

More About Story-telling

In the entertainment system of the described embodiment, the ADS (StoryPal) is given a system for telling "true" and "interesting" stories about the experiences of the ADS within its artificial worlds. It has been discovered, in accordance with this invention, that human-type storytelling may be efficiently simulated by saving data according to the following techniques: (1) at an appropriate "high" (selected) level of pain, to start the story, save (the data about) the time and place and the "concretized" current problem situation/node (i.e., for the structured situation which is included in the relational situation of such problem node, save the included concrete objects of the structured situation along with the node information); (2) save as the next story element the current strategy and the first plan node found to be included, along with the concretized relevant data and the action being tried to overcome the problem (and any "high" feelings at this time and at any further node report); (3) then save such information about the next plan node reached and any further action to be tried and any what-iffing predictions; (4) then continue to so save about any next plan node reached and any further action to be tried and any what-iffing predictions; and (5) end the story about reaching a goal when there is a "high" (selected) level of pleasure. The story should preferably, in accordance with this invention, report (following the "rules" of the selected natural language) in the concrete terms of the structured situations, not in the abstract terms of the relational situations.

For this story-telling use of the ADS, or to have the ADS answer questions, or for other language production uses, the language production program or module must of course have access to the pertinent thought elements (data) representing the material to be reported. Then, for, and depending upon, the specific natural language in which the report is to be made, the ADS must have access to (1) the normal order of reporting, both within sentences and among sentences; (2) the "snippets" or phrase structures which signal to a listener that the included word(s) represents a certain kind of data; (3) usual connectives; and (4) the word(s) which represent the data to be reported. For variety, the ADS should have access to synonymous or alternate acceptable ways to use such orders, snippets, data-word(s), etc.

It is noted that other technologies, e.g., parsing or logic or speech production or prosody or speech recognition, may be combined with the instant invention where desired.

The Expert System Main Screen Menus

Figure 29:
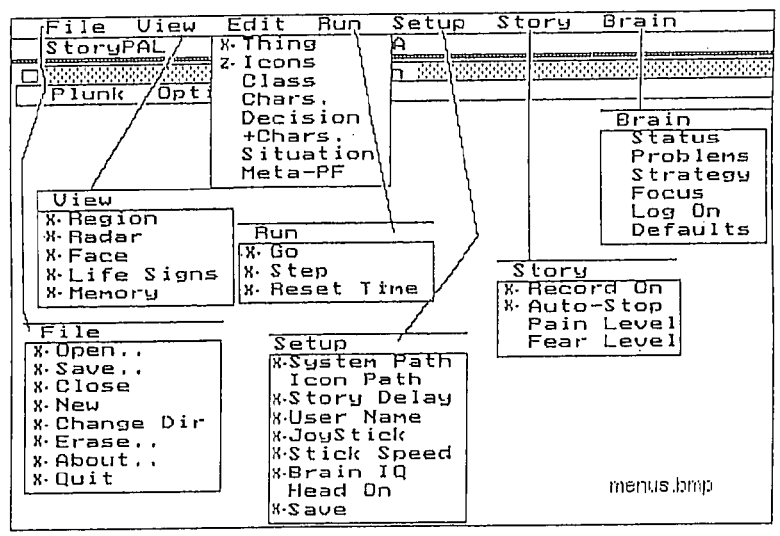
FIG. 29 shows the expert system main screen menus.

FIG. 29 shows the expert system main screen menus. Those menu items shown in FIG. 29 with an "x-" in front of them are covered above in the discussion of the Novice Version of StoryPAL. The single item marked "z-" (the Icons item in the Edit menu) is covered in the discussion about Drawing Your Own Icons. A menu item titled Import is in the Novice Version's File menu but is not in the Expert Version. It is a device that enables a user to swap World files with another user. The menu items World Height and World Width are in the Region window's Options menu in the Expert Version but are not in the Novice Version in that same format. Their same function is in the World Size menu item in the Setup menu in the Novice Version.

Menu items seen above not marked with either "x-" or "z-" are covered in this Expert System User Manual except for three menu items: Setup menu—"Head On" is used only in conjunction with a 3-dimensional head; Brain menu—"Defaults" will reset all the numbers in the Status window (see FIG. 37 and the description that follow that figure); Brain menu—"Log On" will generate a Thought Log, which is a print-out of StoryPal's thought process. It was used to debug the predictive planning system and a sample is shown in FIG. 30

Overview

This part of the description does not explain how to run the system. That was done in the description of the StoryPAL Novice Version. It is the intention here to explain how an "advanced" or "expert" user can manipulate the data structures in the system and change existing and create new worlds in which StoryPAL lives. Access to these data structures is not available via the "novice" version of the program but rather requires an "expert" version.

The data structures describing the world in which StoryPAL lives describe a two-dimensional world because the computer screen in which StoryPAL and other creatures live is a two-dimensional screen. Everything said following herein that relates to the X,Y coordinates of a two-dimensional world could have added to it the Z-coordinate of a three dimensional world.

The Sx Data Structure

The first data structure to be further described (it has already been described in the preceding invention summary) is the Current Situation or "Sx" (a structured situation). The Current Situation is a "concrete" representation built in the brain of StoryPAL from sensory input—which means there are things going on outside of StoryPAL in the "real world" and some portion of the "real world" that is detectable by StoryPAL through the senses; and the processing in StoryPAL's brain done with the input from those senses results in building in StoryPAL's brain what can be called a Current Situation ("Sx").

A Current Situation consists of a mathematical "map" in the brain of StoryPAL which has on it every (more-concrete) Thing Noticed by StoryPAL. Notice as used here is a technical word meaning that of all that is "out there" in the world only certain portions of it are detectable as limited by the nature of StoryPAL's senses (and including such items as StoryPAL's then "look-fors"). What is Noticed about each Thing in StoryPAL's Current Situation is an identification (concrete) of that Thing, where on the map it is located, what it is Doing (e.g., it's legs are moving in a running motion and/or its mouth is chewing), which direction it is moving and how fast it is so moving. Putting that in a table (the data order does not matter, but must, of course, be consistent):

| | |
|---|---|
| Thing 1 Location (X, Y) Doings Movement Vector Speed | |
| Thing 2 Location (X, Y) Doings Movement Vector Speed | |
| . . . | |
| Thing n Location (X, Y) Doings Movement Vector Speed | |

Further discussed later will be the representing of a "concrete" Thing (Rx or Px), already mentioned in the preceding invention summary.

The Si Data Structure

Figure 31:
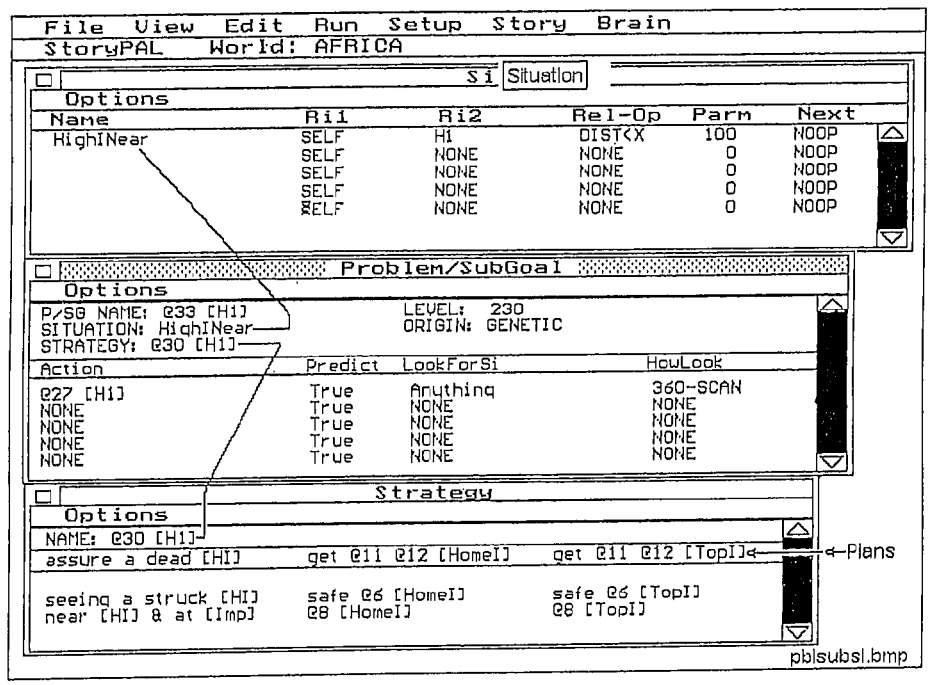
FIG. 31 shows three open windows of the expert system: Situation; Problem/Subgoal; and Strategy.

The abstract-situation Si (or "situation-inclusional" or "relational situation") data structure has already been described in the preceding invention summary. FIG. 31 shows three open windows of the expert system: Situation, Problem/Subgoal, and Strategy. In FIG. 31 (beginning with the Si window) it shows that the Si (Situation) is an aspect of the Problem/Subgoal as is the Strategy. To be discussed are each of the three windows shown in FIG. 31. The Si data referred to in the Si window is called "HighINear". The name is arbitrary but is fairly descriptive. High refers to where the Thing is on a food chain; it's near the top (Top is used for the Thing at the very top of the food chain and next highest is High, followed by Low and then Bottom). The "I" in HighI refers to Food Chain I (there are two food chains in this world, I and II). That really indicates an abstraction of the Thing (maybe a Lion) and that a more-abstract Class (Ri or Pi) is being referred to, called HighI in the Si title HighINear, and H1 for the Ri2 within the Si. The implication of the name is that a High thing on the food chain is Near StoryPAL. The rest of the columns confirm that. Ri1 and Ri2 are the Classes Self and H1.

Relationships are a key element in the Si. Ri1 and Ri2 are the two Things whose relationship is being described. Frequently the Ri1 is Self It is true so frequently that the Ri1 column is filled with the defaulted value of Self Any and all of those Selfs can be overwritten with some other value. The Ri1 is Self which means, if we are considering StoryPAL's view of what is happening, StoryPAL him/herself. Ri2 is called an H1. The Class Editor will show that an H1 is a Predator.

Rel-Op means Relational Operator, a description of the relationship between Ri1 and Ri2. The relationship in the case referred to is that the Distance between Self and Ri2 (the H1 Predator) is less than X. The list/chart of valid Relational Operators is shown in FIG. 32.

The next column is the Parm or Parameter. It is the value of X (in the Relational Operator). In the case of this Si the distance of X is 100. So putting the two columns together, the Si is so far described as: Self is less than 100 units (in the case of this system it is pixels) from the H1 "Predator".

The last column (Next) says NOOP which means "we're done with this Si", meaning literally no Boolean operator relative to the next row. Instead of NOOP, e.g., maybe the column would have said AND meaning go on to the next row. The next row could describe a relationship between an Ri1 and an Ri2 and this situation would not be the applicable one unless row 1 AND row 2 were true. Other Parms allowed are OR (meaning and/or), XOR (meaning exclusive or, meaning either but not both), and NOT (meaning what's on the lines so far, but NOT what's on the next one, i.e., the next line must NOT be true). Note that, in this system embodiment, up to five Ri1/Ri2 relationships can be input.

The Problem/Subgoal Data Structure

This data structure is that of the Si. In the Problem/Subgoal window, the "header" information is:

The Problem/Subgoal Name. "@33 [H1]" is shown.

1) Situation: "HighINear" is indicated as the relevant Si for this Problem/Subgoal.

This links the Si and the Problem/Subgoal. In other words, looking at the Si, if an H1 is less than 100 from SELF it means Self is in danger from that H1 and will take some immediate action and will attempt to get on a Plan to rid itSelf of the Problem.

2) Strategy: "@30 [H1]" is shown as an arbitrary name (useful in the natural-language programs, however). This links the Problem/Subgoal to the Strategy. The Strategy is at least one Plan for ridding the Self of this Problem.

3) Level: This has a number of 230 and correlates to a Fear level associated with being in this Situation and thus having this Problem. Problems are in hierarchical order and the higher this number the more "important" the problem, i.e., the higher the Level, the higher the Fear and the higher on the list of Problems to be solved. A Problem with a Level of 230 is higher up the scale of Problems than any Problem with a number less than 230. 230 is a pretty high number in this embodiment of the system (the highest is 255). It demands that this Problem be dealt with before any problem with a lower level.

4) Origin: Not used in this embodiment. The choices will be Genetic and Learned.

This field is used when the Learning System is operated.

Below the header information is the action table. We already know that if StoryPAL (or any other Thing that can be eaten by an H1 Predator) is less than 100 from an H1, Story-PAL (or the Thing that can be eaten by an H1 Predator) has a Problem. The Problem has an arbitrary name of @33 [H1] which was found by going through the list of problems StoryPAL has in his/her brain and seeing which one the Si HighINear relates to. That list is looked at top (highest priority, most danger) to bottom.

The Problem carries with it an action, namely "@27 [H1]". A look at the DsD (the Action selected by the system) edit window for "@27 [H1]" would show Angle=180, Rate=20, Do=2, RiName=H1, Register=TIRED, and Value=10. All that means that StoryPAL is to move 180 degrees (directly away from something) at a rate or speed of 20 (StoryPAL's fastest incremental pace, 20 pixels), Doing 2 (which means running, and the screen display for the StoryPAL or whichever Thing is Self, is changed to one that appears to be running), and the something to go 180 degrees from is H1, the Predator. Makes sense! Running hard from anything can make one tired, and sure enough, to the TIRED register is added 10 points. This Action is intended to be the Action most likely to reduce the danger of the present Problem.

Following the arbitrary action name, "@27 [H1]", is Predict=True. This field will be discussed in the next section titled "Prediction". The Look-For Si is Anything. The only two values shown here are Anything and None (look-fors have also been generally discussed in the invention summary). How-Look is 360-degree scan meaning that: while running away from the Predator, be looking all over for anything that will help.

Prediction

One major function of a brain is to "what if" whether a possible action choice will "work" or not (i.e., "'What if' I do this action; what will happen, something good or something worse than what my situation is now?"). If it looks like the action will work, then take that action. If it doesn't then do a "what if" on another action. In place of the words "what if" we can use the word "predict". The process can be thought of this way. The Predator (High I) is close. StoryPAL's genetics or learning say to take some particular action (e.g., if there is a tree around, head for the tree). Now freeze the world. StoryPAL and the Predator stop moving. StoryPAL now mentally heads for the tree and mentally has the Predator chasing him/her. If StoryPAL makes it to the tree ahead of the Predator, we can say that StoryPAL's prediction regarding this Action "worked". We could say that StoryPAL predicted he/she would be in a situation where he/she was safely in a tree as opposed to being in a situation where he/she was in the clutches of the Predator first.

The following discussion of Strategy and Plans shows that one can be in an improved situation without even reaching a final goal of being rid of the Problem completely. What the Predict=True/False means is that at the time the Problem is identified and before its default Action is taken, StoryPAL is to run a prediction to determine whether or not that action can be expected to either rid StoryPAL of the Problem or at least put him/her on a course that can be expected to result in being rid of the Problem.

Why would a creature which can do Prediction elect not to do so here? If, for example, the Predator had just jumped out from behind a bush and taken a nip at StoryPAL, even the small fraction of a second it would take StoryPAL to do the Prediction is not advantageous. Do the default Action of leaping away from the Predator NOW. Instantly. Nothing else makes sense. Only StoryPAL has the ability to do Prediction.

The Strategy

The Problem/Subgoal points to a Strategy arbitrarily named "@30 [H1]". A Strategy consists of one or more Plans. "@30 [H1]" has three plans represented by the three columns in the Strategy window. They are titled on the row that starts with "assure a dead [H1]". Think of a plan as culminating with the absence of the relevant Problem. When StoryPal encounters problems that are of a nature it has seen before it usually has a Plan for getting rid of them. That Plan is usually a multi-step plan with each step being an abstract Situation, in other words, an Si. Suppose StoryPal were getting hungry. It's Plan might be get into a situation of not being near food. Then it would want to be in a situation of being at the food. Then it would want to be eating the food. Plans have steps starting at the bottom of the list under the Plan name. That list contains the names of Subgoals, as in Problems and Subgoals. It is StoryPal's experience that if it can get to that lowest Subgoal and do the prescribed Action it will move up to the next Subgoal. And if it keeps moving up the Subgoal chain it will end up at the top, which means it will be rid of its problem.

Let's look at the details. If StoryPAL is at the Problem/Subgoal "@33 [HI]" from the Situation "HighINear", meaning that a thing one level above StoryPal in the same food chain is less than 100 pixels away. Then StoryPal will use the Strategy "@30 [HI]" which is 3 different Plans to "get away from the HighI". StoryPal will then search through all the Plan node Situations looking for a starting place on a plan. If StoryPal's home is visible (<255 pixel away), StoryPal will find its starting place on the Plan node "@8 [HomeI]" (look at the bottom of the second Plan titled "get @11 @12 [HomeI]") StoryPAL will know it is there by detecting that it is in the Situation titled HomeIFar. Go to the Problem/Strategy window and look up "@8 [HomeI]". The Situation is HomeIFar. A look-up of the Si HomeIFar shows that it means that Self is <255 (pixels) from HomeI. A look-up of the Decision "@19 @12 [HomeI]" shows that StoryPal's action is to go at a rate of 20 (StoryPAL's fastest) directly toward (angle zero) HomeI. It is expected that doing so will bring StoryPAL to the next Subgoal of "Safe @6 [HomeI]" where the Predator in this Africa world cannot attack StoryPAL.

All plans are of the nature: a thing is at Situation A, do this to get to Situation B. Now that thing has made it to Situation B, so do this to get to Situation C, etc. It is also true that there can be more than one plan that will get one out of the Problem. The Strategy "@30 [H1]" has three plans for getting to a situation where StoryPAL is safe from the Predator. The left-most is that the Predator for some reason gets dead (a real possibility since the Native hunter can kill the Predator with the Impaler, meaning, in our default "Africa" world, the spear). The next is that StoryPAL gets to that HomeI or H1, the Tree in this case. The third safe place to be is where the Native hunter is since the hunter can kill the lion, but not vice versa.

Something else needs to be noted regarding Strategies (sets of Plans). One doesn't have to start at the bottom to work one's way to the top. StoryPAL's brain looks for a match/inclusion between its current situation (Sx) and any place (Si) on any plan in the appropriate strategy. If a plan is six steps long being on any of the six is a good starting point, but they are checked by StoryPal top to bottom. In fact, the farther up the plan the better because that means StoryPAL is starting out pretty close to the goal. So it works like this: Starting with the Si referenced in the highest-level Subgoal, StoryPAL compares its Current Situation (Sx) to that referenced Subgoal's Sis. If the Current Situation abstracts into, i.e., is included in, that Si, there is a match to that Subgoal. If not, go to the next-lower Subgoal and do the same. Eventually an inclusion, a match, will be made between the Current Situation Sx and some Subgoal's Si. Once the match has been made, the current Subgoal has been identified. That Subgoal has an action (Decision) associated with it. Then the prescribed Action is tried by StoryPal in hopes of moving up to the next and less dangerous Situation in the Plan where the next Action is taken to move up again, and so on until the Problem is gone.

What is going on is: a Situation (Si) is recognized. If it is a brand new Problem, there is a default Action. If not, the Action is based on a determination of where on a Plan StoryPAL finds him/herself. An Action is specified to move up the Plan. Before that Action is taken, it is mentally tested (a Prediction is run), given the existing Situation (Sx), to see if it "works" or not. This will be clear from having read about Prediction above. Finally ("finally" being a small fraction of a second), an Action is selected and executed. No Action (except possibly that first default Action) is taken without a "mental" testing-prediction to see what-if. This is the Predictive element of the system. As soon as the Action is selected and execution of it is set up, a new cycle of Noticing, Recognizing and determining a new Sx is started. If anything "relevantly" different from the last Sx "sneaked into" the Situation it can be taken into account since StoryPAL analyzes every new Sx in terms of the Si's in which it may be "included".

Actually, there is an additional step that goes along with "sending out" and "setting up" the selected Action to be executed. Not everything out there can or will be Noticed; there's just too much of it or in some situations (particularly the more dangerous ones) only certain of what's out there matters (for example, if StoryPal is being chased by a predator, it won't be doing much food watching). So indications of what to Look For are also sent out for sensory use. For example, if StoryPAL is being chased by a Lion, Look Fors of the yellow Lion color and the big Lion size would be looked for. StoryPAL can ignore lots of things, but the chasing Lion is not one of them.

Behavior Tendencies (+Chars, PF's)

What Is A Behavior Tendency?

Different creatures tend to do different things in the same situation and the same creature tends to do different things in different situations. Given the situation that an attacking Lion is near a StoryPAL which is near a Tree, the behavior tendency of the StoryPAL is to run away from the Lion and toward the tree (assuming the Lion is not between the StoryPAL and the Tree). Given the same situation, the behavior tendency of the Lion (if hungry) is to run toward StoryPAL, not away from it. If the situation included a StoryPAL and a Rabbit (StoryPAL's eat Rabbits) but not a Lion, StoryPAL would tend (if hungry) to run toward the Rabbit as opposed to running away from anything.

So a Behavior Tendency or PF (Prediction Factor) is what a creature is most likely to do given a certain situation. It consists of two basic pieces: a situation and a resulting action. Behavior Tendencies are called +Chars in this system embodiment. From this point forward in this document "PF" and PF's" will be used so that the reader has in mind the idea of Prediction. "+Chars" will be used only when referring to that literally when discussing a window. Creatures or Things are described by two types of descriptors. The first type is identifying characteristics of the type noticeable by sensors or how a creature is identified by another creature. This includes shape, size, color and the like. It is what is seen on the first window of the Thing editor described in the "StoryPAL (Novice) User's Manual". In StoryPal's world, it is how things recognize other things. In this system these are referred to as Chars (they are sometimes called "RF's" for Recognition Factors which we will also use from this point forward).

The second type of descriptor is the PF or Behavior Tendency. Let's go back to the Situation with the Lion and StoryPAL. First StoryPal notices the shape and size of the other creature and concludes that it is a Lion and it is near. The Lion does likewise to determine that it is near a StoryPal. Now StoryPal's brain "pulls up" or "accesses" the Behavior Tendencies of the Lion and assigns them to or associates them with that Lion thing in its brain's Situation. StoryPal can now guess or Predict, what's going to happen next, namely that the Lion is going to run toward StoryPAL who is going to run away from the Lion. These Behavior Tendencies are also Characteristics (Chars for short), but that word is already taken in the system, so the Behavior Tendencies are called Plus-Characteristics or, for short, +Chars, and Predictability Factors or PF's for short.

Note that while RF's do not determine Behavior Tendencies (how does yellow or big behave?), the opposite is often true, namely that PF's can be used to determine what a Thing is. For example, if StoryPal saw something bounding along with a certain unique hopping gait, even if it couldn't quite make out its shape or color it might determine it were noticing a kangaroo-like thing.

The +Chars Window

FIG. 33 shows three open windows of the expert system: +Chars (PF's); Situation (Si); and Decision (DsD or dsd). The +Chars window or table has four fields: The +Char's (PF's) name, a reference to a Situation (Si), a reference to a Decision (sometimes called a DsD or dsd in the system) and a Phantom reference. Each line in the +Chars window is a separate PF. As discussed herein previously, a Behavior Tendency (a PF) describes how something behaves in an (abstract) Situation, or, in other words, what Decision (regarding what to do next) it will do given a Situation. Hence the Situation and Decision (DsD) fields in the +Char window. The last field in the +Chars window is called Phantom. There are places in the system where it is desirable to adjust the hierarchied sequence of the PF's. The Phantom field, when used, is the primary sort field (thus overriding the default PF hierarchy). The Situation (Si) window has already been described. It is worth noting here that in FIG. 33, unlike FIG. 31, this particular Si has two applicable lines (each line is called a "sub-evaluation" or "subeval" or SE). Here's how the Si in FIG. 33 is read: The Si named HighIIClose&AtHomeII (which can be translated "when a high-two is close to Self and Self is at home II" exists when the Self is less than a distance of 60 pixels from a thing in the High position of the second food-chain AND when the Self is less than 20 pixels from the Home (second food-chain). At the end of the first line it says something other than NOOP (it says AND instead in this instance).

A PF is a Behavior Tendency than can be assigned to a Thing, and presumably it will be, or it would not have been created. In fact, it could be assigned to any number of Things. However, since this one has to do with staying safe from a High in food-chain Two (at HighII), it would only make sense to assign it to a Thing to whom a HighII was dangerous and also was safe from that HighII if it was at HomeII (i.e., a LowII).

The Decision (DsD or Dsd or dsd) Window

The DsD window (see FIG. 33) shows one complete Decision per line. If a PF of 2LowSafe@HomeII is assigned to a Thing then, when that Thing is less than 60 pixels from a HighII and is less than 20 from a HomeII, that Thing will "hide" ("hide" is the name of the applicable DsD). What does hide mean? The rest of the DsD line tells us. It means that at an angle of zero degrees and at a rate of zero speed relative to SELF (all of which means don't move) Do 7 (rest). FIG. 34 shows a chart describing Do-ings. Do-ings that have negative numbers are used to direct physical actions for the Thing consistent with the DsD. Do-ings in the 0-25 range are used to change the screen picture (the icon) of a Thing, e.g., a Lion Do-ing 0 might look like it's just standing there. If it's Do-ing changed to 14, it might show on the screen on its back with its tongue out and Xs for eyes, paws in the air, etc. If there is no separate icon for a Thing for a particular Do-ing, the Normal Do-ing picture is used by default.

Figure 35:
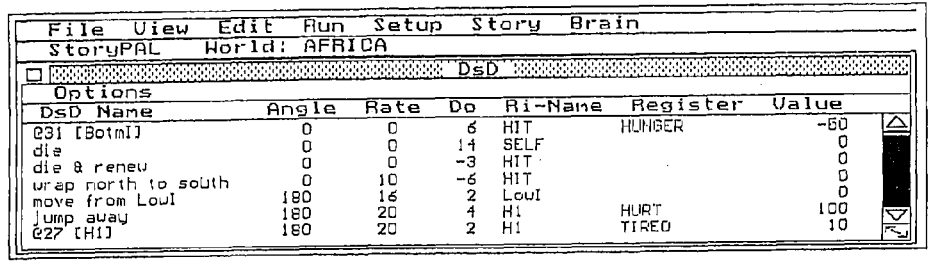
FIG. 35 shows another portion of a Decision (DsD) screen.

The DsD (Decision) window in FIG. 33 does not show any values in either the Register or the Value fields, hence FIG. 35 is shown, although it is unrelated to any of the values shown in the +Chars and Si windows in FIG. 33. Looking at the first line at the DsD Name "@31 [BotmI]", if that decision is made, the "Hunger Register" is decremented by 50 per the "−50" in the Value field. "@31 [BotmI]" is relevant to something that eats a Bottom 1 having that Bottom 1 in its clutches. Eating a bite or two of the Bottom 1 will reduce what ever is eating its Hunger by 50 units. On the other hand, if the decision is the sixth line, "jump away", that results from being bitten by a Predator, which will most certainly increase one's Hurt by 100 units. For more on the Hunger, Hurt and Tired registers see the section "Recognition Factors (Chars, RF's)" below.

The Meta PF's Window

Recall that PF (Prediction Factor) is the same as +Chars. PF's are Behavior Tendencies so, taking it a step farther, Meta PF's can be thought of as Meta Behavior Tendencies. Meta PF's are not a direct part of the functioning of the Autonomous Decision System within this system, but are a fast natural-language expedient for assigning groups of PF's to Things via the Thing Builder's Behavior pages (of which there are five, see FIGS. 21-25). For how to read the MetaPF window shown in FIG. 36:

1) The MetaPF called Low includes all the PF's under the PF's column heading.
2) It also INcludes all the PF's in the PF's column of those MetaPF's referenced in the MetaPF+ column.
3) In also EXcludes (deletes) all the PF's in the PF's column of those MetaPF's referenced in the MetaPF− column.
4) When going to the MetaPF's referenced in the MetaPF+ and − columns the system stops with those MetaPF's for adding and deleting PF's. In other words, the system does not go from the starting MetaPF and then go to the referenced + and − MetaPF's and then go to their referenced + and − MetaPF's and on and on.
5) Further, once the MetaPF's referenced by the starting MetaPF are looked at, only the PF's listed in their PF's column are added or deleted, and then the process is done, i.e., their MetaPF + and − columns are ignored.

Figure 36:
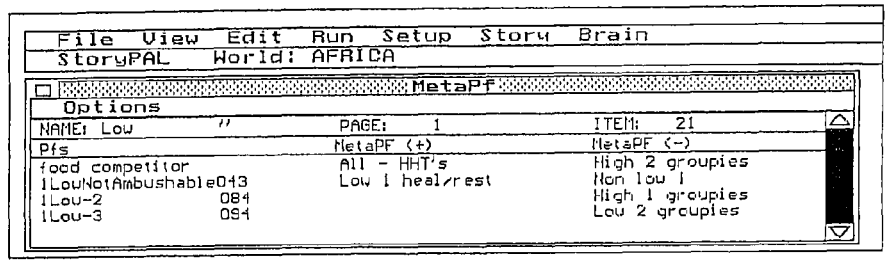
FIG. 36 shows a MetaPF (or MetaPf) window.
Figure 37:
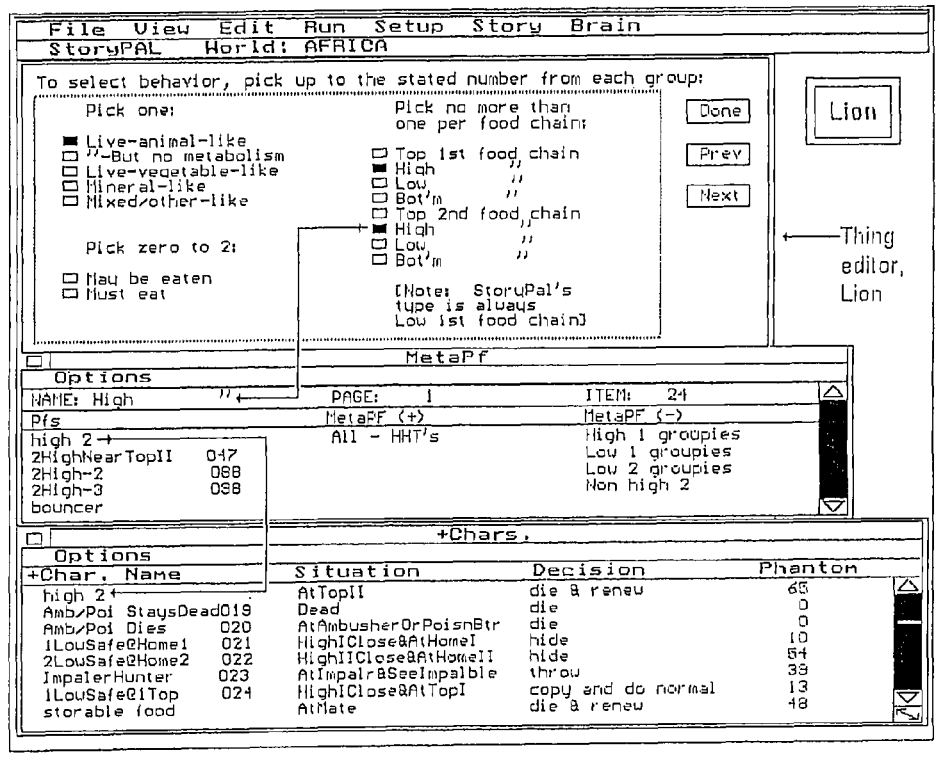
FIG. 37 shows three open windows of the expert system: Page 1 of the Behavior editor; a MetaPF window; and a portion of the +Chars. (PF's) screen.

FIG. 37 shows three open windows of the expert system: Page 1 of the Behavior editor; a MetaPF window; and a portion of the +Chars. (PF's) screen. FIGS. 21, 25, 36, and 37 are used for describing why MetaPF's exist and how they work. FIG. 21 is what the user sees when the Thing Builder is opened from the Edit Menu and select Behaviors. There are five "pages" (separate screen windows) of selections to be made to build a Thing's behaviors. FIG. 25 shows page 5 of the Behaviors menu. Each selection (clicking in a box in front of some words on a line) "grabs" some PF's via the MetaPF mechanism without a Novice user (who can use the Thing Builder but has no access or even reference to +Chars/PF's) having to understand a thing about Behavior Tendencies (PF's).

Every line in Thing Builder/Behaviors (i.e., FIGS. 21-25) is prescribed with a MetaPF, including the lines which have no selection but only an instruction (such as "Pick one:") or even the blank lines. Each of the five pages in Behaviors can be thought of as having two columns with fifteen lines each which are referenced in the MetaPF window by a page number and a line number with a value in the range 1-30. A MetaPF that is not to appear in the Behaviors is given a page number of zero. A user might find it helpful to open the MetaPF window and from its Options menu select Print. That will print all the MetaPF's already in the system. Use the printout by looking at each printed MetaPF's Page and Item (line) numbers and associate them with specific lines in the five Behavior windows. The user will see that those having a Name, Page and Item but nothing under the headings PF's, MetaPF(+) or MetaPF(−) are words in the windows only and have no check box enabling them to be selected.

The very first MetaPF in the printed list will be "Name: Pick one:, Page 1 and Item 1". That will correspond to the very first line on the very first Behaviors page. There is no MetaPF for Page 1, Item 2, and that line is, in fact, blank. FIG. 21's page 1 window in the second column shows two food chains (1st and 2nd). Note the line with a check box in the first food chain that says 'Low "'. FIG. 36 shows the MetaPF window for the MetaPF named 'Low"'.

Note that it shows that it belongs on Behaviors page 1 on line 21 (the sixth line of the second column) which is just where the user finds it in FIG. 21. This is how the columns in that MetaPF window are read and used:

1) Include for any Thing chosen to be a "Low 1st food chain" the four PF's shown in the PF's column ("food competitor", etc.).
2) Now go to the MetaPF "All—HHT's" window and add to "Low 1st food chain's" PF's all the PF's listed in the PF's column of the MetaPF "All—HHT's".
3) Also add all to "Low 1st food chain's" PF's all the PF's listed in the PF's column of the MetaPF "Low 1 heal/rest".
4) Then remove from to "Low 1st food chain's" PF's (if they are present) all the PF's listed in the PF's column of the MetaPF "High 2 groupies".
5) Then remove from to "Low 1st food chain's" PF's (if they are present) all the PF's listed in the PF's column of the MetaPF "Non low 1".
6) Then remove from to "Low 1st food chain's" PF's (if they are present) all the PF's listed in the PF's column of the MetaPF "High 1 groupies".
7) And finally, remove from to "Low 1st food chain's" PF's (if they are present) all the PF's listed in the PF's column of the MetaPF "Low 2 groupies".

Now the "Low 1st food chain's" PF list is complete.

FIG. 25 is page 5 of the Behaviors windows. It shows the default action the Thing is to take when it isn't in an Si that is a Problem requiring some other DsD (Action). It's what to do when this thing doesn't have anything to do and isn't even hurt, hungry or tired. The user can pick only one of these. Look above in the "Do-ings" Table at the one whose number is −4. The explanation given there for Do-ing −4 is "Default". That means to do the action specified on page 5 shown in FIG. 25.

FIG. 37 shows how the Thing Builder/Behaviors, MetaPF's and +Chars (PF's) relate to each other. The Thing Builder window in FIG. 37 shows 'High" '(meaning High 2nd food chain) selected. That refers to a MetaPF of the same name as indicated by the arrow from the Thing Builder window to the MetaPF window. In the MetaPF window the first PF is "high 2". The arrow then traces that PF to the +Chars window's "high 2". Reading across that line in the +Chars window we see that something that is High in the 2nd food chain will, when in the Si "AtTopII" (which, if looked it up in the Si window, means that when the High in the 2nd food chain is next to the Top in the 2nd food chain), "die and renew". What does "die and renew" mean? Why not just "die"? Running the world over an extended time eventually gets all or nearly all the creatures killed off. That is a bit boring, so "die and renew" means die but have the system automatically plunk another of the same Thing at some random place in the world. A typical High in the 2nd food chain is the Lion. If the Spear Thing kills the Lion, another Lion will appear somewhere in the world. If the user were to make a world where Things are born every now and then, "renew" might be unnecessary since a "balanced" birth and death rate would perpetuate an "ecological balance". But until that was done, the user would find "die and renew" to be the only way to accomplish that.

Recognition Factors (RF's)

Recall that, as the title of this section indicates, RF stands for Recognition Factor and that any time "Chars" is seen on a screen it means RF's. At this point it might be helpful to quickly re-read the section titled "Behavior Tendencies" becoming reacquainted with what an RF is, namely characteristics or distinguishments by which we recognize someThing.

FIG. 38 shows the Chars (RF) screen. Compared to the real Chars window in the system this figure has horizontal lines dividing the listing up into three sections (1, 2 and 3 with circles around them). Also, while every RF (each line is a separate RF) in the system is not shown, every "type" of RF is shown. In the section "Behavior Tendencies", the simplified view that RF's consisted of what we can detect with our senses regarding Things other than Self was indicated with a hint that Behaviors could be RF's as well as PF's. That will, of necessity, be expanded here.

The Thing Builder's Select menu shows five choices: Shape, Size, Color, Temperature and Behavior. Shape is described in the Novice User Manual. Behaviors is discussed above under "Behavior Tendencies" and "+Chars" sections. The Chars window has the following fields:

1) Char (RF) Name: For portion 1, for example, these are the words seen in the Thing Builder.
2) Register Used: Sensory values are contained in registers. For example, the Blue color register detects "blue" if the "light waves" in the system (a metaphor) detectable by the Blue register are between the values 1 and 127. If they are in the range 128 and 255 (the maximum value allowed in a register) they are detected as "white".
3) Min(imum): In the just-discussed "Register Used", values were mentioned (in the Blue register, between 1 and 127=blue versus between 128 and 255=white). This is where the lower of those numbers in each range goes. Minimum means the lower limit value in the indicated Register that will be detected as the Named Char.
4) Max(imum): What is applicable to the Min is applicable here except that Maximum means the upper limit value in the indicated Register that will be detected as the Named Char.

The portion of the Chars window labeled "1" shows the varieties of Size (Small, Medium and Large), Color (Blue, White, Red, Yellow and Mixed Hues) and Temperature (Cool, Tepid and Warm). The portion of the Chars window labeled "2" shows the varieties of values having to do with registers that detect signals from inside the Thing itself. The three registers initially set up in the system are for detecting degrees of Hunger, Hurt and Tiredness. That there are six degrees of Hunger and five each for Hurt and Tiredness is arbitrary and at the discretion of the user. These three registers can be tracked in the LifeSigns window (see the preceding Novice discussion).

We will now discuss the portion of the Chars window labeled "3". Recall from the "Behavior Tendencies" section above that some Thing's behaviors are sufficiently unique to enable them to be used for recognizing what a Thing is. The unique hopping motion of a kangaroo-like thing was used for illustration. Here are some of those Do-ings set up initially that will be used to help determine a specific Thing (and as a result, the Class or Ri) Noticed. PF's are set up in the Chars window, but where are they used. The answer is they are used in the Class (Ri) window.

Class (Ri)

FIG. 39 shows a portion of the Class Editor screen. An Ri or Pi (a Class of Things) includes all of the Things having one or more characteristics or distinguishments in common. If, for example, a Medium-sized Thing is prey to any Thing that is Large, then it doesn't matter what color or shape someThing is or what it is Do-ing, if it is Large and near, the only wise Decision is to get away. In that case, the Ri of Predator need only have one characteristic, namely the Chars (RF) of Large, since anyThing Large is a Predator. FIG. 39 shows an Ri named "OnFirePlac" (not used in Africa). For anything to be characterized as an OnFirePlac it must have a PF of "place to make a fire" and an RF of "FireOn".

Focus

The types of scans available for Things to use are many. For purposes of initial simplicity, all things in the world of the programmed entertainment system do a 360 degree sweep with a "vision" limit of 255 pixels.

Status Window

FIG. 40 shows the Status window. The first three rows are discussed above, namely Hurt, Hunger and Tired and are used by all things including StoryPal. The remaining rows are used exclusively by StoryPal. The Hurt, Hunger and Tired rate of change are the next three rows. Motorrate is the rate of change in StoryPal's level of "physical activity" (i.e., metaphors to total bodily muscle activity). Note that this number is subtracted from Total arousal using the minus sign in the Weight column. The rest of the rows have to do with registers showing feelings that result from Si's and the success or failure of trying to execute plans (except Total, which is a simple sum). The following rules might be typical of how feeling registers might be used:

The Fear register is the same value as the Level in the Problem (see the Problem/Subgoal window.

The Surprise register is incremented when StoryPal notices being further along on a Plan than predicted.

The Disappointment register is incremented when StoryPal notices that it is has "lost a plan" that it was on.

The Frustrated register is incremented when StoryPal notices that it is not getting to a plan node when it was predicted to.

The Hopeless register is incremented when StoryPal notices that it cannot find a starting place on a plan.

The Pain/Joy register is either incremented or decremented depending upon the rate of change in the Total register value.

The Total register is a sum of all other registers after those other registers have been multiplied by the number in the Weight column as a percent. (These default values were arrived at after much trial and error in order to make StoryPal's expressions and stories more "interesting".

The rest of the fields for each register name are:
1) Move: This is the value that will be added or subtracted from the relevant register each time cycle (each new Current Situation) if StoryPAL is moving and is in addition to any other register value input.
2) Stopped: This is the value that will be added or subtracted from the relevant register each time cycle (each new Current Situation) if StoryPAL is not moving and is in addition to any other register value input.
3) Weight: See Total register above.
4) FaceMin: The value in this feelings register must be at least this much to have any effect on StoryPal's expression this time cycle (another way to adjust StoryPal's face to make it more "interesting".

Region Window

There are two Option menu choices in the Region Window that are not part of the Novice system and therefore not described in that User's Manual.

Huh? (A debugging tool for experts)

FIG. 41 shows the "Huh?" window. This window enables the user to determine a lot of information about any of the Things in the Region screen. First, in the Region window click the cursor arrow on any Thing. That "selects" it. Then open the Options menu and select "Huh?". The window shown in FIG. 41 will appear. In this case, the Lion was selected. The available information is:
1) Now & Prior location: FIG. 41 shows that the Lion was immediately previously at X,Y coordinates (in the World) 193,153 and is now at 172,163.
2) Rads: This is the direction the Lion is moving in Radians.
3) Speed: This is how many units of distance the Lion is moving as of "now".
4) PF: The Lion's current PF is "2High-3 098".
5) Si: If the Si is "LowIINear" (if a Low in food chain 2, which is the Lion's prey, is near), then . . .
6) DsD: The DsD is "race to Low II" (meaning go get it!).
7) Do: The Lion will be Do-ing "1" which means Chase.
8) Rel.Rx: The Rx is a Thing. The specific Thing all this activity is Relative to (from the Lion's point of view) is the Deer which is at X,Y location 141,179.

Print

Selecting this menu item prints a listing where each Thing is in the World at this time, and for each line the fields printed are: The Thing's name, its current X,Y coordinates, DsD, speed, direction, Si and how it came to be in the World (plunked, created by the system, etc.).

Some Miscellaneous Settings

Enter Icon Path:

In the Region window are seen the Things that are in a World and where they are located in that World. The Icons (little pictures) of the Things are intended to look like the Things, and even to make each Thing look like it is Do-ing what its Do-ing indicates. A user can locate Icon files in any subdirectory desired. The system assumes, unless overridden by data in this field, that the Icons for a World are located in c:\brain. However, if they are located elsewhere, open "Enter icon path:" window in the Setup menu by selecting "Icon Path" (see FIG. 42) and replace c:\brain with the complete path wherever Icon files are located.

Set Pain Threshold:

This is the minimum level of pain (from the Pain/Joy register) that StoryPal must have in order to trigger the beginning of an "interesting" story. See FIG. 42.

Set Fear Threshold:

This is the minimum level of fear (from the Fear register) that StoryPal must have in order to trigger the ending of an "interesting" story. See FIG. 42.

Moving Things—Point Of View

All data structures are used by all Things in a World except for a few that are unique to StoryPAL. Those include the ability to take a DsD and run it into the future a few cycles to see if it will work (see "Prediction" above under "The Situation And Its Meaning"), the ability to remember what happened to it and then tell an interesting story about what happened (Story) and feelings or emotions (see Fear, Surprise, Disappointment, etc. in FIG. E-8 above). All other data structures and their use in processing are common to any Thing placed in any world. The system "flows" from Si to Si by going from one Current Situation to another. The system processes "everything" for one Current Situation, which ends up with everyThing that is going to move being moved per its DsD (per its Decision regarding how to move), and then processes the next Current Situation. The continuous movement on the screen is a continuous processing of Current Situations.

How everything moves each Current Situation is determined by looking at the entire World during that Current Situation from each Things point of view, in turn, with StoryPAL always going last. Picture a Current Situation in which there are only a Lion, a Tree and StoryPAL.

Start with the Lion. Construct an Si from the Lion's "point of view". The Lion is at the center and locates what is around it. From that it constructs an Si which, when processed, results in a decision (DsD) prescribing how the Lion will move that Current Situation. Then the same is done for the Tree (its decision on how to move will always be the same, unless the user changes it, namely, don't move! Trees are like that, unless the user would like to do a hurricane World where trees do move. Last, StoryPAL calculates its move with the advantage of testing it out first in its head and picking another one if that doesn't turn out well (i.e., winds up with an even worse problem). Then the other Things (the Lion, Tree and StoryPAL) all do the moves they have decided to do, all the Icons on the screen are moved accordingly (and perhaps changed for a Thing if its Do-ing so dictates) and the Current Situation is done with the next one started immediately. Each current situation on a 486 or better PC will take a small fraction of a second.

The point that a user might find important in thinking about how to make and change worlds is that the data structures (Thing, Si, Ri, PF, DsD, etc.) are all available for every Thing in a World to use, and some of them will be used by each Thing each and every Current Situation. So when a user looks at or writes a data structure, do not write it with only StoryPAL in mind Those structures can be made the property of the "brain" of every Thing in a World for deciding how to move.

FIG. 43 summarizes the access to the data structures.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A computer system for implementing decisions of an autonomous decision system in an environmental situation, comprising:
   a) at least one computer processor structured and arranged to process data;
   b) at least one computer storage device structured and arranged to store data on a storage medium;

c) at least one input computer processor structured and arranged to provide temporally-incremental input data about a series of said environmental situations; and d) at least one concrete-situation computer processor structured and arranged to process data regarding said temporally-incremental input data about said series of said environmental situations to provide a temporally-incremental series, respectively, of "present" concrete self-situation representations of said respective environmental situations, wherein i) each said self-situation representation comprises a self representation and a set of event representations, each said event representation being represented specifically spacio-temporally relative to said self representation, and each said event representation including (1) a behavioral-type designation selected from a set of behavioral-type designations, each said behavioral-type designation of said set of behavioral-type designations being associated with a set of incremental behavioral self-tendencies for determining incrementally-predicted self-situation representations from a said presented self-situation representation; and (2) a set of current-behavior designations associated with each said event representation specifying the current behaviors of each said event representation; and e) wherein said system enables implementing decisions of an autonomous decision system in an environmental situation.

2. The computer system according to claim 1 wherein said at least one concrete-situation computer processor comprises at least one representation data computer processor structured and arranged to process data to represent a particular object as part of a collection of object representations, each said object representation of said collection comprising a said behavioral-type designation, and said at least one concrete-situation computer processor further comprising:

a) at least one assignment computer processor structured and arranged to process and store data regarding assigning characteristics to each said object representation of said collection, wherein essentially each of said characteristics comprises a subset of a set of self-tendencies and a corresponding subset of a set of self-tendency markers, i) said set of self-tendency markers having a 1-to-1 correspondence with said set of self-tendencies, one unique marker from said set of self-tendency markers corresponding respectively with each self-tendency of said set of self-tendencies, ii) said subset of self-tendencies being constructed and arranged to permit a determination of the expected behavior of each said object representation with respect to any mappable representation of other object representations from said collection of object representations, iii) each said self-tendency consisting essentially of an instruction for self-behavior (of any first object representation to which said self-tendency may be assigned) on the condition that any mappable representation of object representations from said collection, including said first object representation, from the viewpoint of said first object representation, is included in a specified self-relation selected from a set of self-relations, and iv) where each self-relation of said set of self-relations comprises a specified space-time relation among a said first object representation and at least one said other object representation, each said other object representation being specified as a subset of a set of self-tendency markers, each said subset of self-tendency markers corresponding to the subset of self-tendencies assigned to each said other object representation.

3. The computer system according to claim 2 wherein:

a) each said self-tendency marker has a first marker part selected from a set of first marker parts and a second marker part selected from a set of second marker parts, b) said set of first marker parts having a 1-to-1 correspondence with said set of self-relations, and c) said set of second marker parts having a 1-to-1 correspondence with said set of instructions for self-behavior.

4. A computer system for implementing natural language functions in a humanoid autonomous decision system, comprising:

a) at least one computer processor structured and arranged to process data;

b) at least one computer storage device structured and arranged to store data on a storage medium;

i) wherein said data comprises non-linguistic discrete data-types and, conforming to each of said discrete non-linguistic data-types, a set of non-linguistic discrete data elements; and c) at least one input computer processor structured and arranged to provide information about current circumstances of the humanoid autonomous decision system;

d) at least one output computer processor structured and arranged to implement decisions of the humanoid autonomous decision system; and e) at least one relevance computer processor structured and arranged to provide information regarding the relevance to the humanoid autonomous decision system of said current circumstances, comprising i) at least one self-representation computer processor structured and arranged to process data regarding "self" to provide at least one "self" representation, ii) at least one structured-situation computer processor structured and arranged to process data regarding said current circumstances to provide a first non-linguistic structured "self"-situation representation, iii) at least one relational-situation computer storage device structured and arranged to provide data regarding a set of hierarchically-organized, relevant, non-linguistic relational "self"-situations, and iv) at least one inclusional computer processor structured and arranged to process data to determine inclusions of a said first non-linguistic structured "self"-situation within said non-linguistic relational "self"-situations to determine any relevance of said first structured "self"-situation to a said "self" of said relevance means, v) wherein said data regarding said set of hierarchically-organized, relevant, non-linguistic relational "self"-situations includes data regarding (1) a set of hierarchically-organized problem relational "self"-situations, and (2) in association with essentially each of said problem relational "self"-situations, a set of hierarchically-organized plan relational "self"-situations; and f) at least one type-linking computer storage device structured and arranged to provide data regarding i) respectively linking essentially each said discrete data-type of said humanoid autonomous decision system with a respective word/phrase category of a first natural language, and ii) respectively linking selected words/phrases of each said linked word/phrase category of said first natural language with respective said discrete data elements of each said discrete data-type so linked with a said linked word/phrase category; and g) at least one data transformation computer processor structured and arranged to process data regarding a first communication to be made by said humanoid autonomous decision system to transform a specified set of non-linguistic data elements into a said first communication in said first natural language, comprising i) at least one identification computer processor structured and arranged to process data regarding identifying which of said discrete data elements of said discrete data-types is to form part of said first communication, ii) at least one snippet computer processor structured and arranged to process data regarding selecting natural-language snippets for pointing to the said categories of said natural-language corresponding to whichever of said discrete data-types includes each said discrete data element which is to form part of said first communication, iii) at least one vocabulary computer processor structured and arranged to process data regarding selecting a word/phrase of said natural-language corresponding to each said discrete data element which is to form part of said first communication, and iv) at least one grammar computer processor structured and arranged to process data regarding producing from the grammar practices of said natural language and from said snippet selections and from said word/phrase selections said first communication in said natural language.

5. The computer system according to claim 4, further comprising:

a) at least one what-if computer processor comprising i) at least one trial-decision computer processor structured and arranged to provide data regarding, in association with each of said relevance self-relations, a set of hierarchically-organized "self" trial decisions;

ii) at least one selecting computer processor structured and arranged to process data regarding said "self" trial decisions to provide data regarding, when a said relevance self-relation has included a said specific circumstance, a current selected said "self" trial decision;

iii) at least one trial-decision-testing computer processor structured and arranged to process data regarding using said at least one relevance computer processor to determine the relevance of selected amended structured-situations arising by simulation from using a selected said "self" trial decision for the "self" object within the then said specific circumstance; and iv) at least one self-decision-selecting computer processor structured and arranged to process data regarding selecting, depending upon the then specific relevances upon operation of said at least one trial-decision-testing computer processor, a said "self" trial decision as a then self-decision of said intelligent system.

6. A computer system for implementing first natural language interpretation functions in a humanoid autonomous decision system interpreting incoming first natural language from another, comprising:

a) at least one computer processor structured and arranged to process data;

b) at least one computer storage device structured and arranged to store data on a storage medium i) wherein said data comprises non-linguistic discrete data-types and, conforming to each of said discrete non-linguistic data-types, a set of non-linguistic discrete data elements;

c) at least one type-linking computer storage device structured and arranged to provide data regarding i) respectively linking essentially each said discrete data-type of said humanoid autonomous decision system with a respective word/phrase category of said first natural language, and ii) respectively linking selected words/phrases of each said linked word/phrase category of said first natural language with respective said discrete data elements of each said discrete data-type so linked with a said linked word/phrase category; and d) at least one input computer processor structured and arranged to provide input information about characteristics of said incoming natural language sufficient to identify each vocabulary element, snippet type for each said element, and grammatical function for each said element;

e) at least one translation computer processor structured and arranged to process data regarding said input information to provide a non-natural-language concrete circumstance interpretation of said input information; and f) at least one relevance computer processor structured and arranged to provide information regarding the relevance to the humanoid autonomous decision system of said circumstance interpretation, comprising i) at least one relational-situation computer storage device structured and arranged to provide data regarding a set of hierarchically-organized, relevant, non-linguistic relational "self"-situations, and ii) at least one inclusional computer processor structured and arranged to process data to determine inclusions of said non-natural-language concrete circumstance interpretation within said non-linguistic relational "self"-situations to determine any relevance of said non-natural-language concrete circumstance interpretation a said "self" of said at least one relevance computer processor, iii) wherein said data regarding said set of hierarchically-organized, relevant, non-linguistic relational "self"-situations includes data regarding (1) a set of hierarchically-organized problem relational "self"-situations, and (2) in association with essentially each of said problem relational "self"-situations, a set of hierarchically-organized plan relational "self"-situations.

7. The computer system according to claim 6 wherein said interpreting humanoid autonomous decision system has abilities to select for use in interpretation similar cognitive, relevancy, and emotion systems to those of the other.

8. A computer system for machine learning from an environmental situation in an autonomous decision system, comprising:

a) at least one computer processor structured and arranged to process data;

b) at least one computer storage device structured and arranged to store data on a storage medium;
c) at least one input computer processor structured and arranged to provide temporally-incremental input data about a series of said environmental situations; and
d) at least one concrete-situation computer processor structured and arranged to process data regarding said temporally-incremental input data about said series of said environmental situations to provide a temporally-incremental series, respectively, of "present" concrete self-situation representations of said respective environmental situations, wherein
  i) each said self-situation representation comprises a self representation and a set of event representations, each said event representation being represented specifically spacio-temporally relative to said self representation, and each said event representation including
    (1) a behavioral-type designation selected from a set of behavioral-type designations, each said behavioral-type designation of said set of behavioral-type designations being associated with a set of incremental behavioral self-tendencies for determining incrementally-predicted self-situation representations from a said presented self-situation representation; and
    (2) a set of current-behavior designations associated with each said event representation specifying the current behaviors of each said event representation; and
e) wherein said system provides machine learning from an environmental situation in an autonomous decision system.

9. The computer system according to claim 8 further comprising:
a) at least one predicted-situation computer processor structured and arranged to process data regarding a first of a said series of "present" concrete self-situation representations of said respective environmental situations to provide an incremental simulation of a set of "predicted" concrete self-situation representations;
b) at least one comparing computer processor structured and arranged to process data regarding, for a corresponding particular time, a said "predicted" concrete self-situation representation with a said corresponding "present" concrete self-situation representation to identify any selected minimum event differences between said compared concrete representations;
c) at least one difference-storing computer storage device structured and arranged to store data regarding
  i) said concrete self-situation representations having at least said identified minimum event difference and
  ii) said particular "present" concrete self-situation representation from which said identified "predicted" concrete self-situation representation was computed;
d) at least one choosing computer processor structured and arranged to process data regarding choosing a modification in a said incremental behavioral self-tendency likely to decrease said event difference between said compared representations;
e) at least one testing computer processor structured and arranged to process data regarding, for said corresponding particular time, a said "predicted" concrete self-situation representation and a said corresponding "present" concrete self-situation representation to provide a new identified "predicted" concrete self-situation representation using said modification chosen for said incremental behavioral self-tendency;
f) at least one new-prediction computer processor structured and arranged to process data regarding comparing said new identified "predicted" concrete self-situation representation with said corresponding former "predicted" concrete self-situation representation to identify any remaining said event differences; and
g) at least one heuristic computer processor structured and arranged to process data regarding said modification and said event differences to heuristically choose further processing of data among at least the following
  i) test a further modification of a said incremental behavioral self-tendency, or
  ii) select for storage a modified incremental behavioral tendency, or
  iii) combine for storage a said modified incremental behavioral tendency with a corresponding original incremental behavioral tendency as a replacement incremental behavioral tendency.

10. A computer system for an entertainment system, comprising:
a) at least one computer simulation processor structured and arranged to process data regarding a user-selected "world"-representation containing user-selected spacio-temporally located "object"-representations to provide incremental simulation-stepping of said "world"-representation;
b) at least one natural-language computer interface structured and arranged to process data for providing a natural-language interface for user selection of non-natural-language characteristics of a said "object"-representation;
c) at least one placement computer interface structured and arranged to process data for providing an interface for user placement of a said "object"-representation into said "world"-representation;
d) at least one computer interface structured and arranged to process data for providing an interface for placement into said "world"-representation, as a said "object"-representation, of an autonomous decision system;
e) wherein said autonomous decision system comprises
  i) at least one representation computer processor structured and arranged to process data essentially from said "world"-representation for presenting a selected self-situation (for said autonomous decision system) representation, said presented self-situation representation comprising a self representation and a set of event representations, each said event representation being represented specifically spacio-temporally relative to said self representation, and
  ii) at least one prediction computer processor structured and arranged to process data for determining the representations of a set of incrementally-predicted self-situations, predicted as incremental consequences from said presented self-situation representation;
  iii) wherein said at least one prediction computer processor comprises said computer simulation processor.

11. A machine computational-processing method, for providing current simulated-emotion expression in at least one simulated-humanoid autonomous decision system having at least one ability to assess a set of environmental circumstances, comprising the steps of:
a) storing in such at least one simulated-humanoid autonomous decision system planning data providing plan capability to such at least one simulated-humanoid autonomous decision system;
b) using information about such set of environmental circumstances of such at least one simulated-humanoid autonomous decision system and such plan capability, computing at least one current planning selection;

c) using information about such at least one current planning selection, computing at least one current planning status;

d) using information about such at least one current planning status, computing current simulated-emotion source data; and e) using such current simulated-emotion-source data, computing current simulated-emotion status.

12. The machine computational-processing method according to claim 11 further comprising the step of using information about such current simulated-emotion status, computationally providing output signals to operate effectors to provide current simulated-emotion expression of such at least one simulated-humanoid autonomous decision system.

13. A machine computational-processing method, for implementing decisions of at least one autonomous decision system in environmental situations, such at least one autonomous decision system having at least one input system for providing temporally-incremental input data about a series of such environmental situations, comprising the steps of:

a) computationally processing such temporally-incremental input data about such series of such environmental situations to provide a temporally-incremental series, respectively, of "present" concrete self-situation representations of such respective environmental situations, wherein
   i) each such "present" concrete self-situation representation comprises a self representation and a set of event representations, each such event representation being represented spacio-temporally relative to each such self representation, wherein each such event representation comprises
      (1) at least one behavioral-type designation selected from a set of behavioral-type designations, each such at least one behavioral-type designation of such set of behavioral-type designations being associated with a set of incremental behavioral self-tendencies for determining incrementally-predicted self-situation representations from each such "present" concrete self-situation representation, and
      (2) a set of current-behavior designations associated with each such event representation specifying the current behaviors of each such event representation;

b) computationally processing data regarding at least one such "present" concrete self-situation representation of such respective environmental situation to determine the representations of a set of incrementally-predicted self-situations, predicted as incremental consequences from such at least one "present" concrete self-situation representation;

c) storing data for hierarchical planning comprising
   i) a hierarchical set of n problem representations, and
   ii) m plan-sets of hierarchical subgoal representations, each said plan-set of hierarchical subgoal representations being associated with at least one of said set of n problem representations; and d) computationally comparing such data for hierarchical planning with such data about each such "present" concrete self-situation representation and each such incrementally-predicted self-situation to determine
   i) at least one self-relevancy of each such presented self-situation representation, and
   ii) at least one self-relevancy of each such incrementally-predicted self-situation representation;

e) wherein any threat to and any opportunity of such at least one autonomous decision system may be determined.

14. The machine computational-processing method according to claim 13 further comprising the step of, from such information determined about any such threat to and any such opportunity of such at least one autonomous decision system, computationally determining at least one decision of such autonomous decision system.

15. The machine computational-processing method according to claim 13 wherein such computational comparing step comprises:

a) computationally determining which of such hierarchical set of n problems includes at least one such "present" concrete self-situation representation;

b) computationally determining which of such hierarchical subgoal representations includes at least one such "present" concrete self-situation representation; and c) computationally determining which of such problem representations and which of such subgoal representations include at least one such incrementally-predicted self-situation representation.

16. The machine computational-processing method according to claim 13 further comprising the steps of:

a) computationally specifying at least one self trial decision for use in what-iffing; and b) computationally determining, using such at least one self trial decision, at least one set of such incrementally predicted self-situation representations.

17. A machine computational-processing method, for implementing natural language functions in at least one simulated humanoid autonomous decision system, comprising the steps of:

a) storing in at least one computational storage system data comprising non-linguistic discrete data-types and, conforming to each of such discrete non-linguistic data-types, a set of non-linguistic discrete data elements;

b) storing in at least one computational storage system data
   i) respectively linking essentially each such discrete data-type of such simulated-humanoid autonomous decision system with a respective word/phrase category of at least one first natural language, and
   ii) respectively linking selected words/phrases of each such linked word/phrase category of such at least one first natural language with respective such discrete data elements of each such discrete data-type so linked with a such linked word/phrase category;

c) using information about at least one set of current circumstances of such at least one simulated-humanoid autonomous decision system, computationally determining at least one relevance to the simulated-humanoid autonomous decision system of such current circumstances;

d) using information about such at least one relevance, computationally specifying at least one set of relevant such non-linguistic discrete data elements; and e) using such specification of such at least one set of relevant such non-linguistic discrete data elements, computationally determining at least one first communication to be made by such simulated-humanoid autonomous decision system to transform such specified set of non-linguistic discrete data elements into such at least one first communication in such first natural language;

f) wherein such step of computational determining comprises i) computationally processing data regarding identifying which of such discrete data elements of such discrete data-types is to form part of such at least one first communication,
ii) computationally processing data regarding selecting natural-language snippets for pointing to the such categories of such natural-language corresponding to whichever of such discrete data-types includes each such discrete data element which is to form part of such at least one first communication,
iii) computationally processing data regarding selecting a word/phrase of such natural-language corresponding to each such discrete data element which is to form part of such at least one first communication, and
iv) computationally processing data regarding producing from grammar practices of such natural language and from such snippet selections and from such word/phrase selections such at least one first communication in such natural language.

18. A machine computational-processing method for implementing first natural language interpretation functions in at least one simulated-humanoid autonomous decision system interpreting incoming first natural language from at least one other, comprising the steps of:
a) storing in at least one computational storage system data comprising non-linguistic discrete data-types and, conforming to each of such discrete non-linguistic data-types, a set of non-linguistic discrete data elements;
b) storing in at least one computational storage system data
  i) respectively linking essentially each such discrete data-type of such simulated-humanoid autonomous decision system with a respective word/phrase category of at least one first natural language, and
  ii) respectively linking selected words/phrases of each such linked word/phrase category of such at least one first natural language with respective such discrete data elements of each such discrete data-type so linked with a such linked word/phrase category;
c) computationally processing such incoming natural language sufficiently to provided data identifying each vocabulary element, snippet type for each such element, and grammatical function for each such element;
d) computationally processing such identifying data to provide a non-natural-language concrete circumstance interpretation of such incoming natural language; and
e) computationally determining at least one relevance to such at least one simulated-humanoid autonomous decision system of such circumstance interpretation;
f) wherein such computational determining comprises
  i) storing data regarding a set of hierarchically-organized, relevant, non-linguistic relational "self"-situations, and
  ii) computationally processing to determine inclusions of such non-natural-language concrete circumstance interpretation within such non-linguistic relational "self"-situations to determine any relevance of such non-natural-language concrete circumstance interpretation to such at least one simulated-humanoid autonomous decision system,
  iii) wherein such data regarding such set of hierarchically-organized, relevant, non-linguistic relational "self"-situations includes data regarding
    (1) a set of hierarchically-organized problem relational "self"-situations, and
    (2) in association with essentially each of said problem relational "self"-situations, a set of hierarchically-organized plan relational "self"-situations.

19. The machine computational-processing method according to claim 18 wherein such interpreting simulated-humanoid autonomous decision system possesses abilities to select for use in interpretation similar cognitive, relevancy, and emotion systems to those of the at least one other.

20. The machine computational-processing method according to claim 18 wherein such step of computational processing of such incoming natural language comprises natural-language default-selecting to process data regarding selection of non-natural-language data types and data for correspondence with such incoming information.

21. The machine computational-processing method according to claim 18, further comprising the steps of:
a) computationally processing data regarding at least one story-series of such incoming information to provide at least one story-series of such non-natural-language concrete circumstance interpretation; and
b) computationally processing data regarding such at least one story-series of such non-natural-language concrete circumstance interpretation to provide at least one learned modification of at least one such nonlinguistic discrete data element,
c) wherein such story-series of such non-natural-language concrete circumstance interpretation is treated as at least one temporally-incremental series, respectively, of "present" concrete self-situation representations of at least one temporally-incremental series of respective environmental situations.

\* \* \* \* \*